US012792156B2

(12) United States Patent
Bedal et al.

(10) Patent No.: US 12,792,156 B2
(45) Date of Patent: Nov. 10, 2026

(54) SYSTEM OF MULTIPLE RADAR-ENABLED COMPUTING DEVICES

(71) Applicant: Google LLC, Mountain View, CA (US)

(72) Inventors: Lauren Marie Bedal, San Francisco, CA (US); Leonardo Giusti, San Francisco, CA (US); Amos Oyedeji, London (GB); Eiji Hayashi, Sunnyvale, CA (US); Sean Barclay, Lafayette, CA (US); Ivan Poupyrev, Los Altos, CA (US); Jin Yamanaka, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/111,170

(22) PCT Filed: Sep. 30, 2022

(86) PCT No.: PCT/US2022/077414

§ 371 (c)(1),
(2) Date: Mar. 12, 2025

(87) PCT Pub. No.: WO2024/072459

PCT Pub. Date: Apr. 4, 2024

(65) Prior Publication Data

US 2026/0086647 A1 Mar. 26, 2026

(51) Int. Cl.

*G06F 3/01* (2006.01)
*G01S 7/41* (2006.01)
(Continued)

(52) U.S. Cl.

CPC .............. *G06F 3/017* (2013.01); *G01S 7/415* (2013.01); *G01S 7/417* (2013.01); *G01S 13/50* (2013.01); *G01S 13/88* (2013.01)

(58) Field of Classification Search

CPC ........ G06F 3/017; G06F 3/167; G06F 18/253; G06F 2203/0381; G06F 2203/0382;
(Continued)

(56) References Cited

U.S. PATENT DOCUMENTS

| | | | |
|---|---|---|---|
| 9,542,004 | B1 | 1/2017 | Hu |
| 9,720,559 | B2 | 8/2017 | Tan et al. |

(Continued)

FOREIGN PATENT DOCUMENTS

| | | |
|---|---|---|
| CN | 110850982 | 2/2020 |
| KR | 20150112708 | 10/2015 |

(Continued)

OTHER PUBLICATIONS

Pursuant to MPEP § 2001.6(b) the applicant brings the following co-pending application to the Examiner's attention: U.S. Appl. No. 19/113,189.

(Continued)

*Primary Examiner* — Brent D Castiaux
(74) *Attorney, Agent, or Firm* — Colby Nipper PLLC

(57) ABSTRACT

A system of multiple radar-enabled computing devices, along with related techniques, are described in this document. These techniques are employed with this system to coordinate information and operations across multiple radar-enabled computing devices to create a seamless experience. In particular, each computing device of the computing system may have access to stored radar-signal characteristics that enable detection and distinction of users and detection and recognition of gestures. Computing devices may coordinate in-progress operations to provide continuity across multiple devices. When positioned in different locations, each device may also learn over time users, gestures, and versions of gestures associated with that location to anticipate them in the future.

20 Claims, 46 Drawing Sheets

(51) Int. Cl.
*G01S 13/50* (2006.01)
*G01S 13/88* (2006.01)

(58) Field of Classification Search
CPC ...... G06F 2218/10; G01S 7/415; G01S 7/417; G01S 13/50; G01S 13/88; G01S 13/42; G06V 40/20
See application file for complete search history.

(56) References Cited

U.S. PATENT DOCUMENTS

| | | | | |
|---|---|---|---|---|
| 10,503,883 | B1 | 12/2019 | Gillian et al. | |
| 10,609,199 | B1 | 3/2020 | Haskin | |
| 2010/0083373 | A1* | 4/2010 | White | G06F 3/017 726/21 |
| 2012/0226981 | A1 | 9/2012 | Clavin | |
| 2013/0106686 | A1 | 5/2013 | Bennett | |
| 2015/0007042 | A1 | 1/2015 | Gay et al. | |
| 2015/0091790 | A1 | 4/2015 | Forutanpour et al. | |
| 2016/0041617 | A1 | 2/2016 | Poupyrev | |
| 2016/0320854 | A1* | 11/2016 | Lien | G01S 13/08 |
| 2017/0177383 | A1 | 6/2017 | De Sa et al. | |
| 2017/0205888 | A1 | 7/2017 | Nicholson et al. | |
| 2018/0046255 | A1 | 2/2018 | Rothera et al. | |
| 2018/0088902 | A1 | 3/2018 | Mese | |
| 2018/0210543 | A1 | 7/2018 | Chennamsetty et al. | |
| 2019/0324553 | A1 | 10/2019 | Liu et al. | |
| 2019/0361719 | A1 | 11/2019 | Vangala et al. | |
| 2020/0026361 | A1 | 1/2020 | Baheti et al. | |
| 2020/0064458 | A1 | 2/2020 | Giusti et al. | |
| 2020/0073482 | A1 | 3/2020 | Levesque | |
| 2020/0125158 | A1 | 4/2020 | Giusti et al. | |
| 2020/0285377 | A1 | 9/2020 | Hoefs et al. | |
| 2020/0300970 | A1* | 9/2020 | Nguyen | G01S 13/88 |
| 2020/0301512 | A1 | 9/2020 | Davies et al. | |
| 2020/0356178 | A1 | 11/2020 | Qiu et al. | |
| 2021/0064145 | A1 | 3/2021 | Stern et al. | |
| 2021/0337329 | A1 | 10/2021 | Starpbom et al. | |
| 2022/0113808 | A1 | 4/2022 | Zhao | |
| 2022/0399014 | A1 | 12/2022 | Tan et al. | |
| 2026/0086226 | A1 | 3/2026 | Felch et al. | |
| 2026/0093333 | A1 | 4/2026 | Hayashi et al. | |
| 2026/0186578 | A1 | 7/2026 | Hayashi et al. | |

FOREIGN PATENT DOCUMENTS

| | | |
|---|---|---|
| KR | 102191177 | 12/2020 |
| KR | 20210000974 A | 1/2021 |
| KR | 20210064788 A | 6/2021 |
| WO | 2024072458 | 4/2024 |
| WO | 2024072459 | 4/2024 |
| WO | 2024072461 | 4/2024 |
| WO | 2024072462 | 4/2024 |
| WO | 2024072463 | 4/2024 |
| WO | 2024072465 | 4/2024 |
| WO | 2024072466 | 4/2024 |
| WO | 2024072468 | 4/2024 |

OTHER PUBLICATIONS

Pursuant to MPEP § 2001.6(b) the applicant brings the following co-pending application to the Examiner's attention: U.S. Appl. No. 19/112,549.

Pursuant to MPEP § 2001.6(b) the applicant brings the following co-pending application to the Examiner's attention: U.S. Appl. No. 19/112,561.

Pursuant to MPEP § 2001.6(b) the applicant brings the following co-pending application to the Examiner's attention: U.S. Appl. No. 19/112,562.

Pursuant to MPEP § 2001.6(b) the applicant brings the following co-pending application to the Examiner's attention: U.S. Appl. No. 19/113,102.

Pursuant to MPEP § 2001.6(b) the applicant brings the following co-pending application to the Examiner's attention: U.S. Appl. No. 19/113,156.

Pursuant to MPEP § 2001.6(b) the applicant brings the following co-pending application to the Examiner's attention: U.S. Appl. No. 19/113,129.

"International Preliminary Report on Patentability", Application No. PCT/US2022/077414, Mar. 1, 2025, 10 pages.

"International Preliminary Report on Patentability", Application No. PCT/US2022/077433, Mar. 1, 2025, 10 pages.

"International Preliminary Report on Patentability", Application No. PCT/US2022/077439, Mar. 1, 2025, 10 pages.

"International Preliminary Report on Patentability", Application No. PCT/US2022/077430, Mar. 1, 2025, 11 pages.

"International Preliminary Report on Patentability", Application No. PCT/US2022/077442, Mar. 1, 2025, 11 pages.

"International Preliminary Report on Patentability", Application No. PCT/US2022/077437, Mar. 1, 2025, 13 pages.

"International Preliminary Report on Patentability", Application No. PCT/US2022/077428, Mar. 1, 2025, 9 pages.

"International Search Report and Written Opinion", Application No. PCT/US2022/077388, Mar. 1, 2025, 10 pages.

"International Search Report and Written Opinion", Application No. PCT/US2022/077428, May 22, 2023, 12 pages.

"International Search Report and Written Opinion", Application No. PCT/US2022/077414, May 22, 2023, 13 pages.

"International Search Report and Written Opinion", Application No. PCT/US2022/077433, May 22, 2023, 13 pages.

"International Search Report and Written Opinion", Application No. PCT/US2022/077430, May 22, 2023, 14 pages.

"International Search Report and Written Opinion", Application No. PCT/US2022/077442, May 22, 2023, 14 pages.

"International Search Report and Written Opinion", Application No. PCT/US2022/077437, May 22, 2023, 16 pages.

"International Search Report and Written Opinion", Application No. PCT/US2022/077388, May 24, 2023, 13 pages.

"International Search Report and Written Opinion", Application No. PCT/US2022/077439, May 24, 2023, 14 pages.

Chen, et al., "Disambiguation Techniques for Freehand Object Manipulations in Virtual Reality", Mar. 22, 2020, pp. 285-292.

"Foreign Office Action", KR Application No. 10-2025-7006935, May 6, 2026, 14 pages.

"Non-Final Office Action", U.S. Appl. No. 19/113,129, Jun. 4, 2026, 11 pages.

"Foreign Office Action", EP Application No. 22794051.7, Jun. 11, 2026, 8 pages.

"Foreign Office Action", EP Application No. 22794047.5, Jun. 30, 2026, 8 pages.

"Foreign Office Action", EP Application No. 22794045.9, Jul. 2, 2026, 8 pages.

"Foreign Office Action", EP Application No. 22793091.4, Aug. 21, 2026, 11 pages.

* cited by examiner

SYSTEM OF MULTIPLE RADAR-ENABLED COMPUTING DEVICES

BACKGROUND

Home automation, using virtual assistant (VA) technology, continues to grow in popularity as a method of increasing the security, comfort, and convenience of a home. Occupants may utilize a computing device equipped with VA technology to easily control, for instance, lighting, climate, entertainment systems, appliances, and alarms. A user may perform a gesture command to instruct the device to turn on their favorite music or start a timer for their kitchen oven, for example. These computing devices are often stationary and limited to a single room of a home, requiring a user that leaves a room to return to that room to continue interacting with the device to listen to music or check the status of their timer. In doing so, a user may have to stop what they are doing to return to that room, which may be distracting and tedious. Therefore, there are barriers preventing users from enjoying a seamless experience across multiple rooms of their home when using VA technology.

SUMMARY

A system of multiple radar-enabled computing devices, along with related techniques, are described in this document. These techniques are employed with this system to coordinate information and operations across multiple radar-enabled computing devices to create a seamless experience. In particular, each computing device of the computing system may have access to stored radar-signal characteristics that enable detection and distinction of users and detection and recognition of gestures. Computing devices may coordinate in-progress operations to provide continuity across multiple devices. When positioned in different locations, each device may also learn over time users, gestures, and versions of gestures associated with that location to anticipate them in the future.

Aspects described below include a system of multiple radar-enabled computing devices, which may perform a method including transmitting a first radar-transmit signal from a first radar-enabled computing device of a computing system, the first radar-enabled computing device within a first proximate region of a physical region, the physical region larger than the first proximate region; receiving, at the first radar-enabled computing device, a first radar-receive signal; comparing a first radar-signal characteristic of the first radar-receive signal to one or more stored radar-signal characteristics, the comparing effective to correlate the first radar-signal characteristic to a first stored radar-signal characteristic of a registered user, the correlation indicating a presence of the registered user within the first proximate region; transmitting a second radar-transmit signal from a second radar-enabled computing device of the computing system, the second radar-enabled device within a second proximate region of the physical region, the second radar-enabled computing device having access to the one or more stored radar-signal characteristics; receiving, at the second radar-enabled computing device, a second radar-receive signal; and comparing a second radar-signal characteristic of the second radar-receive signal to the one or more stored radar-signal characteristics, the comparing effective to determine that the second radar-signal characteristic correlates to the first stored radar-signal characteristic or a second stored radar-signal characteristic of the registered user, the correlation indicating the presence of the registered user within the second proximate region. Means and apparatuses are also described herein.

BRIEF DESCRIPTION OF DRAWINGS

Apparatuses and techniques for a system of multiple radar-enabled computing devices are described with reference to the following diagrams.

The same numbers are used throughout the drawings to reference like features and components.

DETAILED DESCRIPTION

Overview

Figure 1:
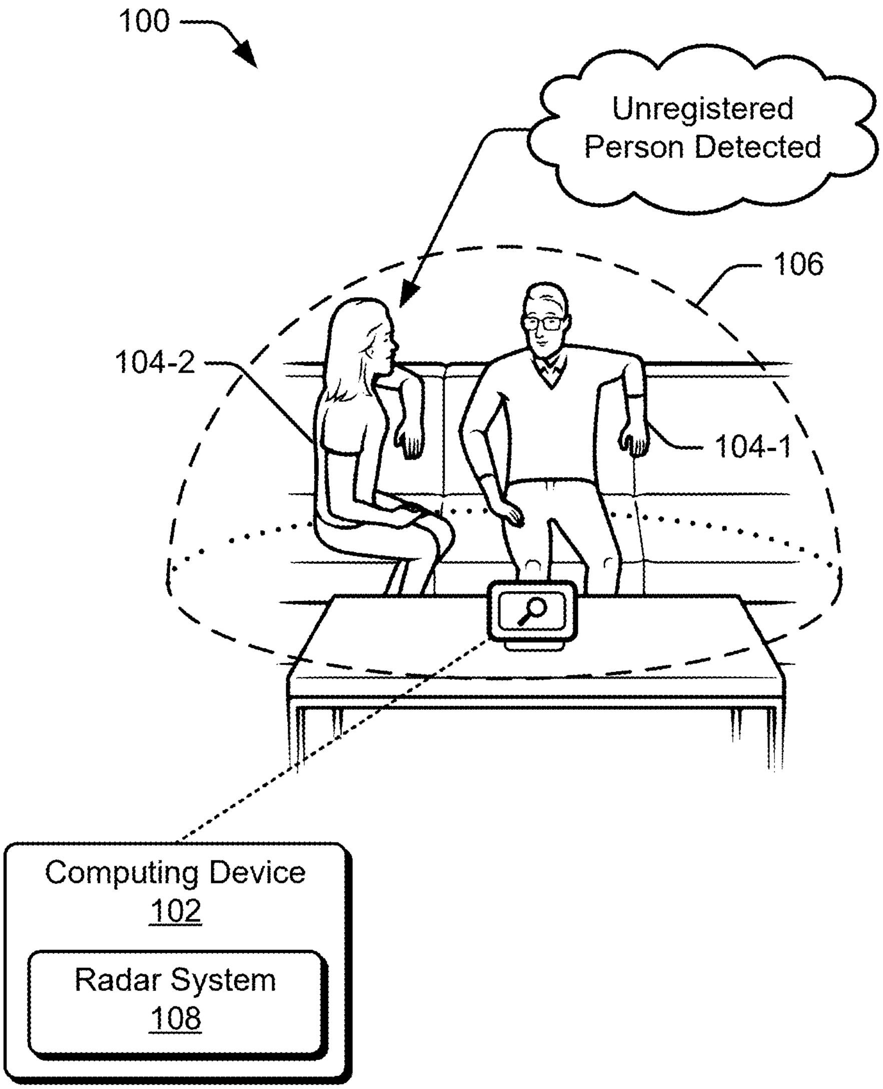
FIG. 1 illustrates an example environment having a radar-enabled computing device, users, a proximate region, and a radar system.

Home automation, using virtual assistant (VA) technology, continues to grow in popularity as a method of increasing the security, comfort, and convenience of a home. Occupants may utilize a computing device equipped with VA technology to easily control, for instance, lighting, climate, entertainment systems, appliances, alarms, and so forth. These devices may recognize a command made by a user that instructs the device to perform an operation, such as instruct a device to start a timer for their kitchen oven.

Some of these computing devices, however, are stationary and limited to a single room of a home. This may require a user to return to the device to check on the current status of an operation, modify an operation, or perform another operation. For instance, after starting a timer for their kitchen oven, the user may leave the kitchen to perform chores in their bedroom. If the user wants to check the status of the timer while performing chores, they would need to stop what they are currently doing and return to the kitchen where the device is located. The user may find this process tedious and prefer to check the timer status from their bedroom instead of walking back to the kitchen.

Some computing devices equipped with VA technology are mobile but require the user to either carry or wear the device, which can be burdensome. For example, a user may want to carry laundry into their bedroom without additionally carrying a mobile device. A user may also want to freely shower or swim without having to remove wearable devices. Alternatively, some smart homes include multiple computing devices equipped with VA technology as part of a computing system, but these devices may perform operations without communicating with other devices in the home. In this case, operations may still be limited to the device that received the command, which may prevent a user from seamlessly enjoying an experience in multiple rooms of a home.

In an example, a user may want to listen to music while performing tasks around their home. If the user begins their tasks in the kitchen, then they may perform a command to start playing music. If the user moves into the bedroom to continue their tasks, however, they may notice that the music is still playing in the kitchen but not the bedroom. The user may need to return to the kitchen to turn off the music and then instruct a device in the bedroom to restart the music. This music may not resume playing songs in the same place, resulting in a tedious experience that prevents the user from enjoying their VA smart-home system.

Additionally, some computing devices equipped with VA technology may use a microphone or camera to recognize a user's actions using speech recognition techniques or by identifying visual cues, respectively. For example, a user may provide a voice input of "turn the bedroom lights off," and the device may interpret the speech (e.g., using speech-to-text techniques) to determine that the bedroom lights should be turned off. While these devices may enable users to perform tasks more easily, some users may become concerned about the privacy of their personal information. For example, a user may wonder if a camera is collecting images or videos of them. These images or videos may contain information that the user considers private, thereby preventing them from feeling comfortable near the device. Furthermore, some cameras collect images to enable facial recognition techniques that may be used to identify and track users. A user may become uncomfortable and wonder if the device is monitoring them in their own home. For computing devices that utilize microphones, a user may wonder if the device is listening to their private conversations and performing speech-to-text of conversations other than speech intended to be a command.

To address these challenges, this disclosure describes a system of multiple radar-enabled computing devices (e.g., a computing system) that may coordinate information and operations across multiple rooms of a home using radar, though other sensors and detectors may also be used. The techniques described herein improve upon previous computing devices by utilizing a computing system to better enable: (1) the coordination of in-progress operations across multiple computing devices of the computing system, (2) the accuracy of user distinction and gesture recognition, and/or (3) the anticipation of user presence and/or gestures based on a computing device's location within a home. Using this computing system, a user may enjoy a seamless experience across multiple rooms of a home.

Example Environment

FIG. 1 illustrates an example environment 100 in which a radar-enabled computing device 102 performs techniques described in this document, such as detecting and distinguishing users and user engagement, detecting and recognizing gestures, and causing commands to be performed, as well as improving any of these techniques. The radar-enabled computing device 102 (computing device 102) may be used to cause performance of tasks (e.g., turning off lights, decreasing volume of music, turning on an oven, changing television channels) through recognition of gestures associated with commands. A swipe of a user's hand may indicate a command to change songs being played, while a push-pull gesture may indicate a command to check the status of a timer in a kitchen. The computing device 102 may allow for multiple users 104, in some cases each user being able to enjoy a tailored experience through being distinguished by the computing device 102. Furthermore, multiple computing devices (e.g., computing devices 102-X, where X represents an integer value of 1, 2, 3, 4, . . . and so forth) may be connected (e.g., wirelessly, such as by connection to one or more wireless networks and/or by direct wireless communication) to create an interconnected network of radar systems as described with respect to FIGS. 3 and 4. This network of computing devices may be arranged to detect and recognize gestures being performed by a user 104 (such as a first user 104-1, a second user 104-2, or a different user 104-X, where X represents an integer value of 3, 4, 5, . . . and so forth) in any one or more rooms of a domicile, for example.

In particular, the techniques may include (1) detecting the presence of a user 104 within a proximate region 106 of computing device 102, (2) distinguishing that user from other users to enable a tailored experience, and then (3) directing the computing device 102, an application associated with the computing device 102, or another device to execute a command upon recognizing that a known gesture has been performed. Additionally, or instead of (3), the computing device 102 may prompt the user 104 to begin or continue gesture training, based on that user's training history.

The computing device 102 may transmit radar-transmit signals discretely or continually over time (e.g., without requiring a "wake-up trigger") to detect user presence and/or performance of a gesture within the proximate region 106. Any one or more of these radar-transmit signals may reflect off an object (e.g., user 104 making a motion or a stationary object) in the proximate region 106, resulting in one or more radar-receive signals. The computing device 102 may determine, based on the radar-receive signals, a radar-signal characteristic (e.g., temporal information or topological information of the object or motion). If the determined radar-signal characteristic correlates with one or more stored radar-signal characteristics, then the computing device 102 can classify the object or motion. By so doing, the computing device 102 may determine that the motion is likely to be a gesture, rather than some other movement or non-moving object. In this example, the techniques compare the radar-signal characteristic to one or more stored radar-signal characteristics associated with registered or unregistered users or known gestures, and thereby attempt to detect and distinguish the user making the movement and detect and recognize the gesture being performed.

For example, assume that the user 104-1 makes a motion with their hand. The computing device 102 may detect, based on one or more radar-receive signals reflected off the user's hand, that this motion is a gesture, rather than a non-gesture movement, based on radar-signal characteristics of the radar-receive signals. The computing device 102, either concurrent with or after detecting the gesture, correlates one or more of the radar-signal characteristics to one or more stored radar-signal characteristics of a known gesture (e.g., a wave gesture associated with a command to turn on lights). If the determined radar-signal characteristic correlates to a desired level of confidence (e.g., a threshold criterion), then the device may determine that the wave gesture was performed and cause the lights to be turned on.

In another example, the computing device 102 may detect a first user's presence within the proximate region 106 (as depicted in FIG. 1) by receiving one or more radar-receive signals reflected off the first user 104-1. The device may determine at least one radar-signal characteristic of this first user 104-1 (e.g., a height, shape, movement) and correlate it to one or more stored radar-signal characteristics of a "registered user." If the determined radar-signal characteristic correlates to a desired level of confidence, then the device may determine that the first user 104-1 is the registered user and the user is currently located within the proximate region 106.

In this disclosure, a "registered user" will generally refer to a user 104 who is associated with at least one stored radar-signal characteristic and/or has an account or other registration accessible by the computing device 102. An account may be set up manually (e.g., by the registered user or another user of the device) or automatically (e.g., upon interacting with the device). The account may include or have associated with the account one or more stored radar-signal characteristics, user settings, preferences, gesture training histories, user habits, and so forth, which may or may not rely on accessing personally identifiable information. By virtue of an account, a registered user may have rights to modify, store, or access an amount of information (e.g., that user's settings or preferences) associated with the computing device. These rights may be granted to registered users but not (by default) users who are unregistered with the device.

For some aspects, the account with which the registered user is registered corresponds to their account with a cloud-based smart-home service platform of a virtual assistant provider, such as Google® (which provides a "Hey Google®" or "OK Google®" voice assistant service) or Amazon® (which provides an "Alexa®" voice assistant service). In such examples, the registered user may be a primary user of an account associated with the cloud-based service platform for a particular domicile, sometimes referenced, depending on the nature of the platform, as the main user, the billed user, the supervisory user, the administrator user, the super user, the master user, or the like. Dad, Mom, another head of household, the "family technology guru," or another designated person often serves in the role of the primary user. A registered user may alternatively be a secondary user (or tertiary user, etc.) of the account associated with the cloud-based service platform, such as a teenager or a non-primary-user adult, who enjoys at least some benefits of being known to the cloud-based service platform but typically has a more limited set of privileges or capabilities. It is to be appreciated, however, that other kinds of user registration different than those with cloud-based service platforms are within the scope of the present teachings, including but not limited to user accounts established with stand-alone, offline, or off-grid groupings of devices having their own kinds of local account establishment and registered user establishment.

More specifically, the computing device 102 uses a radar system 108 (as identified in FIG. 1) to transmit one or more radar-transmit signals (e.g., modulated electromagnetic (EM) waves within a radio frequency (RF) range) to probe the proximate region 106 for user presence. When an object (e.g., a user 104) is detected within the proximate region 106, a radar-transmit signal may reflect off the user 104 and become modified (e.g., in amplitude, phase, and/or frequency) based on the topography and/or motion of the user 104. This modified radar-transmit signal (e.g., a radar-receive signal) may be received by the radar system 108 and contain information used to distinguish the user 104 from other users, see for example, FIG. 6 and accompanying description. The radar system 108 uses the radar-receive signal to determine a velocity, size, shape, surface smoothness, or material of the user 104, as the received signal will have different radar-signal characteristics for differences in the object, such as velocity (e.g., through Doppler) of an object, size (see FIG. 6), shape (see FIG. 6), and so forth. The radar system 108 may also determine a distance between the user 104 and the computing device 102 and/or an orientation of the user 104 relative to the computing device 102, such as through a time-of-flight analysis.

While the proximate region 106 of example environment 100 is depicted as a hemisphere, in general, the proximate region 106 is not limited to the topography shown. The topography of the proximate region 106 may also be influenced by nearby obstacles (e.g., walls, large objects). In general, the computing device 102 may be located within the proximate region 106 (e.g., bedroom) of a physical region (e.g., a domicile, an environment) that is larger than the proximate region 106. Furthermore, the radar system 108 may probe for and detect users and/or gestures outside of the proximate region 106 depicted in example environment 100. The boundary of the proximate region 106 corresponds to an accuracy threshold in which users and/or gestures detected within this boundary are more likely to be accurately distinguished or recognized than users or gestures, respectively, detected outside this boundary. Example proximate regions 106 are one centimeter to eight meters, depending on power usage of the radar system 108, desired confidence, and whether or not the radar system 108 is configured for detecting users, distinguishing users, detecting gestures, recognizing gestures, and/or detecting user engagement.

For example, the computing device 102 sends a first radar-transmit signal into the proximate region 106 and then receives a first radar-receive signal (e.g., a reflected radar-transmit signal) associated with the presence of an object (e.g., a first user 104-1). This first radar-receive signal includes one or more radar-signal characteristics (e.g., radar cross-section (RCS) data, motion signatures, gesture performances, and so forth) that may be used to distinguish the first user 104-1 from other users 104. In particular, the radar system 108 may compare the first radar-receive signal to stored radar-signal characteristics of registered users to determine whether the first user 104-1 is a registered user who has previously interacted with and/or established an account with the device. Example manners in which to do so include use machine-learned models described in FIGS. 7 and 8, as well as topological, temporal, gestural, and contextual distinctions 600-1, 600-2, 600-3, and 600-4, respectively. In this example, radar-signal characteristics of the first radar-receive signal are correlated with one or more stored radar-signal characteristics of a registered user to a desired confidence using the machine-learned model 700 trained using the stored radar-signal characteristics and with, as input, the radar-signal characteristics of the first radar-receive signal reflected from one of the users 104.

In general, a radar-transmit signal may refer to a single (discrete) signal, a burst of signals, or a continual stream of signals transmitted over time from one or more antennas of the computing device 102. Radar-transmit signals may be transmitted at any time without requiring a "wake-up" trigger event (described in more detail with respect to FIG. 8). Radar-receive signals may be received by the same transmitting antenna, a different antenna of the computing device 102, or an antenna of another device of the computing system (described in more detail with respect to FIGS. 3 and 4, infra).

The computing device 102 in example environment 100 may (but is not required to) forgo "personally identifying" (e.g., private or personally identifiable information of) the first user 104-1 in determining that the detected object is the registered user. For example, the computing device 102 may determine that the first user 104-1 is the registered user without requiring personally identifiable information, which may include legally identifiable information (e.g., a legal name). Furthermore, the computing device 102 may forgo identifying a personal device of the first user 104-1 (e.g., a mobile phone, a device equipped with an electronic tag), collect facial recognition information, or perform speech-to-text of potentially private conversations in determining that the first user 104-1 is the registered user, based on a user's preferences or settings. Instead of personally identifying the first user 104-1, the computing device 102 may "distinguish" the first user 104-1 from another user (e.g., a second user 104-2) using radar-signal characteristics that do not contain personally identifiable and/or confidential information as described with respect to FIG. 4, infra.

A user 104 may be provided with controls allowing the user 104 to make an election as to both whether and when the techniques described herein may enable collection of user information (e.g., information about a social network, social actions, social activities, or a profession of the user, photographs taken by the user, audio recordings made by the user, preferences of the user, a current location of the user, and so forth) and as to whether the user 104 is sent content or communications from a server. In addition, certain data may be treated in one or more ways before it is stored or used so that personally identifiable information is removed. For example, an identity of the user may be treated so that no personally identifiable information can be determined for the user 104, or a geographic location of the user may be generalized where location information is obtained (for example, to a city, ZIP code, or state level) so that a particular location of the user 104 cannot be determined.

Thus, the user 104 may have control over what information is collected about the user 104, how that information is used, and what information is provided to the user 104.

Gesture Training

Gesture training refers to an interactive user experience by which a radar-enabled computing device helps a user learn how to make gestural commands or inputs to the device. Gesture training may involve, for example, the device performing the steps of (i) communicating information to the user pertaining to how to make one or more particular gestural commands or inputs, (ii) suggesting/proposing that the user attempt to make that gesture, (iii) monitoring the user as an attempt is made, and (iv) providing evaluative feedback to the user regarding whether that attempt was successful versus whether they might try it again differently. In one exemplary scenario, the device is a smart-home display assistant (e.g., a Google® NEST HUB™) having FMCW (frequency modulated continuous wave) radar-based touchless gesture (e.g., in-air hand gesture) recognition using radar signals in the 60 GHz range. This smart-home assistant is capable of recognizing, for example, gestures such as swipe-left, swipe-right, swipe-up, swipe-down, air-knob turn, and inward-push. The smart-home assistant may provide gesture training on a swipe-left gesture by (i) showing a short animation or video to the user of a swipe-left motion while displaying or speaking, "This is a swipe-left," (ii) displaying or speaking, "Now you try," (iii) performing radar-based monitoring as the user attempts the gesture, and, if successful, (iv) displaying or speaking, "Awesome, you've got it!" If the gesture was too short in distance from left to right, for example, the smart-home assistant may say, "Try again using a longer sweeping motion," and so on. Other methods of gesture training may be similar in general approach but couched in more-fun activities such as having the user control or guide an on-screen character or other on-screen object in a game-like setting. Other kinds of interactive user experiences for gesture training can be provided without departing from the scope of the present teachings. For purposes of user convenience, encouragement, and continued engagement with the device, it is often desirable to avoid requiring a one-time, single-event gesture training session in which all gesture training is done at once, unless such single-event gesture training session is overtly requested by the user. Rather, it is often desirable to suggest and provide smaller, modular lessons over time at opportune moments (e.g., a first lesson on swipe-left at an opportune time on a first day, a second lesson on air-knob turn at an opportune time on a later day, etc.).

Thus, according to one aspect, before, after, or concurrently with determining that the first user 104-1 is the registered user (or unregistered but having a stored radar-signal characteristic), the computing device 102 may prompt the first user 104-1 to start or continue gesture training. For example, the first user 104-1 may be part-way through training, having already completed training on a first gesture (e.g., swipe-left in the preceding example of the previous paragraph). The computing device 102 may have stored information regarding a way in which the first user 104-1 performed the first gesture during training in a training history. When the first user 104-1 is detected, the computing device 102 may access the training history and prompt the first user 104-1 to continue training on a second gesture (e.g., air-knob turn) instead of repeating training on the first gesture. As a result, determining that the first user 104-1 is the registered user, or an unregistered person of which there is a stored radar-signal characteristic, may allow the computing device 102 to improve the efficiency of gesture training. The distinction of the first user 104-1 may allow the computing device 102 to activate settings (e.g., privacy settings, preferences) of the registered user or unregistered person to provide a tailored experience for the first user 104-1.

Assume, for FIG. 1, that a second user 104-2 joins the first user 104-1 on a couch within the proximate region 106. The computing device 102 may use the radar system 108 to send a second radar-transmit signal to detect the presence of another object (e.g., the second user 104-2). The radar system 108 may then compare the second radar-receive signal to stored radar-signal characteristics of registered users to determine whether the second user 104-2 is another registered user. In this example, the second radar-receive signal is not found to correlate to one or more stored radar-signal characteristics of another registered user. Therefore, the second user 104-2 is distinguished as an "unregistered person."

In this disclosure, an "unregistered person" will generally refer to a user 104 who is not registered with the device and thus is not associated with one or more accounts. Unlike a registered user, an unregistered person may not have rights to modify, store, or access information of the computing device. For example, a new visitor (e.g., a guest who is not associated with one or more accounts of the device) may be considered an unregistered person. This new visitor may not have interacted with the computing device 102 before and thus not be associated with one or more stored radar-signal characteristics, or the visitor may have done so and be associated with a stored radar-signal characteristic but not have an account or other, special rights. Thus, a prior visitor (e.g., a nanny, housekeeper, gardener) may be associated with one or more stored radar-signal characteristics but lack an account with the device. In accordance with one or more aspects, the computing device 102 may still store this user's radar-signal characteristics to improve their user experience. The device, however, may prevent the prior visitor (unregistered person) from exercising rights afforded to a registered user, such as modifying, accessing, or storing information of the device.

After determining that the second user 104-2 is an unregistered person, the computing device 102 assigns an unregistered user identification (e.g., mock identity, pseudo identity) to this unregistered person, which may be associated with one or more radar-signal characteristics of the second radar-receive signal, such as a unique, random number by which to later identify the unregistered user. The unregistered user identification may be stored to enable distinction of the second user 104-2 at a future time. In particular, the unregistered user identification may be used to correlate a future-received radar-receive signal with one or more associated radar-signal characteristics of the unregistered person. The computing device 102 may also prompt the second user 104-2 to register with the computing device 102.

The computing device 102 may or may not require personally identifiable information of the second user 104-2 to determine that the other object is the unregistered person. After the second user 104-2 and the first user 104-1 have been distinguished, the computing device 102 may determine that the privacy settings of the first user 104-1 need to be adapted (e.g., modified, restricted) to ensure the first user's information remains private. For instance, the first user 104-1 may want the device to refrain from announcing calendar reminders (e.g., doctor appointments) while the second user 104-2 is present. Additionally, the computing device 102 may prompt the second user 104-2 to begin gesture training, which may be recorded in another training history (e.g., associated with the unregistered user identification) of the second user 104-2.

At a later time (not depicted), the computing device 102 may use the radar system 108 again to send a third radar-transmit signal to detect whether a user 104 is within the proximate region 106. If a user 104 (e.g., the first user 104-1, the second user 104-2) is present at this time, then the third radar-transmit signal may reflect off the user 104 and the computing device 102 may receive a third radar-receive signal, which includes one or more radar-signal characteristics. The radar system 108 may compare these radar-signal characteristics with, for instance, the stored radar-signal characteristics of the first user 104-1 (the registered user) and the second user 104-2 (the unregistered person associated with the unregistered user identification) to determine whether the first user 104-1 or the second user 104-2 is present. Based on this determination, the computing device 102 may tailor settings and training prompts accordingly.

In an example, the radar system 108 uses the third radar-receive signal to determine, based on stored radar-signal characteristics associated with the first user 104-1, that the first user 104-1 (the registered user) is present again within the proximate region 106. The computing device 102 may then prompt the first user 104-1 to finish their gesture training based on their training history and/or activate their user settings. Alternatively, if the radar system 108 determines that the second user 104-2 (the unregistered person) is present again within the proximate region 106, then the computing device 102 may prompt the second user 104-2 to continue their gesture training and/or activate predetermined user settings. The computing device 102 and radar system 108 are further described with reference to FIG. 2.

Example Computing Device

Figure 2:
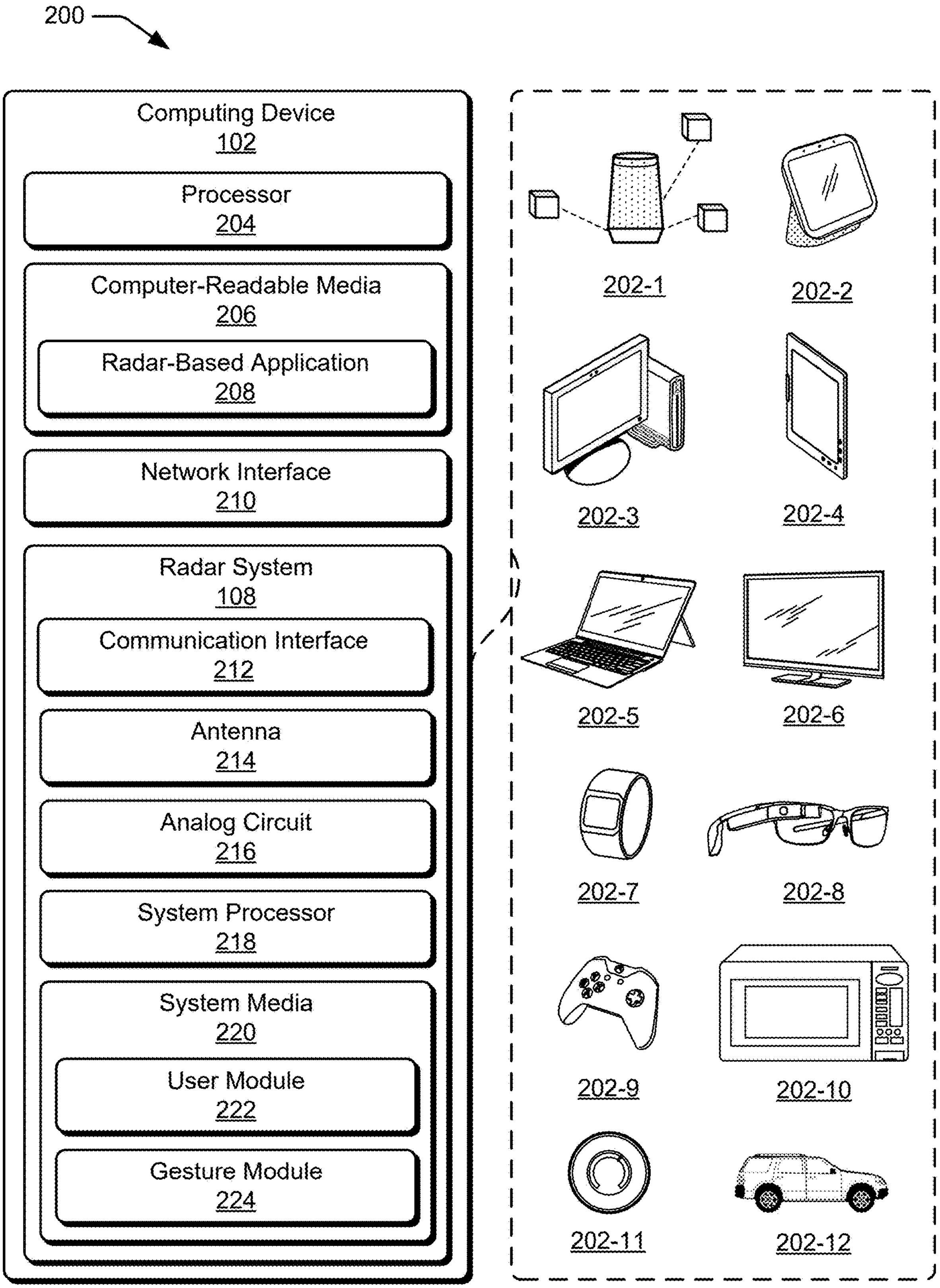
FIG. 2 illustrates an example implementation of the radar-enabled computing device of FIG. 1.

FIG. 2 illustrates an example implementation 200 of the radar system 108 as part of the computing device 102. The computing device 102 is illustrated with various non-limiting example devices 202, including a home-automation and control system 202-1, a smart display associated with a home-automation and control system 202-2, a desktop computer 202-3, a tablet 202-4, a laptop 202-5, a television 202-6, a computing watch 202-7, computing glasses 202-8, a gaming system 202-9, a microwave 202-10, a smart thermostat interface 202-11, and an automobile having computing capabilities 202-12. Other devices may also be used, such as a security camera, a baby monitor, a Wi-Fi® router, a drone, a trackpad, a drawing pad, a netbook, an e-reader, other forms of a home-automation and control systems, a wall display, a virtual-reality headset, another vehicle (e.g., an e-bike or plane), and other home appliances, to name just a few examples. Note that the computing device 102 may be wearable, non-wearable but mobile, or relatively immobile (e.g., desktops and appliances), all without departing from the scope of the present teachings.

The computing device 102 may include one or more processors 204 and one or more computer-readable media (CRM) 206, which may include memory media and storage media. Applications and/or an operating system (not shown) embodied as computer-readable instructions on the CRM 206 may be executed by the processor 204 to provide some of the functionalities described herein. The CRM 206 may also include a radar-based application 208, which uses data generated by the radar system 108 to perform functions such as gesture-based control, human vital-sign notification, collision avoidance for autonomous driving, and so forth. For example, the radar system 108 may recognize a gesture performed by a user 104 that indicates a command to turn off lights in a room. This command data may be used by the radar-based application 208 to send control signals (e.g., triggers) to turn off the lights in the room.

The computing device 102 may also include a network interface 210 for communicating data over wired, wireless, or optical networks. For an interconnected system of multiple computing devices 102-X, each computing device 102 may communicate with another computing device 102 through the network interface 210. For example, the network interface 210 may communicate data over a local area network (LAN), a wireless local area network (WLAN), a personal area network (PAN), a wide area network (WAN), an intranet, the Internet, a peer-to-peer network, a point-to-point network, a mesh network, and the like. The multiple computing devices 102-X may communicate with each other using a communication network as described with respect to FIG. 3, infra. The computing device 102 may also include a display.

The radar system 108 may be used as a stand-alone radar system or used with, or embedded within, many different computing devices or peripherals, such as in control panels that control home appliances and systems, in automobiles to control internal functions (e.g., volume, cruise control, or even driving of the car), or as an attachment to a laptop computer to control computing applications on the laptop.

The radar system 108 may include a communication interface 212 to transmit radar data (e.g., radar-signal characteristics) to a remote device, though this may not be used when the radar system 108 is integrated within the computing device 102. In general, the radar data provided by the communication interface 212 may be in a format usable to detect, distinguish, and/or recognize a user, user engagement, or gesture, such as the radar-signal characteristics (e.g., values of frames corresponding to complex-range Doppler maps, see FIGS. 8 and 12-14) or a determination of the detection or recognition by the computing device 102. The communication interface 212 may also or instead communicate with a remote instance of the radar-based application 208, such as a command associated with a recognized gesture or an identification of the recognized gesture (e.g., indicating to the radar-based application 208 on a remote computing device that a push-pull gesture has been performed).

The radar system 108 may also include at least one antenna 214 used to transmit and/or receive radar signals. In some cases, the radar system 108 may include multiple antennas 214 implemented as antenna elements of an antenna array. The antenna array may include at least one transmitting antenna element and at least one receiving antenna element. In some situations, the antenna array may include multiple transmitting antenna elements to implement a multiple-input multiple-output (MIMO) radar capable of transmitting multiple distinct waveforms at a given time (e.g., a different waveform per transmitting antenna element). The receiving antenna elements may be positioned in a one-dimensional shape (e.g., a line) or a two-dimensional shape (e.g., a triangle, a rectangle, or an L-shape) for implementations that include three or more receiving antenna elements. The one-dimensional shape may enable the radar system 108 to measure one angular dimension (e.g., an azimuth or an elevation), while the two-dimensional shape may enable two angular dimensions to be measured (e.g., both an azimuth and an elevation). Each antenna 214 may alternatively be configured as a transducer or transceiver. Furthermore, any one or more antennas 214 may be circularly polarized, horizontally polarized, or vertically polarized.

Using the antenna array, the radar system 108 may form beams that are steered or un-steered, wide or narrow (e.g., one to 45 degrees, 15 to 90 degrees), or shaped (e.g., as a hemisphere, cube, fan, cone, or cylinder). The one or more transmitting antenna elements may have an un-steered omni-directional radiation pattern or may be able to produce a wide steerable beam. Either of these techniques may enable the radar system 108 to radar-illuminate a large volume of space. To achieve target angular accuracies and angular resolutions, the receiving antenna element may be used to generate thousands of narrow steered beams (e.g., 2000 beams, 4000 beams, or 6000 beams) with digital beamforming. In this way, the radar system 108 may efficiently monitor an environment for users and gestures.

The radar system 108 may also include at least one analog circuit 216 that includes circuitry and logic for transmitting and receiving radar signals using the at least one antenna 214. Components of the analog circuit 216 may include amplifiers, mixers, switches, analog-to-digital converters, filters, and so forth for conditioning the radar signals. The analog circuit 216 may also include logic to perform in-phase/quadrature (I/Q) operations, such as modulation or demodulation. A variety of modulations may be used to produce the radar signals, including linear frequency modulations, triangular frequency modulations, stepped frequency modulations, or phase modulations. The analog circuit 216 may be configured to support continuous-wave or pulsed radar operations.

The analog circuit 216 may generate radar signals (e.g., radar-transmit signals) within a frequency spectrum (e.g., range of frequencies) that includes frequencies between 1 and 400 gigahertz (GHz), 1 and 24 GHz, 2 and 6 GHz, 4 and 100 GHz, or 57 and 63 GHz. In some cases, the frequency spectrum may be divided into multiple sub-spectrums that have similar or different bandwidths. Example bandwidths may be on the order of 500 megahertz (MHz), one GHz, two GHz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the analog circuit 216 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 108 may also include one or more system processors 218 and a system media 220 (e.g., one or more computer-readable storage media). The system processor 218 may be implemented within the analog circuit 216 as a digital signal processor or a low-power processor (or both), for instance. The system processor 218 may execute computer-readable instructions that are stored within the system media 220. Example digital operations performed by the system processor 218 may include fast Fourier Transforms (FFTs), filtering, modulations or demodulations, digital signal generation, digital beamforming, and so forth.

The system media 220 may optionally include a user module 222 and a gesture module 224 that may be implemented using hardware, software, firmware, or a combination thereof. The user module 222 and the gesture module 224 may enable the radar system 108 to process radar-receive signals (e.g., electrical signals received at the analog circuit 216) to detect the presence of and distinguish a user 104 and detect and recognize a gesture, along with other capabilities, such as object (non-user) detection and detection of user engagement.

The user module 222 and the gesture module 224 may include one or more machine-learning algorithms and/or machine-learned models, such as artificial neural networks (referred to herein as neural networks) to improve user distinction and gesture recognition, respectively. A neural network may include a group of connected nodes (e.g., neurons or perceptrons), which are organized into one or more layers. As an example, the user module 222 and the gesture module 224 may include a deep neural network, which includes an input layer, an output layer, and multiple hidden layers positioned between the input layer and the output layer. The nodes of the deep neural network may be partially connected or fully connected between the layers.

In some cases, the deep neural network may be a recurrent deep neural network (e.g., a long short-term (LSTM) recurrent deep neural network) with connections between nodes forming a cycle to retain information from a previous portion of an input data sequence for a subsequent portion of the input data sequence. In other cases, the deep neural network may be a feed-forward deep neural network in which the connections between the nodes do not form a cycle. Example deep neural networks are described with respect to FIGS. 7 and 8, infra. The user module 222 and the gesture module 224 may also include models capable of performing clustering (e.g., trained using unsupervised learning), anomaly detection, or regression, such as a single linear-regression model, multiple linear-regression models, logistic-regression models, stepwise regression models, multi-variate adaptive-regression splines, locally estimated scatterplot-smoothing models, and so forth.

Generally, a machine-learning architecture may be tailored based on available power, available memory, or computational capability. For the user module 222, the machine-learning architecture may also be tailored based on a quantity of radar-signal characteristics that the radar system 108 is designed to recognize. For the gesture module 224, the machine-learning architecture may additionally be tailored based on a quantity of gestures and/or various versions of gestures the radar system 108 is designed to recognize.

The computing device 102 may optionally (not depicted) include at least one additional sensor (distinct from the antenna 214) to improve fidelity of the user module 222 and/or gesture module 224. In some cases, for example, the user module 222 may detect the presence of a user 104 with low confidence (e.g., an amount of confidence and/or accuracy that is below a threshold). This detection may occur, for instance, when the user 104 is far away from the computing device 102 or when there are large objects (e.g., furniture) obscuring the user 104. To increase the accuracy of user detection and distinction and/or gesture detection and recognition, the computing device 102 may verify a low-confidence result using one or more additional sensors (e.g., those described with respect to FIG. 19). These sensors can be passive, active, remote, and/or touch based. Example sensors, some of which can sense in more than one of the passive, active, remote, and touch manners, include a microphone, an ultrasonic sensor, an ambient light sensor, a camera, a health sensor and/or biometric sensor, a barometer, an inertial measurement unit (IMU) and/or accelerometer, a gyroscope, a magnetic sensor (e.g., magnetometer or hall effect), a proximity sensor, a pressure sensor, a touch sensor, a thermostat/temperature sensor, an optical sensor, and so forth.

The user module 222 may also distinguish users 104 (e.g., a first user 104-1 from a second user 104-2) using contextual information. This contextual information may also improve the interpretation of ambiguous gestures (e.g., gestures that cannot be recognized to a desired level of confidence), such as those described with respect to FIG. 24. For instance, each user 104 may commonly perform their own version of a known gesture based on their personality, physicality, ability/disability, mood, or so forth. This contextual information may be accessed by the gesture module 224 to improve gesture recognition.

In an example, the first user 104-1 performs a gesture, and the gesture module 224 determines that the first user 104-1 accidentally performed an ambiguous gesture that does not correlate (to a desired level of confidence) to a known gesture. If, however, the user module 222 determines that the first user 104-1 (rather than the second user 104-2 or another user) performed the ambiguous gesture, then the gesture module 224 may additionally access contextual information regarding stored radar-signal characteristics of that user's previous gesture performances. Using this contextual information, the gesture module 224 may be able to correlate the ambiguous gesture to one or more stored radar-signal characteristics associated with the distinguished user to better recognize it as the known gesture. In this way, the user module 222 of the computing device 102 may improve the fidelity of gesture recognition.

Example Computing System

Figure 3:
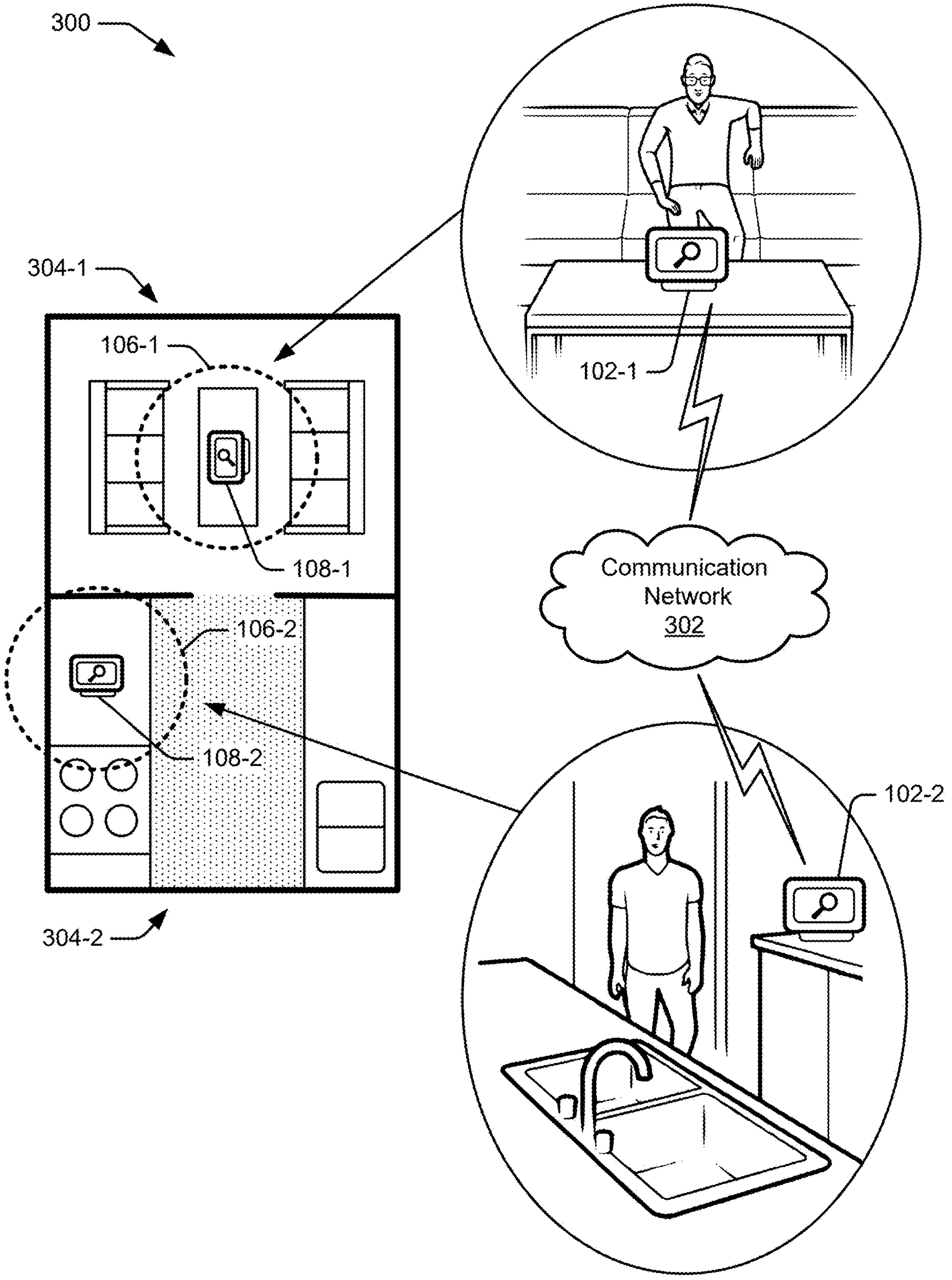
FIG. 3 illustrates an example environment in which multiple radar-enabled computing devices are connected through a communication network to form a computing system.

FIG. 3 illustrates an example environment 300 in which multiple computing devices 102-1 and 102-2 are connected through a communication network 302 to form a computing system. The example environment 300 depicts a domicile with a first room 304-1 (a living room) and a second room 304-2 (a kitchen). The first room 304-1 is equipped with a first computing device 102-1 that includes a first radar system 108-1, and the second room 304-2 is equipped with a second computing device 102-2 that includes a second radar system 108-2. In this example, the first room 304-1 is separate from the second room 304-2 but connected through a door of the home. The first computing device 102-1 in the first room 304-1 may detect users 104 and gestures within a first proximate region 106-1, whereas the second computing device 102-2 in the second room 304-2 may detect users 104 and gestures within a second proximate region 106-2.

The domicile of example environment 300 may not be restricted to the arrangement and number of the computing devices 102 shown. In general, an environment (e.g., a home, building, workplace, car, airplane, public space) may include one or more computing devices 102 distributed across one or more distinct areas (e.g., rooms 304). For instance, a room 304 may contain two or more computing devices 102 that are positioned near to or far from each other (or radar systems 108 associated with a single computing device 102). While the first proximate region 106-1 depicted in example environment 300 does not overlap spatially with the second proximate region 106-2, and therefore the computing devices of each region are not able to sense radar-receive signals of the other region, in general, proximate regions 106 may also be positioned to partially overlap. While the environment depicted in FIG. 3 is a home, in general, the environment may include any indoor and/or outdoor space that is private or public, such as a library, an office, a workplace, a factory, a garden, a restaurant, a patio, an airplane, or an automobile.

For an environment with two or more computing devices 102, the devices may communicate with each other through one or more communication networks 302. The communication network 302 may be a LAN, a WAN, a mobile or cellular communication network, such as a 4G or 5G network, an extranet, an intranet, the Internet, a Wi-Fi® network, and so forth. In some examples, the computing devices 102 may communicate using short-range communication such as near field communication (NFC), radio frequency identification (RFID), Bluetooth®, and so forth.

Furthermore, a computing system may include one or more memories that are separate from or integrated into one or more of the constituent computing devices 102-1 and 102-2. In one example, the first computing device 102-1 and the second computing device 102-2 may include a first memory and a second memory, respectively, in which the contents of each memory are shared between devices using the communication network 302. In another example, a memory may be separate from the first computing device 102-1 and second computing device 102-2 (e.g., cloud storage) but accessible to both devices. A memory may be used to store, for instance, radar-signal characteristics of a registered user, user preferences, security settings, training histories, unregistered user identifications and radar-signal characteristics, and so forth.

In an example, the first computing device 102-1 may connect to the communication network 302 using a first network interface 210-1 (see FIG. 2) to exchange information with the second computing device 102-2. Using this communication network 302, the computing devices 102 may exchange stored information regarding one or more users 104, which may include radar-signal characteristics, training histories, user settings, and so forth. Furthermore, the computing devices 102 may exchange information regarding operations in progress (e.g., timers, music being played) to preserve a continuity of operations and/or information regarding operations across various rooms 304. These operations may be performed by one or more computing devices 102 simultaneously or independently based on, for instance, the detection of a user's presence in a room 304. Each computing device 102 may also use the radar system 108 to associate (and store to memory) commonly detected users and commands associated with the device's location. The radar system 108 is further described with respect to FIG. 4.

Radar-Enabled User Detection and Distinction

Figure 4:
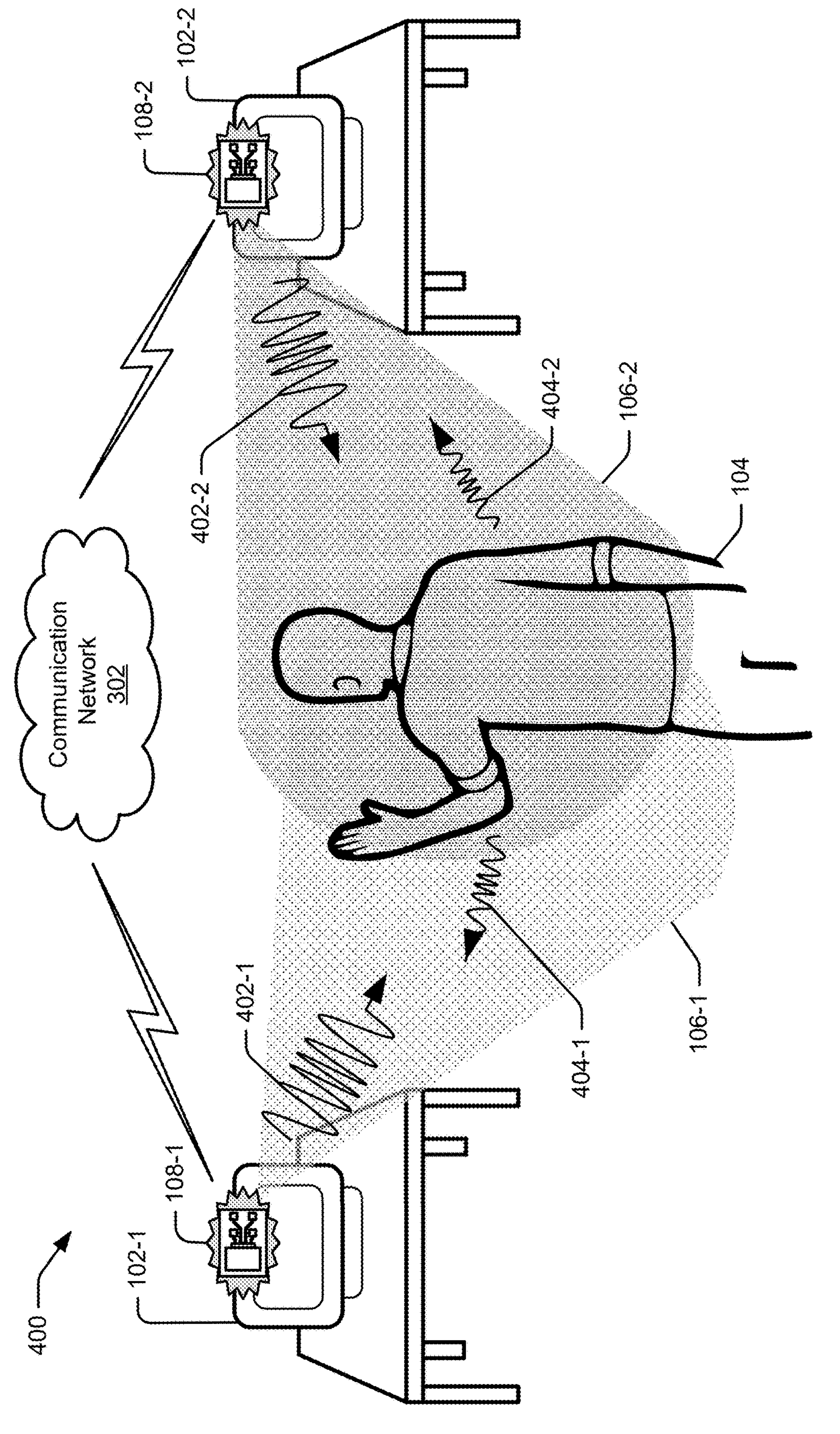
FIG. 4 illustrates an example environment in which a radar system is used by a computing device to detect, distinguish, and/or recognize a user or gesture being performed by the user.

FIG. 4 illustrates an example environment 400 in which a radar system 108 is used by a computing device 102 to detect the presence of and distinguish a user 104. The example environment 400 depicts a first computing device 102-1 with a first radar system 108-1 and a second computing device 102-2 with a second radar system 108-2. The first radar system 108-1 and the second radar system 108-2 may transmit one or more radar-transmit signals 402 (e.g., 402-Y, where Y represents an integer value of 1, 2, 3, . . . and so forth) to probe a first proximate region 106-1 and a second proximate region 106-2, respectively, for users (and/or gestures). Note that each of these regions are illustrated conically for simplicity, but have contours dictated by an amplitude and quality of a radar field in which radar-receive signals are receivable by the corresponding radar system 108 of that region. Each radar-transmit signal 402-Y can be referred to as a composite radar-transmit signal 402-Y, which represents multiple superpositioned radar-transmit signals that are transmitted from respective antennas 214 (see FIG. 2) at a given time. Using a radar-transmit signal 402-1, the first radar system 108-1 may illuminate an object (e.g., the user 104) entering the first proximate region 106-1 with a broad 150° beam of radar pulses (e.g., one or more radar-transmit signals) operating at frequencies of 1-100 gigahertz (GHz; e.g., 60 GHz). While reference may be made in this disclosure to a radar-transmit signal 402, it is to be understood that one or more radar-transmit signals 402 may be transmitted over a period of time and/or include one or more radar pulses.

Upon encountering the user 104, a portion of the energy associated with the radar-transmit signal 402-Y may be reflected back towards the first radar system 108-1 and/or the second radar system 108-2 in one or more radar-receive signals 404-Z (where Z may represent an integer value of 1, 2, 3, . . . ). Each radar-receive signal 404-Z can be referred to as a composite radar-receive signal 404-Z, which represents a superposition of multiple reflections of the radar-transmit signal 402-Y at the one or more antennas 214 at a given time. In example environment. 400, two radar-receive signals 404-1 and 404-2 are depicted as being received by the radar systems 108-1 and 108-2, respectively. The radar-receive signals 404-1 and 404-2 can be reflected from one or more discrete dynamic-scattering centers of the user 104. Each radar-receive signal 404 may represent a modified version of its corresponding radar-transmit signal 402 in which an amplitude, phase, and/or frequency is modified by the one or more dynamic-scattering centers. These radar-receive signals 404 may allow one or more of the radar systems 108-1 and 108-2 to distinguish the user 104 and/or recognize a gesture using, for instance, a radial distance, geometry (e.g., size, shape, height), orientation, surface texture, material composition, and so forth. For additional details on how this is performed, see at least FIGS. 7-18 herein.

While the first computing device 102-1 and the second computing device 102-2 of example environment 400 may independently detect and distinguish the user 104 and/or recognize a gesture performance, they may also work together (e.g., with dependency, in tandem). This may be particularly useful if, for instance, each device separately is unable to distinguish the user 104 and/or recognize the gesture performance to a desired level of confidence. In this case, the two devices may exchange radar-signal characteristics determined from radar-receive signals received at each device. In an example, the first computing device 102-1 may detect an ambiguous user within the first proximate region 106-1 who is associated with a first radar-signal characteristic. Simultaneously or at a separate time, the second computing device 102-2 may also detect this ambiguous user and determine a second radar-signal characteristic associated with the user's presence. If the first and second radar-signal characteristics, separately, are not enough to distinguish the ambiguous user to the desired level of accuracy, then the devices may work together and/or exchange information to enable user distinction.

In a first scenario, the first computing device 102-1 may access the second radar-signal characteristic and then compare the first and second radar-signal characteristics to one or more stored radar-signal characteristics to distinguish the ambiguous user. In a second scenario, the second computing device 102-2 may access the first radar-signal characteristic and then compare the first and second radar-signal characteristics to the one or more stored radar-signal characteristics to distinguish the ambiguous user (e.g., through use of the machine-learned model of FIG. 7 or 8). In a third scenario, the first computing device 102-1 and the second computing device 102-2 may work in tandem, cooperatively, in unison, and so forth to distinguish the ambiguous user. This technique may also be applied to ambiguous gesture commands. The radar system 108 is described in more detail with respect to FIG. 5.

Figure 5:
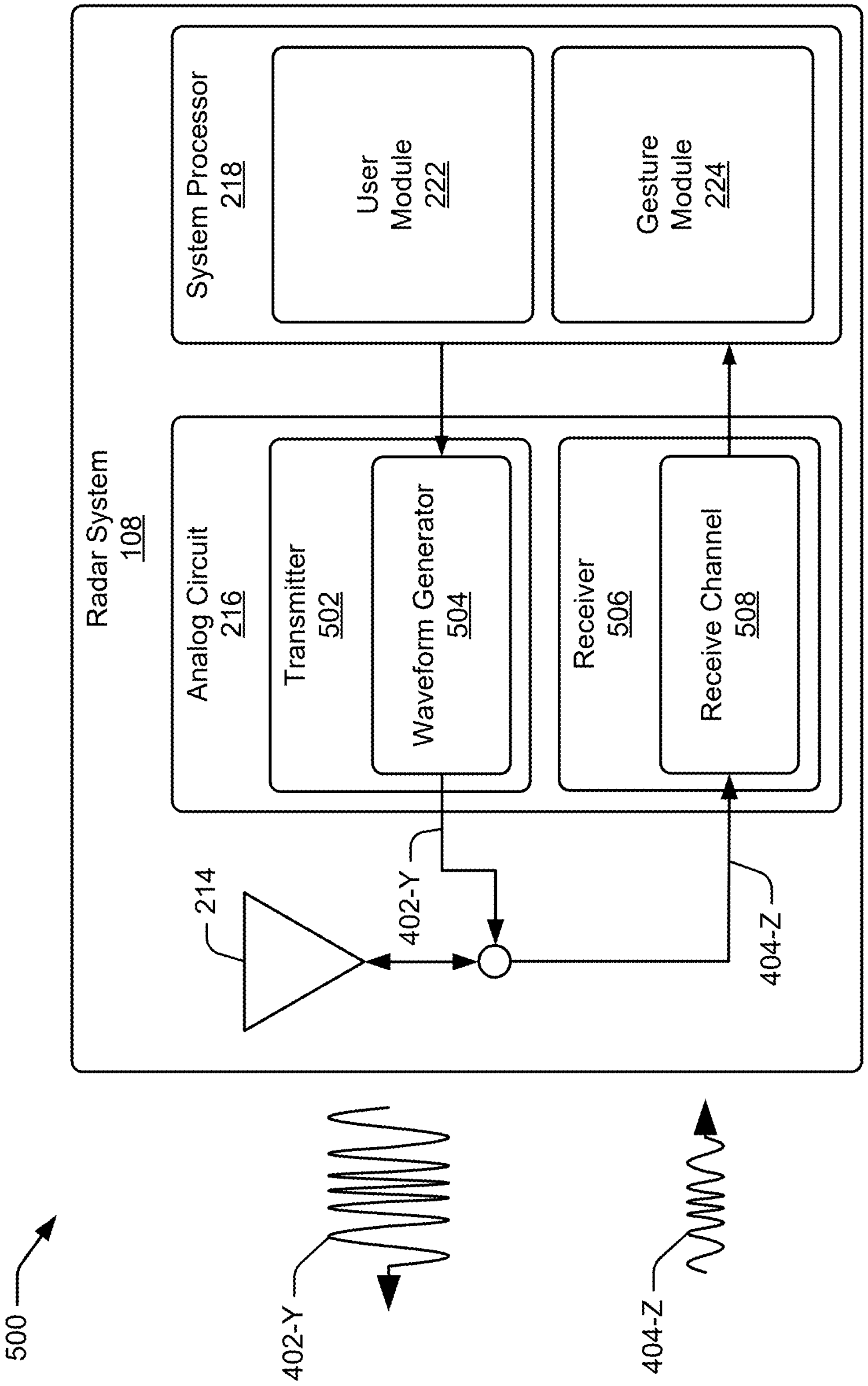
FIG. 5 illustrates an example implementation of an antenna, analog circuit, and system processor of a radar system.

FIG. 5 illustrates an example implementation 500, which includes the antenna 214, the analog circuit 216, and the system processor 218 of the radar system 108. In the depicted configuration, the analog circuit 216 may be coupled between the antenna 214 and the system processor 218 to enable the techniques of both user detection and distinction and gesture detection and recognition. The analog circuit 216 may include a transmitter 502, equipped with a waveform generator 504, and a receiver 506 that includes at least one receive channel 508. The waveform generator 504 and the receive channel 508 may each be coupled between the antenna 214 and the system processor 218.

While one antenna 214 is depicted in example implementation 500, in general, the radar system 108 may include one or more antennas to form an antenna array. When utilizing an antenna array, the waveform generator 504 may generate similar or distinct waveforms for each antenna 214 to transmit into a proximate region 106. Furthermore, while one receive channel 508 is depicted in example implementation 500, in general, the radar system 108 may include one or more receive channels. Each receive channel 508 may be configured to accept a single or multiple versions of the radar-receive signals 404-Z at any given time.

During operation, the transmitter 502 may pass electrical signals to the antenna 214, which may emit one or more radar-transmit signals 402-Y to probe the proximate region 106 for user presence and/or gestures. In particular, the waveform generator 504 may generate electrical signals with a specified waveform (e.g., specified amplitude, phase, frequency). The waveform generator 504 may additionally communicate information regarding the electrical signals to the system processor 218 for digital signal processing. If the radar-transmit signal 402-Y interacts with a user 104, then the radar system 108 may receive the radar-receive signals 404-Z on the receive channel 508. The radar-receive signal 404-Z (or multiple versions thereof) may be sent to the system processor 218 to enable user detection (using the user module 222 of the system media 220) and/or gesture detection (using the gesture module 224). The user module 222 may determine whether the user 104 is located within the proximate region 106 and then distinguish the user 104 from other users. The user 104 may be distinguished based on one or more radar-receive signals 404-Z, as further described with respect to FIG. 6.

Figure 6:
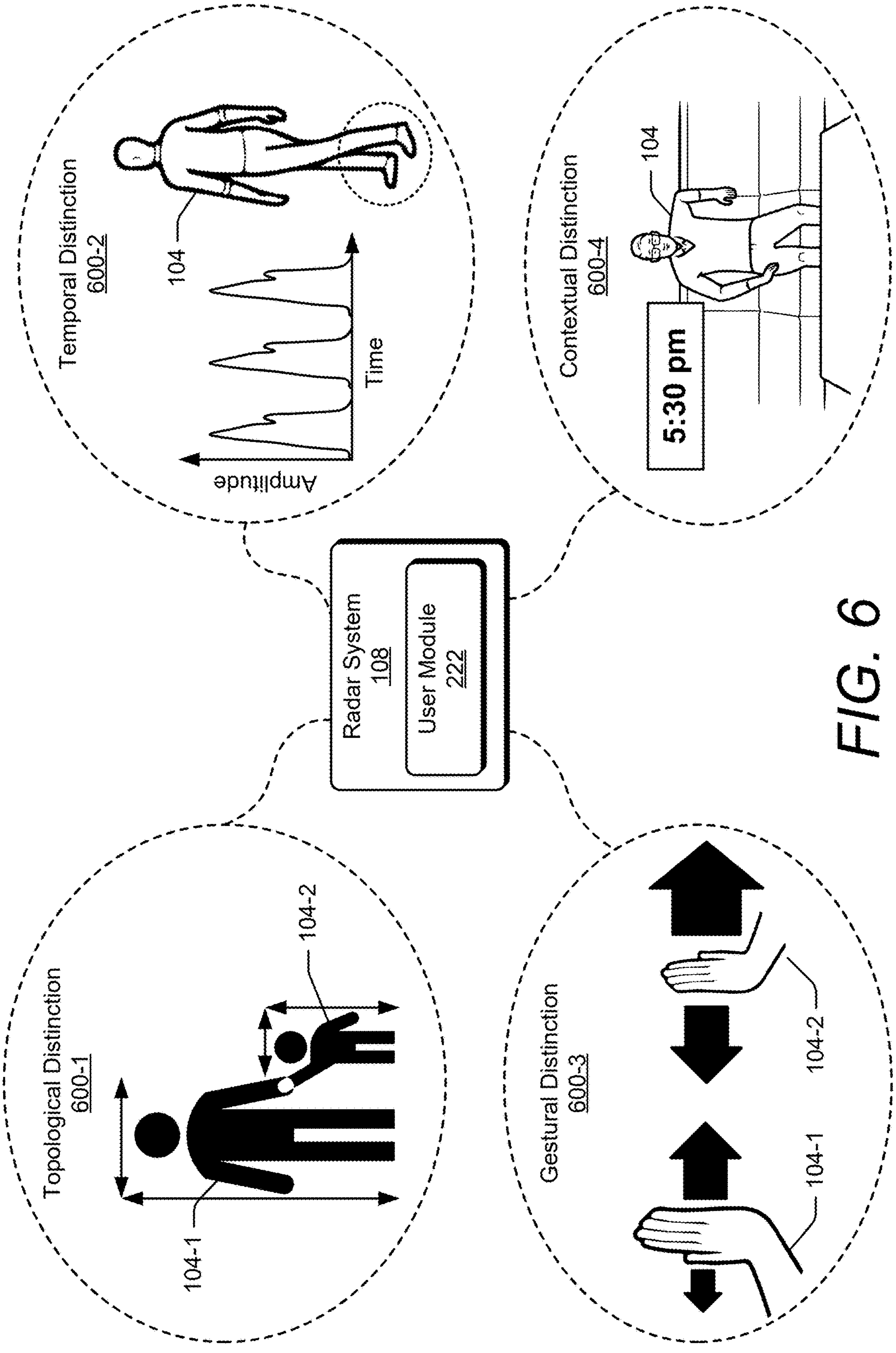
FIG. 6 illustrates example implementations in which the user module may distinguish users.

FIG. 6 illustrates example implementations 600-1 to 600-4 in which the user module 222 may distinguish users 104. The user module 222 may utilize, in part, one or more radar-receive signals 404 to distinguish, for instance, a first user 104-1 from a second user 104-2 with or without personally identifying the first user 104-1 or the second user 104-2. By distinguishing users 104, the user module 222 may enable the computing device 102 to provide a tailored experience for each user 104 that recalls, for instance, training histories, preferences, privacy settings, and so forth. In this way, the computing device 102 may improve upon some virtual-assistant (VA) equipped devices by meeting the privacy and/or functionality expectations of each user.

To distinguish the users 104, the user module 222 may analyze radar-receive signals 404 to determine (1) topological distinctions, (2) temporal distinctions, (3) gestural distinctions, and/or (4) contextual distinctions of a user 104. In this disclosure, topological, temporal, gestural, and contextual distinctions may be determined based on, in part, one or more radar-signal characteristics and, in some cases, non-radar data from non-radar sensors. The user module 222 is not limited to the four categories of distinction depicted in FIG. 6 and may include other categories not shown. Furthermore, the four categories of distinction are shown as example categories and may be combined and/or modified to include subcategories that enable the techniques described herein. The techniques described with respect to FIG. 6 may also be applied to the gesture module 224 as described herein (e.g., in a similar depiction with respect to FIG. 25).

In example implementation 600-1, the user module 222 may use, in part, topological information to distinguish a user 104. This topological information may include radar cross section (RCS) data such as a height, shape, or size of a user 104. For example, a first user 104-1 (e.g., a father) may be significantly larger than a second user 104-2 (e.g., a child). When the father and child enter a proximate region 106, the radar system 108 may obtain radar-receive signals 404 indicating the presence of each user. These radar-receive signals 404 may include, in part, radar-signal characteristics associated with topological information that indicates the height, shape, or size of each user. In this example, the radar-signal characteristics of the father may be distinct from those of the child. The user module 222 may then compare the radar-signal characteristics of each user to stored radar-signal characteristics of registered users to determine whether the father and child are registered users (or unregistered persons having an associated radar-signal characteristic).

In this example, the user module 222 may determine that the first user 104-1 (the father) is a registered user. In particular, the user module 222 may correlate stored radar-signal characteristics of the father (e.g., saved to a memory shared by multiple computing devices 102-X) with the one or more radar-receive signals 404 to determine that he is a registered user. Upon determining that the first user 104-1 is a registered user, the computing device 102 may activate the father's settings, prompt the father to continue gesture training (based on the father's training history), and so forth.

The user module 222 may also determine that the second user 104-2 (the child) is an unregistered person who does not have an account with the computing device 102. In particular, the user module 222 may compare the stored radar-signal characteristics of registered users to the one or more radar-receive signals 404, which contain radar-signal characteristics of the second user 104-2. Upon determining that the topological information associated with the radar-signal characteristics of the second user 104-2 does not correlate with one or more of the stored radar-signal characteristics of registered users (e.g., assuming some level of fidelity), the user module 222 determines that the child is an unregistered person. The radar system 108 may assign the child an unregistered user identification that contains the child's radar-signal characteristics so that the child may be distinguished from other users (e.g., the father) at a future time using topological information. This unregistered user identification may include data, such as shown in FIGS. 12-15, or information determined from that data, such as a height range, motion data, or gate for the child, and so forth. The computing device 102 may also prompt the child to begin gesture training and/or implement predetermined settings (e.g., standard preferences, settings programmed by an owner of the computing device 102).

In general, the stored radar-signal characteristics of registered users may be collected and saved at one or more times. For instance, the radar system 108 may store radar-signal characteristics each time a user 104 interacts with the computing device 102 to improve user recognition. The radar system 108 may also store radar-signal characteristics continually over time to improve user and/or gesture detection. Stored radar-signal characteristics of a user 104 may include topological, temporal, gesture, and/or contextual information inferred from one or more radar-receive signals 404 associated with that user 104. Additionally, the radar system 108 may utilize one or more models used by the user module 222 to distinguish each user 104 based on their corresponding radar-signal characteristics. These one or more models may include a machine-learned (ML) model, predicate logic, hysteresis logic, and so forth to improve user distinction.

In example implementation 600-2, the user module 222 may use, in part, temporal information to distinguish a user 104. Unlike traditional radar detectors that may require high spatial resolution, the radar system 108 of this disclosure may rely more on temporal resolution (rather than spatial resolution) to detect and distinguish a user 104 and/or recognize a gesture performance. In this way, the radar system 108 may distinguish a user 104 that is moving into a proximate region 106 by receiving a motion signature (e.g., a distinct way in which the user 104 typically moves). A motion signature may include a gait (depicted in the plot of example implementation 600-2), limb motion (e.g., corresponding arm movements), weight distribution, breathing characteristics, unique habits, and so forth. A user's motion signature may include a limp, an energetic pace, a pigeon-toed walk, knock-knees, bowlegs, and so forth. Using this information, the user module 222 may be able to detect the motion of the user (e.g., a movement of their hand) without identifying details (e.g., facial features) that may be considered private. The detection of motion signatures by the radar system 108 may enable users to maintain greater anonymity than they would by using, for instance, devices that perform facial recognition or speech-to-text techniques.

While described in the context of distinguishing a user from one or more other users, or as a particular registered user, these techniques may also be used in conjunction with detecting a user. Thus, a radar-signal characteristic of a radar-receive signal reflected from a user may be used to both detect that a user (e.g., any person) is present and also that the detected user is a particular user. Thus, these operations of detecting user presence and distinguishing a user, can be performed separately or as one operation.

In example implementation 600-3, the user module 222 may also use, in part, gesture performance information to distinguish a user 104. When utilizing radar-signal characteristics associated with gesture performance, the user module 222 may communicate with the gesture module 224. A user may perform a gesture (e.g., a push-pull gesture) in a unique way (or unique in some partial way) that may help distinguish that user 104 (while still, of course, conforming sufficiently to a push-pull gesture paradigm to be recognizable as a push-pull gesture). A push-pull gesture, for instance, may include a push of the user's hand in a direction, followed immediately by a pull of their hand in the opposite direction. While the radar system 108 may expect the push and pull motions to be complementary (e.g., equal in motion extent, equal in speed), the user 104 may perform the motion differently than expected. Each user may perform this gesture in a unique way, which is recorded on the device for user distinction and gesture recognition.

As depicted in example implementation 600-3, a first user 104-1 (e.g., a father) may perform a push-pull gesture in a different way than a second user 104-2 (e.g., a child). For instance, the first user 104-1 may push their hand to a first extent (e.g., distance) at a first speed but pull their hand back to a second extent at a second speed. The second extent may include a shorter distance than the first extent, and the second speed may be much slower than the first speed. The radar system 108 may be configured to recognize this unique or partially unique push-pull gesture based on the first user's training history (if available).

When distinguishing the first user 104-1, the radar system 108 may receive one or more radar-receive signals 404 that include radar-signal characteristics of the first user 104-1 associated with their performance of the push-pull gesture. The user module 222 may compare these radar-signal characteristics to stored radar-signal characteristics of registered users to determine whether there is a correlation (see FIGS. 7-17 and 25 and accompanying description for manners in which this is performed). If there is a correlation (e.g., assuming some level of fidelity), the user module 222 may determine that the first user 104-1 is a registered user (the father) based on performance of the push-pull gesture. Similar to the teachings supra regarding example implementation 600-1, the computing device 102 then may activate settings of the father, prompt the father to continue gesture training, and so forth. In this example, it is assumed that the father performed the push-pull gesture at least once in the past, and the radar-signal characteristics of that performance were recorded in the father's training history to later, in part, enable distinction of the father's presence from the presence of other users.

As also depicted in example implementation 600-3, the second user 104-2 (the child) may try to perform the push-pull gesture. The second user 104-2 may push their hand to the first extent at the first speed but pull their hand back to much greater third extent and third speed. In particular, the radar system 108 may receive one or more radar-receive signals 404 that include radar-signal characteristics of the second user 104-2 associated with the performance of this push-pull gesture. The user module 222 may compare these radar-signal characteristics to the stored radar-signal characteristics of registered users to determine whether there is a correlation. Similar to the teachings supra regarding example implementation 600-1, the user module 222 may determine that the push-pull gesture of the second user 104-2 does not correlate with the stored radar-signal characteristics of registered users. Therefore, the user module 222 may determine that the child is an unregistered person and assign the child an unregistered user identification. The radar-signal characteristics associated with the child's push-pull gesture, however, may be included in the unregistered user identification to enable future distinction.

The user module 222 may also use, in part, contextual information to distinguish a user 104. Contextual information may be determined by the user module 222 using, for instance, the antenna 214, another sensor of the computing device 102, data stored on a memory (e.g., user habits), local information (e.g., a time, a relative location), and so forth. In example implementation 600-4, the user module 222 may use a local time as context to enable distinction of a particular user. If a user 104 (e.g., the father) consistently sits on a living room couch at 5:30 pm every day, the user module 222 may take note of this habit to improve user distinction. Whenever the user 104 is detected on the couch at 5:30 pm, the radar system 108 may, in part, use this contextual information to distinguish that user 104 as the father. In another example, if the computing device 102 is located in a child's room, then the radar system 108 may determine over time that the child is the most common user in that room. That contextual information may be used to enable user distinction. Similarly, if the computing device 102 is located in a shared space (e.g., a backyard, an entry), the radar system 108 may determine over time that unregistered persons (e.g., guests, nannies, housekeepers, gardeners, contractors, freelance helpers) are common in that area. It is to be appreciated that while the scope of the present teachings is not necessarily limited to camera-less environments, and therefore that for some embodiments camera(s) and facial recognition may be used to augment the contextual information, one advantageous feature provided by the camera-less embodiments described herein is that the desired contextual information can indeed be derived without the use of cameras, as the presence of cameras in the home environment, especially in more sensitive areas of the home, can bring about uneasiness and a sense of compromise to privacy.

The contextual information gathered by the user module 222 may be used on its own to distinguish a user 104 or in combination with topological information, temporal information, and/or gesture information. In general, the user module 222 may use any one or more of the distinction categories depicted, in any combination, at any time to distinguish a user 104. For instance, the radar system 108 may collect topological and temporal information regarding a user 104 who has entered a proximate region 106 but lack gesture and contextual information. In this case, the user module 222 may distinguish the user 104 based on analysis of the topological and temporal information. In another case, the radar system 108 may collect topological and temporal information but determine that the information is insufficient to correctly distinguish the user 104 (e.g., to a desired level of confidence). If contextual information is available, the radar system 108 may utilize that context to distinguish the user 104 (similarly to in example implementation 600-4). Any one or more categories depicted in FIG. 6 may be prioritized over another category.

The user module 222 may utilize one or more logic systems (e.g., including predicate logic, hysteresis logic, and so forth) to improve user distinction. Logic systems may be used to prioritize certain user distinction techniques over others (e.g., favoring temporal distinctions over contextual information), add weight (e.g., confidence) to certain results when relying on two or more categories of distinction, and so forth. For instance, the user module 222 may determine with low confidence that a first user 104-1 could be a registered user. A logic system may determine that the low confidence is below an allowed threshold criterion (e.g., limit) and instead prompt the radar system 108 to send out a second radar-transmit signal 402-2 (or set of signals transmitted over a period of time) to probe the proximate region 106 again. The user module 222 may also include one or more machine-learned models to improve user distinction, as further described with respect to FIG. 7.

Figure 7:
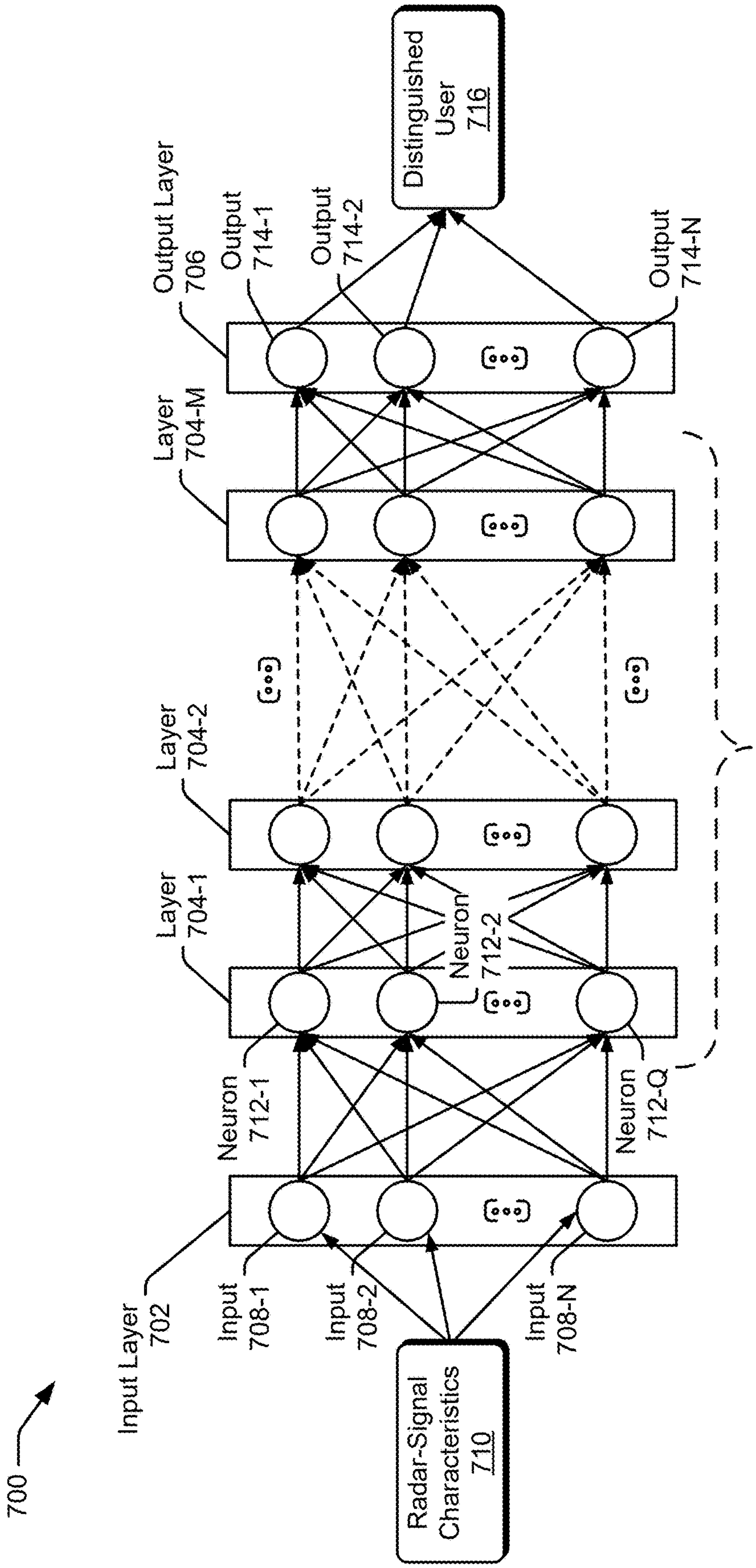
FIG. 7 illustrates an example implementation of a machine-learned (ML) model used to distinguish users of a computing device.

FIG. 7 illustrates an example implementation of a machine-learned model 700 used to distinguish users 104 and/or recognize gestures. The machine-learned model 700 can perform classification in which the machine-learned model 700 provides, for each of one or more classes, a numerical value descriptive of a degree to which it is believed that input data should be classified into the corresponding class. In some instances, the numerical values provided by the machine-learned model 700 can be referred to as probabilities or "confidence scores" that are indicative of a respective confidence associated with classification of the input into the respective class. In some implementations, the confidence scores can be compared to one or more threshold criteria to render a discrete categorical prediction. In some implementations, only a certain number of classes (e.g., one) with the relatively largest confidence scores can be selected to render a discrete categorical prediction.

In example implementations, the machine-learned model 700 can provide a probabilistic classification. For example, the machine-learned model 700 can predict, given a sample input, a probability distribution over a set of classes. Thus, rather than outputting only the most likely class to which the sample input should belong, the machine-learned model 700 can output, for each class, a probability that the sample input belongs to such class. In some implementations, the probability distribution over all possible classes can sum to one.

The machine-learned model 700 can be trained using supervised learning techniques. For example, the machine-learned model 700 can be trained on a training data set that includes training examples labeled as belonging (or not belonging) to one or more classes. At least a portion of the training can be performed to initialize the machine-learned model 700 prior to a user purchasing the computing device 102. This type of training is referred to as off-line training. During off-line training, the training data set is not necessarily associated with the user. In some implementations, the computing device 102 enables the user to perform user gesture training. During user-gesture training, the machine-learned model 700 can collect a new set of training data that is specific to the user and operate as a perpetual learning machine by performing on-the-fly training using the training data associated with the user. In this way, the machine-learned model 700 can adapt to a unique radar signature of the user and the way in which the user performs gestures to improve performance. This type of training is referred to as on-line or in-line training.

In the depicted configuration, the machine-learned model 700 is implemented as a deep neural network and includes an input layer 702, multiple hidden layers 704, and an output layer 706. The input layer 702 includes multiple inputs 708-1, 708-2 . . . 708-N, where N represents a positive integer equal to a quantity of radar-signal characteristics 710 associated with one or more radar-receive signals 404. The multiple hidden layers 704 may include layers 704-1, 704-2 . . . 704-M, where M represents a positive integer. Each hidden layer 704 may include multiple neurons, such as neurons 712-1, 712-2 . . . 712-Q, where Q represents a positive integer. Each neuron 712 may be connected to at least one other neuron 712 in a previous hidden layer 704 or a next hidden layer 704. A quantity of neurons 712 may be similar or different between different hidden layers 704. In some cases, a hidden layer 704 may be a replica of a previous layer (e.g., the layer 704-2 may be a replica of the layer 704-1). The output layer 706 may include outputs 714-1, 714-2 . . . 714-N associated with a distinguished user 716 (e.g., a registered user, an unregistered person) that may have been detected within the proximate region 106.

Generally speaking, a variety of different deep neural networks may be implemented with various quantities of inputs 708, hidden layers 704, neurons 712, and outputs 714. A quantity of layers within the machine-learned model 700 may be based on the quantity of radar-signal characteristics and/or distinction or recognition categories (as depicted in FIG. 6). As an example, the machine-learned model 700 may include four layers (e.g., one input layer 702, one output layer 706, and two hidden layers 704) to distinguish a first user 104-1 from a second user 104-2 as described with respect to example environment 100 and example implementations 600. Alternatively, the quantity of hidden layers may be on the order of a hundred.

When utilized by the user module 222, the machine-learned model 700 may improve the fidelity of user distinction. The machine-learned model 700 may collect multiple inputs 708 (e.g., radar-signal characteristics 710 associated with one or more radar-receive signals 404) over time that include topological, temporal, gesture, and/or contextual information regarding a user 104. For example, the second user 104-2 (e.g., a child) may be positioned far from the radar system 108 during a first interaction with the computing device 102, resulting in a first set of inputs 708 used to distinguish the child as an unregistered person. The first set of inputs 708 may be included in an unregistered user identification assigned to the child. On a second interaction, the child may be seated close to the radar system 108, resulting in a second set of inputs 708 used to distinguish the child that is distinct from the first set and may also be included in the unregistered user identification of the child. This process may continue over time, providing the machine-learned model 700 with more inputs 708 to better distinguish (e.g., with higher accuracy, greater speed) the child at a future time.

When utilized by the user module 222, the machine-learned model 700 analyzes complex radar data (e.g., phase and/or amplitude data) and generates probabilities. Some of the probabilities are associated with various gestures that the radar system 108 can recognize. Another one of the probabilities can be associated with a background task (e.g., background noise or gestures that are not recognized by the radar system 108). Although described with respect to gestures, the machine-learned model 700 can be expanded to indicate other events, such as whether or not a user is present within a given distance.

The gesture module 224 may also collect gesture performance information of a user 104 during user-gesture training, as an input to the machine-learned model 700, to enable the user module 222 to distinguish users based on gesture performance. If the first user 104-1 performs a push-pull gesture four times during user-gesture training, then there may be at least four inputs 708-1, 708-2, 708-3, and 708-4 to the machine-learned model 700. The user module 222 may utilize, in part, one or more outputs 714 of the machine-learned model 700 to distinguish the first user 104-1 (e.g., the father) when he performs the push-pull gesture at a future time.

In general, the machine-learned model 700 may be integrated into the user module 222, the radar system 108, or the computing device 102 or located separately from the computing device 102 (e.g., a shared server). The gesture module 224 may also include a similar machine-learned model 700 that may improve the detection and recognition of gestures being performed by a user 104. For example, the gesture module 224 may detect one or more radar-signal characteristics 710 associated with a gesture being performed by the first user 104-1. The gesture module 224 may utilize the machine-learned model 700 outputs 714 to recognize the gesture as a known gesture (e.g., a push-pull gesture) associated with a command (e.g., to turn on an oven). Operations of the gesture module 224 may be performed at the same time as or a separate time from operations performed by the user module 222. The gesture module 224 may additionally include one or more deep learning algorithms such as a convolutional neural network (CNN) to improve the detection and recognition of gestures. An example integration of CNNs into the gesture module 224 is further described with respect to FIG. 8.

Figure 8:
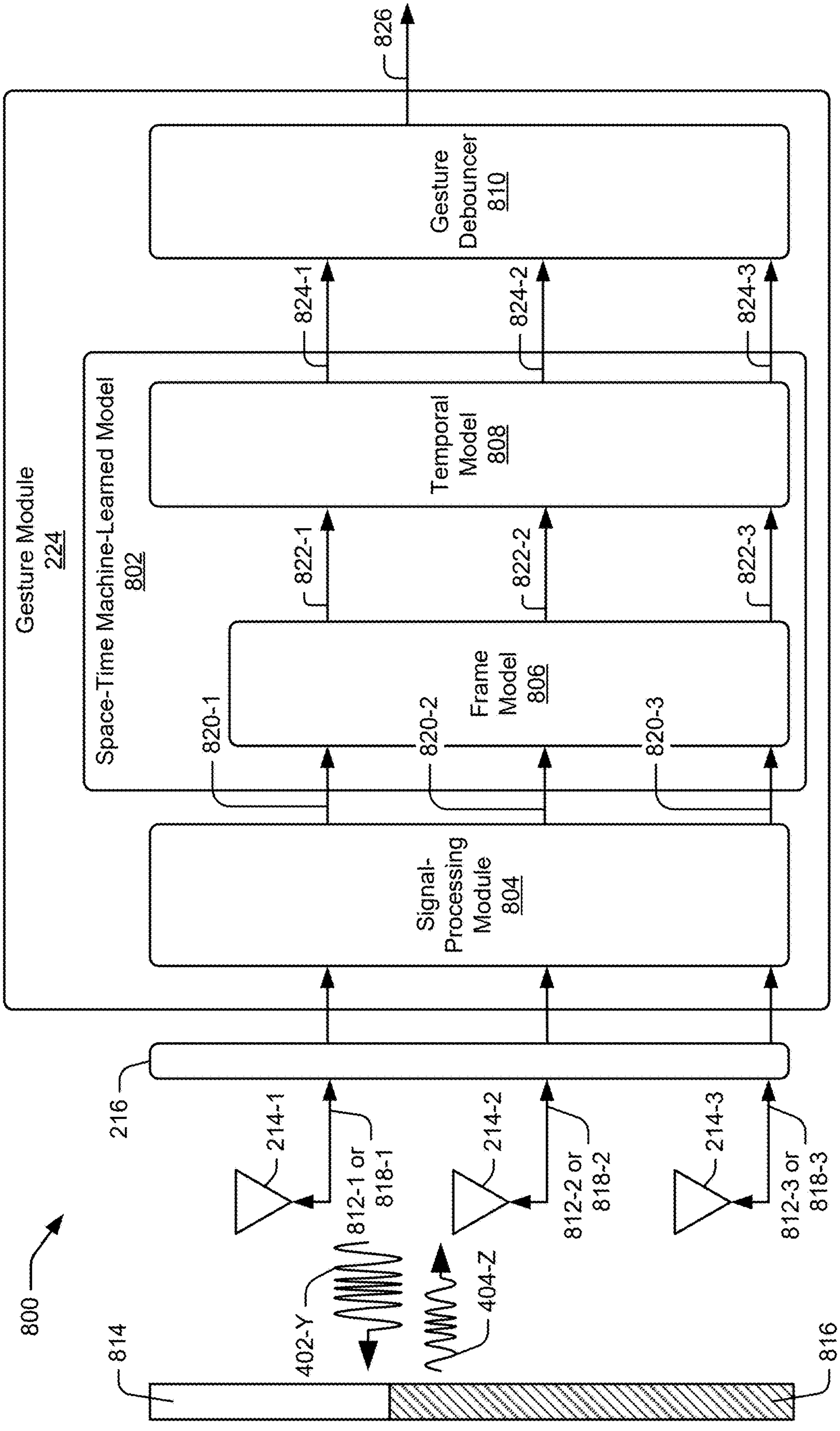
FIG. 8 illustrates an example implementation of a gesture module, which utilizes a space-time machine-learned model to improve the detection and recognition of gestures.

While the machine-learned models of FIG. 7 above and FIG. 8, infra, are described as distinguishing users and recognizing gestures, detecting a user or gesture can be performed as one operation with distinguishing that user or recognizing that gesture, respectively. In some cases multiple or more-complex operations are used, however, such as when an attempt to both detect and recognize a gesture fails by being sufficient to detect but not to recognize the gesture (e.g., where correlation with known gestures is too low to recognize which gesture is performed, such as to a low-confidence level, but is sufficient for the gesture to be determined to be some sort of gesture rather than a non-gesture motion). Thus, one or more radar-signal characteristics of one or more radar-receive signals reflected from a user may be used to both detect that a gesture is performed and also to recognize that the detected gesture is a known gesture.

Example Space-Time Machine-Learned Model

FIG. 8 illustrates an example implementation 800 that includes a gesture module 224, which utilizes a space-time machine-learned model 802 (e.g., one or more CNNs) to improve the detection and recognition of gestures. This space-time machine-learned model 802 may enable the computing device 102 to detect and recognize gestures to a desired level of confidence at long-range extant distances, such as four meters, as well as close distances, such as a few centimeters. The gesture module 224 is depicted with a signal-processing module 804, a frame model 806, a temporal model 808, and a gesture debouncer 810.

The space-time machine-learned model 802 has a multi-stage architecture, which includes a first stage (e.g., the frame model 806) and a second stage (e.g., the temporal model 808). In the first stage, the space-time machine-learned model 802 processes complex radar data (e.g., a complex-range Doppler map) across a spatial domain, which involves processing the complex radar data on a burst-by-burst basis. In the second stage, the space-time machine-learned model 802 concatenates results of the frame model 806 across multiple bursts. By concatenating the results, the second stage processes the complex radar data across a temporal domain. With the multi-stage architecture, an overall size and inference time of the space-time machine-learned model 802 can be significantly less compared to those of other types of machine-learned models. This attribute can enable the space-time machine-learned model 802 to run on a computing device 102 with limited computational resources.

The gesture module 224 is not limited to the arrangement depicted in example implementation 800 and may include additional or fewer components as shown. For example, a gesture module 224 may lack a gesture debouncer 810 but include multiple signal-processing modules 804 that are arranged before the frame models 806, before the temporal model 808, and/or after the temporal model 808. Additionally, any one or more of the depicted components of the gesture module 224 may be arranged separately from the gesture module 224. For instance, the outputs of the temporal model 808 may be sent to a gesture debouncer 810 that is separate from the gesture module 224. The space-time machine-learned model 802 may also be separate from the gesture module 224. In one example, the space-time machine-learned model 802 may be arranged within the radar system 108 but separate from the gesture module 224. In another example, the space-time machine-learned model 802 may be separate from the computing device 102 (e.g., located on a remote server). Further details regarding the recognition of gestures are described herein, such as with respect to FIG. 25.

In example implementation 800, three radar-transmit signals 812-1, 812-2, and 812-3 are transmitted using antennas 214-1, 214-2, and 214-3, respectively. The three radar-transmit signals 812-1, 812-2, and 812-3 represent component signals, which can be superpositioned during propagation to form a composite transmit signal 402-Y. The composite transmit signal 402-Y propagates into an ambient environment (e.g., a domicile). The composite transmit signal 402-Y is reflected, such as off an environment 814 and/or a gesture 816 being performed by a user 104. The environment 814 may include, for example, a fixed environment, such as stationary objects (e.g., furniture), and an unfixed environment, such as motions of objects that are not associated with gestures (e.g., the user 104 walking and/or interacting with their environment 814, a ceiling fan, movement of a domestic animal, and so forth). In FIG. 8, at least a portion of the composite transmit signal 402-Y is reflected off the environment 814 and the gesture 816 (e.g., a hand of the user), resulting in a composite radar-receive signal 404-Z. The antennas 214-1, 214-2, and 214-3 each receive a version of the composite radar-receive signal 404-Z, which is represented by radar-receive signals 818-1, 818-2, and 818-3. The radar-receive signals 818-1, 818-2, and 818-3 correspond to at least three respective radar-signal characteristics and are sent to the analog circuit 216 (with reference to FIG. 5) before being sent to the signal-processing module 804. The analog circuit 216 may modify (e.g., digitize) the radar-receive signals 818 (associated with the radar-signal characteristics) to enable operations of the signal-processing module 804.

In one example of FIG. 8, the computing device 102 transmits the composite radar-transmit signal 402-Y as a burst of 16 chirps at a high-pulse repetition rate (PRF) of 3 kilohertz (kHz). Each burst includes a broad 150-degree radar beam of frequency-modulated continuous waves to illuminate surroundings (e.g., the environment 814 and the gesture 816) of a proximate region 106. Each burst is transmitted periodically over time (at a rate of 30 Hz) to enable unsegmented detection of gestures. Each antenna 214 captures a superposition of reflections (corresponding to the radar-receive signal 404-Z) from scattering surfaces within the proximate region 106 at a long-range extent (e.g., four meters, although other ranges such as about two, six, or eight meters are also contemplated). In general, radar-transmit signals may be transmitted over a variable period of time that is not a fixed period of time (e.g., segmented detection periods).

While three radar-transmit signals 812 are depicted in example implementation 800, in general, the computing device 102 may simultaneously transmit one or more signals from one or more antennas 214. In general, the computing device 102 may detect and recognize gestures at one or more locations within the proximate region 106 that extends to a long-range extent, e.g., a linear range of one to four meters. The computing device 102 of this disclosure does not require the user 104 to perform a gesture at any specific location within the proximate region 106 (e.g., above an interface of the device), which may allow the user 104 freedom to perform gestural commands comfortably from a variety of locations within, for instance, their home without having to walk up to the device's interface.

In example implementation 800, the radar-receive signals 818-1, 818-2, and 818-3 are processed by the signal-processing module 804, which applies a high-pass filter to remove reflections from stationary objects. This high-pass filter may include, for instance, one or more resistors, capacitors, inductors, operational amplifiers (op amps), and so forth. Alternatively, or in addition, each radar-receive signal 818-1, 818-2, and 818-3 may be processed with multiple stages of fast Fourier transforms (FFTs) to generate one or more complex-range Doppler maps 820-A (an example is described with respect to FIG. 12).

A complex-range Doppler map 820 may be a two-dimensional representation that includes a range dimension (e.g., a slant-range dimension) and a Doppler dimension. The range dimension may correspond to a displacement of a scattering surface of the gesture 816 (e.g., a surface of the user's hand) from the computing device 102, and the Doppler dimension may correspond to a range rate of the scattering surface relative to the computing device 102. Thus, one or more complex-range Doppler maps 820 may enable the radar system 108 to determine the relative position and motion of an object (e.g., a gesture 816) within its proximate region 106. The radar system 108 may determine one or more complex-range Doppler maps 820 over time with similar or distinct FFT window sizes. For example, an FFT window size may be set to 128 by 16, corresponding to bin sizes of the range and Doppler data, respectively. In this example, the range resolution Δr is 0.027 meters (m) while the Doppler resolution $\Delta f_d$ is 0.38 meters per second (m/s), as defined by the following equations:

$$\Delta r = \frac{c}{2B}$$

$$\Delta f_d = \frac{c \cdot PRF}{2 f_c l}$$

where c represents the speed of light, B is the transmission bandwidth set at 5.5 GHz, PRF is the pulse repetition frequency set at 3 kHz, $f_c$ is the center frequency set at 60.75 GHz, and l is the number of chirps per burst set at 16.

The signal-processing module 804 then sends one or more complex-range Doppler maps 820 to the frame model 806. As depicted in example implementation 800, the signal-processing module 804 sends three complex-range Doppler maps 820-1, 820-2, and 820-3 to the frame model 806. While one frame model 806 is depicted, the gesture module 224 may include one or more frame models 806 that each utilize CNN (convolutional neural network) techniques. With reference to the previous example, the frame model 806 may receive complex-range Doppler maps 820-1 to 820-3 formatted as a tensor of size 128 (number of range bins) by 16 (number of Doppler bins) by 6 (3 antennas×2 values), where the "2 values" correspond to real and imaginary values as a float representation. The tensor size may be reduced if the proximate region 106 is reduced to a smaller size (e.g., 1.5 m). In this case, the number of range bins may be cropped at the $64^{th}$ bin to correspond to the user 104 standing 1.7 m from the computing device 102 and performing the gesture 816 with their hand at a distance of 1.5 m from the device.

The frame model 806 may output frame results 822-B, which include one-dimensional representations of the complex-range Doppler maps 820-A that have been processed for each burst. In this case, frame results 822-1, 822-2, and 822-3 associated with different bursts may be sent to the temporal model 808 to be connected along the time domain and processed using a similar or distinct CNN technique. The temporal model 808 may compute one or more gesture possibilities (e.g., temporal results 824-C, where the variable C represents the quantity of classes analyzed by the temporal model 808) for one or more gesture classes (e.g., known gestures) and/or a background class (e.g., background motions, objects not associated with known gestures) to be sent to the gesture debouncer 810. For example, the gesture debouncer 810 may be configured to recognize five possible gesture classes (e.g., a tap, an up swipe, a down swipe, a right swipe, and a left swipe) and one background class (e.g., motions and objects that are not correlated with the five possible gesture classes).

The gesture debouncer 810 may enable the computing device 102 to perform unsegmented gesture detection, which may enable the device to detect gestures without first receiving an indication that a gesture is going to be performed and/or without having prior knowledge that a gesture is going to be performed. For instance, the computing device 102 may detect a gesture 816 without requiring the user 104 to prompt the device with a "wake-up" trigger. A wake-up trigger may include a verbal, visual, or gestural prompt made by the user 104 to indicate to the computing device 102 that a gesture 816 performance is imminent. The wake-up trigger may be detected by any one or more sensors of the computing device 102, such as an antenna 214, a microphone, an ambient light sensor, a pressure sensor, a camera, and so forth. By not requiring a wake-up trigger event, the radar system 108 continually (e.g., in an unsegmented manner) scans for and detects gestures 816 at any time.

To prevent a false detection or recognition of a gesture 816, the gesture debouncer 810 may apply one or more heuristics to the temporal results 824-C. A false recognition may include, for instance, correlating the gesture 816 incorrectly to a known gesture or to multiple known gestures. A first heuristic may include a requirement that a temporal result 824-C (e.g., a result of the space-time machine-learned model 802) should be of greater value than an upper threshold criterion (e.g., a set value) within the last three consecutive frames—a maximum threshold requirement regarding a confidence of the result. A second heuristic may require a temporal result 824-C to be of lesser value than a lower threshold criterion when detecting multiple gestures within a period of time—a minimum threshold requirement of elapsed time between gesture performances. If a second gesture 816-2 is performed by the user 104 quickly after the performance of a first gesture 816-1, then the gesture debouncer 810 may rely on an indication that the two gestures 816 are separate actions being performed within the period of time. For example, after the first gesture 816-1 has been detected, the temporal results 824-C may have values less than the lower threshold for an elapsed time before the second gesture 816-2 is detected. These upper and lower thresholds may be experimentally determined or tailored based on user needs and performance.

The gesture debouncer 810 may apply these one or more heuristics to determine a gesture result 826. This gesture result 826 may be an indication of the most likely classification of the object and/or motions (e.g., correlation of radar-signal characteristics) detected by the radar system 108. If the gesture module 224 can categorize up to six classes, then the gesture debouncer 810 will indicate which of these six classes has been detected.

In a first example, assume that a first radar-transmit signal 402-1 is sent into a proximate region 106-1 of a computing device 102-1 and is reflected off a cat walking across a room (shown in part in FIG. 4, cat not illustrated). A first radar-receive signal 404-1 is received at the analog circuit 216 (see FIG. 2) of an illustrated radar system 108-1, before being sent to the signal-processing module 804 (FIG. 8). The signal-processing module 804 cleans the first radar-receive signal 404-1 by applying a high-pass filter to remove signals associated with stationary objects (e.g., a toy on the floor, not illustrated). A first complex-range Doppler map 820-1 is sent to a first frame model 806-1 that performs one or more CNN techniques and transforms the map into a one-dimensional array (a first frame result 822-1). The first frame result 822-1 is sent to the temporal model 808 (see FIG. 8), where the device calculates the probability of the moving cat being any one of six classes (five gesture classes and a background class). The temporal model 808 determines that the probability for each of the five gesture classes is 0.01 (on a scale of 0-1.00) and the probability for the background class is 0.95. These six values (e.g., a first temporal result 824-1) are sent to the gesture debouncer 810. The gesture debouncer 810 applies the first heuristic, requiring the probability of a class to be of greater value than an upper threshold of 0.80. Since the probability of the background class is 0.95, the gesture debouncer 810 sends a first gesture result 826-1 that indicates the cat is of the background class, thus implying the motion of the cat is not associated with one of the five gesture classes. Although the scope of the present teachings is not so limited, it is assumed in this example that the six classes are mutually exclusive and the sum of all six probabilities is equal to 1.00.

In a second example shown in FIG. 4, a second radar transmit signal 402-2 is sent into a proximate region 106-2 of a computing device 102-2 and is reflected off a user 104 (located four meters from the device) greeting a family member by waving their hand. A second radar-receive signal 404-2 is received by a radar system 108-2 (using a similar set of techniques described in the previous example, and at the analog circuit 216), and a second frame result 822-1 is sent to the temporal model 808. The device determines that the motion of the user 104 waving their hand has a probability of 0.2 for an up swipe, 0.2 for a down swipe, 0.2 for a left swipe, 0.2 for a right swipe, 0.1 for a tap, and 0.1 for the background class. A second temporal result 824-2 is sent to the gesture debouncer 810, which determines that none of the six classes have a probability value greater than the upper threshold set at 0.8. Instead of outputting a second gesture result 826-2, the gesture debouncer 810 may, for instance, communicate (to the gesture module 224, radar system 108, and/or computing device 102) that there is insufficient information regarding whether or not the user's wave is a gesture or a background motion. Based on this indication, the gesture module 224 may instruct the device to transmit a third radar-transmit signal 402-3 (not shown in FIG. 4) to obtain an additional radar-signal characteristic (e.g., using a third complex-range Doppler map 820-3, a third frame result 822-3, and a third temporal result 824-3 similar to the above examples). As noted, the techniques may use one or more additional sensors (e.g., a microphone) to collect complementary data and/or may utilize additional information (e.g., contextual information) to discern whether or not the user's wave was intended to be a command for the device. One such manner includes audio that is not necessarily speech recognition. For example, even if the user 104 is not distinguished and thus the computing device 102 does not yet know which user is performing the gesture, audio and other complementary data can be used to alter or establish a probability that a particular gesture is being performed. Examples are set forth in the description of FIG. 19, infra.

In example implementation 800, the frame model 806 and temporal model 808 may collectively form a "space-time machine-learned model" (identified at 802) that utilizes CNN techniques, artificial intelligence, logic systems, residual neural networks (ResNets), dense layers, and so forth. Any one or more components of the space-time machine-learned model may be repeated, rearranged, or neglected as needed. An example structure for the frame model 806 is depicted in FIG. 9.

Figure 9:
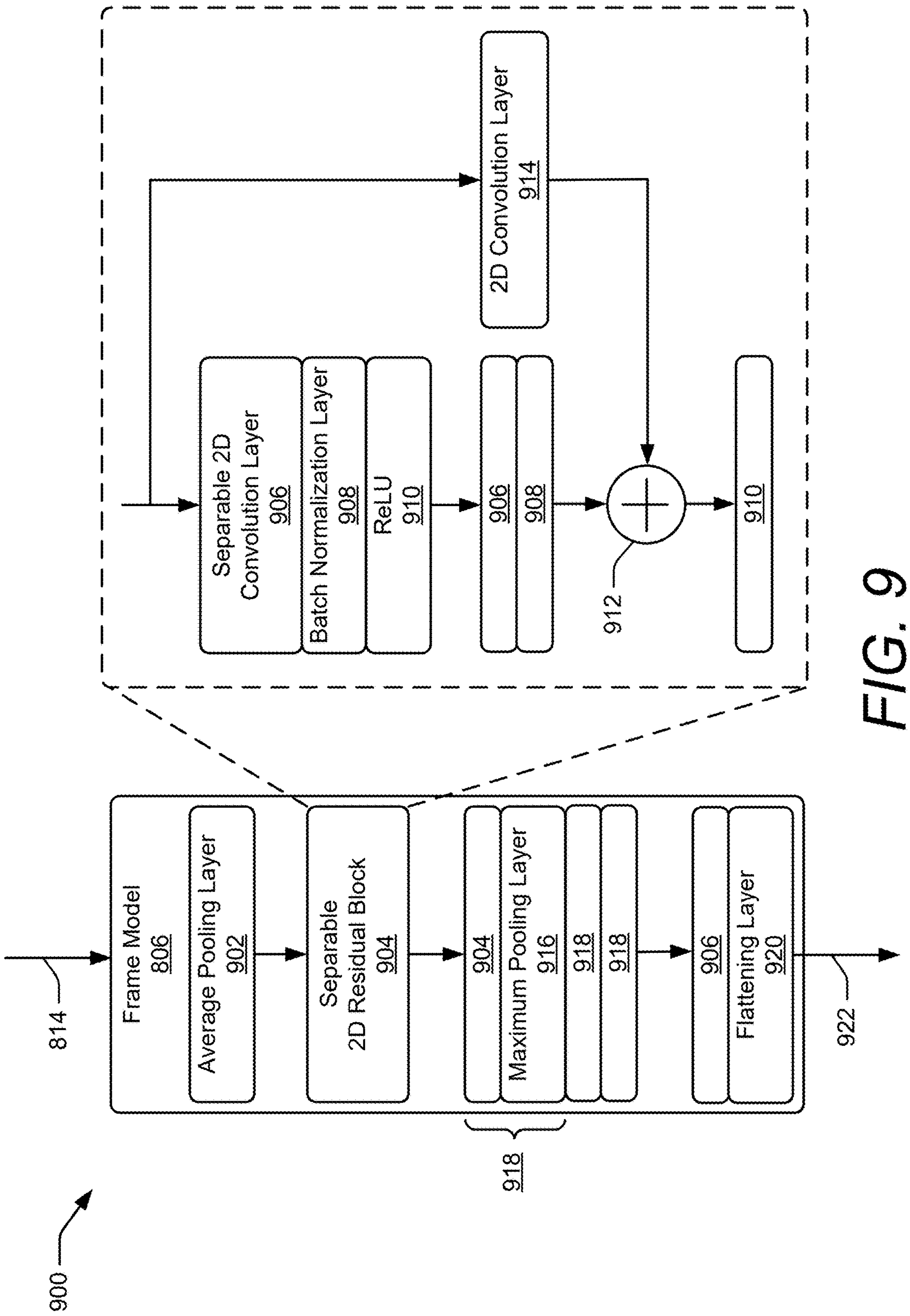
FIG. 9 illustrates an example implementation of deep learning techniques utilized by a frame model.

FIG. 9 illustrates an example implementation 900 of the space-time machine-learning techniques utilized by the frame model 806. These techniques may utilize a neural network (with reference to FIG. 7) with several layers that are arranged as depicted. Any one or more of the depicted layers may be rearranged, removed, or repeated to form alternative neural networks that may also enable detection and recognition of gestures at long-range extents.

As depicted, a complex-range Doppler map 820 (e.g., an input tensor) is first sent to an average pooling layer 902 to reduce the size of the map and computational costs of subsequent layers that follow. The average pooling layer 902 may be used to reduce the size of the map by averaging a set of values, associated with the complex-range Doppler map 820, as an input to the separable two-dimensional (2D) residual block 904. While separable convolution layers are depicted in example implementation 900, the frame model 806 may alternatively, or in addition, utilize standard convolution layers. Separable convolution layers are used to divide a matrix into constituent (two) kernel parts of the matrix. For instance, a 3×3 complex-range Doppler map 820 may require one convolution with 9 multiplications, whereas the matrix's constituent kernel parts (a 1×3 and a 3×1 kernel) may only require two convolutions with three (3) multiplications, thus reducing computational time.

In general, a residual block may be associated with a ResNet that can skip connections (e.g., layers) within a neural network. An example separable 2D residual block 904 is depicted in the dashed box of FIG. 9 with two example paths. On a first path, the results from the average pooling layer 902 are inputted into a separable 2D convolution layer 906. A filter may slide over these inputs, performing an elementwise multiplication and summing at each location. In an example, the space-time machine-learned model 802 may apply a 2×2 filter to a 3×3 input matrix of the separable 2D convolution layer 906. This 2×2 filter may slide over the values of the input matrix, resulting in a 2×2 matrix output. Alternatively, the edges of the 3×3 input matrix may be padded at the separable 2D convolution layer 906 to output a 3×3 matrix instead of a 2×2 matrix. Additionally, a stride (e.g., a skip of one or more locations as the filter slides across the input matrix) may be performed at the separable 2D convolution layer 906.

The output matrix of the separable 2D convolution layer 906 may be sent to a batch normalization layer 908 where the values of the output matrix are standardized to improve the stability and speed of the space-time machine-learned model 802. For example, the values of the output matrix may be standardized by calculating the mean and standard deviation of each value. In another example, the values may be standardized by calculating a running average of the mean and standard deviation. These standardized results may be sent to a rectifier (ReLU) 910, which is an activation function defined as the positive part of its argument. The ReLU 910 may be used to prevent the separable 2D residual block 904 from activating all of the neurons 712 at the same time, thereby preventing exponential growth in the computational requirements. The ReLU 910 may include, for instance, a linear (e.g., parametric) or nonlinear (e.g., Gaussian, sigmoid, analytic, logistic) function. Modified results from the ReLU 910 may be sent to another separable 2D convolution layer 906 that is similar to or distinct from the previous convolution layer. Those results may be processed at another batch normalization layer 908 before being sent to a summation node 912 where the results of this first path are summed with the results of a second path of the separable 2D residual block 904.

On the second path, the results from the average pooling layer 902 bypass the layers of the first path and instead are sent to a 2D convolution layer 914, which may include a two-dimensional standard convolution layer that does not separate matrices into constituent kernels. The output matrix from the 2D convolution layer 914 may be sent to the summation node 912, where the results from the first and second paths are summed and sent to another ReLU 910.

The frame model 806 may next implement a series of separable 2D residual blocks 904 and maximum pooling layers 916 (collectively labeled by 918). Each separable 2D residual block 904 may utilize distinct or similar algorithms for processing data. For instance, each block may use a distinct or similar filter size (e.g., 1×1, 2×2, 3×3, and so forth) and/or stride (e.g., filtering at every 1, 2, 3, or so forth value). Unlike at the average pooling layer 902, one or more maximum values from a set of inputs may be determined at the maximum pooling layer 916. At the maximum pooling layer 916, for example, maximum values of a 4×4 matrix may be calculated by sliding a 2×2 window over the matrix. While this example uses a 2×2 window, in general, the maximum pooling layer 916 may utilize a 1×1 window, a 3×3 window, and so forth. Each maximum pooling layer 916 depicted in example implementation 900 may include a window that is distinct or similar to the window of another maximum pooling layer 916.

At the end of the frame model 806, the data is sent to a final separable 2D convolution layer 906 and then a flattening layer 920. The flattening layer 920 may reduce data to a one-dimensional array (e.g., a frame summary 922). This frame summary 922 may be sent to the temporal model 808 for further processing as described with respect to FIG. 10.

Figure 10:
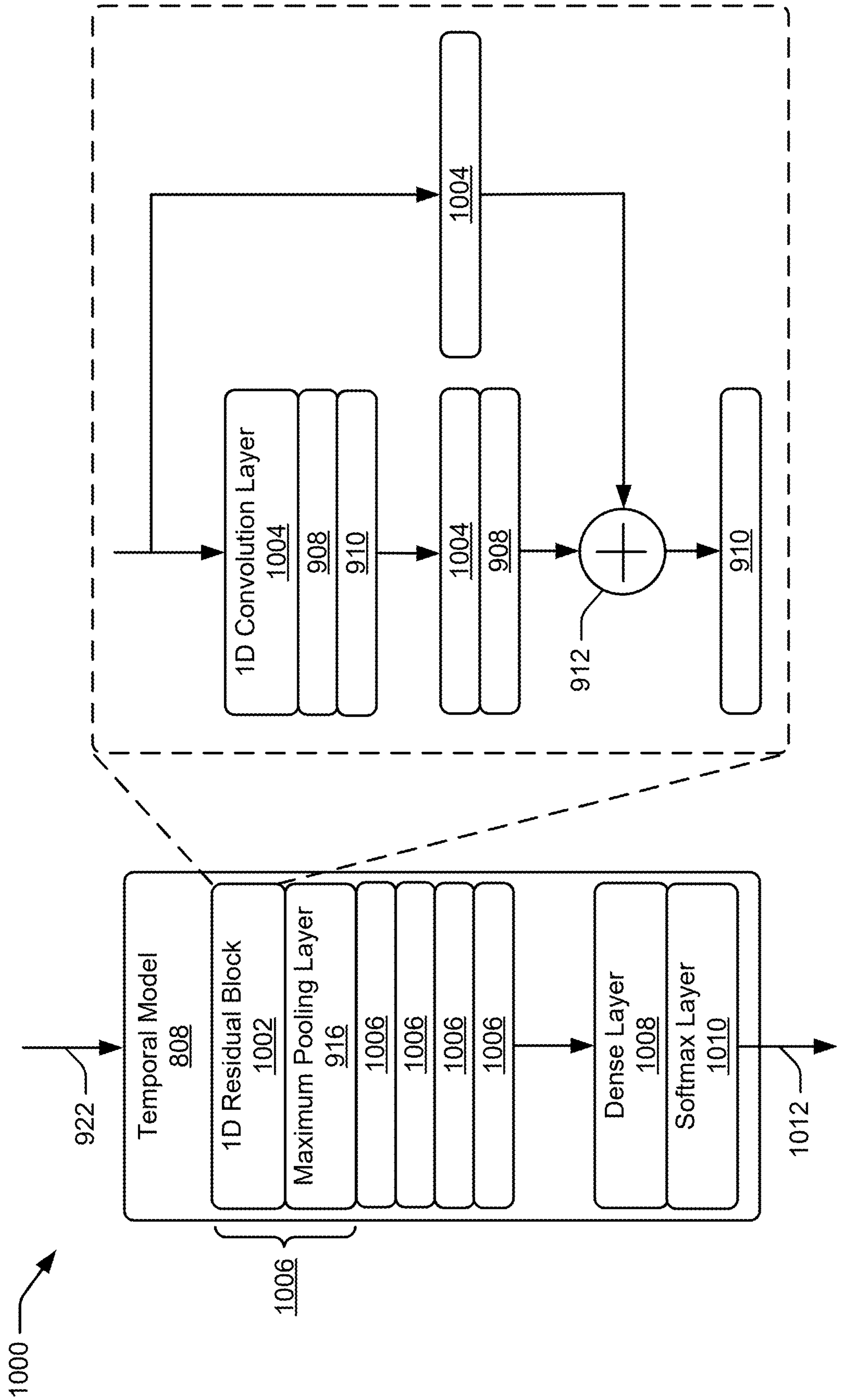
FIG. 10 illustrates an example implementation of deep learning techniques utilized by a temporal model.

FIG. 10 illustrates an example implementation 1000 of the machine-learning techniques utilized by the temporal model 808. Similarly to the frame model 806, the techniques may include a neural network with several layers that are arranged as depicted. Any one or more of the depicted layers may be rearranged, removed, or repeated to form alternative neural networks that may also enable the detection and recognition of gestures at long-range extents.

As depicted, a frame summary 922 may be sent to the temporal model 808 to correlate the frames of the radar-receive signal 404 within the time domain. The frame summary 922 may first be processed at a one-dimensional (1D) residual block 1002. The 1D residual block 1002 may be similar to the separable 2D residual block except in that calculations are performed in one dimension with standard convolutions (e.g., without using separable convolutions). An example 1D residual block 1002 is depicted in the dashed box of FIG. 10 with two possible paths. On a first path, the frame summary 922 is inputted into a 1D convolution layer 1004. The 1D convolution layer 1004 may be similar to the separable 2D convolution layer 906 except in that calculations are performed in one dimension with standard convolutions. These results may be sent to a batch normalization layer 908, followed by a ReLU 910. The data may be processed by another 1D convolution layer 1004 that is similar to or distinct from the prior 1D convolution layer 1004. Those results may be processed at another batch normalization layer 908 before being sent to a summation node 912 where the results of this first path are summed with the results of a second path of the 1D residual block 1002.

On the second path, the frame summary 922 bypasses the layers of the first path and is sent to a 1D convolution layer 1004, which may be similar to or distinct from the 1D convolution layers 1004 of the first path. The results from the first and second paths are summed at the summation node 912 and sent to another ReLU 910.

The temporal model 808 may next implement a series of 1D residual blocks 1002 and maximum pooling layers 916 (collectively labeled by 1006). Each 1D residual block 1002 may utilize distinct or similar algorithms for processing the data with reference to discussions regarding FIG. 9. At the end of the temporal model 808, the data is sent to a dense layer 1008 and then a softmax layer 1010. At the dense layer 1008 (e.g., a fully connected layer), each neuron may receive data from all the neurons of the preceding layer. The size of the data may change at the dense layer 1008 and reflect the number of classes available for classifying a gesture. For example, if the gesture module 224 has five gesture classes and one background class, then the output from the dense layer 1008 may reflect those six classes. This output may be sent to the softmax layer 1010, at which a softmax function is applied to this data to assign probabilities to each class. For example, if there are six classes, then each of the six classes may be assigned a probability value of 0-1. The sum of all six class probabilities may add up to 1. Gesture probabilities 1012 are then sent from the temporal model 808 to the gesture debouncer 810 (with reference to discussions regarding FIG. 8) to enable the detection and recognition of gestures.

Off-Line Training for Radar-Based Gesture Recognition

The gesture module 224 can be trained using off-line supervised training techniques. In this case, a recording device records data that is generated by a radar system 108. The recording device is coupled to the radar system 108 to capture complex radar data. The recording device can be a standalone unit that connects to the radar system 108. Alternatively, the recording device can be integrated within the radar system 108 or the computing device 102.

For off-line training, the radar system 108 collects positive recordings as a participant performs gestures, such as a right swipe using a left hand and a left swipe using a right hand. In general, the positive recordings represent complex radar data that is recorded by the radar system 108 or the recording device during time periods in which participants perform gestures associated with the gesture classes.

The positive recordings can be collected using participants with various heights and types of handedness (e.g., right-handed, left-handed, or ambidextrous). Also, the positive recordings can be collected with the participant located at various positions relative to the radar system 108. For example, the participant can perform gestures at various angles relative to the radar system 108, including angles between approximately −45 and 45 degrees. As another example, the participant can perform gestures at various distances from the radar system 108, including distances between approximately 0.3 and 2 meters. Additionally, the positive recordings can be collected with the participant assuming various postures (e.g., sitting, standing, or lying down), with different recording device placements (e.g., on a desk or in a hand of the participant), and with various orientations of the recording device (e.g., a portrait orientation or a landscape orientation).

For off-line training, the radar system 108 also collects negative recordings as a participant performs background tasks. Background tasks can include the participant operating a computer or the computing device 102. Another background task can include the participant walking around the radar system 108. In general, the negative recordings represent complex radar data that is recorded by the radar system 108 during time periods in which participants perform background tasks associated with the background class (or tasks not associated with a gesture class).

The participants may perform background motions that resemble gestures associated with one or more of the gesture classes. For example, the participant can move their hand between the computer and a mouse, which may resemble a directional swipe gesture. As another example, the participant may place a cup down on a table next to the recording device and pick the cup back up, which may resemble a tap gesture. By capturing these gesture-like background motions in the negative recordings, the gesture module 224 can be trained to detect a difference between background tasks with gesture-like motions and intentional gestures meant to control the computing device 102.

The negative recordings can be collected in various environments, including a kitchen, a bedroom, or a living room. In general, the negative recordings capture natural behaviors around the radar system 108, which can include the participant reaching to pick up the computing device 102, dancing nearby, walking, cleaning a table with the computing device 102 on the table, or turning a car's steering wheel while the computing device 102 is in a holder. The negative recordings can also capture repetitions of hand movements similar to swipe gestures, such as moving an object from one side of the radar system 108 to another side. For training purposes, the negative recordings are assigned a background label, which sets them apart from the positive recordings. To further improve performance of the gesture module 224, the negative recordings can optionally be filtered to extract samples associated with motions with velocities higher than a predefined threshold criterion.

"The positive recordings and the negative recordings are split or divided to form a" training data set, a development data set, and a test data set. A ratio of positive recordings to negative recordings in each of the data sets can be determined to maximize performance. In example training procedures, the ratio is 1:6 or 1:8.

The recording device can refine timings of gesture segments within the positive recordings. To do this, the recording device detects a center of a gesture motion within a gesture segment of a positive recording. As an example, the recording device detects, within a given gesture segment, a zero-Doppler crossing. The zero-Doppler crossing can refer to an instance in time in which the motion of the gesture changes between a positive and a negative Doppler bin. Explained another way, the zero-Doppler crossing can refer to an instance in time in which a Doppler-determined range rate changes between a positive value and a negative value. This indicates a time in which a direction of the gesture motion becomes substantially perpendicular to the radar system 108, such as during a swipe gesture. It can also indicate a time in which a direction of the gesture motion reverses and the gesture motion became substantially stationary, such as during performance of a tap gesture. Other indicators can be used to detect a center point of other types of gestures.

The recording device aligns a timing window based on a detected center of a gesture motion. The timing window can have a particular duration. This duration can be associated with a particular quantity of bursts, such as 12 or 30 bursts. In general, the quantity of bursts is sufficient to capture the gestures associated with the gesture classes. In some cases, an additional offset is included within the timing window. The offset can be associated with a duration of one or more bursts. A center of the timing window can be aligned with the detected center of the gesture motion.

The recording device resizes a given gesture segment based on its aligned timing window to generate pre-segmented data. For example, the size of the gesture segment is reduced to include samples associated with the aligned timing window. The pre-segmented data can be provided as the training data set, the development data set, and a portion of the test data set.

The gesture module 224 can be trained using the training data set and supervised learning. As described above, the training data set can include pre-segmented data. This training enables optimization of internal parameters of the gesture module 224, including weights and biases.

Firstly, hyperparameters of the gesture module 224 are optimized using the development data set. As described above, the development data set can include pre-segmented data. In general, hyperparameters represent external parameters that are unchanged during the training. A first type of hyperparameter includes parameters associated with an architecture of the gesture module 224, such as a quantity of layers or a quantity of nodes in each layer. A second type of hyperparameter includes parameters associated with processing of training data, such as a learning rate or a number of epochs. The hyperparameters can be hand selected or can be automatically selected using techniques such as a grid search, a black box optimization technique, a gradient-based optimization, and so forth.

Secondly, the gesture module 224 is evaluated using the test data set. In particular, a two-phase evaluation process is performed. A first phase includes performing a segmented classification task using the gesture module 224 and pre-segmented data within the test data set. Without use of the gesture debouncer 810 to determine whether or not a gesture occurred, the gesture is determined based on the highest probability provided by the temporal model 808. By performance of the segmented classification task, an accuracy, precision, and recall of the gesture module 224 can be evaluated.

A second phase includes performing an unsegmented recognition task using the gesture module 224 and the gesture debouncer 810. Instead of using the pre-segmented data within the test data set, the unsegmented recognition task is performed using continual time-series data (or a continual data stream). By performance of the unsegmented recognition task, a recognition rate and/or a false positive rate of the gesture module 224 can be evaluated. In particular, the unsegmented recognition task can be performed using the positive recordings to evaluate the recognition rate and the negative recordings to evaluate the false positive rate. The unsegmented recognition task utilizes the gesture debouncer 810, which enables further tuning of threshold criteria to better achieve a desired recognition rate and a desired false positive rate.

If the results of the segmented classification task and/or the unsegmented recognition task are not satisfactory, one or more elements of the gesture module 224 can be adjusted. These adjustments can extend to an overall architecture of the gesture module 224, the training data, and/or the hyperparameters. With these adjustments, the training of the gesture module 224 can repeat. The positive recordings and/or the negative recordings can be augmented to further enhance training of the gesture module 224, as further described below.

Data Augmentation Techniques

The data sets of the space-time machine-learned model 802 (e.g., complex-range Doppler maps 820, frame results 822, and/or temporal results 824 associated with radar-signal characteristics) may be enhanced using data augmentation to increase the quantity of stored radar-signal characteristics without requiring a large number of interactions (e.g., 50 or more interactions) between the user 104 and the computing device 102 for off-line or in-line training. Radar-augmentation techniques described in this disclosure include determination of random or predetermined phase rotations and/or magnitude scaling of data corresponding to one, or more radar-signal characteristics. By implementing these radar-augmentation techniques, the computing device 102 may reduce the amount of gesture training needed to accurately recognize gestures to a desired level of confidence. For instance, the computing device 102 may need to collect only three radar-signal characteristics of a user 104 performing a swipe gesture, instead of ten, to accurately recognize a command. Therefore, a user 104 may quickly enjoy using the computing device 102 without having to undergo time-consuming gesture training.

For complex-range Doppler maps 820, absolute phases may be influenced by surface positions under a range bin resolution, phase noises, errors in sampling timings, and so forth. Furthermore, magnitudes of complex-range Doppler maps 820 may be influenced by properties of an antenna 214, continuity between computing devices 102 (when utilizing a computing system), signal reflectivity from scattering surfaces, orientations of scattering surfaces, and so forth. For a large data set, these absolute phases and magnitudes may distribute uniformly. For a small data set (e.g., corresponding to a new user beginning gesture training), however, these absolute phases and magnitudes may be biased, reducing the accuracy of gesture detection and/or recognition.

To address these concerns without requiring the user 104 to undergo time-consuming gesture training, the computing device 102 may utilize radar-augmentation techniques to augment the phase and/or magnitude of the complex-range Doppler map 820, M, based on the following relation:

$$A(r, d, c) = s * M(r, d, c) * (\cos\theta + i\sin\theta)$$

where A is an augmented complex-range Doppler map, r is a range bin index, d is a Doppler bin index, c is a channel index (with reference to FIG. 8), s is a random or predetermined scaling factor chosen from a normal distribution with a mean of 1, and θ is a random or predetermined rotation phase chosen from a uniform distribution between −π and π. From this equation, complex values may be rotated with various phase values and/or scaling factors to increase the quantity of stored radar-signal characteristics usable to recognize gestures. In physical terms, the phase values may represent an angular displacement of a gesture from the computing device 102. In particular, these phase values may represent an angular orientation of a scattering center of the user's hand (assuming the gesture is performed with the user's hand) relative to a front or zero-degree orientation of an antenna 214 of the computing device 102. Relatedly, magnitude values may represent a linear displacement of the gesture from the computing device 102. If the user 104 performs the gesture near (e.g., one foot away from) the device, then the magnitude may be of larger value than if the user 104 had performed the gesture far from (e.g., four meters away from) the device. The random or predetermined rotation phases and scaling factors used for augmentation may be distinct from the rotation phase and scaling factor, respectively, of a detected and/or stored radar-signal characteristic. In this way, the augmented data may complement (not duplicate) the radar-signal characteristics stored on the computing device 102.

In an example, a first user 104-1 (e.g., an unregistered person) is interacting with the computing device 102 for a first time and begins gesture training on a swipe gesture. The computing device 102 instructs the user 104 to perform the swipe gesture with their hand. The radar system 108 transmits a first radar-transmit signal 402-1 that is reflected off a scattering surface of the user's hand, resulting in a first radar-receive signal 404-1. A first antenna 214-1 receives this signal and sends it to the analog circuit 216 before the signal is received by the signal-processing module 804 of the gesture module 224. A first complex-range Doppler map 820-1, or $M_1$, of the first radar-receive signal 404-1 is augmented to include two additional phase values and two additional magnitude values, resulting in four augmented complex-range Doppler maps ($A_1$, $A_2$, $A_3$, $A_4$). These five maps $M_1$, $A_1$, $A_2$, $A_3$, and $A_4$ may be utilized by the space-time machine-learned model 802 to improve the detection and recognition of gestures (and background motions).

Figure 11:
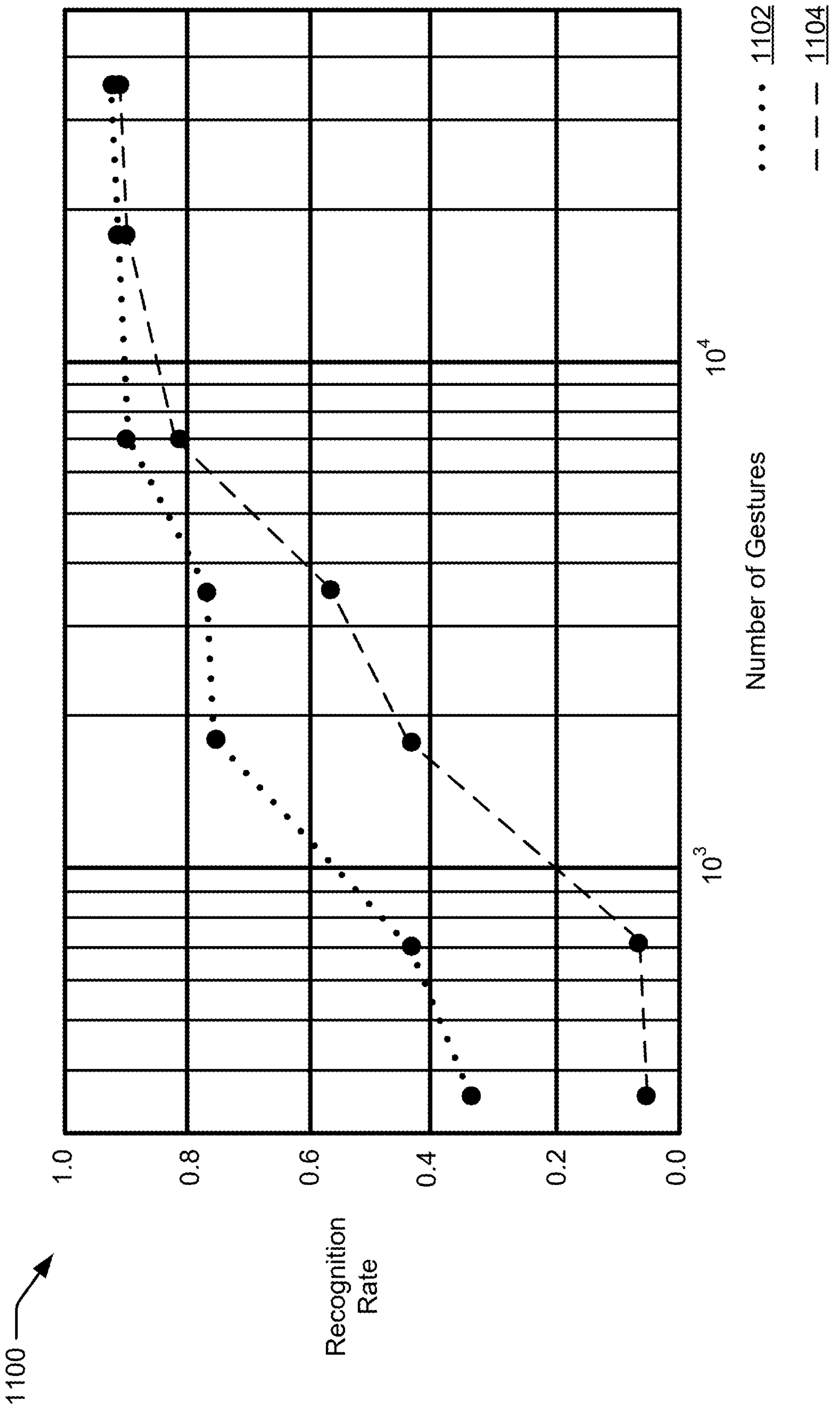
FIG. 11 illustrates experimental results that indicate an improved performance in the recognition of gestures when utilizing the radar-augmentation techniques.

FIG. 11 illustrates experimental results 1100 that indicate an improved performance in the recognition of gestures when utilizing the radar-augmentation techniques. In this experiment, the gesture module 224 augmented complex-range Doppler maps 820 within a Keras layer. An augmented data set 1102 includes detected, stored, and augmented radar-signal characteristics, whereas an original data set 1104 includes detected and stored radar-signal characteristics. The x-axis of the experimental results 1100 represents a number of gestures performed over time for a set of gesture trainings. For this experiment, the number of false positives per hour was equal to 2.0. The results indicate that the augmented data set 1102 enabled the computing device 102 to more frequently recognize known gestures at earlier times during training than the original data set 1104. This means that the computing device 102 of this disclosure may be able to accurately recognize known gestures while requiring fewer interactions with the user 104 when utilizing radar-augmentation techniques to accurately recognize known gestures.

These radar-augmentation techniques may be modified for and/or applied to detection and distinction of users 104 and are not limited to the techniques of gesture detection and recognition. In particular, the computing device 102 may augment a set of one or more radar-signal characteristics used to distinguish a user 104 and to improve detection of user presence. In an example, a first user 104-1 (e.g., a new, unregistered person) is detected at a distance of two meters (2 m) from the computing device 102 and at an angle of 90 degrees relative to the front (0-degree orientation) of the device. At the user's position, the computing device 102 detects one radar-signal characteristic of the first user 104-1, which may be used to distinguish them from another user. Before the radar system 108 can determine a second radar-signal characteristic, however, the first user 104-1 leaves the proximate region 106 of the computing device 102. For some devices, one radar-signal characteristic may not be sufficient to distinguish the presence of the first user 104-1 at a future time to a high level of confidence. The computing device 102 of this disclosure, however, may augment this first radar-signal characteristic to enable an accurate distinction of the first user 104-1 at the future time. In particular, the augmentation may include rotation phase angles, θ, of 0, 180, and 270 degrees along with magnitudes, s, that correspond to linear displacements of 0.5, 1, and 4 m.

These augmented complex-range Doppler maps (corresponding to augmented radar-signal characteristics) may be stored, along with the first radar-signal characteristic, to enable distinction of the first user 104-1 at the future time. When the first user 104-1 reenters the proximate region 106 at the future time, the user module 222 may distinguish this user using ten stored radar-signal characteristics (the nine augmented radar-signal characteristics and the one detected radar-signal characteristic) instead of just one radar-signal characteristic. The computing device 102 may additionally exchange augmented radar-signal characteristics between devices of a computing system using the communication network 302 described with respect to FIG. 3. In this way, a set of computing devices 102-X (forming a computing system) may improve the recognition of gestures by sharing augmented data.

Experimental Data Using the Space-Time Machine-Learned Model

Figure 12:
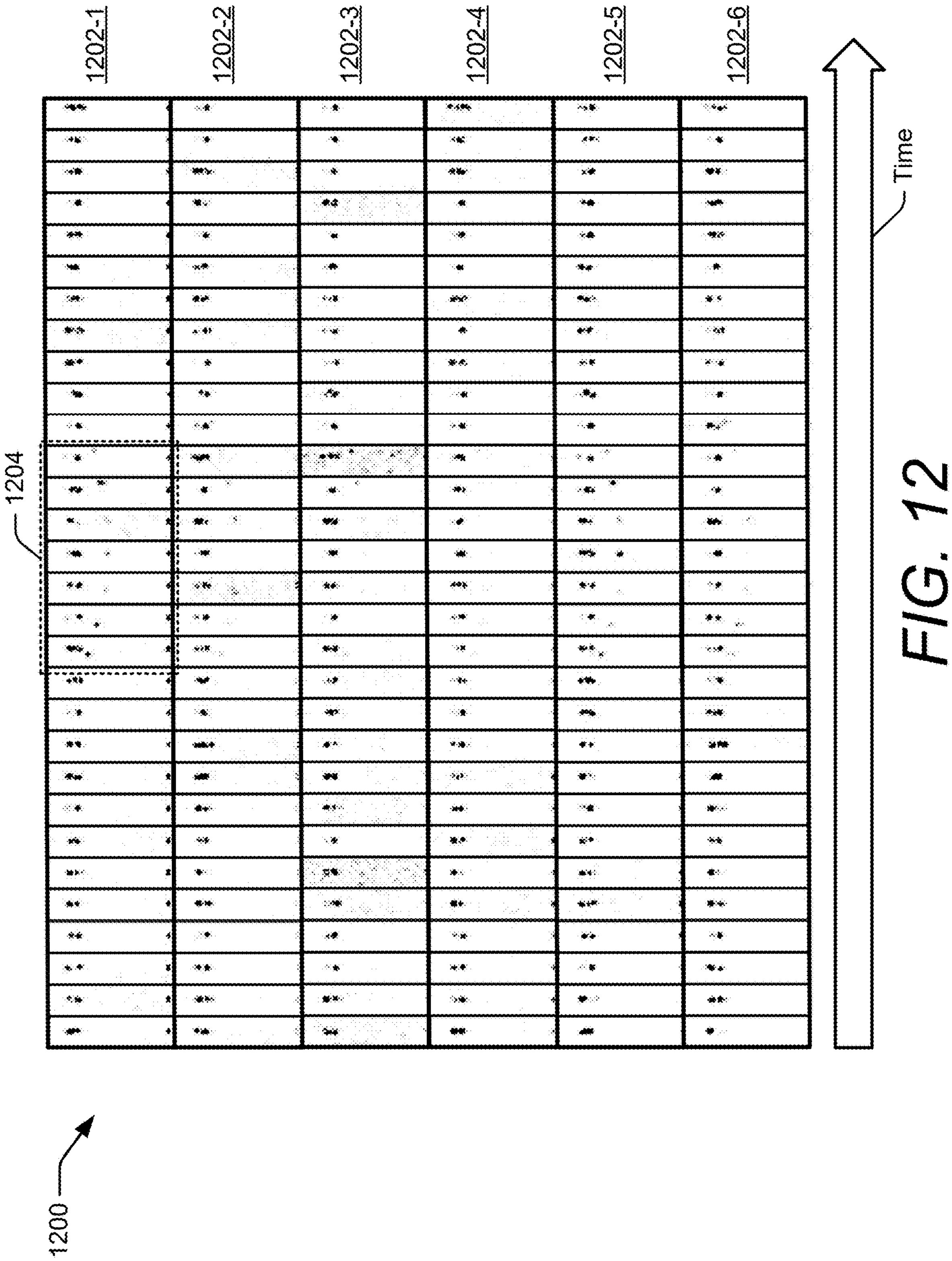
FIG. 12 illustrates experimental data of a user performing a tap gesture.

FIG. 12 illustrates experimental data 1200 of a user 104 performing a tap gesture for the computing device 102. The tap gesture may involve the user 104 pushing their hand towards the device and then pulling their hand back to its initial starting position. For this experiment, the user 104 performed the tap gesture at a distance of 1.5 m from the computing device 102 and an angular displacement of zero degrees. The experimental data 1200 includes real and imaginary values of complex-range Doppler maps 820. A first row 1202-1, third row 1202-3, and fifth row 1202-5 each include real values of 30 frames (corresponding to 30 complex-range Doppler maps 820) as collected by a first, second, and third receive channel 508-1, 508-2, and 508-3, respectively. A second row 1202-2, fourth row 1202-4, and sixth row 1202-6 each include imaginary values of the 30 frames (corresponding to the 30 complex-range Doppler maps 820) collected by the first, second, and third receive channels 508-1, 508-2, and 508-3, respectively. Each frame is shown with a horizontal axis (x-axis) corresponding to a range rate of a gesture, with a zero range rate at the center, negative range rates to the left, and positive range rates to the right. Each frame is also shown with a vertical axis (y-axis) corresponding to a displacement of a gesture, with a zero displacement (e.g., the location of the antenna 214) at the bottom and an extent of 2 m at the top. These displacements and range rates are taken relative to a position of a receiving antenna of the computing device 102. For each row 1202, the 30 frames are arranged sequentially, with time increasing from left to right.

From the experimental data 1200, the user 104 is detected standing at 1.5 m in every frame, as demonstrated by a first circular feature that is consistently visible at the top of each frame. When the user 104 performs the tap gesture, their hand motion 1204 can be seen in frames 13-19. As the user 104 begins to move their hand towards the device (at frame 13), a second circular feature begins to appear. This second circular feature continues to move towards the bottom of frames 14 and 15 (as the user 104 pushes their hand towards the device) until the user 104 has fully extended their arm at frame 16. At frame 17, the user 104 begins to pull their hand back towards their body and away from the computing device 102. By frame 20, the tap gesture has been completed. The gesture module 224 may determine from this data that the user 104 has performed the tap gesture and then determine a corresponding command to be performed by the computing device 102.

When storing one or more radar-signal characteristics associated with the user 104 performing the tap gesture, the gesture module 224 may include, for instance, any one or more of the frames shown in the experimental data 1200. In a first example, the device may select frames 13-19 of row 1202-1 (identified at 1204) to store for future reference. In a second example, the device may store frames 1-30 of row 1202-1 as a radar-signal characteristic of the tap gesture. In a third example, the device may store all 30 frames of each of rows 1202-1 through 1202-6 as radar-signal characteristics of the tap gesture. Additional experimental data regarding the tap gesture is described with respect to FIG. 13.

Figure 13:
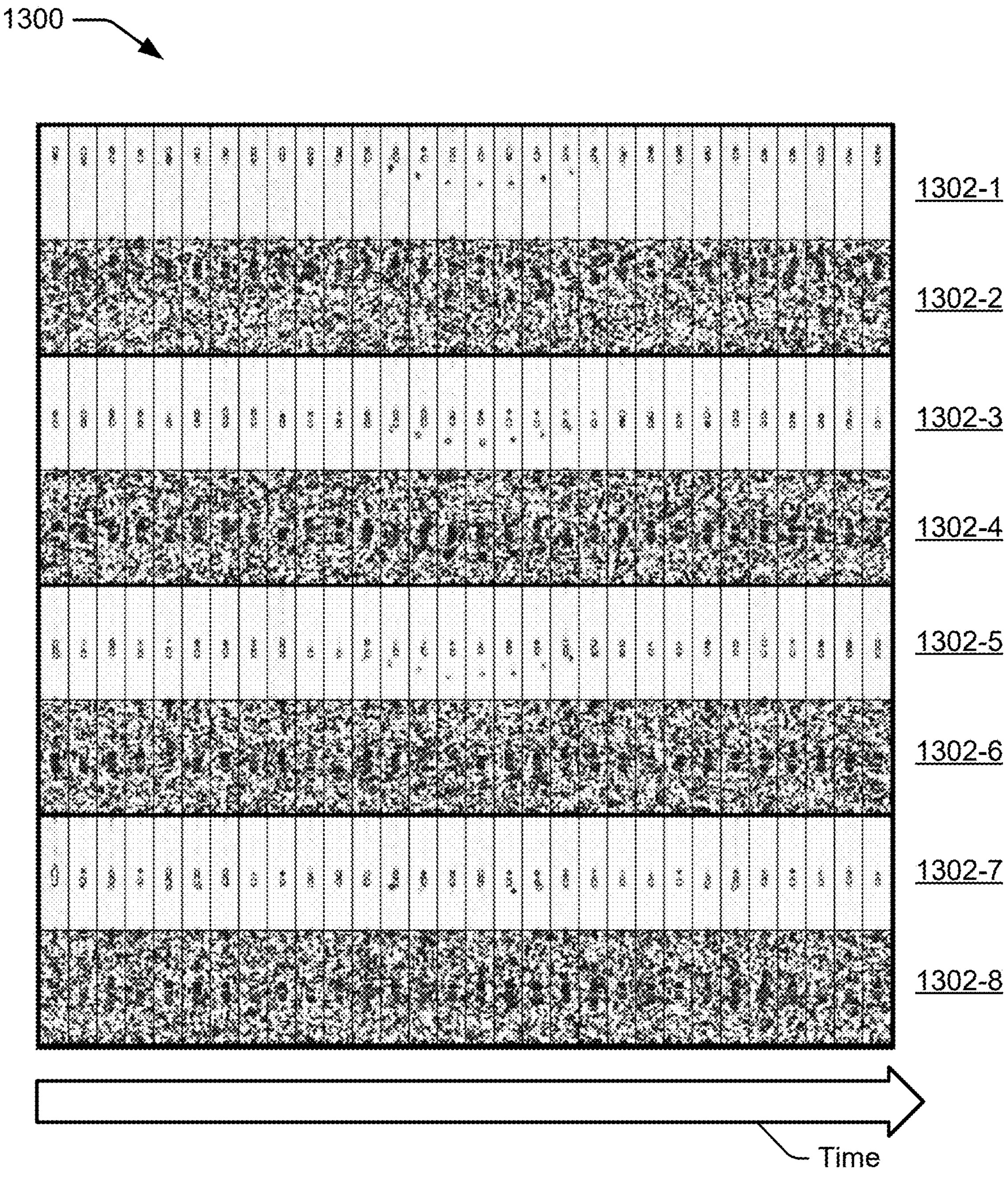
FIG. 13 illustrates experimental data of a user performing a tap gesture, right swipe, strong left swipe, and weak left swipe.

FIG. 13 illustrates experimental data 1300 of a user 104 performing a tap, right swipe, strong left swipe, and weak left swipe for the computing device 102. The data shown in FIG. 13 is arranged similarly to the experimental data 1200 of FIG. 12 except in the following ways. Rows 1302-1, 1302-3, 1302-5, and 1302-7 correspond to the absolute-range Doppler maps of the tap gesture, right swipe, strong left swipe, and weak left swipe, respectively. Each absolute-range Doppler map may be generated by taking the average magnitude of a corresponding complex-range Doppler map 820. Rows 1302-2, 1302-4, 1302-6, and 1302-8 correspond to the interferometric-range Doppler maps of the tap gesture, right swipe, strong left swipe, and weak left swipe, respectively. Each interferometric-range Doppler map may be generated by computing phase differences between complex-range Doppler maps 820 associated with two or more receive channels 508.

In this experimental data 1300, the strong left swipe of rows 1302-5 and 1302-6 can be seen at frames 13-19 with a clear second circular feature. The weak left swipe of rows 1302-7 and 1302-8, however, lacks a clear second circular feature, which can make the classification of this gesture challenging. In some cases, the gesture module 224 may utilize the space-time machine-learned model 802, contextual information, in-line learning techniques, and so forth to improve the recognition of this gesture. In other cases, this weak left swipe may be categorized as "negative data" or a "false gesture," which cannot be mapped to a gesture class (e.g., a swipe, tap) to a desired level of confidence. Instead of neglecting negative data, the gesture module 224 may store this information (e.g., as a background motion) to improve gesture recognition at a future time.

Negative Data Collection

The computing device 102 of this disclosure may store one or more radar-signal characteristics to enable the detection, distinction, and/or recognition of gestures and/or users. These stored radar-signal characteristics are not limited to "positive data" and may also include "negative data." Positive data may include radar-signal characteristics used to recognize a gesture (e.g., a known gesture with an associated command) and/or distinguish a user to a desired level of confidence. Examples of positive data may include radar-signal characteristics correlated with a gesture class (e.g., tap, swipe, flick, point) or a specific user based on, for instance, radar cross section (RCS) data. Negative data, on the other hand, may include radar-signal characteristics that do not correlate, to the desired level of confidence, to one or more stored radar-signal characteristics of a gesture or user 104. Examples of negative data may include motions of a person walking, twisting their torso, picking up an object, and so forth. Negative data may also include motions of animals (e.g., house cats), cleaning devices (e.g., automated vacuums), and so forth. The gesture module 224 may categorize this negative data within a background class of radar-signal characteristics that are not associated with known gestures (e.g., gesture commands the computing device 102 is programmed or taught to recognize).

In an example, a motion is detected in the proximate region 106 of the computing device 102, and the radar system 108 detects a first radar-signal characteristic of the motion. If the first radar-signal characteristic correlates with one or more stored radar-signal characteristics of a tap gesture (to a desired level of confidence), then the gesture module 224 may store this first radar-signal characteristic as positive data to improve the recognition of the tap gesture at a future time. If the first radar-signal characteristic does not correlate with one or more stored radar-signal characteristics of a known gesture, then the gesture module 224 may determine the motion is not correlated with a command. Instead of discarding this data, the gesture module 224 may store the first radar-signal characteristic as negative data to improve the detection or recognition of gestures from background motions (e.g., movements may by a user 104 or object that are not intended to be gesture commands). Similar techniques may be used to improve the detection of user presence and distinction of one user from another user.

Figure 14:
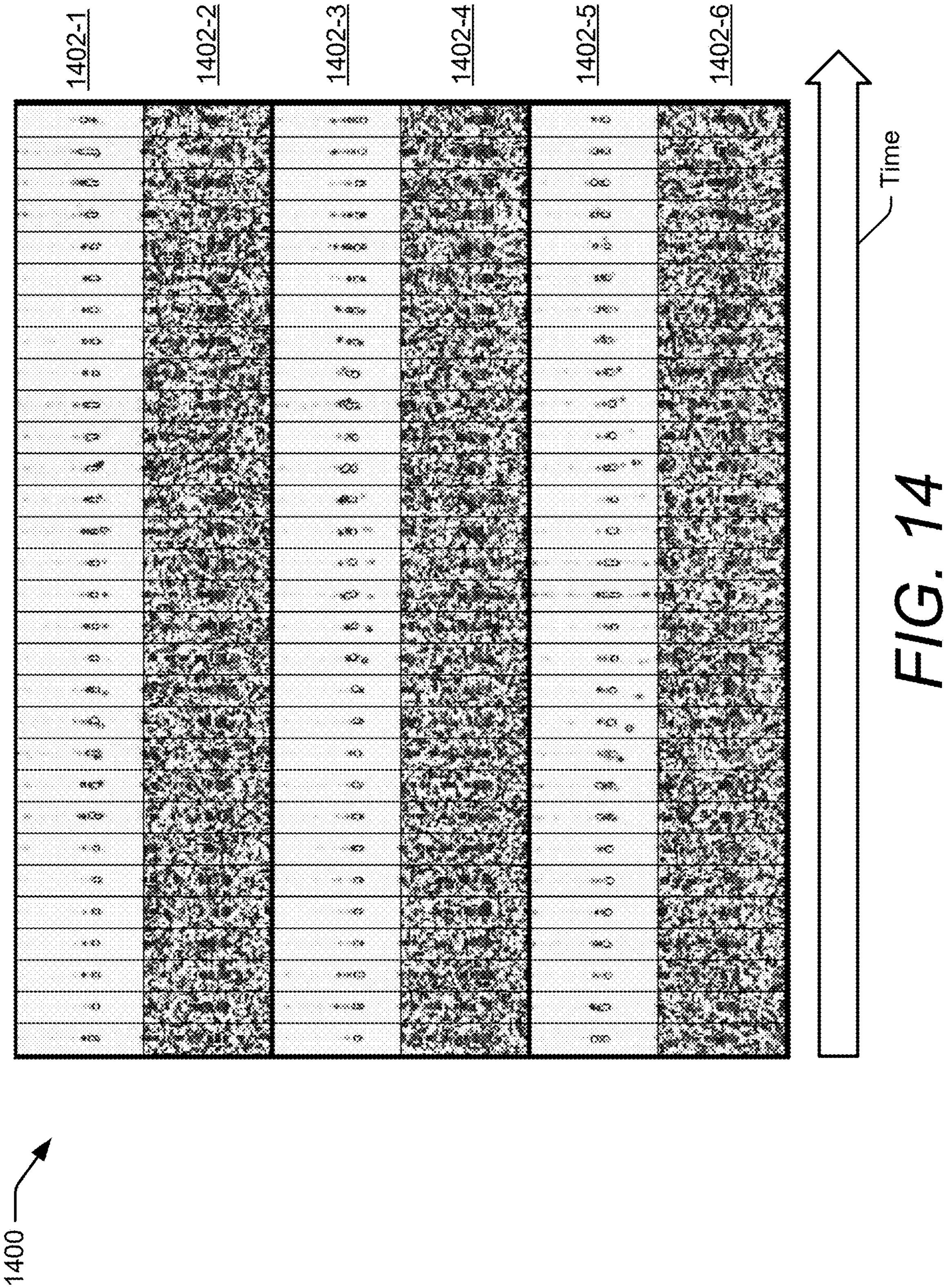
FIG. 14 illustrates experimental data of three sets of negative data that may be stored to improve the detection and recognition of gestures from background motions.

FIG. 14 illustrates experimental data 1400 of three sets of negative data that may be stored to improve the detection of gestures from background motions. The negative data is arranged similarly to the experimental data 1300 of FIG. 13 except in the following ways. Rows 1402-1, 1402-3, and 1402-5 correspond to the absolute-range Doppler maps of a user 104 moving their hands while talking near the computing device 102, a user 104 twisting their torso in front of the device, and a user 104 picking up and setting back down an object near the device, respectively. Rows 1402-2, 1402-4, and 1402-6 correspond to the interferometric-range Doppler maps associated with rows 1402-1, 1402-3, and 1402-5, respectively.

Figure 15:
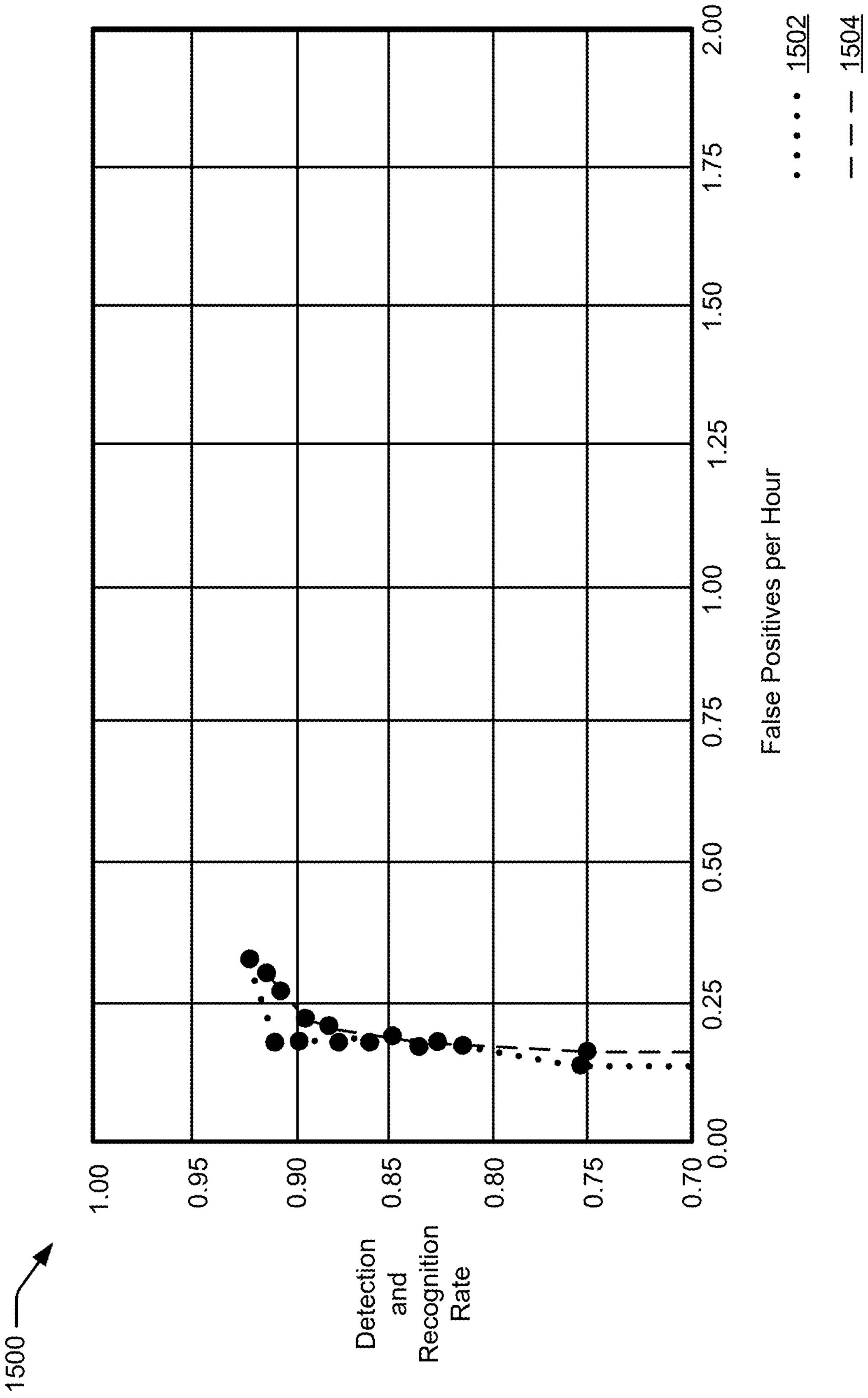
FIG. 15 illustrates experimental results regarding the accuracy of gesture recognition in the presence of background motions.

FIG. 15 illustrates experimental results 1500 regarding the accuracy of gesture detection and recognition in the presence of background motions. In this experiment, a user 104 performed a swipe gesture 1502 and a tap gesture 1504 over time while background motions (either natural motions of the user 104 or motions from other objects) occurred within the proximate region 106 of the computing device 102. Using both positive and negative data, the gesture module 224 accurately detected that a gesture was a gesture (even if not always recognizing which known gesture), in this case also recognizing the swipe gesture 1502 and tap gesture 1504 at a detection and recognition rate of approximately 0.88 while false positives per hour were made at a rate of approximately 0.10. The false positives represent instances in which the gesture module 224 incorrectly determined a background motion to be a gesture, here also recognizing the background motion as a swipe or tap gesture. The false positives per hour may be impacted by the upper and/or lower thresholds of the gesture debouncer 810 as previously described with respect to FIG. 8.

To calculate the detection and recognition rate, in general, the gesture module 224 marks motion events as either "correct" or "wrong." A correct gesture detection and recognition occur when the gesture module 224 outputs only one accurate gesture determination that is associated with a command the user 104 intended to perform (e.g., both a detection and a recognition). An incorrect gesture detection occurs when the gesture module 224 does not detect a gesture (even though a gesture was performed by the user 104), detects a gesture but determines an inaccurate one (one that does not correlate with the intended command of the user 104), or detects and determines multiple gestures for a single gesture performance. The detection and recognition rate is determined by dividing the number of correct events by the total number of events (a sum of the correct and wrong events).

Figure 16:
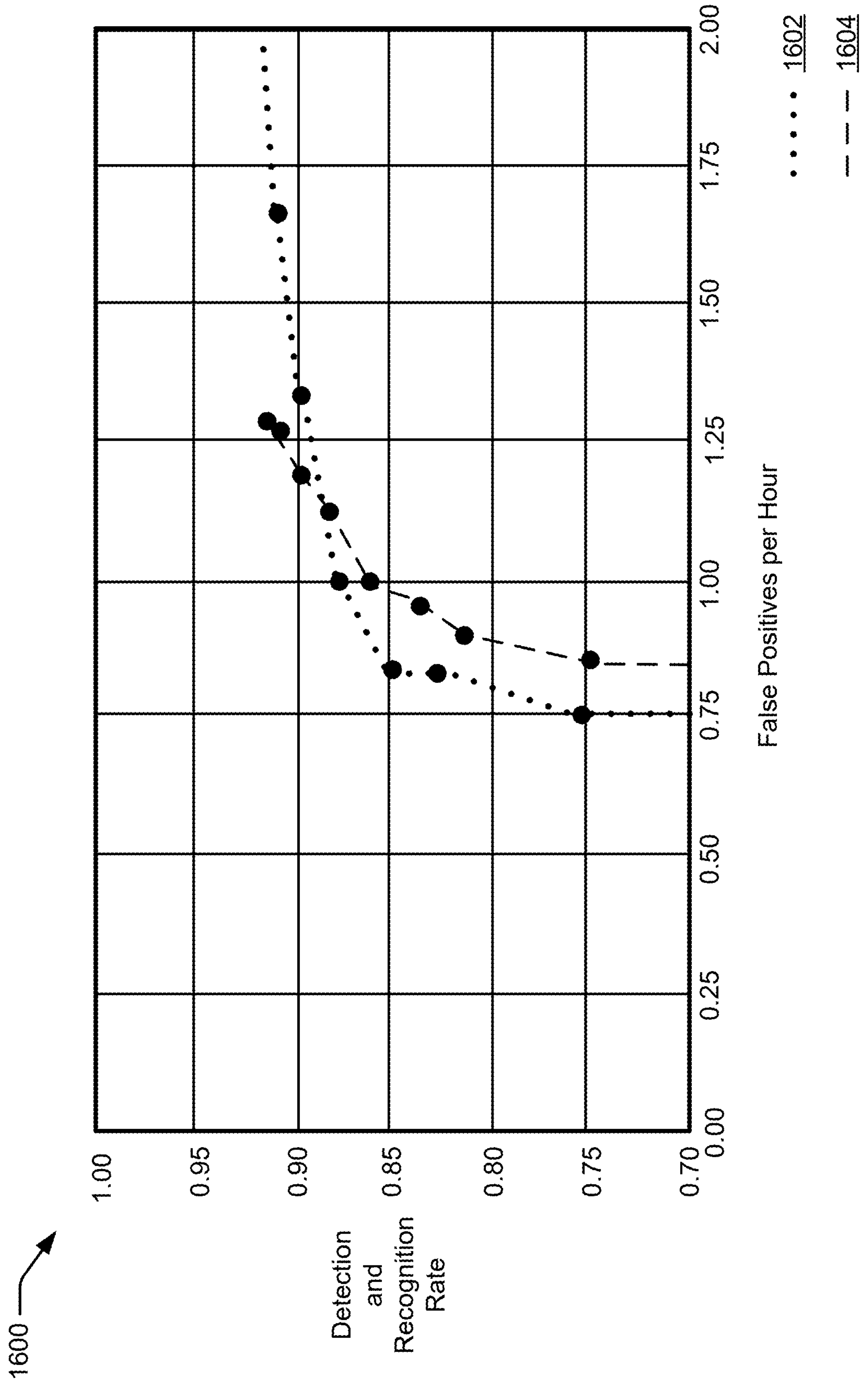
FIG. 16 illustrates experimental results regarding the accuracy of gesture detection and recognition when additionally using adversarial negative data.

FIG. 16 illustrates experimental results 1600 regarding the detection and recognition rate of gestures when additionally using adversarial negative data. In this experiment, a user 104 performed both gestures and adversarial motions similar to (but not the same as) the gestures. These adversarial motions included motions of the user 104 picking up and putting back objects near the computing device 102, interacting with the device's touchscreen, flipping switches on and off, and moving their hands while talking near the device. The experimental results 1600 indicate, relative to results 1602 that do not use adversarial negative data, robust performance of the gesture module 224, in terms of accurately recognizing gestures shown at higher rates with lower false positives and robust results (shown at robust results 1604), while adversarial motions are performed in the proximate region 106.

Unsegmented Gesture Detection and Recognition

While the computing device 102 of this disclosure may provide gesture training (e.g., segmented learning of gesture performances), the device may also improve the detection of gestures over time using unsegmented learning techniques. For segmented learning, the gesture module 224 may prompt the user 104 to perform, for instance, a tap gesture within a period of time. The computing device 102 may be able to detect this tap gesture based on "prior knowledge" that the user 104 is going to perform the tap gesture (and not another gesture) within the designated period of time. In contrast, unsegmented learning does not utilize prior knowledge in this manner. For unsegmented learning, the gesture module 224 does not necessarily know if and when the user 104 may perform any one or more gestures for the computing device 102. Furthermore, unsegmented learning may allow the computing device 102 to continually detect gestures over time without requiring the user 104 to prompt the device (e.g., provide a wake-up trigger) before a gesture is performed. Therefore, unsegmented recognition of gesture performances may be more difficult than segmented recognition.

To improve the accuracy of unsegmented recognition of gestures, the gesture module 224 may utilize one or more gesture debouncers 810 and adjust the upper and lower thresholds as needed to improve performance. Additionally, the gesture module 224 may identify gestures temporally by detecting one or more zero-crossings of the data (e.g., circular features with reference to the experimental data 1200) along a velocity axis (x-axis) over a set of two or more frames. For instance, the hand motion 1204 performed in FIG. 12 (a tap motion) resulted in a second circular feature that moved towards the left (a negative velocity) at frames 13-15, back to the center (zero velocity) at frame 16, and towards the right (a positive velocity) at frames 17-19. The zero-crossing of this motion occurred at frame 16, and the gesture module 224 may identify this frame as the center of the motion. The computing device 102 may additionally select one or more frames of data around frame 16 (e.g., frames 1-15 and frames 17-30) to form a set of data used to correlate this motion to the tap gesture.

Figure 17:
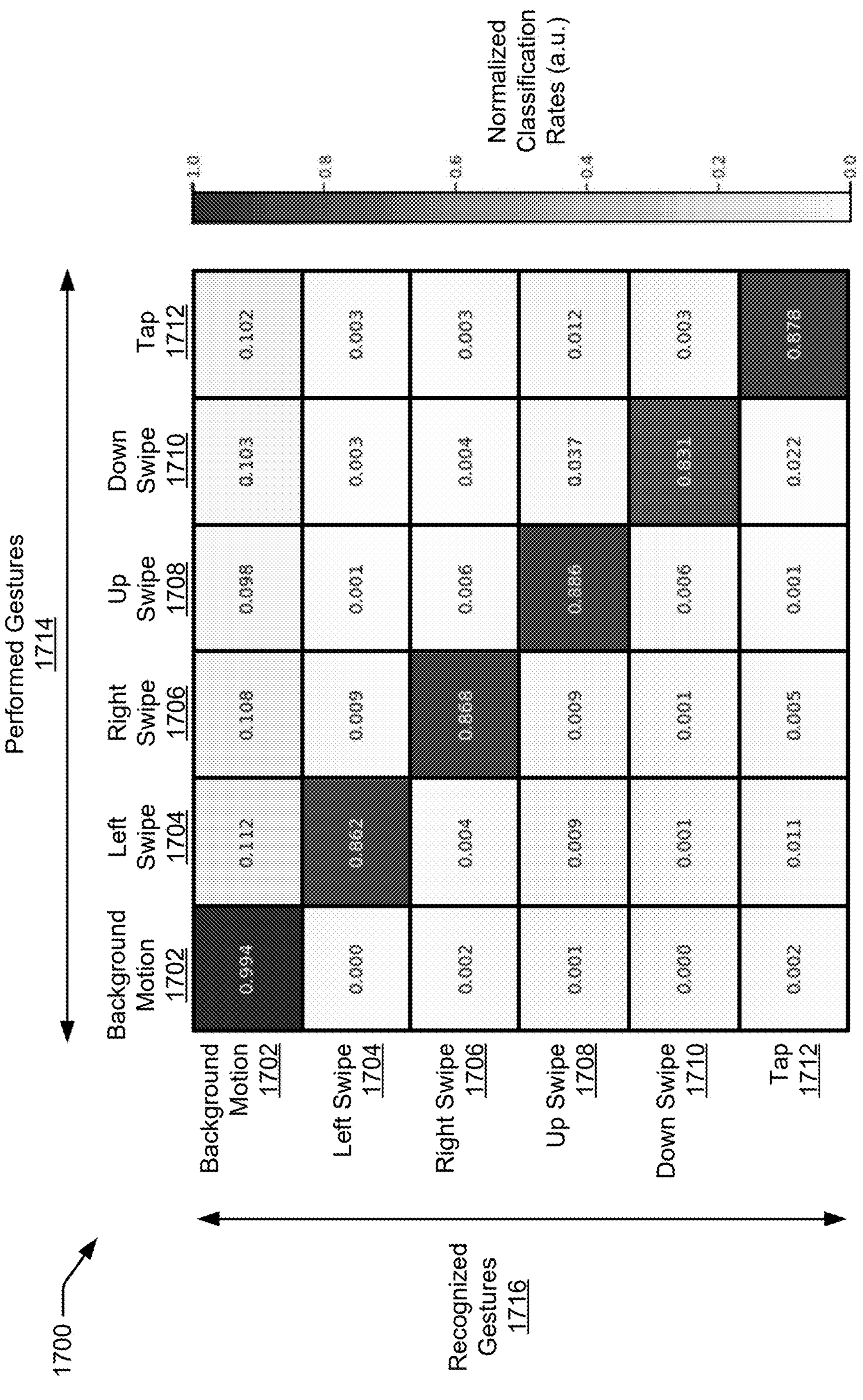
FIG. 17 illustrates experimental results (a confusion matrix) pertaining to the accuracy of gesture recognition.

FIG. 17 illustrates experimental results 1700 (a confusion matrix) pertaining to the accuracy of unsegmented gesture detection. In this experiment, a user 104 performed 6 gestures over time, which included a background motion 1702 (e.g., movements of the user 104 or objects that are not associated with gesture commands), left swipe 1704, right swipe 1706, up swipe 1708, down swipe 1710, and tap 1712.

The x-axis (performed gestures 1714) of this confusion matrix represents the intended gesture command of the user 104, and the y-axis (recognized gestures 1716) represents the classification, made by the gesture module 224, of the gesture performance. The experimental results 1700 include 36 possible results that are quantified in terms of classification rates over a period of time (normalized to one). The results indicate that the gesture module 224 was able to determine each performed gesture 1714 with an accuracy of 0.831-0.994. In this experiment, the gesture debouncer 810 utilized an upper threshold of 0.9.

Figure 18:
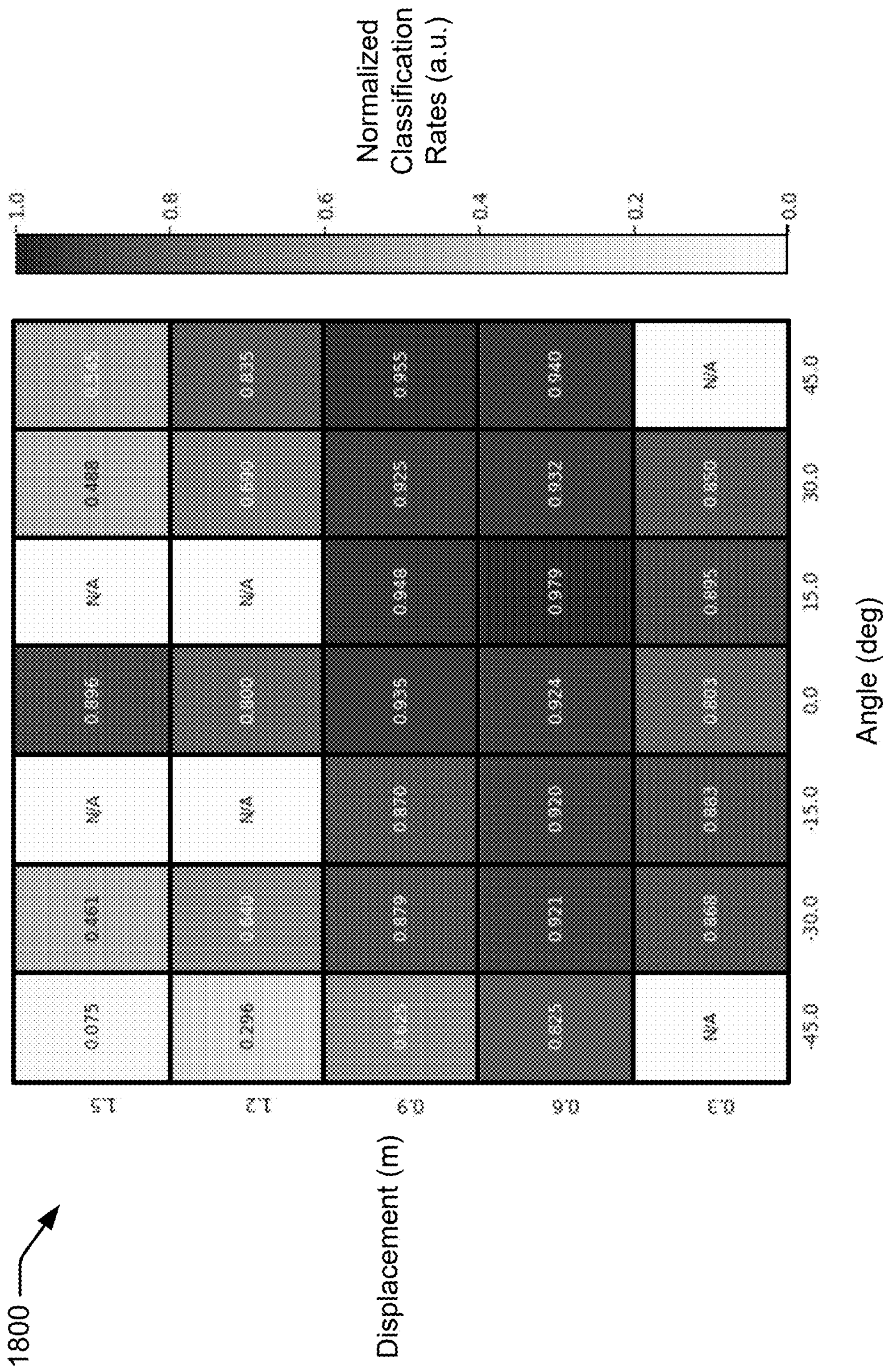
FIG. 18 illustrates experimental results corresponding to the accuracy of gesture recognition at a variety of linear and angular displacements from an antenna of the radar system.

FIG. 18 illustrates experimental results 1800 corresponding to the accuracy of unsegmented gesture detection at a variety of linear and angular displacements from the computing device 102. These results utilized a similar set of data to the experimental results 1700 of FIG. 17 and include another confusion matrix of normalized detection rates of gestures over the period of time. The matrix includes 29 results regarding the accuracy of unsegmented gesture recognition at a variety of angular displacements (ranging from −45 degrees to +45 degrees) and linear displacements (ranging from 0.3 m to 1.5 m) from the computing device 102. The data represented in FIGS. 17 and 18 represents hundreds of motions, including gestures and background motions, performed by a user 104.

Additional Sensors to Improve Fidelity of User Distinction

Figure 19:
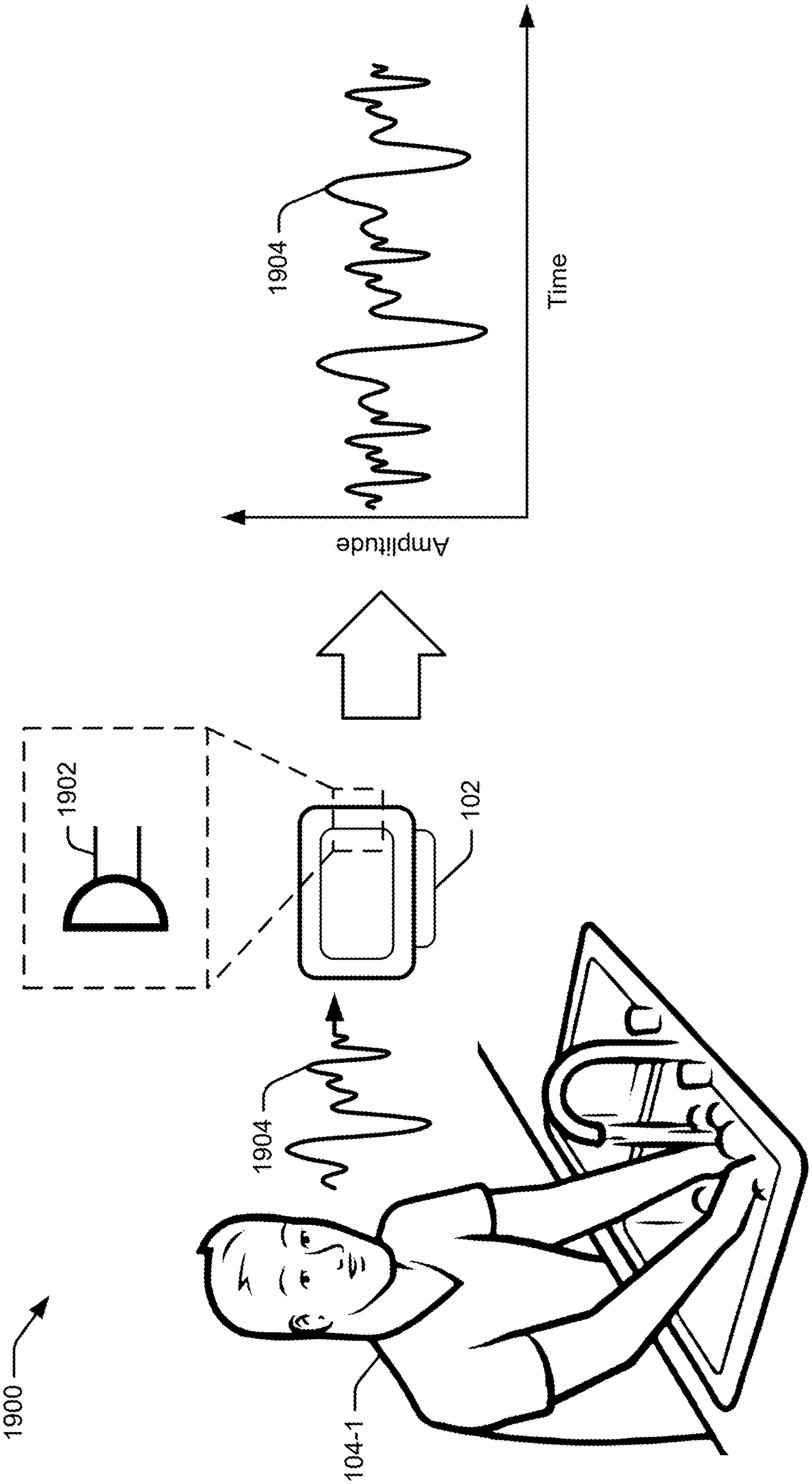
FIG. 19 illustrates an example implementation of a radar-enabled computing device that uses an additional sensor to improve fidelity of user detection and distinction.

FIG. 19 illustrates an example implementation 1900 of a computing device 102 that uses an additional sensor (e.g., a microphone 1902) to improve fidelity of user distinction and/or gesture recognition, as well as user engagement. In some situations, radar-signal characteristics associated with a nearby object (e.g., a registered user or unregistered person) or motion (e.g., gesture performance, background motion) may not provide enough information to distinguish a user 104 and/or recognize a gesture to a desired level of confidence. As depicted in example implementation 1900, the user module 222 may not be able to determine with confidence that a first user 104-1 is a registered user (e.g., the father) based only on radar-signal characteristics. In this situation, the computing device 102 may bootstrap audio signals 1904 (e.g., sound waves made by the first user 104-1) to enable the radar system 108 to determine that the father is present.

As depicted in example implementation 1900, the user module 222 may receive the audio signals 1904 through the microphone 1902 and analyze characteristics (e.g., wavelengths, amplitudes, time periods, frequencies, velocities, speeds) of these sound waves to determine which user is present in the proximate region 106. This analysis may be performed automatically when triggered or concurrently with or after the analysis of radar-signal characteristics. The audio signals 1904 may be modified by additional circuitry and/or components before being received by the user module 222.

With or without accessing private information (e.g., content of conversations), the user module 222 may analyze the audio signals 1904 to distinguish users. For instance, the radar system 108 may characterize the audio signals 1904, with or without identifying words being spoken (e.g., performing speech-to-text), to distinguish the presence of the first user 104-1, as characteristics such as a low-pitch or fast-cadence speech may be used to distinguish a particular user. The radar system 108 may characterize the audio signals 1904 in terms of pitch, loudness, tone, timbre, cadence, consonance, dissonance, patterns, and so forth. As a result, the user 104 may comfortably discuss private information near the computing device 102 without worrying about whether the device is identifying words, sentences, ideas, and so forth being spoken, depending on the settings and preferences of the user.

The computing device 102 may store audio-detected characteristics of one or more users 104 (e.g., on a shared memory) to enable distinction of a user's presence. When a registered user (e.g., the father) enters the proximate region 106 of the radar system 108, then the user module 222 may, in part, utilize stored audio-detected characteristics of the father to distinguish him from other users of the device. When an unregistered person enters the proximate region 106, then the user module 222 may, in part, utilize stored audio-detected characteristics of registered users to determine that this is an unregistered person who, for instance, has not provided audio signals 1904 to the computing device 102. The radar system 108 may then generate an unregistered user identification for this unregistered person, which includes audio-detected characteristics associated with one or more audio signals 1904 made by the unregistered person. Therefore, the radar system 108 may be able to distinguish this unregistered person at a later time using the audio-detected characteristics stored in their unregistered user identification.

While the additional sensor of example implementation 1900 is depicted as the microphone 1902, in general, the techniques described with respect to FIG. 19 may be performed using various sensors described herein. It is to be appreciated that it is not outside the scope of the present teachings, for circumstances or environments in which privacy is either not a functional concern or methods are otherwise provided to obviate privacy concerns, for the additional sensor of example implementation 1900 to be a photo camera or video camera. Furthermore, the additional sensor may be used to improve gesture detection and recognition. For example, the computing device 102 may additionally utilize data associated with an ambient light sensor to detect and recognize gestures being performed by the first user 104-1. This action may be particularly useful if, for instance, the first user 104-1 performs an ambiguous gesture that cannot be recognized to a desired level of confidence using only radar-signal characteristics. In another example, the computing device 102 may additionally utilize data from an ultrasonic sensor to improve the recognition of an ambiguous gesture performed by the first user 104-1. Thus, complementary data sensed by non-radar sensors can be used to aid in gesture recognition as well as other determinations, such as user presence, user distinction, and user engagement.

In general, an additional sensor input (e.g., audio signals 1904 from a microphone 1902) is optional, and a user 104 may be afforded privacy controls to limit the use of such additional sensors. For instance, the user 104 may modify their personal settings, general settings, default settings, and so forth to include and/or exclude an additional sensor (e.g., additional to the antenna 214 used for radar). Furthermore, the user module 222 may implement these personal settings upon distinguishing a user's presence. Privacy controls are further described with respect to FIG. 20.

Adaptive Privacy and Other Settings

Figure 20:
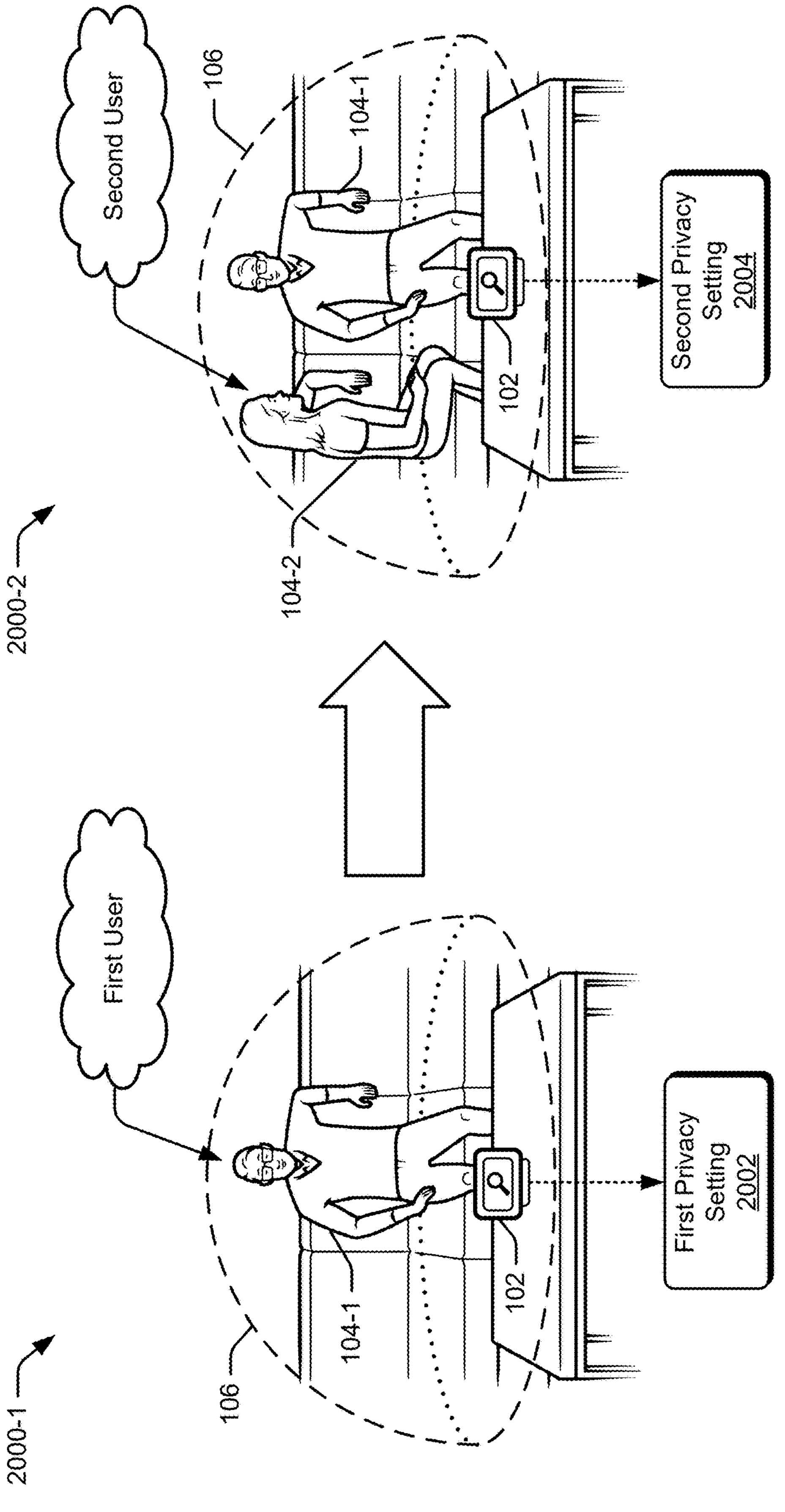
FIG. 20 illustrates an example environment in which privacy settings are modified based on user presence.

FIG. 20 illustrates example environments 2000-1 and 2000-2 in which privacy settings are modified based on user presence. In example environment 2000-1, the user module 222 of the computing device 102 detects that a first user 104-1 is present within the proximate region 106. The radar system 108 may implement a first privacy setting 2002 of the first user 104-1 responsive to detecting the presence of a user or person. This first privacy setting 2002 may include user preferences regarding, for example, allowed sensors (with reference to FIG. 19), audio reminders, calendar information, music, media, settings of household objects (e.g., light preferences), and so forth. For instance, the first user 104-1 may receive audio reminders of calendar events when the first privacy setting 2002 has been implemented.

In example environment 2000-2, the computing device 102 may later detect the presence of a second user 104-2 (e.g., another registered user) in addition to the continued presence of the first user 104-1. The radar system 108 implements a second privacy setting 2004 to adapt the privacy of the first user 104-1 based on the second user's presence. Implementation may be automatic or triggered based on a command from the first user 104-1. For instance, the second privacy setting 2004 may restrict audio reminders to prevent private information from being announced in the presence of others. The second privacy setting 2004 may be based on, for example, preset conditions, user inputs, and so forth.

The second privacy setting 2004 may also be implemented to protect the privacy of the first user's information and adapted based on users in the room. For example, the presence of another registered user (e.g., a family member) may require fewer privacy restrictions than the presence of an unregistered person (e.g., a guest). Adaptive privacy settings may also be tailored for each user 104. For instance, the first user 104-1 may have more-restrictive privacy settings (e.g., restricting audio reminders in the presence of others), while the second user 104-2 may have less restrictive privacy settings (e.g., not restricting audio reminders in the presence of others).

In addition to adaptive privacy, the techniques may also adapt other settings in a similar manner. These adaptive settings can depend, like the above adaptive privacy, on the presence of other users, such as those (e.g., second user 104-2) in proximity to a user (e.g., first user 104-1) that is interacting or has interacted with the computing device 102. Adaptive settings may be applied to operations in progress, such as in a case where the first user 104-1 commands that music play on a stereo. If the second user 104-2 is distinguished, or if the second user 104-2 speaks to the first user 104-1 (or vice versa), the techniques may turn down the music without explicit user interaction by the first user 104-1 (e.g., a gesture to turn down the music). Adaptive settings may also be applied to operations in progress. In an example, a first user 104-1 (e.g., a father) may start an oven and set a timer for 20 minutes. If a second user 104-2 (e.g., a child) attempts to turn the oven or the timer off before the timer has expired, then the techniques of this disclosure may prevent the child from doing so. This adaptation allows the father to control operations of the oven and timer during those 20 minutes to prevent disruptions to their baking. In particular, the computing device 102 may associate operations in progress with a user 104 who performed a command to prevent another user from modifying the operation. In another example, a mother may perform a command to turn off bedroom lights at 9:00 pm to ensure her child goes to sleep on time. If a child performs a command to keep the lights on past their bedtime, the computing device 102 may prevent the child from modifying the command of the mother.

Example Implementation of a Computing System

Figure 21:
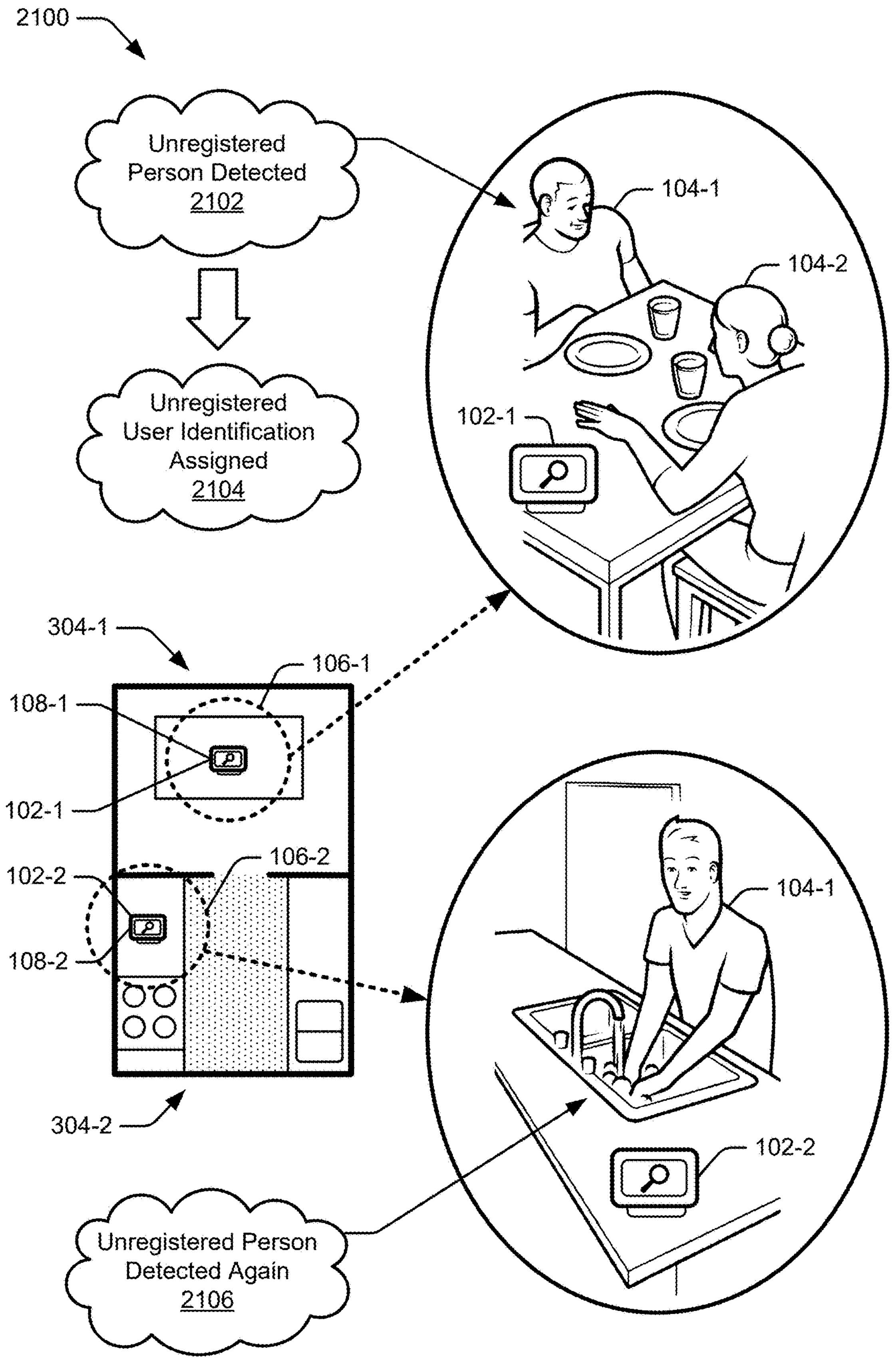
FIG. 21 illustrates an example environment in which the techniques of user distinction may be implemented using multiple computing devices that form a computing system.

FIG. 21 illustrates an example environment 2100 in which the techniques of user distinction (e.g., described with respect to FIGS. 1 and 20) may be implemented using multiple computing devices 102-1 and 102-2 that form a computing system. In example environment 2100, an example home is depicted with a first room 304-1 and a second room 304-2. A first computing device 102-1, equipped with a first radar system 108-1, is located in the first room 304-1, while a second computing device 102-2, equipped with a second radar system 108-2, is located in the second room 304-2. The first and second computing devices 102-1 and 102-2 are capable of exchanging information (e.g., stored to a local or shared memory) by means of a communication network 302 and form, in part, a computing system. For purposes of this illustrative example, a first proximate region 106-1 does not overlap with a second proximate region 106-2.

The first computing device 102-1 of example environment 2100 may use the first radar system 108-1 to send a first radar-transmit signal 402-1 (see FIG. 4, supra) to detect the presence of one or more users. The first radar-transmit signal 402-1 may reflect off an object (e.g., a first user 104-1) and become modified in amplitude, phase, or frequency before being received at the first computing device 102-1. The first radar system 108-1 may compare this first radar-receive signal 404-1 (see FIG. 4, supra) (containing at least one radar-signal characteristic) to one or more stored radar-signal characteristics of registered users to determine whether the first user 104-1 is a registered user or an unregistered person. In this example, the first radar-receive signal 404-1 is not correlated with one or more stored radar-signal characteristics of a registered user. Therefore, the first user 104-1 is distinguished as an unregistered person at 2102.

After determining at 2102 that the first user 104-1 is an unregistered person, the first computing device 102-1 generates and assigns an unregistered user identification (e.g., mock identity, pseudo identity) to the unregistered person, as illustrated at 2104. The unregistered user identification may include one or more radar-signal characteristics associated with the first radar-receive signal 404-1 that may be used to distinguish the unregistered person from other users (e.g., a second user 104-2) at a future time. The unregistered user identification may be stored on a local or shared memory, and each computing device of the computing system (e.g., the second computing device 102-2) may access the unregistered user identification even if the device has not directly detected the unregistered person. For instance, the second computing device 102-2 may access the stored first radar-signal characteristic associated with the unregistered user identification even though the unregistered person has never been detected by the second computing device 102-2.

At the future time, the first user 104-1 walks into the second room 304-2 and is detected by the second computing device 102-2 at 2106. In particular, the second radar system 108-2 of the second computing device 102-2 sends a second radar-transmit signal 402-2 to detect the presence of one or more users. The second radar-transmit signal 402-2 is reflected off an object (e.g., the first user 104-1) and becomes modified in amplitude, phase, or frequency before being received at the second computing device 102-2. The second radar system 108-2 compares this second radar-receive signal 404-2 (containing at least one radar-signal characteristic) to the one or more stored radar-signal characteristics of registered users and the unregistered user identification assigned to the unregistered person to determine whether the object is a registered user or the unregistered person. In this example, the at least one radar-signal characteristic of the second radar-receive signal 404-2 is correlated with one or more stored radar-signal characteristics of the unregistered person. Therefore, the first user 104-1 is distinguished again (at 2106) as the unregistered person based on the unregistered user identification. The second radar-signal characteristic may be stored and associated with the unregistered user identification.

While not depicted in FIG. 21, the same techniques may be applied to distinguishing a registered user. For example, the first computing device 102-1 may transmit a third radar-transmit signal 402-3 to distinguish one or more additional users. The third radar-transmit signal 402-3 may reflect off another object (e.g., the second user 104-2 who is distinct from the previously detected unregistered person) and become modified before being received at the first computing device 102-1. The first radar system 108-1 may compare this third radar-receive signal 404-3 (containing at least one radar-signal characteristic) to the one or more stored radar-signal characteristics of registered users and the unregistered user identification. In this example, the at least one radar-signal characteristic of the third radar-receive signal 404-3 is correlated with one or more stored radar-signal characteristics of a registered user. Therefore, the second user 104-2 may be distinguished as a registered user. The third radar-signal characteristic may be stored to improve distinction of the registered user at a later time. The first radar system 108-1 may additionally access stored settings, preferences, training histories, habits, and so forth of the registered user to provide a tailored experience.

In this example, the second user 104-2 (the registered user) may later move to the second room 304-2 and enter the second proximate region 106-2. The second radar system 108-2 of the second computing device 102-2 may transmit a fourth radar-transmit signal 402-4 to distinguish the registered user. The fourth radar-transmit signal 402-4 reflects off the registered user and becomes modified before being received at the second computing device 102-2. The second radar system 108-2 compares this fourth radar-receive signal 404-4 (containing at least one radar-signal characteristic) to the one or more stored radar-signal characteristics of the registered user to distinguish the registered user. In this example, the second computing device 102-2 accesses the one or more stored characteristics from a local memory of the first computing device 102-1 and/or a shared memory. Here, the at least one radar-signal characteristic correlates with one or more stored radar-signal characteristics of the registered user, and the second radar system 108-2 determines the registered user is present within the second proximate region 106-2 of the second computing device 102-2. Applications of the computing devices 102 as part of a computing system are further described with respect to FIG. 22.

Continuity of Operations Across a Computing System

Figure 22:
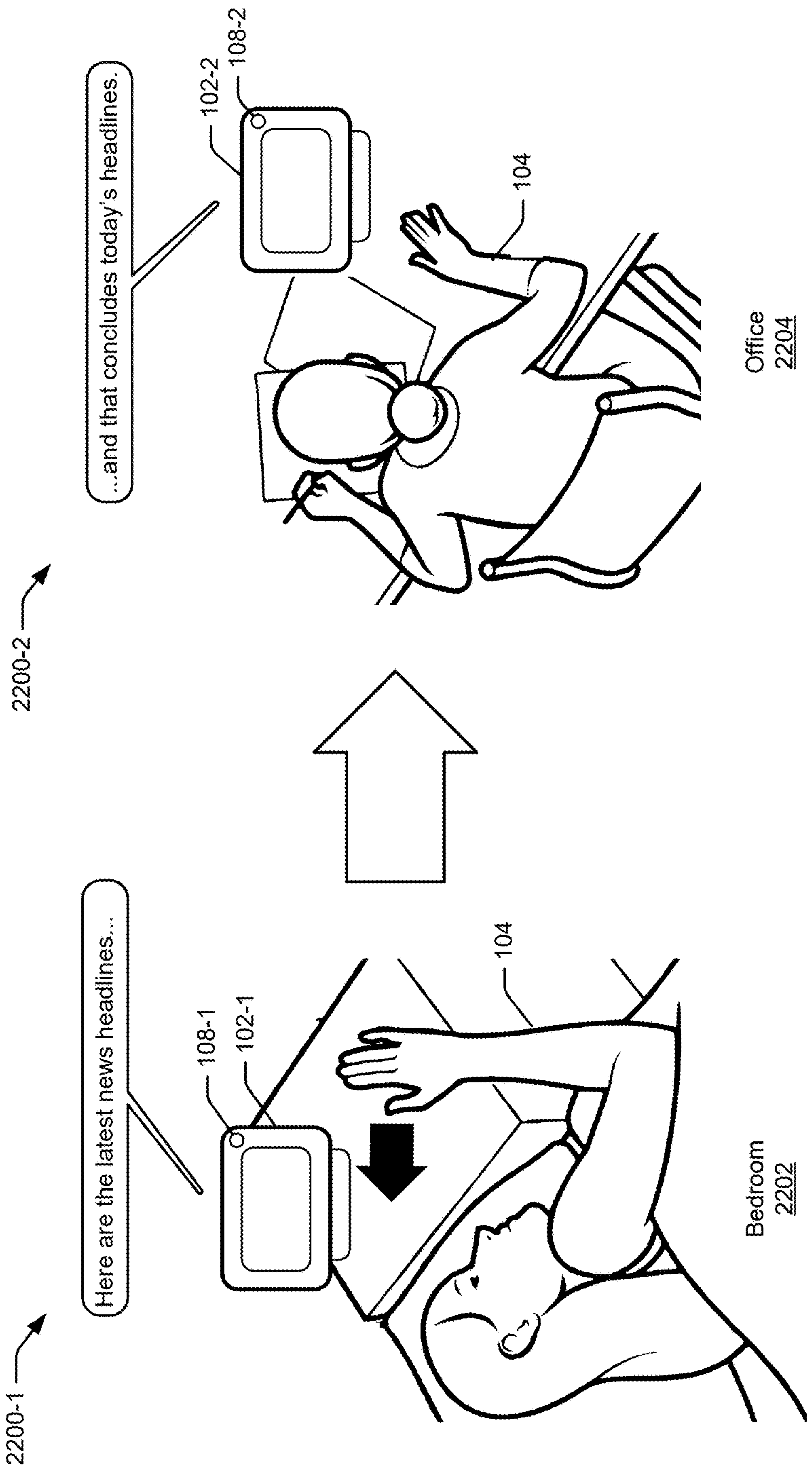
FIG. 22 illustrates an example environment in which an operation is performed continually across multiple computing devices of a computing system.

FIG. 22 illustrates an example environment 2200 in which an operation is performed continually across multiple computing devices 102-1 and 102-2 of a computing system. A first computing device 102-1 is depicted as being located in a bedroom 2202, which is separate from an office 2204 where a second computing device 102-2 is located. The first computing device 102-1 and the second computing device 102-2 are part of a computing system of two or more devices (e.g., those described with respect to FIGS. 3 and 21).

At a first time, in an example environment 2200-1, a user 104 performs a swipe gesture to command the first computing device 102-1 to read the latest news headlines out loud. The user 104 may listen to the news while in the bedroom 2202, and a first radar system 108-1 may instruct the first computing device 102-1 to continue playing the news while the presence of the user 104 is detected.

At a second time, in an example environment 2200-2, the user 104 moves from the bedroom 2202 to the office 2204 and the news continues playing on the second computing device 102-2. In particular, the first radar system 108-1 may detect a lack of the user's presence within a first proximate region 106-1 of the bedroom 2202 and pause the news. Once the user 104 moves into the office 2204, the second computing device 102-2 may detect and distinguish this user's presence within, for instance, a second proximate region 106-2. Then, a second radar system 108-2 may automatically (e.g., without user input) continue playing the news previously paused by the first radar system 108-1. In this way, the user 104 may enjoy a seamless experience that is automized across multiple rooms of a home.

Operations in progress may follow the user 104 who performed the gesture. For instance, if the user 104 of example environment 2200-1 leaves the bedroom 2202, then the first computing device 102-1 may detect an absence of this user 104 (e.g., rather than another user) and pause the news. When the user 104 is later detected and distinguished by the second computing device 102-2 in the office 2204, then the news may continue to be read aloud. In addition to the user 104 of example environment 2200-1, there may still be one or more other users in the bedroom 2202 that have been detected by the first computing device 102-1. The first radar system 108-1 may determine that these other users are not the user 104 that performed the gesture command, thereby deducing that the news should follow the user 104 who performed the gesture. Alternatively, the news may follow the user 104 who performed the gesture in addition to being played in the bedroom 2202 when other users are present.

Each radar system 108-1 and 108-2 may adjust operations in progress based on the location of the user 104. For instance, if the user 104 is lying close to the first computing device 102-1 (as depicted in example environment 2200-1), then the first radar system 108-1 may detect this shorter distance and lower a speaker volume. Alternatively, if the user 104 moves to a far side of the bedroom 2202 (e.g., further away from the first computing device 102-1), then the first radar system 108-1 may detect this larger distance and increase the speaker volume.

In another example (not depicted in FIG. 22), a user 104 performs gestures associated with a two-part command to (1) start playing news headlines out loud and (2) stop playing the news headlines. In a first room equipped with a first computing device 102-1, the user 104 performs a first gesture associated with a first portion of the command (to start playing the news). The user 104 then moves to a second room equipped with a second computing device 102-2 and continues listening to the news in this room (following discussions of FIG. 22). At a later time, the user 104 performs a second gesture associated with a second portion of the command (to end playing the news). In this example, the first and second computing devices 102-1 and 102-2 utilized a communication network 302 to coordinate a two-part command across multiple rooms of a home. The same techniques may also be applied to a first and/or second portion of an audio input sensed by a microphone of the first or second computing device 102-1 or 102-2.

In an additional example (not depicted in FIG. 22), a user 104 may perform a gesture associated with a single command that is detected by both the first and second computing devices 102-1 and 102-2 (with reference to discussions regarding FIG. 4). In this example, the user may be providing a detailed command while moving between two rooms. The user 104 begins explaining their single command (to schedule an appointment with their doctor) in the first room (equipped with the first computing device 102-1), and the first radar system 108-1 recognizes a first portion of the command. The user 104, however, moves to the second room (to get their medical records) and continues scheduling their appointment by providing a second portion of the command to the second computing device 102-2. In this example, the first and second computing devices 102-1 and 102-2 utilized the communication network 302 again to coordinate a single command across multiple rooms of a home. The same techniques may also be applied to a first and/or second portion of an audio input sensed by a microphone of the first or second computing device 102-1 or 102-2.

In an additional example (not depicted in FIG. 22), a user 104 may perform a pausable (capable of being paused and then continued) sustained radar-detected gesture that can be successively detected by both the first and second computing devices 102-1 and 102-2 for an advantageous effect of continuing an intermittently sustainable activity between rooms. An example of a pausable sustained gesture can be a voice listing gesture, wherein the user can start moving their hand in a rolling circular motion within a generally vertical plane that passes through themself and the device (hereinafter "rolling their hand"-intuitively, one can envision an analogy to a "keep the film rolling" gesture made by a film director to a cameraman). In one example, in the first room (equipped with the first computing device 102-1 having the first radar system 108-1), the user begins rolling their hand and, while rolling their hand continually, says, "This is my shopping list: milk, eggs, butter . . . " and the device 102-1 will recognize that gesture using the first radar system 108-1 and cause those named items to be associated with that user's shopping list for as long as the user keeps rolling their hand. If the user stops rolling their hand, the list-making is suspended even if the user continues talking. (This suspension can happen, for example, if the user gets interrupted and needs to speak to another person on a subject unrelated to their shopping list.) If the user then resumes rolling their hand, the list making is resumed and things they speak will resume being added to the shopping list. (The user can terminate the list making any time by a "push-pull" gesture and/or a suitable voice command.) If, during their (non-terminated) list-making process in the first room, the user stops rolling their hand and then walks into the second room, then the user can resume rolling their hand in the second room and resume speaking their shopping list items, the second device 102-2 having the second radar system 108-2 will recognize that gesture, the addition of spoken items to the shopping list will resume for as long as the user keeps rolling their hand, and so on.

Figure 23:
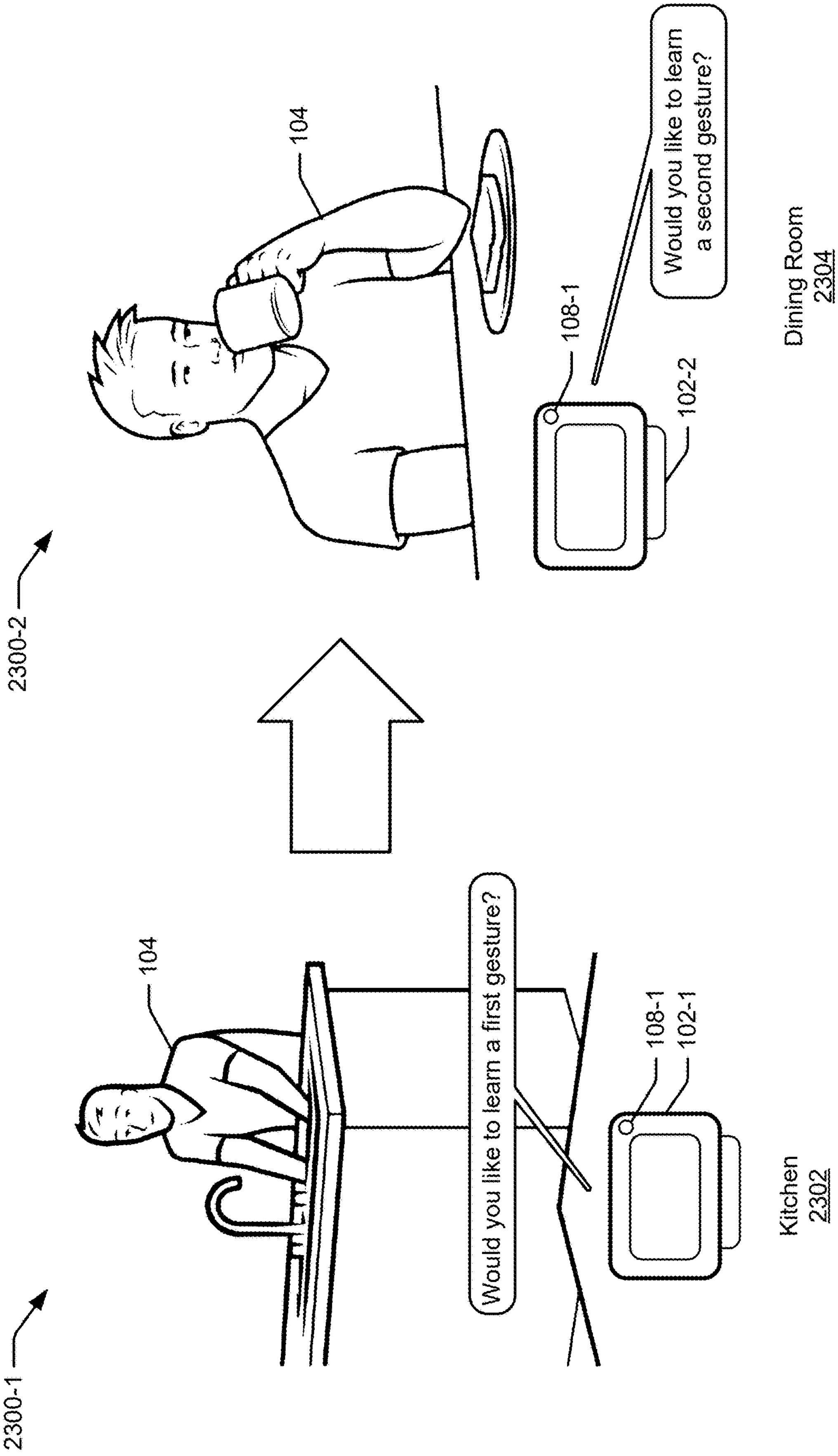
FIG. 23 illustrates an example environment in which a computing system enables a continuity of operations across multiple computing devices.

The techniques described with respect to FIG. 22 are not limited to in-progress operations and may be applied to operations that are performed periodically over time, as further described with respect to FIG. 23.

FIG. 23 illustrates an example environment 2300 in which a computing system enables a continuity of operations across multiple computing devices 102-1 and 102-2. In an example environment 2300-1, a user 104 is detected by a first computing device 102-1 of a computing system that is located in a kitchen 2302. A first radar system 108-1 determines that the user 104 is an unregistered person and assigns them an unregistered user identification, thereby distinguishing the user 104 from other users. In this example, the first computing device 102-1 prompts the unregistered person to begin gesture training on a first gesture. During training, radar-signal characteristics associated with a way in which the unregistered person performs the first gesture are stored and associated with the unregistered user identification. This unregistered user identification may be stored on a memory and/or accessed by any one or more devices (e.g., a second computing device 102-2) of the computing system.

At a later time, depicted in an example environment 2300-2, the user's presence is detected in a dining room 2304 by the second computing device 102-2 that is part of the computing system. A second radar system 108-2 distinguishes the user 104 as the unregistered person based on radar-signal characteristics and, using the unregistered user identification, accesses this user's training history. The second computing device 102-2 may then prompt the user 104 to continue training on a second gesture. In particular, the second radar system 108-2 may determine that they have already completed training on the first gesture. This sequence may continue (though not depicted in FIG. 23) over time using various computing devices 102 of the computing system until the unregistered person has completed their gesture training.

A user 104, however, may perform gestures differently for some computing devices 102 of the computing system based on that user's behavior or body position in a room. When a user 104 performs a gesture in a manner that is different from, for instance, a way in which the gesture is taught during training, a computing device 102 may determine that an ambiguous gesture has been performed. This ambiguous gesture may be similar to one or more gestures that are recognizable by the device but may lack enough similarity to a single known gesture to allow a high-confidence recognition. Therefore, each computing device 102 may utilize contextual information to improve the interpretation of ambiguous gestures, as further described with respect to FIG. 24.

Example of Ambiguous Gesture Interpretation

Figure 24:
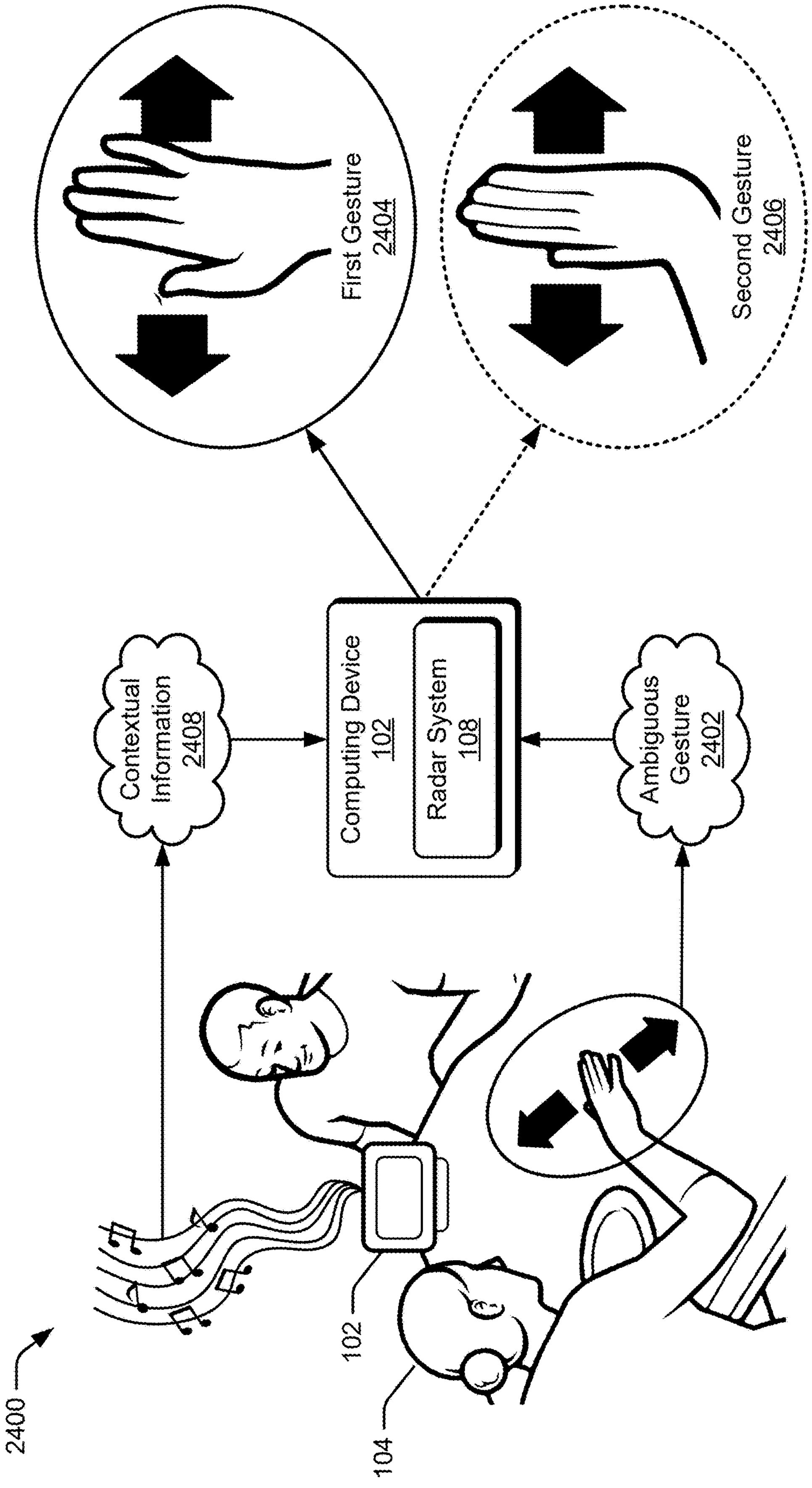
FIG. 24 illustrates techniques of radar-based ambiguous gesture determination using contextual information.

FIG. 24 illustrates the techniques of radar-based ambiguous gesture determination using contextual information. An example environment 2400 depicts a user 104 performing an ambiguous gesture 2402 that is detected by a radar system 108 of a computing device 102. Assume here that the user 104 intended to perform a first gesture 2404 that is recognizable by the device and associated with a first command to turn down the volume of music being played from the computing device 102. The user 104, however, accidentally performed an ambiguous gesture 2402 that is similar to both the first gesture 2404 and a second gesture 2406 (associated with a second command to open a garage door) but cannot be recognized to a desired level of confidence. Therefore, the radar system 108 is unable to determine that the ambiguous gesture 2402 is the first gesture 2404 and not the second gesture 2406.

In particular, the ambiguous gesture 2402 may correlate to the first and second gestures 2404 and 2406 by an amount that is greater than a no-confidence level but less than a high-confidence level. For instance, the correlation to each gesture may have a confidence of 40% (e.g., the ambiguous gesture 2402 is 40% likely to be the first gesture 2404 and 40% likely to be the second gesture 2406). If the no-confidence level is set to 10% and the high-confidence level is set to 80%, then the correlation of the ambiguous gesture 2402 to the first or second gesture 2404 or 2406 is above the no-confidence level and below the high-confidence level. In general, the no-confidence and high-confidence levels may be modified or adapted to improve the quality of gesture detection. In this disclosure, a "desired level of confidence" will refer collectively to these no-confidence and high-confidence levels, which may be distinct or similar for each use case (e.g., each gesture, each user, destructiveness of the gesture).

To avoid prompting the user 104 to repeat a performance of the gesture until success, the radar system 108 uses contextual information 2408 to improve the interpretation of the ambiguous gesture 2402. In this example, the radar system 108 determines that the contextual information 2408 includes music being played on the computing device 102 at a current time. In general, contextual information may include operations in progress, past or planned operations, foreground or background operations, a location of the device, a history of common users or gestures, applications running, conditions external to the computing device 102, and so forth. External conditions may include, for instance, a time of day, lighting, audio within a proximate region 106, and so forth.

The computing device 102 may determine that the ambiguous gesture 2402 is most likely the first gesture 2404 based on the contextual information 2408. In this example, the radar system 108 correlates the music being played on the device at the current time with the first command of the first gesture 2404. Since the second command to open the garage door is not related to the music being played on the device, the radar system 108 determines that the first gesture 2404 is more likely the intended gesture of the user 104. This determination may be performed using formal logic, informal logic, mathematical logic, hysteresis logic, deductive reasoning, inductive reasoning, abductive reasoning, and so forth. The determination may also be performed using a machine-learned model, such as the machine-learned model 700 (with reference to FIG. 7) and/or the space-time machine-learned model 802 (with reference to FIG. 8).

In an example, the radar system 108 utilizes inductive reasoning to determine general associations by which the radar system 108 can deduce that the ambiguous gesture 2402 is the first gesture 2404. In doing so, the radar system 108 may proceed according to the following arguments:

(1) The ambiguous gesture 2402 is either the first gesture 2404 or the second gesture 2406.
(2) The first gesture 2404 is associated with the first command to turn down the music volume.
(3) The second gesture 2406 is associated with the second command to open the garage door.
(4) Music is being played at the current time (the contextual information 2408).
(5) The first command is related to the music being played at the current time.
(6) The second command is not related to the music being played at the current time.
(7) Ambiguous gestures are generally associated with operations being performed at a current time.

Therefore, the ambiguous gesture 2402 is most likely the first gesture 2404.

In detecting an ambiguous gesture 2402, a radar system 108 may determine that the ambiguous gesture 2402 does not correlate with a known gesture (e.g., one or more stored radar-signal characteristics) to a desired level of confidence. The desired level of confidence may be a quantitative or qualitative assessment of the confidence (e.g., accuracy) required to recognize a gesture correctly or another like symbolic, vector-based, or matrix-based threshold criterion or combinations of threshold criteria.

In example environment 2400, the radar-signal characteristics of the ambiguous gesture 2402 are 40% likely to correlate with stored radar-signal characteristics of the first gesture 2404, 40% likely to correlate with stored radar-signal characteristics of the second gesture 2406, and 20% likely to correlate with stored radar-signal characteristics of a third gesture. If the desired level of confidence is set at 50%, then the radar system 108 may not be able to accurately determine which known gesture is correlated with the ambiguous gesture 2402 to that desired level of confidence. The radar system 108, however, may determine that the first gesture 2404 and second gesture 2406 are more likely related to the ambiguous gesture 2402 than the third gesture. In particular, the radar system 108 may consider gestures that exceed a minimum level of confidence (e.g., threshold) of 35% or more. Since the third gesture is only 20% likely to be the ambiguous gesture 2402, the radar system 108 may eliminate this possibility. The radar system 108 may, instead, determine that the first gesture 2404 and the second gesture 2406 both have a likelihood of 40% that exceeds the minimum level of confidence.

To recognize the ambiguous gesture 2402 as either the first gesture 2404 (e.g., a known gesture) or the second gesture 2406 (e.g., another known gesture), the radar system 108 may utilize the contextual information 2408. In particular, the radar system 108 may determine whether the first command of the first gesture 2404 or the second command of the second gesture 2406 are associated with the contextual information 2408. The association may be quantified or qualified based on a strict yes/no association (e.g., binary), a varying scale of association, a logic or reasoning, a machine-learned model (700, 802), and so forth. For instance, the radar system 108 may determine that the first command to turn down the music volume is associated with the contextual information 2408 of music being played at the current time. The radar system 108 may, on the other hand, also determine that the second command of opening the garage door is not associated with the music being played. Based on this determination, the radar system 108 may determine that the ambiguous gesture 2402 is the first gesture 2404.

In some situations, the radar system 108 may not be able to accurately recognize the ambiguous gesture 2402 using contextual information. If the first command of the first gesture 2404, instead, is associated with starting a timer, then the radar system 108 may determine that both the first command and the second command are not associated with the music being played at the current time. In lieu of additional information, the radar system 108 may determine that neither the first command nor the second command should be performed by the computing device 102. Additionally, the computing device 102 may prompt the user 104 to repeat the gesture and/or provide additional input (e.g., a voice command).

Radar-Enabled Gesture Recognition

Figure 25:
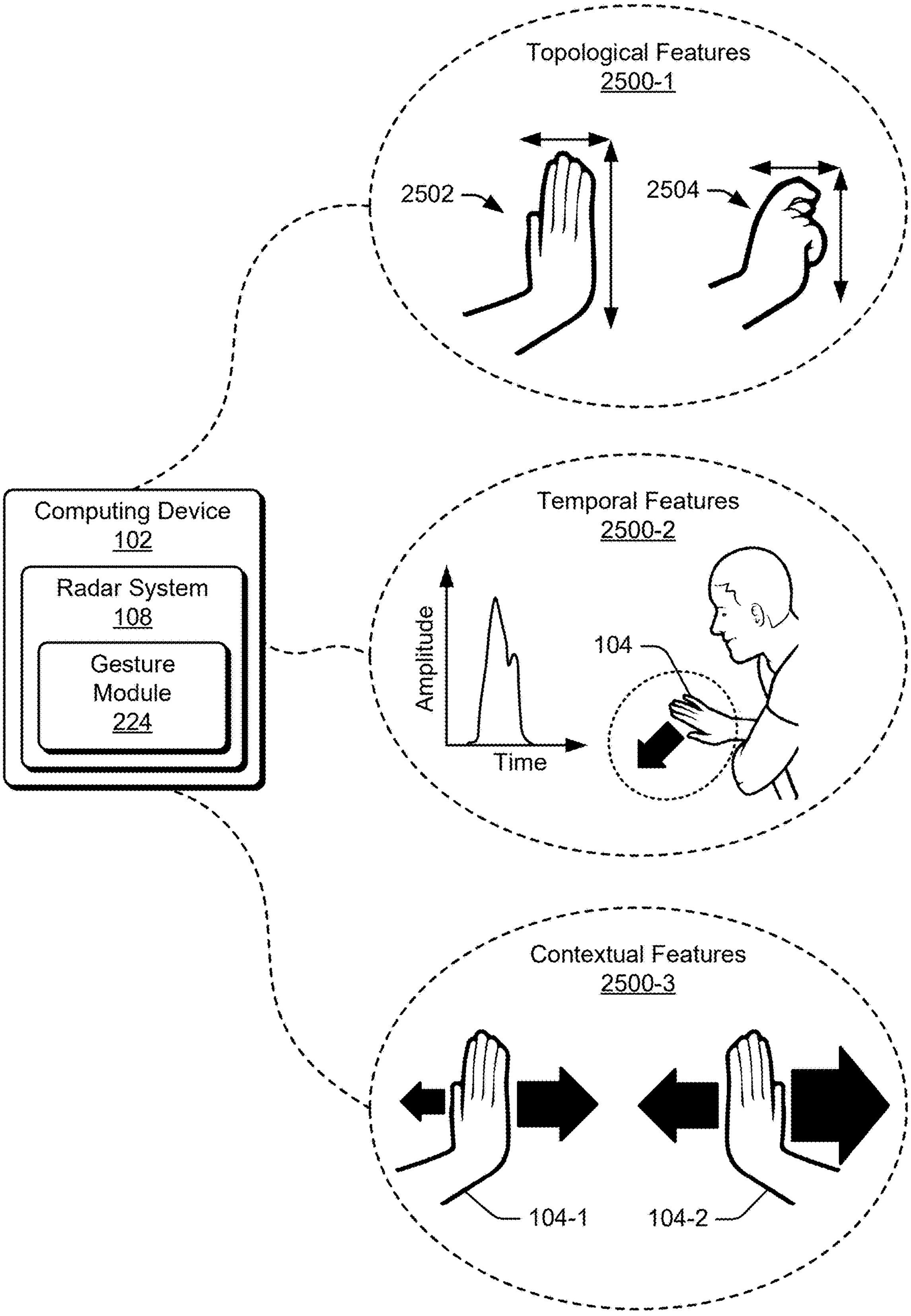
FIG. 25 illustrates example implementations in which the gesture module may recognize gestures performed by a user.

FIG. 25 illustrates example implementations 2500-1 to 2500-3 in which the gesture module 224 may recognize gestures performed by a user 104. To recognize gestures, the gesture module 224 of the radar system 108 may analyze radar-receive signals 404 to determine (1) topological features, (2) temporal features, and/or (3) contextual features. Each of these features may be associated with one or more radar-signal characteristics detected by a computing device 102. The computing device 102 is not limited to the three categories of features depicted in FIG. 25 and may include other radar-signal characteristics and/or categories not shown. Furthermore, the three categories of features are shown as example categories and may be combined and/or modified to include subcategories that enable the techniques described herein. Techniques discussed with reference to FIGS. 7-18 may additionally be included and are not mutually exclusive from the techniques presented in FIG. 25. The gesture-recognition discussions of FIG. 25 are similar to the user-distinction discussions of FIG. 6 except in their application to gesture performance.

In example implementation 2500-1, the gesture module 224 may use, in part, topological information to recognize gestures. Similar to the teachings supra regarding example implementation 600-1 of FIG. 6, topological features may include RCS data associated with a height, shape, orientation, distance, material, size, or so forth of a user 104. For example, the user 104 may perform a wave gesture 2502 by forming a straight, flat hand but perform a pinch gesture 2504 by pinching together (e.g., making contact between) their thumb and pointer finger. The topological features associated with the wave gesture 2502 may include a larger surface area, an orthogonal orientation, a flatter surface, and so forth when compared to those associated with the pinch gesture 2504. The topological features associated with the pinch gesture 2504, on the other hand, may include a smaller surface area, a less uniform (e.g., less flat) surface, a greater depth of the hand's position, and so forth as compared to those associated with the wave gesture 2502.

In example implementation 2500-2, the gesture module 224 may use, in part, temporal information to recognize gestures with reference to example implementation 600-2. The radar system 108 may recognize a gesture by receiving and analyzing, for instance, a motion signature (e.g., a distinct way in which the user 104 moves when performing a gesture). In an example, a user 104 performs a swipe gesture to turn a page of a book they are reading. The radar system 108 detects one or more radar-signal characteristics (e.g., a temporal profile, as depicted) of the swipe gesture and compares them to one or more stored radar-signal characteristics. A temporal profile may include an amplitude of one or more radar-receive signals 404 as detected over time using the analog circuit 216 of FIG. 5. The temporal profile of the swipe gesture may have distinct characteristics from, for instance, a wave gesture or a pinch gesture. The wave gesture may include two complementary motions (e.g., resulting in two amplitude peaks), while the swipe gesture may include one motion (e.g., resulting in one amplitude peak). The pinch gesture may be performed slower than the swipe gesture over time, resulting in a broader amplitude peak of the radar-receive signal 404.

In example implementation 2500-3, the gesture module 224 may also use contextual information to recognize gestures with reference to example implementations 600-3 and 600-4 of FIG. 6, supra. Contextual information is not limited to the example depicted in FIG. 25, and a variety of other examples are described with reference to FIGS. 24-32. In this disclosure, "contextual information" refers to information that adds context (e.g., additional details) to signals received by the radar system 108. Contextual information may include user presence, user habits, a location of the computing device 102, a history of commonly performed gestures and/or detected users, common activities of a room, in-progress operations on one or more computing devices 102, past and planned operations, foreground and background operations, and so forth.

Example implementation 2500-3 depicts how user presence may provide additional context to recognize gestures. The computing device 102 may be configured to recognize a push-pull gesture that involves the user 104 pushing their hand to an extent at a speed and pulling their hand back by a similar extent (e.g., of equal distance but in an opposite direction) at the same speed. In this way, the device may expect complementary push and pull motions when a user 104 performs a push-pull gesture. If, however, the push-pull gesture is performed without complementary push and pull motions (as depicted), then the gesture module 224 may determine that an ambiguous gesture has been performed.

To improve the interpretation of ambiguous gestures, the user module 222 may provide additional details (e.g., contextual information) to the gesture module 224 regarding user presence. If the gesture module 224 can determine which user performed the gesture, then it may better interpret the ambiguous gesture.

In an example, a first user 104-1 performs a push-pull gesture with noncomplementary push and pull motions and the gesture module 224 determines that the gesture does not correlate (e.g., to a desired level of confidence) to a push-pull gesture. The first user 104-1 may have pushed their hand to an extent at a speed but pulled their hand back at a significantly slower speed and to a shorter extent. The gesture module 224 determines that the gesture is an ambiguous gesture that could be either a push-pull or a push gesture. Instead of prompting the first user 104-1 to perform the gesture again, the gesture module 224 utilizes user presence information from the user module 222 to determine that a first registered user performed the gesture. This first registered user may have performed this gesture in the past (e.g., during gesture training) and may typically perform the push-pull gesture in this modified manner. The gesture module 224 may then access one or more stored radar-signal characteristics associated with a history (e.g., gesture training history) of the first registered user performing gestures. This additional information may allow the computing device 102 to determine that the ambiguous gesture is the push-pull gesture as commonly performed by the first registered user.

As also depicted in example implementation 2500-3, a second user 104-2 may also perform the push-pull gesture in a unique manner. The second user 104-2 may push their hand to an extent at a speed but pull their hand back at a significantly faster speed and to a longer extent. Due to the noncomplementary push and pull motions, the gesture module 224 may determine that the gesture is an ambiguous gesture that could be either a push-pull or a pull gesture. The gesture module 224 may again utilize user presence information from the user module 222 to determine whether a registered user performed the gesture. In this example, the second user 104-2 is an unregistered person who has not previously performed gestures for the computing device 102. Therefore, the gesture module 224 may utilize other contextual information (as further described with respect to FIGS. 26-32), prompt the unregistered person to perform the gesture again, and/or initiate gesture training.

In this example, the radar system 108 may receive one or more radar-receive signals 404 that include radar-signal characteristics of the second user 104-2 performing their version of this push-pull gesture (e.g., another ambiguous gesture). The gesture module 224 may compare these radar-signal characteristics to stored radar-signal characteristics to determine that the other ambiguous gesture could be the push-pull gesture (a first known gesture) or the pull gesture (a second known gesture). In particular, the correlation of the performed version of the push-pull gesture to each known gesture exceeds the no-confidence level (e.g., minimum threshold), but the device determines that the correlation is also lower than the high-confidence level.

In general, contextual information may include details determined using, for instance, an antenna 214, an additional sensor of the computing device 102, data stored on a memory (e.g., user habits), local information (e.g., a time, relative location), statuses of operations, and so forth. In another example (not depicted), the gesture module 224 may use a local time as context to enable the recognition of an ambiguous gesture. If a user 104 consistently performs a gesture to turn on lights at 6:00 am every morning, then the computing device 102 may take note of this habit to improve gesture recognition. If the user 104 accidentally performs an ambiguous gesture at 6:00 am (e.g., that could be associated with turning on the lights or reading news aloud), then the device may use this contextual information to determine that the user 104 most likely intended to perform a gesture to turn on the lights. In another example, if the computing device 102 is located in a kitchen, then the gesture module 224 may determine over time that kitchen-related gestures (e.g., to turn on an oven) are common in that room. If a user 104 performs an ambiguous gesture in the kitchen (e.g., that could be associated with turning on a dishwasher or turning on a security system in a living room), then the device may use the contextual information of kitchen-related gestures to determine that the user 104 most likely intended to perform a gesture to turn on the dishwasher.

The gesture module 224 may additionally utilize one or more logic systems (e.g., including predicate logic, hysteresis logic, and so forth) to improve gesture recognition. Logic systems may be used to prioritize certain gesture-recognition techniques over others (e.g., favoring temporal features over contextual information), add weight (e.g., confidence) to certain results when relying on two or more features, and so forth. The gesture module 224 may also include a machine-learned model (e.g., 700, 802) to improve gesture recognition (e.g., interpretation of ambiguous gestures), as previously described with respect to FIGS. 7 and 8, respectively.

The radar system 108 may use contextual information on its own or in combination with topological or temporal information of radar-signal characteristics to recognize gestures. In general, the gesture module 224 may use any one or more of the categories depicted in FIG. 25 in any combination and at any time to recognize a gesture. For instance, the radar system 108 may collect topological and temporal information regarding a performed gesture but lack contextual information. In another case, the radar system 108 may collect topological and temporal information but determine that the information is insufficient to recognize an ambiguous gesture. If contextual information is available, the radar system 108 may utilize that contextual information to recognize the ambiguous gesture. Any one or more categories depicted in FIG. 25 may be prioritized over another category. An application of the contextual features described with respect to example environment 2500-3 is further described with respect to FIG. 26.

Contextual Information Associated with User Habits

Figure 26:
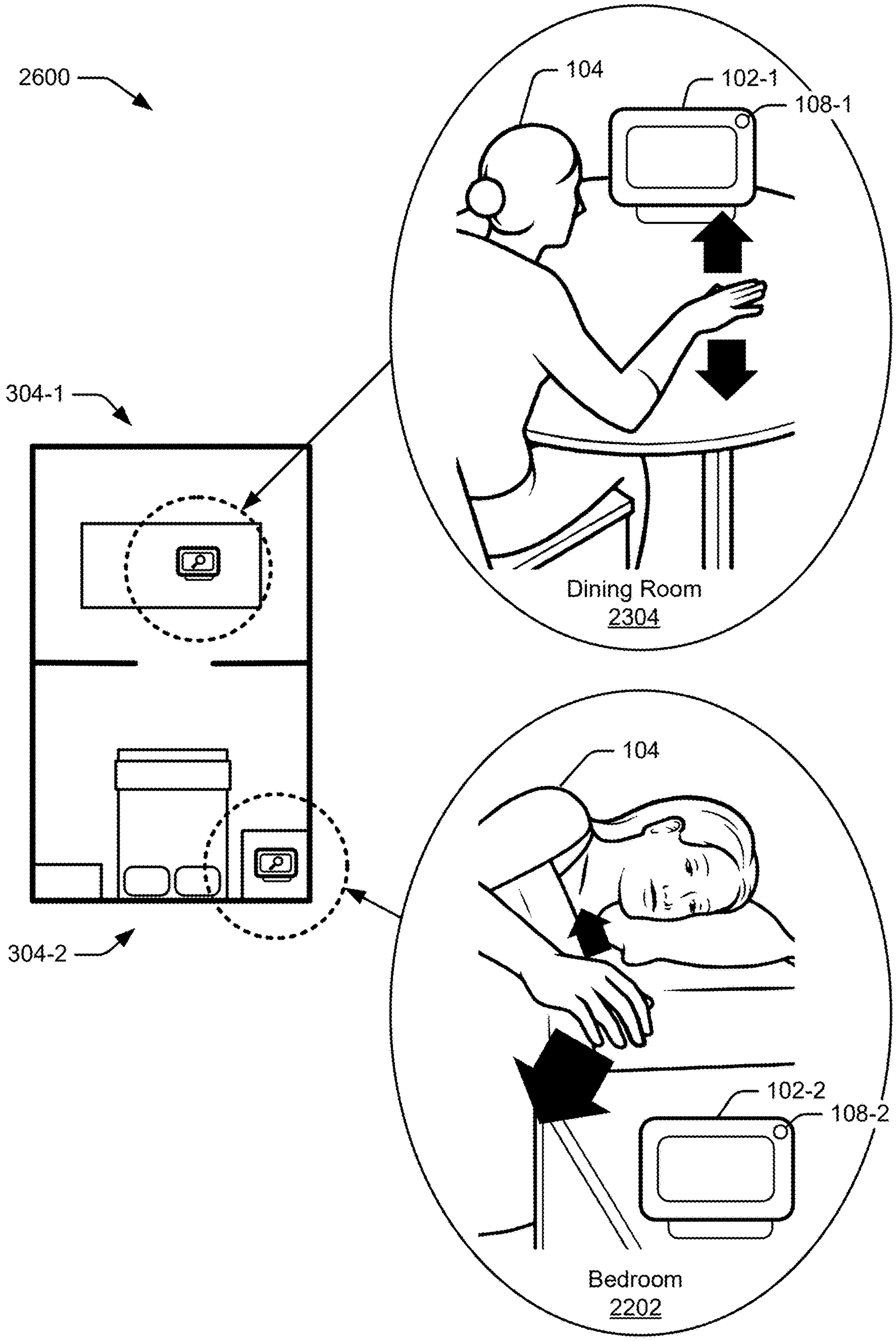
FIG. 26 illustrates an example environment in which computing devices may utilize contextual information of a user's habits to improve gesture recognition.

FIG. 26 illustrates an example environment 2600 in which computing devices 102-1 and 102-2 may utilize contextual information of a user's habits to improve gesture recognition. In example environment 2600, a first room 304-1 (the dining room 2304) contains a first computing device 102-1, and a second room 304-2 (the bedroom 2202) contains a second computing device 102-2. Each computing device 102 may determine its location within a home based on, for instance, a relative location to other devices, user input, user behaviors, a frequency of commands, types of commands, user presence, and so forth. Additionally, each computing device 102 may utilize one or more sensors to perform, for instance, geofencing, multilateration, true-range multilateration, dead reckoning, atmospheric-pressure adjustments, true-range inertial multilateration, angle-of-arrival calculations, time-of-flight calculations, and so forth to determine the device's location.

Users may perform gestures differently in each room of a home based on their typical behavior or body position in that room. As depicted in example environment 2600, a user 104 located within the dining room 2304 may typically perform gestures while sitting upright in a chair, whereas a user 104 located within the bedroom 2202 may typically perform gestures while lying horizontally in a bed. When the user 104 performs a push-pull gesture in the dining room 2304, for instance, the first computing device 102-1 may detect that the push-pull gesture has been performed with complementary push and pull motions as taught during gesture training. Specifically, the user 104 may commonly push and pull to similar (but opposite) extents and at similar speeds as depicted using complementary arrows in example environment 2600. On the other hand, the user 104 may commonly perform the push-pull gesture in the bedroom 2202 from a lying position with noncomplementary push and pull motions. For instance, the user 104 may typically push to a larger extent, at a larger speed, and in a noncollinear direction from the pull motion, as also depicted using noncomplementary arrows in example environment 2600.

Instead of requiring the user 104 to perform the push-pull gesture perfectly (e.g., consistently, as expected, as taught during training) at each computing device 102-1 and 102-2, each device may learn the user's habits over time as contextual information to improve the recognition of ambiguous gestures. In example environment 2600, the first computing device 102-1 may learn over time that the user 104 typically performs a first version of the push-pull gesture in the dining room 2304 with complementary push and pull motions, whereas the second computing device 102-2 may learn over time that the user 104 typically performs a second version of the push-pull gesture in the bedroom 2202 with noncomplementary push and pull motions. Therefore, the first computing device 102-1 and the second computing device 102-2 may utilize this contextual information (regarding a way in which the user 104 typically performs gestures in a room) when attempting to recognize an ambiguous gesture in the dining room 2304 and bedroom 2202, respectively.

In an example, the user 104 wakes up to a sound of an alarm and performs a push-pull gesture to command the second computing device 102-2 to turn off the alarm. In their tired state, however, the user 104 performs the second version of the push-pull gesture with noncomplementary push-and-pull motions. The second computing device 102-2 may detect one or more radar-signal characteristics associated with spatial and/or temporal features of the gesture and determine that the user has performed an ambiguous gesture. In particular, the user's performance of the push-pull gesture is similar to both a first known gesture (the push-pull gesture) and a second known gesture (a wave gesture). If the device cannot recognize the performed gesture to a desired level of confidence, then the second computing device 102-2 determines that the user performed an ambiguous gesture that could be either the first known gesture or the second known gesture. To recognize this ambiguous gesture, the second computing device 102-2 considers the contextual information regarding the user's habits in the bedroom 2202 and determines that the user 104 typically performs the push-pull gesture in a tired manner with noncomplementary push and pull motions. Therefore, the radar-signal characteristics of the ambiguous gesture more closely resemble the radar-signal characteristics of the second version of the push-pull gesture that is typically performed by the user 104 in the bedroom 2202. The device determines that the ambiguous gesture is more likely the first known gesture (the push-pull gesture) and proceeds to perform operations to turn off the alarm. It is assumed in example environment 2600 that both devices detect and store multiple radar-signal characteristics associated with each version of the push-pull gesture (e.g., stored radar-signal characteristics) over time on one or more memories.

Additionally, the first computing device 102-1 may learn over time to anticipate (e.g., expect, determine it is more common) the first version of the push-pull gesture based on the first device's location within the dining room 2304. Similarly, the second computing device 102-2 may learn over time to anticipate the second version of the push-pull gesture based on the second device's location in the bedroom 2202. If the first computing device 102-1 is moved from the dining room 2304 to the bedroom 2202, then the first computing device 102-1 may be reconfigured (e.g., automatically upon detection of the relocation, manually by a user 104) to anticipate the second version of the push-pull gesture instead of the first version. Similarly, if the second computing device 102-2 is moved from the bedroom 2202 to the dining room 2304, then the second computing device 102-2 may be reconfigured to anticipate the first version of the push-pull gesture. While the contextual information of example environment 2600 includes common ways in which the user 104 performs gestures in a location, the contextual information may also include users 104 who are commonly associated with a location (e.g., a room 304). Therefore, it may be useful for a computing device 102 to anticipate users based on the device's location, as further described with respect to FIG. 27.

Figure 27:
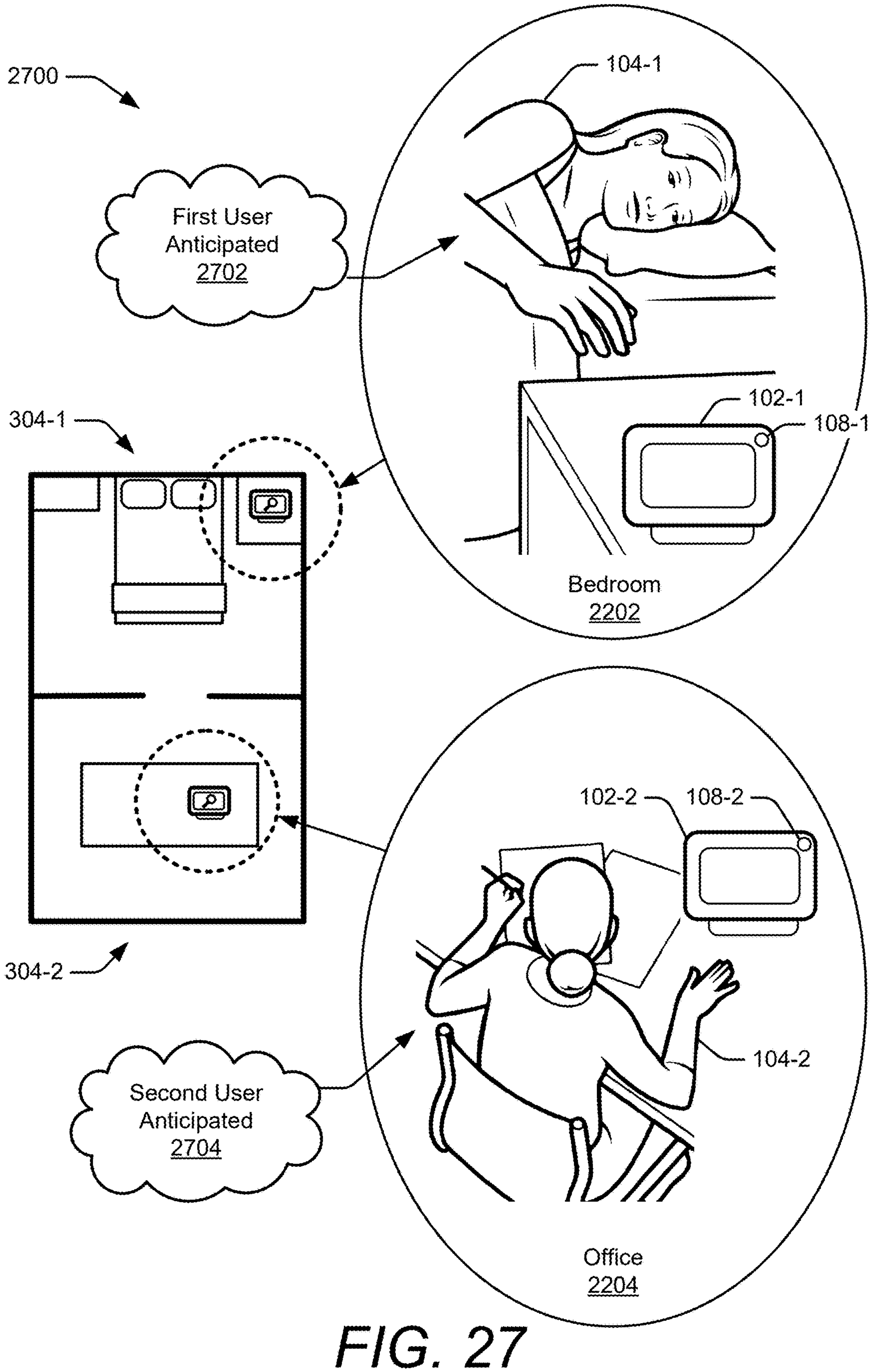
FIG. 27 illustrates the anticipation of user presence based on a computing device's location.

FIG. 27 illustrates the anticipation of user presence based on a computing device's location. In an example environment 2700, a first computing device 102-1 may learn over time that a first user 104-1 (e.g., a daughter) is typically present within the bedroom 2202, which may allow the device to anticipate the first user's presence at 2702. If the first computing device 102-1 detects a user's presence but cannot accurately distinguish them from other users, then the device may rely on the anticipation of the first user's presence to distinguish the user 104. For instance, if an ambiguous user (e.g., a user who cannot be distinguished to a desired level of confidence) is detected at a large distance within the bedroom 2202, then the first computing device 102-1 may determine that this ambiguous user is either the first user 104-1 (the daughter) or a second user 104-2 (a mother). If the daughter has been predominantly detected over time within the bedroom 2202 (when compared to the presence of the mother), then the first computing device 102-1 may determine that the ambiguous user is likely the daughter.

Similarly, a second computing device 102-2 may learn over time that the second user 104-2 (the mother) is predominantly present within another room (e.g., the office 2204), which may allow the second computing device 102-2 to anticipate the presence of the second user, here the mother, at 2704. If the second computing device 102-2 is moved to the bedroom 2202, then the second computing device 102-2 may be reconfigured to anticipate the daughter's presence based on the device's relocation. In particular, the second computing device 102-2 may access a history of users detected by the first computing device 102-1 to enable anticipation of the daughter's presence. Similarly, if the first computing device 102-1 is moved to the office 2204, then the first computing device 102-1 may be reconfigured to anticipate the mother's presence. Each computing device 102-1 and 102-2 may also learn over time that certain gestures are typically detected at each location, as further described with respect to FIG. 28, which may improve the interpretation of ambiguous gestures.

Contextual Information Associated with the Device's Location

Figure 28:
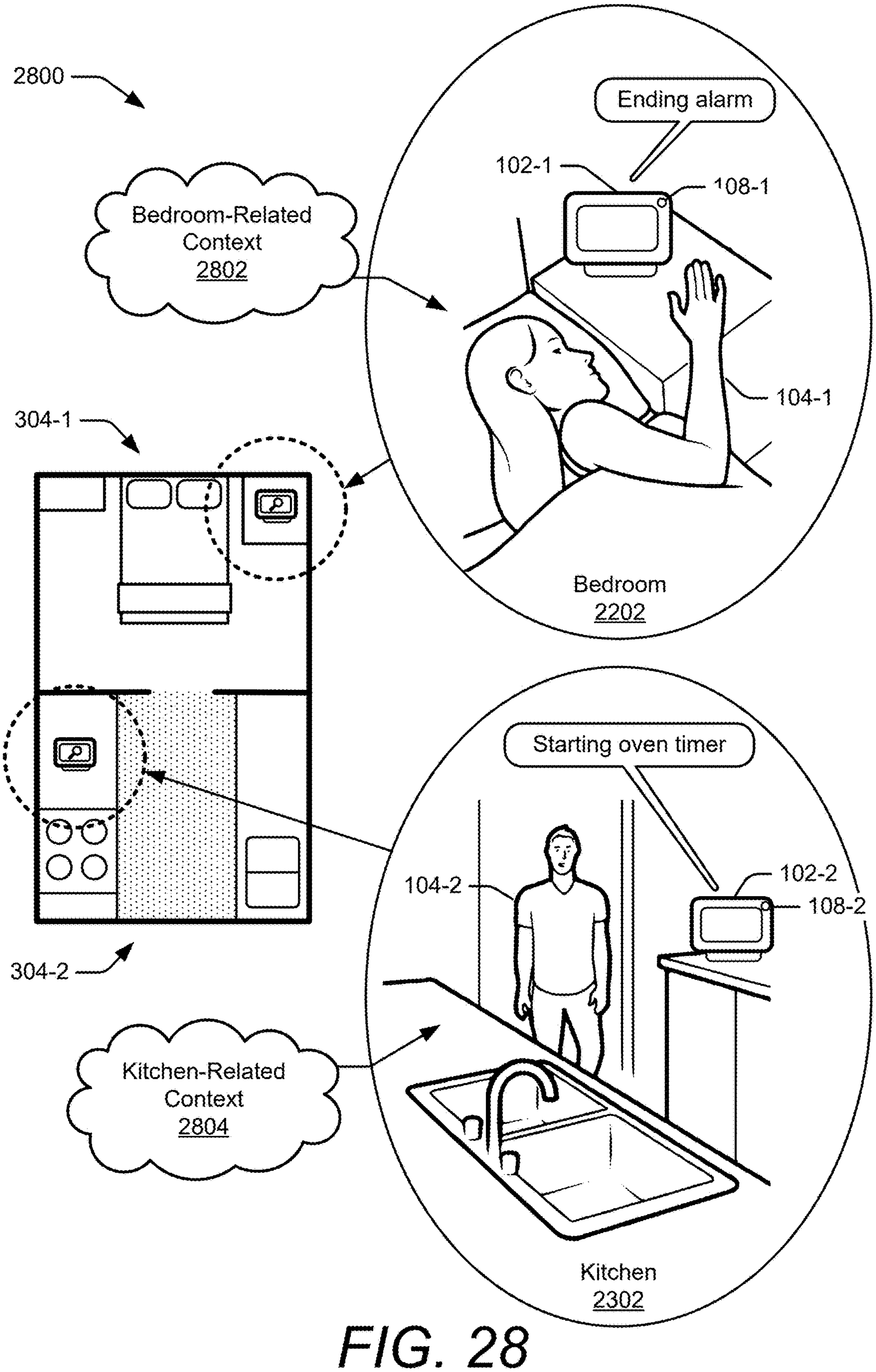
FIG. 28 illustrates techniques of using room-related context to improve the recognition of ambiguous gestures.

FIG. 28 illustrates how room-related context may improve the recognition of ambiguous gestures. In an example environment 2800, a first computing device 102-1 may learn that bedroom-related gestures are more common in the bedroom 2202 (bedroom-related context 2802) and kitchen-related gestures are more common in the kitchen 2302 (kitchen-related context 2804). Bedroom-related gestures may include commands to control an alarm clock, lighting, personal care, calendar events, and so forth, whereas kitchen-related gestures may include commands to control an oven, dishwasher, stove, timer, and so forth. When a computing device 102 determines that an ambiguous gesture has been performed, the gesture module 224 may utilize contextual information (e.g., contexts 2802, 2804) regarding typical commands of a room to recognize the ambiguous gesture.

In a first example, a first user 104-1 wakes up to an alarm and attempts to perform a push-pull gesture to turn it off. Since the first user 104-1 is sleepy, they perform the gesture in a tired manner that differs, for instance, from the push-pull gesture as taught during gesture training. The first computing device 102-1 detects the gesture being performed and determines that it is either the push-pull gesture (to turn off the alarm) or a wave gesture (to turn on an oven) but cannot recognize it to a desired level of confidence. Therefore, the gesture module 224 determines that an ambiguous gesture has been performed.

Instead of prompting the first user 104-1 to repeat the gesture while the alarm continues to ring, the gesture module 224 uses the bedroom-related context 2802 (e.g., commonly performed gestures in the bedroom 2202) to recognize the ambiguous gesture. In this example, the first computing device 102-1 determines that the ambiguous gesture is the push-pull gesture and sends control signals to end the alarm. More specifically, the first computing device 102-1 determines that the push-pull gesture (to turn off the alarm) is more commonly performed in the bedroom 2202 than the wave gesture (to turn on the oven). The determination may be based on, for instance, a history of gestures performed in the bedroom 2202 as stored (e.g., recorded) to a memory.

In a second example, a second user 104-2 walks into the kitchen 2302 and attempts to perform a wave gesture to turn on an oven. Since the second user 104-2 is walking, they perform the gesture in a manner that differs, for instance, from the wave gesture as performed from a stationary position. A second computing device 102-2 detects the gesture being performed and determines that it is either the wave gesture (to turn on the oven) or a push-pull gesture (to turn off an alarm clock) but cannot recognize it to a desired level of confidence. Therefore, the gesture module 224 determines that an ambiguous gesture has been performed and uses the kitchen-related context 2804 (e.g., commonly performed gestures in the kitchen 2302) to recognize the ambiguous gesture. As in the previous example, the second computing device 102-2 determines that the wave gesture (to turn on the oven) is more commonly performed in the kitchen 2302 than the push-pull gesture (to turn off the alarm). The device may proceed to turn on the oven.

The techniques of example environment 2800 may include a model similar to the space-time machine-learned model 802 and/or a machine-learned model 700 (with reference to FIGS. 8 and 7) where the input layer 702 additionally receives contextual information to improve the interpretation of gestures. While the techniques regarding FIGS. 26-28 are described using a history of gestures and user habits detected at one or more times in the past, contextual information may also include real-time information such as a status of operations being performed at a current time (e.g., in-progress operations).

Contextual Information Associated with In-Progress Operations

Figure 29:
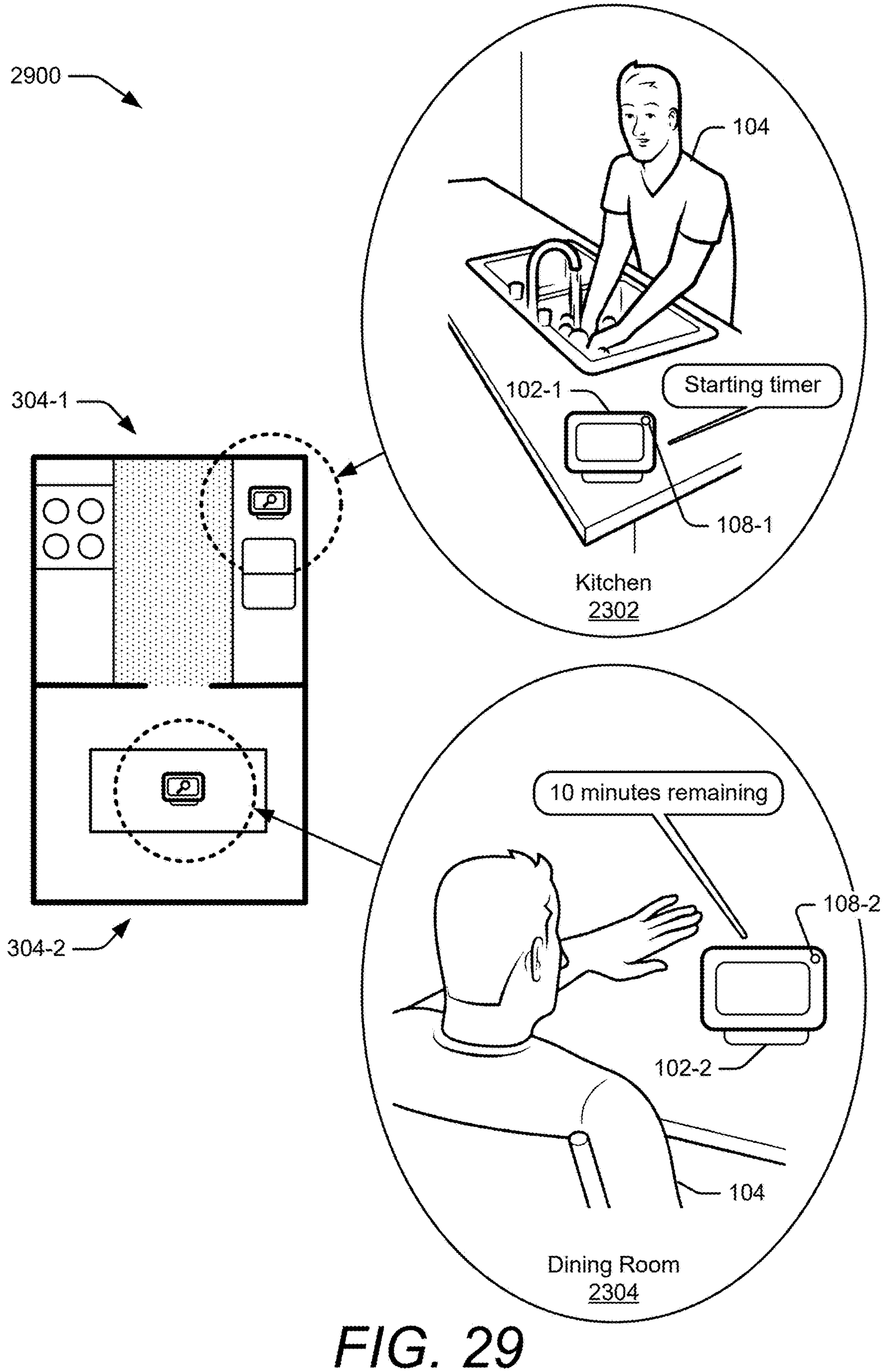
FIG. 29 illustrates techniques of using a status of operations being performed at a current time to improve the recognition of ambiguous gestures.

FIG. 29 illustrates how a status of operations being performed at a current time may improve the recognition of ambiguous gestures. The techniques described in an example environment 2900 may be performed by a computing device 102 (with reference to FIG. 24) or a set of computing devices 102-X that form a computing system. A first computing device 102-1 is depicted in a first room 304-1 (the kitchen 2302), and a second computing device 102-2 is depicted in a second room 304-2 (the dining room 2304). It is assumed in this example that the first computing device 102-1 and the second computing device 102-2 are part of a computing system. As such, each computing device 102-1 and 102-2 may exchange, for instance, contextual information and/or radar-signal characteristics associated with a gesture being performed by a user 104.

In example environment 2900, a user 104 performs a gesture to start a timer for a kitchen oven. A first radar system 108-1 of the first computing device 102-1 detects the gesture, determines it is associated with an operation (to start the timer), and begins a timer in the kitchen 2302. The user 104 then leaves the kitchen 2302 to wait in the dining room 2304 for their food to cook. At a later time, the user 104 wants to know if the food is finished baking, so they attempt to perform a known gesture for a second computing device 102-2 to check the status of the timer. The user 104, however, performs an ambiguous gesture that could be the known gesture (to check the status of the timer) or another known gesture (to turn off a television) but cannot be recognized to a desired level of confidence. In particular, the gesture module 224 of the second computing device 102-2 compares the radar-signal characteristics (e.g., temporal and/or topological features) of the ambiguous gesture to one or more stored radar-signal characteristics to determine that the ambiguous gesture could be either of those known gestures.

Therefore, the second computing device 102-2 utilizes contextual information regarding a status of operations being performed by either computing device 102-1 or 102-2 of the computing system at a current time. In this example, the first computing device 102-1 is currently running a timer for the oven. The second computing device 102-2 detects this in-progress operation and determines that the known gesture (to check the status of the timer) is associated with the in-progress operation (running the timer) of the first computing device 102-1. Additionally, the gesture module 224 determines that the other known gesture (to turn off the television) is not associated with in-progress operations of any device (including the first computing device 102-1) of the computing system, because the television is not on. Therefore, the second computing device 102-2 determines that the ambiguous gesture is most likely the first known gesture (and not the other known gesture) and reports the status of the timer as "10 minutes remaining."

In some situations, however, the status of operations at the current time may include two or more operations. When such a status occurs, the computing device 102 may need to qualify in-progress operations by, for instance, prioritizing foreground operations over background operations, as further described with respect to FIG. 30.

Contextual Information Associated with Foreground and Background Operations

Figure 30:
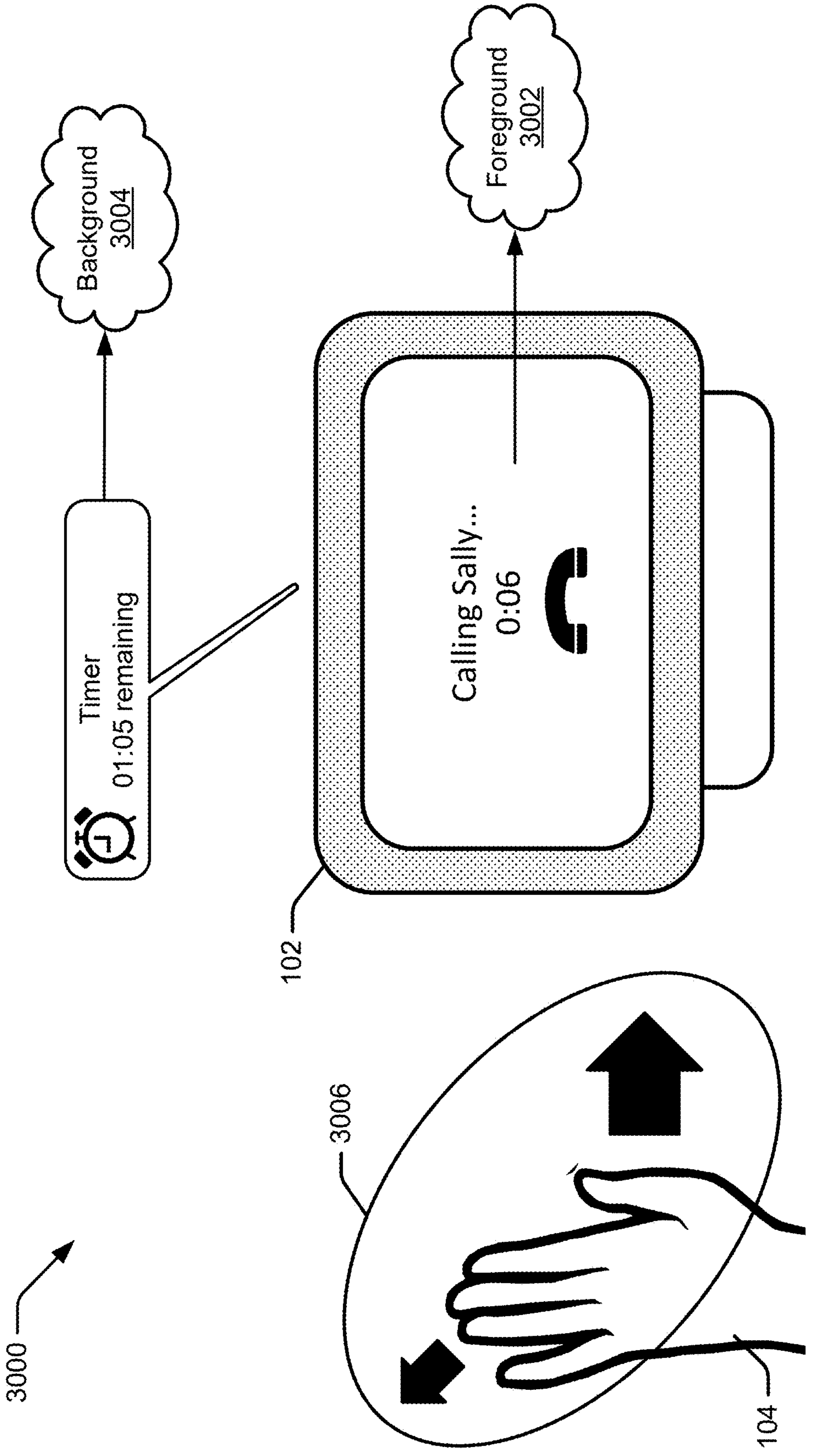
FIG. 30 illustrates techniques for distinguishing ambiguous gestures based on foreground and background operations being performed at a current time.

FIG. 30 illustrates how ambiguous gestures may be recognized based on foreground and background operations being performed at a current time. In this disclosure, foreground operations 3002 will refer to operations that a user is actively involved with (e.g., interacting with, providing inputs to, displayed on a screen) and background operations 3004 will refer to operations that the user is passively involved with (e.g., that occur over a duration of time without user input). For example, the foreground operations 3002 may include phone calls, video calls, scrolling a website using haptic inputs, typing on a display, and so forth. The background operations 3004 may include music being played, a timer, an operational state of an appliance (e.g., an oven turned on), and so forth.

In an example environment 3000, a computing device 102 detects that a user 104 has performed an ambiguous gesture 3006 that may be either a first known gesture or a second known gesture but cannot be recognized to a desired level of confidence. While the user 104 may have intended to perform the first known gesture (e.g., a swipe gesture to turn up the volume of a phone call), the user 104 performed the ambiguous gesture 3006 associated with radar-signal characteristics that are similar to both the first known gesture and the second known gesture (e.g., a wave gesture to stop a timer). If the radar system 108 cannot determine to a level of confidence that the ambiguous gesture 3006 is the first known gesture (and not the second gesture) based on the radar-signal characteristics, then the radar system 108 may utilize contextual information to determine the intended gesture.

The contextual information of example environment 3000 includes the foreground operations 3002 (e.g., a phone call to Sally) and background operations 3004 (e.g., a timer with 1:05 minutes remaining) being performed by the computing device 102 at a current time. Upon detecting the ambiguous gesture 3006, the radar system 108 may determine that the first known gesture (e.g., to turn up the volume of the phone call) is associated with the foreground operations 3002 and the second known gesture (e.g., to stop the timer) is associated with the background operations 3004. The user 104 is actively involved with the phone call to Sally and passively involved with the timer running in the background. The device may then determine that the ambiguous gesture 3006 is most likely the first known gesture and not the second known gesture based on this contextual information.

Figure 31:
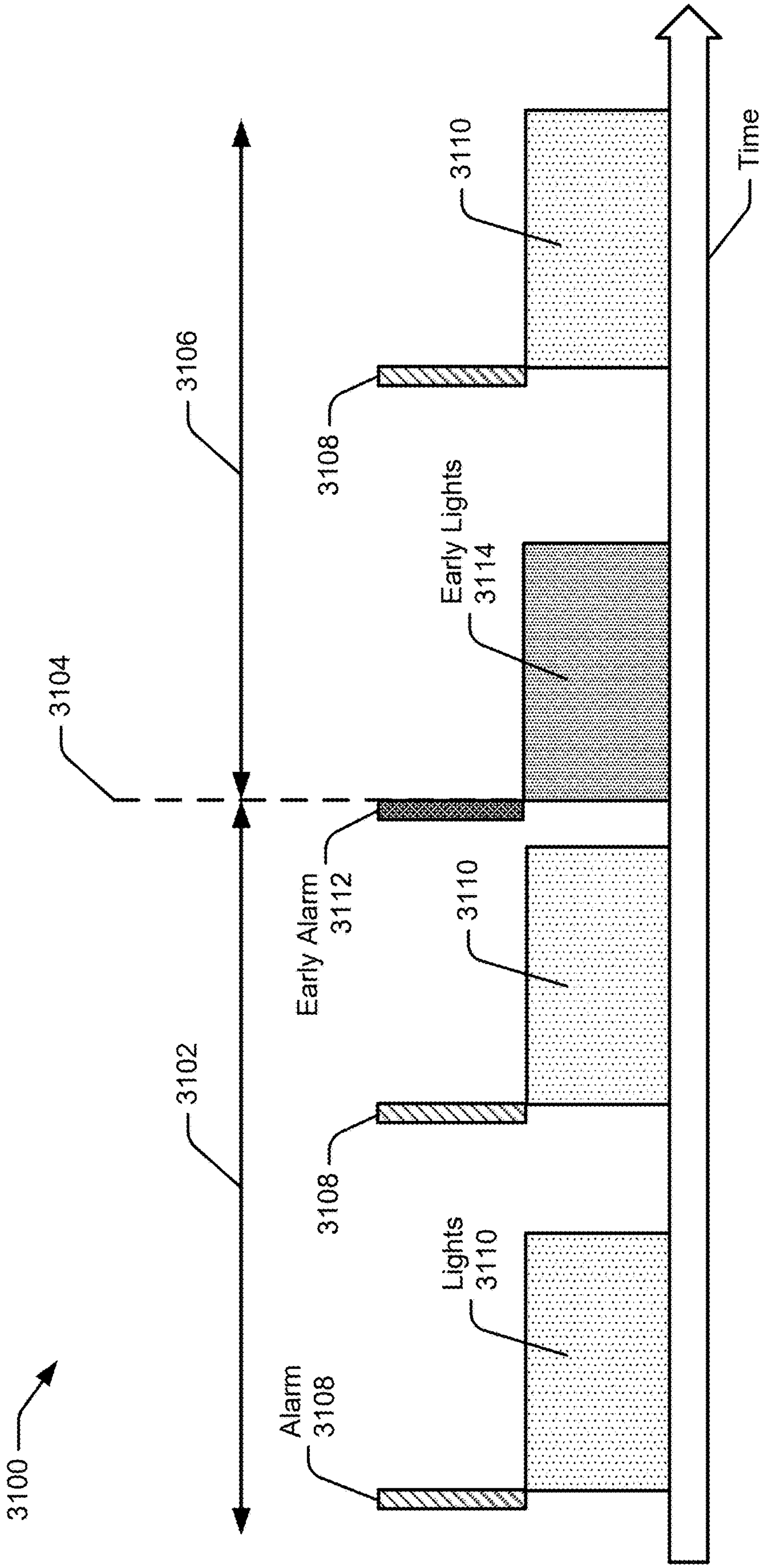
FIG. 31 illustrates techniques of using contextual information that includes past and/or future operations of a computing device.

In general, contextual information is not limited to a status of operations being performed at a current time and may also include operations performed in the past or scheduled to be performed in the future, as further described with respect to FIG. 31.

Contextual Information Associated with Past or Future Operations

FIG. 31 illustrates how contextual information may include past and/or future operations of a computing device 102. Users may routinely (e.g., daily) perform gestures associated with operations to be performed by (or caused by) a computing device 102. An example environment 3100 depicts operations that (1) have been performed during a past period 3102, (2) are being performed at a current time 3104, and (3) are scheduled or anticipated to be performed within a future period 3106. A first command refers to turning off an alarm 3108 every morning, and a second command includes turning on lights 3110 immediately afterward (and leaving them on for a period of time). A computing device 102 may utilize contextual information that includes operations performed in the past period 3102 and/or operations to be performed in the future period 3106 to recognize ambiguous gestures at the current time 3104. The operations of the future period 3106 may, for instance, be scheduled or anticipated by the device based on room-related context or a user habit (e.g., with reference to FIGS. 26-28).

In a first example, the contextual information includes operations performed in the past period 3102. A user 104 typically wakes up to an alarm at 6:00 am every morning and performs a push-pull gesture to turn off the alarm 3108. Then the user 104 performs a swipe gesture to turn on the lights 3110, which stay on until bedtime. These operations (depicted in the past period 3102) have been recorded by the computing device 102 to improve gesture recognition at a future time. One day the user 104 has to wake up early for a flight and sets an early alarm 3112 to wake up at 4:00 am. Upon waking to the alarm, the user 104 performs the push-pull gesture to turn off the alarm and then attempts to perform the swipe gesture (at the current time 3104) to turn on the lights early (e.g., early lights 3114). The user 104, however, is tired and accidentally performs an ambiguous gesture that could be the swipe gesture or a tap gesture (to turn on a radio).

To recognize this ambiguous gesture, the gesture module 224 may reference contextual information regarding past operations to determine that the user 104 intended to perform the swipe gesture, as depicted in example environment 3100. In particular, the gesture module 224 may determine that (1) the lights are usually turned on every morning after the user 104 performs the push-pull gesture to turn off the alarm 3108, (2) the user 104 recently turned off an early alarm 3112, (3) the user 104 performed an ambiguous gesture that could be the swipe gesture or the tap gesture, and (4) the swipe gesture (to turn on the lights) is associated with reoccurring past operations (e.g., the contextual information) and the tap gesture (to turn on the radio) is not associated with past operations. Since ambiguous gestures may be associated with past operations, the gesture module 224 determines that the ambiguous gesture is most likely the swipe gesture and turns on the lights in the bedroom. In this example, the gesture module 224 correlates the past operations (to turn off the alarm 3108 and to turn on the lights 3110) to improve gesture recognition.

In a second example, the contextual information includes operations to be performed (e.g., scheduled) in the future period 3106. A user 104 schedules an alarm 3108 for 6:00 am every morning and programs lights 3110 to automatically turn on at 6:05 am. On a typical morning, the user 104 wakes up to the alarm 3108 and performs the push-pull gesture to turn it off. Unlike in the previous example, the lights 3110 automatically turn on (as scheduled) at 6:05 am without a gesture. One day the user 104 has to wake up early for a flight and manually sets an early alarm 3112 to wake up at 4:00 am. The user 104, however, forgets to adjust the lights to automatically turn on earlier (e.g., at 4:05 am). The early alarm 3112 goes off at 4:00 am, but early lights 3114 have not automatically turned on by 4:05 am. The user 104 attempts to perform a swipe gesture in the dark to turn the lights on early 3114 but accidentally performs an ambiguous gesture that could be the swipe gesture or the tap gesture (to turn on the radio).

In this example, the gesture module 224 may reference contextual information regarding future operations to determine that the user 104 intended to perform the swipe gesture. In particular, the gesture module 224 may determine that (1) the lights are scheduled to automatically turn on every morning at 6:05 am, (2) the user 104 performed an ambiguous gesture at 4:05 am that could be the swipe gesture or the tap gesture, and (3) the swipe gesture (to turn on the lights) is associated with scheduled future operations (e.g., turning on the lights at 6:05 am every morning) and the tap gesture (to turn on the radio) is not associated with any scheduled operations. Therefore, the gesture module 224 determines that the ambiguous gesture is most likely the swipe gesture and turns on the lights in the bedroom.

While the examples of FIGS. 26-31 utilize contextual information associated with operations performed at a current, past, or future time, in some cases this information may not be sufficient to recognize an ambiguous gesture. If the gesture module 224 cannot recognize an ambiguous gesture (e.g., to a level of confidence) based on contextual information (or forgoes doing so based on contextual information), then the computing device 102 may determine a less-destructive operation to perform, as further described with respect to FIG. 32.

Determination of a Less-Destructive Operation

Figure 32:
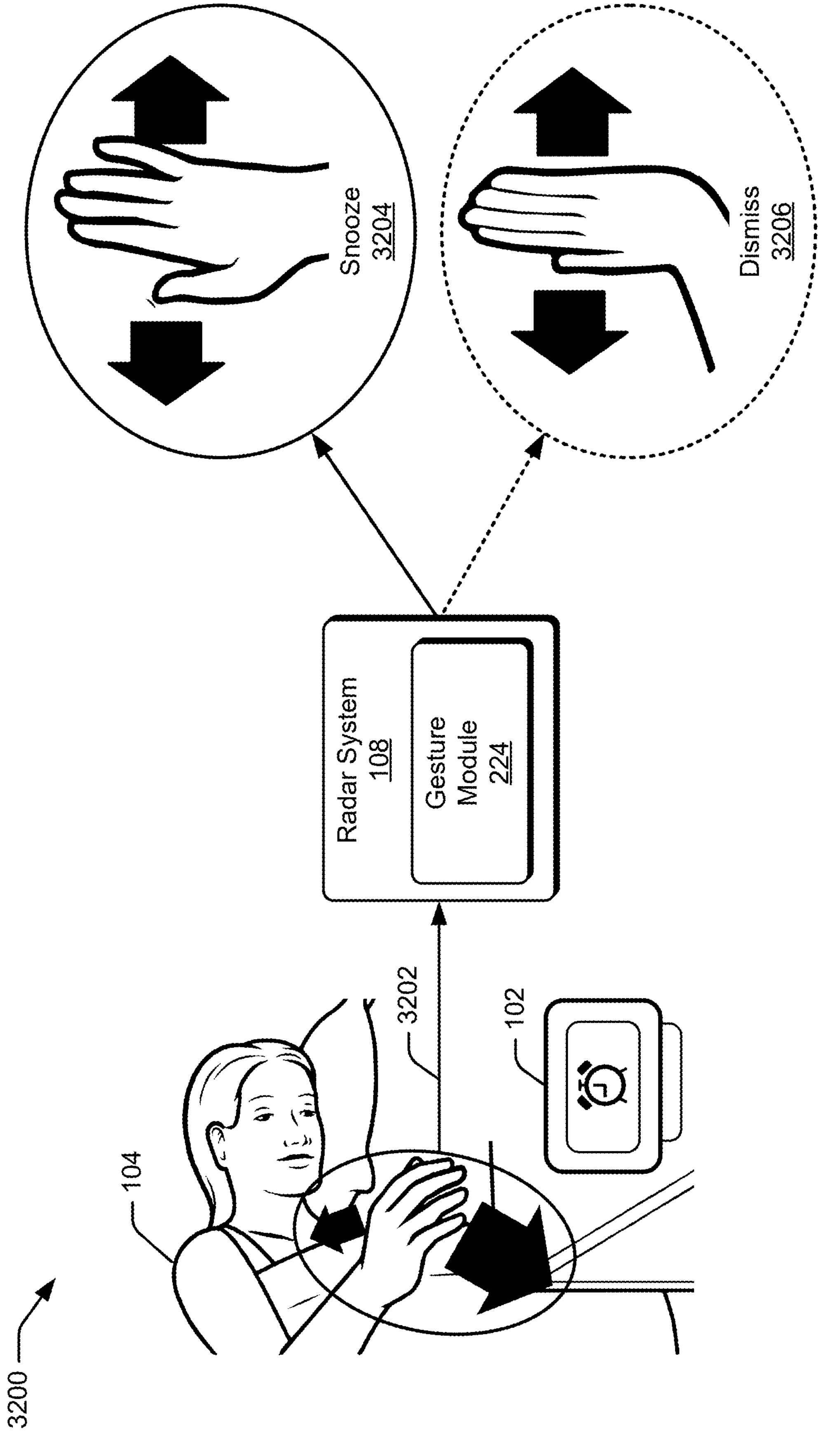
FIG. 32 illustrates techniques for recognizing an ambiguous gesture based on a less-destructive operation.

FIG. 32 illustrates how an ambiguous gesture may be recognized based on a less-destructive operation. Less-destructive operations and less-destructive commands may be referred to generally in this document to describe that an operation or a command associated with the operation is less destructive. In this way, a classification of an operation as less destructive may extend to a command that directs a device to perform that operation.

In an example environment 3200, a user 104 wakes up to an alarm and accidentally performs an ambiguous gesture 3202 that is meant to be a snooze gesture 3204 (e.g., a wave gesture) to reset the alarm for a later time. Since the user 104 performs this gesture in a tired manner, radar-signal characteristics of the ambiguous gesture 3202 are similar to those of both the snooze gesture 3204 and a dismiss gesture 3206 (e.g., a push-pull gesture) to turn off the alarm. In the examples of FIGS. 26-31, the gesture module 224 utilized contextual information to recognize ambiguous gestures. In this example, however, the contextual information (e.g., the alarm going off at the current time) may be related to operations of both the snooze gesture 3204 and the dismiss gesture 3206. Therefore, the contextual information is insufficient to recognize this ambiguous gesture 3202. Although described in relation to a single application, the possible gestures to which the ambiguous gesture 3202 may correspond may be associated with operations affecting a same application or different applications. In this way, contextual information may be more or less helpful in determining the ambiguous gesture 3202 as a particular known gesture.

Instead of, or in addition to, prompting the user 104 to perform the snooze gesture 3204 correctly, the radar system 108 may determine a less-destructive operation to perform. A less-destructive operation may be qualified as an action that is less damaging, less permanent, less consequential, more reversible, and so forth. For instance, muting a phone call may be qualified as less destructive than ending a phone call. In example environment 3200, snoozing an alarm may be qualified as less destructive than dismissing an alarm. Therefore, the radar system 108 may determine that the ambiguous gesture 3202 is more likely the snooze gesture 3204 and reset the alarm for a later time. Less-destructive operations may be qualified based on preset conditions, one or more logics, a history of user behavior, one or more user inputs (e.g., preferences), and so forth. Less-destructive operations may be determined through various techniques described herein, including use of a machine-learned model (e.g., 700, 802) or context-based and user history-based techniques described in this document.

In aspects, determining a less-destructive operation may determine that an operation is an interim operation or a final operation. An interim operation may describe an operation that is reversible and does not terminate an instance of a process. For example, an operation that mutes a call or delays a notification may be described as an interim operation because it merely affects a characteristic of the call or notification without terminating it. In contrast, a final operation may describe an operation that is terminating or irreversible. For example, a final operation may terminate an instance within the computing device and preclude future operations on that instance. As such, a final operation may preclude a system from performing interim operations, with respect to a particular instance, after the final operation has been performed. Given the finality of a final operation, an interim operation may be determined as a less-destructive operation in comparison to a final operation.

In addition, or as an alternative, to determining a less-destructive operation based on operations themselves, the computing device 102 may utilize commands received after performance of a gesture to determine a less-destructive command. Specifically, the computing device 102 may perform a command and the user 104 may respond by performing a gesture or providing a user input to the computing device. In some instances, this gesture or user input may cause the computing device 102 to perform a different command to reverse an original command performed on the computing device. For example, the user 104 may redial a phone number or receive a call back from a previous caller in response to a call being terminated. A command performed to reverse an operation (e.g., redialing the phone) may provide an indication of a destructiveness of the operation (e.g., it may be easier to replay a skipped song than to reopen an unsaved and terminated application).

While some destructiveness determination may be based on current responses to a command performed on the computing device 102, the computing device 102 may utilize prior performances of commands to determine a less-destructive operation. For example, at a previous time, the computing device 102 may have received a particular response from the user 104 after a performance of one or more commands correlated to the ambiguous gesture 3202 (e.g., a gesture that is recognized not as one known gesture but as two known gestures and thus is ambiguous but associated with two of potentially many known gestures). Based on the response, the computing device 102 may determine how destructive an operation is. In one example, the computing device 102 may have previously performed a command to terminate a call or application, which the user 104 responded to by re-initiating the application or call. This historical action taken by a user in response (e.g., within a period of time) to a command received or an operation performed by the computing device 102 may provide an indication of a user's intended command in each situation, thereby making that command less destructive. An operation may be viewed as less destructive if the computing device 102 determines that the operation is likely intended by the user 104, which may be determined from previous behavior. Thus, relying on past detections and responses may enable a system to improve the determination of a less-destructive operation.

When the user 104 performs operations or provides a command to the computing device 102 to reverse a previous operation, indications of the user intervention may be stored to increase the accuracy of ambiguous-gesture recognition in a future occurrence. For example, when the user 104 acts to reverse a command performed as a result of the ambiguous gesture 3202, the computing device 102 may determine that the ambiguous gesture 3202 was recognized incorrectly and store this determination to improve gesture recognition at a future time. This storing may include storing a radar-signal characteristic of the ambiguous gesture 3202 in such a way as to disassociate that characteristic with a gesture to which the ambiguous gesture 3202 was incorrectly correlated.

Instead of, or in addition to, performing a gesture or command to reverse an incorrectly performed command, the user 104 may repeat a performance of the ambiguous gesture 3202 to indicate that the ambiguous gesture 3202 was recognized incorrectly. This other performance of the ambiguous gesture 3202 may be determined to be similar to or identical to the first performance of the ambiguous gesture 3202. As a result, the computing device 102 may determine that the user 104 is attempting to correct an incorrect recognition of the ambiguous gesture 3202 by the computing device 102. By determining that the user 104 is reperforming the ambiguous gesture 3202 based on gesture similarity, the computing device 102 may determine that a previous recognition of the ambiguous gesture is incorrect. Once the computing device 102 determines that the previous recognition of the ambiguous gesture 3202 is incorrect, it may analyze the other performance of the ambiguous gesture 3202 to determine a match to a different known gesture. As a result, the ambiguous gesture 3202 may be recognized as a gesture different from the incorrectly recognized gesture. In aspects, the different gesture may be one of the known gestures to which the ambiguous gesture was originally correlated.

In response to determining that the original recognition of the ambiguous gesture 3202 is incorrect, the computing device 102 may reverse or stop performance of a command associated with the incorrectly recognized ambiguous gesture 3202. Alternatively or additionally, the computing device 102 may perform a command associated with a different known gesture that was correctly correlated to the ambiguous gesture. As with other corrections of the computing device 102, this determination may be stored to enable the computing device 102 to more accurately recognize a future performance of a gesture as the different gesture, which may include storing a characteristic of the first or subsequently performed ambiguous gesture 3202 in association with the different gesture.

While a less-destructive operation may be determined, wholly or partly, based on gestures or commands received after the ambiguous gesture 3202, preferences of the user 104 may be used to determine a less-destructive command. Specifically, the user 104 may store data relating to which commands or operations should be characterized as less destructive. This data may include specific user-specified decisions related to a relative destructiveness of each command/operation or generic data that may be useful to determine a less-destructive operation between any set of commands/operations. User preferences may similarly determine how an ambiguous gesture 3202 is determined (e.g., should higher weight be given to context, destructiveness, and so on). For example, the user 104 may choose to rely more heavily on context to determine between possible correlations of an ambiguous gesture 3202, while another user may rely more heavily on destructiveness to avoid accidental performance of destructive operations.

Through the described techniques, a less-destructive operation may be determined, which may enable a computing system to recognize an ambiguous gesture to be a known gesture in a less or least damaging way. Thus, determination of a less-destructive operation may increase user satisfaction with gesture control, even when a computing device fails to accurately determine an ambiguous gesture as a known gesture.

Continual In-Line Learning

Figure 33:
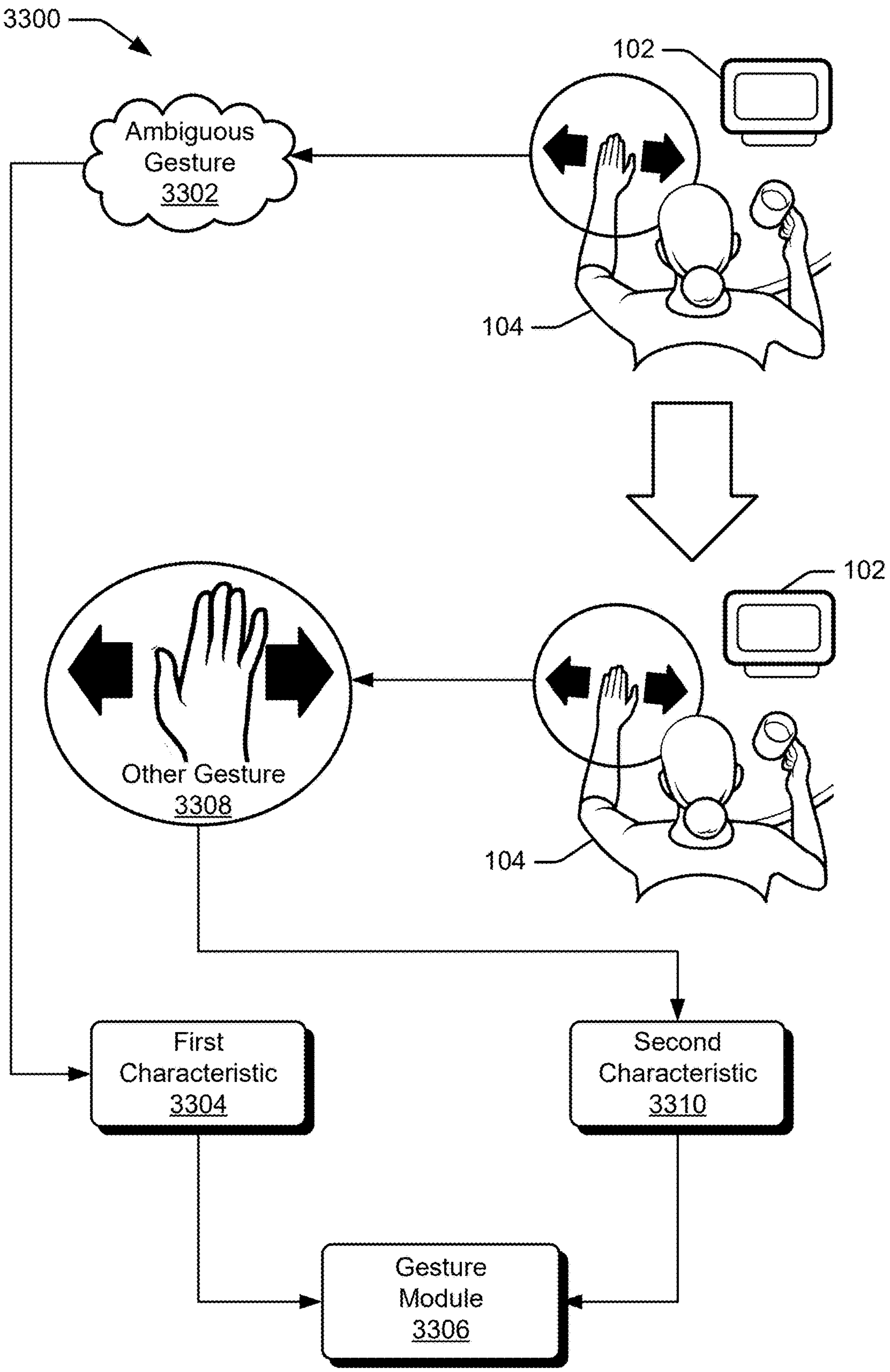
FIG. 33 illustrates a user performing an ambiguous gesture that the user intends to be a first gesture (e.g., a known gesture)

FIG. 33 illustrates a user performing an ambiguous gesture. In an example environment 3300, a user 104 performs an ambiguous gesture 3302 that the user intends to be a first gesture (e.g., a known gesture). The computing device 102 detects the ambiguous gesture 3302 and attempts to correlate the ambiguous gesture 3302 to a known gesture. Specifically, a radar system of the computing device 102 may attempt to determine one or more radar-signal characteristics associated with the ambiguous gesture 3302. In this instance, the radar system determines that a first radar-signal characteristic 3304 is associated with the ambiguous gesture 3302. In general, when a user performs a gesture, radar-signal characteristics of the gesture may vary among different performances of the gesture due to a user's (or different users') slight differences in each performance of the gesture (or orientation or distance relative to the radar system, etc.). Therefore, an instance of a gesture performed by the user 104 may have radar-signal characteristics that differ from stored radar-signal characteristics associated with a known gesture and cause the gesture module 3306 to fail to determine which gesture has been performed by the user 104.

In this case, the ambiguous gesture 3302 is determined to have the first radar-signal characteristic 3304. The first radar-signal characteristic 3304 may be compared to one or more stored radar-signal characteristics. In aspects, the stored radar-signal characteristics may be implemented within a storage media of the computing device 102, the radar system, the gesture module 3306, or an external storage media accessible by the gesture module 3306. The stored radar-signal characteristics may be radar-signal characteristics that are correlated to the first gesture, for example, based on previous performance of the gesture, a previous calibration, or the like. Due to a difference in this instance of the ambiguous gesture 3302, the comparison of the first radar-signal characteristic 3304 and the one or more stored characteristics may be ineffective to correlate the ambiguous gesture 3302 to the first gesture. For example, the first radar-signal characteristic 3304 may differ from the one or more stored characteristics such that two or more gestures (or no gestures) are determined as possible correlations to the ambiguous gesture 3302.

In some implementations, the gesture module 3306 may determine that the ambiguous gesture 3302 likely correlates to the first gesture (e.g., the first gesture has the highest correlation) but the correlation cannot be determined with a required confidence. In other implementations, the gesture module 3306 may determine that the ambiguous gesture 3302 corresponds to multiple stored gestures, including the first gesture, but that another of the multiple stored gestures has a higher correlation than the first gesture. The computing device 102 may not respond to the ambiguous gesture 3302 (e.g., a command that is associated with the first gesture is not performed by the computing device 102) in response to failing to recognize the gesture with the required confidence.

When the computing device 102 fails to perform the command associated with the first gesture, the user 104 often chooses to perform the command again. For instance, in the example illustrated in FIG. 33, the user 104 performs another gesture 3308, which is detected by the computing device 102. In some examples, the computing device 102 may display a notification that prompts the user 104 to repeat the gesture. In other implementations, the notification may be communicated to the user 104 through other manners (e.g., using haptic or audible notifications). Like with the ambiguous gesture 3302, the radar system may determine one or more radar-signal characteristics of the other gesture 3308. As illustrated, the radar system may determine that the other gesture 3308 has particular radar-signal characteristics, such as a second radar-signal characteristic 3310. The second radar-signal characteristic 3310 may be provided to the gesture module 3306, where it, similarly to the first radar-signal characteristic 3304, is compared to one or more stored radar-signal characteristics. Here assume that the second radar-signal characteristic 3310 more closely corresponds to the stored radar-signal characteristics when compared to the first radar-signal characteristic 3304, for example, as a result of the user 104 taking time to more carefully perform the other gesture 3308 in response to the computing device 102 failing to recognize the ambiguous gesture 3302. Here also assume that comparison of the second radar-signal characteristic 3310 to the stored characteristics may enable the gesture module 3306 to correlate the other gesture 3308 to the first gesture. By correlating the other gesture 3308 to a known gesture (e.g., recognizing the other gesture 3308 as the first gesture), the computing device 102 may perform a command associated with the known gesture. Example commands include stopping a timer, pausing/playing media executing on the device, reacting to content displaying on the device, and others described herein.

Given that the computing device 102 (e.g., using the gesture module 3306 or 224 of the radar system 108) was able to determine that the other gesture 3308 was correlated to the first gesture stored by the computing device 102, it may be likely that the ambiguous gesture 3302 was also intended to be the first gesture. As such, the computing device 102 or the gesture module 3306 may compare the ambiguous gesture 3302 and the other gesture 3308 to determine whether the two gestures are similar. Specifically, the gesture module 3306 may compare the first radar-signal characteristic 3304 of the ambiguous gesture 3302 to the second radar-signal characteristic 3310 of the other gesture 3308 to determine if the two gestures are similar. For more information on some of the many ways to do so disclosed herein, see the detailed description accompanying FIGS. 7-18. If it is determined that the two gestures are similar (e.g., to a required confidence level, which may be lower than a required confidence for gesture recognition), the computing device 102 may determine that the ambiguous gesture 3302 is the first gesture. To improve the accuracy of detecting a performance of the first gesture at a future time, the first radar-signal characteristic 3304 of the ambiguous gesture 3302 may be correlated to the first gesture and stored by the computing device 102. In doing so, the computing device 102 may continually increase the accuracy of gesture recognition.

In general, other factors may be incorporated to determine if the ambiguous gesture 3302 is the first gesture. For example, an amount of time elapsed between the performance of the ambiguous gesture 3302 and the other gesture 3308 may be determined, and this amount of time elapsed may be used to determine whether the ambiguous gesture 3302 is the first gesture. In aspects, a shortened period of time (e.g., two seconds or less) elapsed may indicate a higher likelihood that the ambiguous gesture 3302 is the first gesture, while a higher period of time elapsed may indicate a lower likelihood that the ambiguous gesture 3302 is the first gesture. In some implementations, the time elapsed may be a period of time in which an additional gesture is not detected between the ambiguous gesture and the other gesture. In this case, the ambiguous gesture 3302 may be more likely to be the first gesture if the other gesture 3308 is performed immediately following the ambiguous gesture without an additional gesture being performed in between. Here the user 104 repeats the gesture after the ambiguous gesture 3302 is not recognized by the computing device 102.

While some implementations may simply store radar-signal characteristics and correlate them to the recognized gesture, other implementations may utilize or store other data along with the radar-signal characteristics themselves. For example, a weighting may be determined for one or more radar-signal characteristics stored by the computing device 102. When the first radar-signal characteristic 3304 or the second radar-signal characteristic 3310 is stored by the computing device and correlated to the first gesture, a weighting may be stored or altered to indicate a confidence in each characteristic's correlation to the first gesture.

Furthermore, contexts or other data about the gestures may be used to determine the weighting of the first radar-signal characteristic 3304 or the second radar-signal characteristic 3310. For example, a shorter amount of elapsed time between the ambiguous gesture 3302 and the other gesture 3308 may indicate that the ambiguous gesture 3302 is likely the first gesture. Thus, the weighting value for the first radar-signal characteristic 3304 or the second radar-signal characteristic 3310 may indicate a higher confidence in the correlation of the first radar-signal characteristic 3304 or the second radar-signal characteristic 3310 to the first gesture. When a larger amount of time has elapsed between the ambiguous gesture 3302 and the other gesture 3308, the ambiguous gesture 3302 may be less likely to be the first gesture. Therefore, the weighting value for the first radar-signal characteristic 3304 or the second radar-signal characteristic 3310 may indicate a lower confidence in the correlation of the first radar-signal characteristic 3304 or the second radar-signal characteristic 3310 to the first gesture. In some instances, storing the weightings along with the first radar-signal characteristic 3304 and the second radar-signal characteristic 3310 may improve future detection of the first gesture. Machine learning may also or instead be used to determine how to weight various timings, contexts, and radar-signal characteristic similarities according to the description of FIGS. 7-10 and elsewhere herein.

Contextual information may be used or stored when correlating the ambiguous gesture 3302 to the first gesture. For example, the computing device 102 may determine contextual information regarding the performance of the ambiguous gesture 3302 (e.g., contextual information from when the ambiguous gesture 3302 was performed). The contextual information may include, for example, a position of the user 104 or orientation of the user 104 relative to the computing device 102 or any other type of contextual information described in this document (e.g., with respect to FIGS. 25-31). The contextual information may include a non-radar-signal characteristic of the ambiguous gesture 3302 sensed during the performance of the ambiguous gesture. As non-limiting examples, other, non-radar sensors may include an ultrasound detector, camera, ambient light sensor, pressure sensor, barometer, microphone, or biometric sensor, as well as others described herein. The contextual information may be stored with the first radar-signal characteristic 3304 or the second radar-signal characteristic 3310 to enable the computing device 102 to recognize the first gesture more accurately in the future. For example, the computing device 102 may store characteristics of the first gesture in different orientations or positions of the user 104 relative to the computing device 102. In this way, more-accurate comparisons may be made by comparing a gesture with appropriate characteristics for a current context in which the gesture is performed. Additionally or alternatively, the contextual information may be used to adjust weighting values stored with the radar-signal characteristics.

The computing device 102 may also compare the ambiguous gesture 3302 to the other gesture 3308 to determine if the gestures are similar and thus whether the ambiguous gesture 3302 is likely the first gesture. For example, the gesture module 3306 may compare the first radar-signal characteristic 3304 to the second radar-signal characteristic 3310 and determine that the first radar-signal characteristic 3304 has a correlation to the second radar-signal characteristic 3310 that is above a confidence threshold. While this threshold may not be sufficient to recognize the gesture, it is sufficient to indicate some reasonable probability (e.g., a 40, 50, or 60 percent likelihood versus an 80 or 90 or 95 percent threshold to recognize a gesture) that the gestures are correlated. In determining that the first radar-signal characteristic 3304 and the second radar-signal characteristic 3310 are correlated, the computing device 102 determines that the ambiguous gesture 3302 is the first gesture.

In addition to gestures, the computing device 102 may use non-gestural commands to correlate the first gesture. For example, after recognizing the other gesture 3308 (e.g., correlating the other gesture 3308 to the first gesture), the computing device 102 may inquire whether the ambiguous gesture 3302 was the command associated with the first gesture. The user 104 may respond without using gestures (e.g., through touch or sound) to confirm the intended gesture that the ambiguous gesture 3302 was meant to convey. In other instances, the user may provide feedback to the computing device 102 to help identify the ambiguous gesture 3302 through a non-gestural command without being prompted by the computing device 102.

While the example is illustrated with respect to a single computing device 102, it should be noted that continual in-line learning may be performed with multiple computing devices. For example, the ambiguous gesture 3302 may be detected at a first computing device and the other gesture 3308 may be detected at a second computing device. The first computing device and the second computing device may be configured to communicate information across a communication network. In this way, the ambiguous gesture 3302 may be detected by the first computing device in a first region proximate to the first computing device, and the other gesture 3308 may be detected by the second computing device in a second region proximate to the second computing device. As such, the computing devices may utilize continual in-line learning even when located in different areas—for example, different rooms within a home.

Furthermore, the other gesture may not be recognized using a radar system but still provide information useful to correlate radar-signal characteristics of the ambiguous gesture to the first gesture. Assume that the computing device 102 did not recognize the ambiguous gesture as the first gesture. The user 104 may perform an additional gesture that is detected (and recognized as the first gesture in another, non-radar manner) by the computing device 102 using another sensor that is not associated with the radar system (examples listed elsewhere herein). Based on the indication of the additional gesture received at the other sensor, the computing device 102 may determine that the additional gesture is the first gesture. Similarly to in the continual in-line learning described above, the computing device 102 may determine, based on the additional gesture being the first gesture, that the ambiguous gesture 3302 is correlated with the first gesture. As such, the computing device 102 may store a radar-signal characteristic of the ambiguous gesture with the first gesture, thereby enabling improved recognition.

It should be noted that various forms of gesture recognition may be used to recognize the performed gestures. For example, implementations exist in which unsegmented recognition may be used to recognize the ambiguous gesture. In particular, unsegmented gesture recognition may be implemented without prior knowledge or a wake-up-trigger event indicating that the user is going to perform the ambiguous gesture. Regardless of implementation, however, continual in-line learning may enable the computing device 102 to continually improve the accuracy of gesture recognition, even for the most difficult-to-recognize gestures.

Furthermore, while the term "continuous" and "continually" are used to describe continual in-line learning, note that the techniques are not required to be used at all times or forever but rather that the techniques, when used, can operate to continually and/or incrementally improve future gesture recognition. The term "in-line" is also used herein to describe one way in which the techniques "learn" to better recognize and/or detect gestures and so forth. This "in-line" term is meant to convey that the techniques learn how better to detect or recognize gestures as part of, incident with, or through the process of detecting and/or recognizing gestures. In contrast, an explicit training program (e.g., where the device trains a user to perform a gesture in a particular way) is not "in-line" learning. Thus, these techniques for continual in-line learning can improve gesture recognition without requiring separate training beyond normal user interaction with the device. Separate training can be used in conjunction with, or prior to, these techniques, but such is not required by the techniques.

In-Line Learning Based on User Inputs

Figure 34:
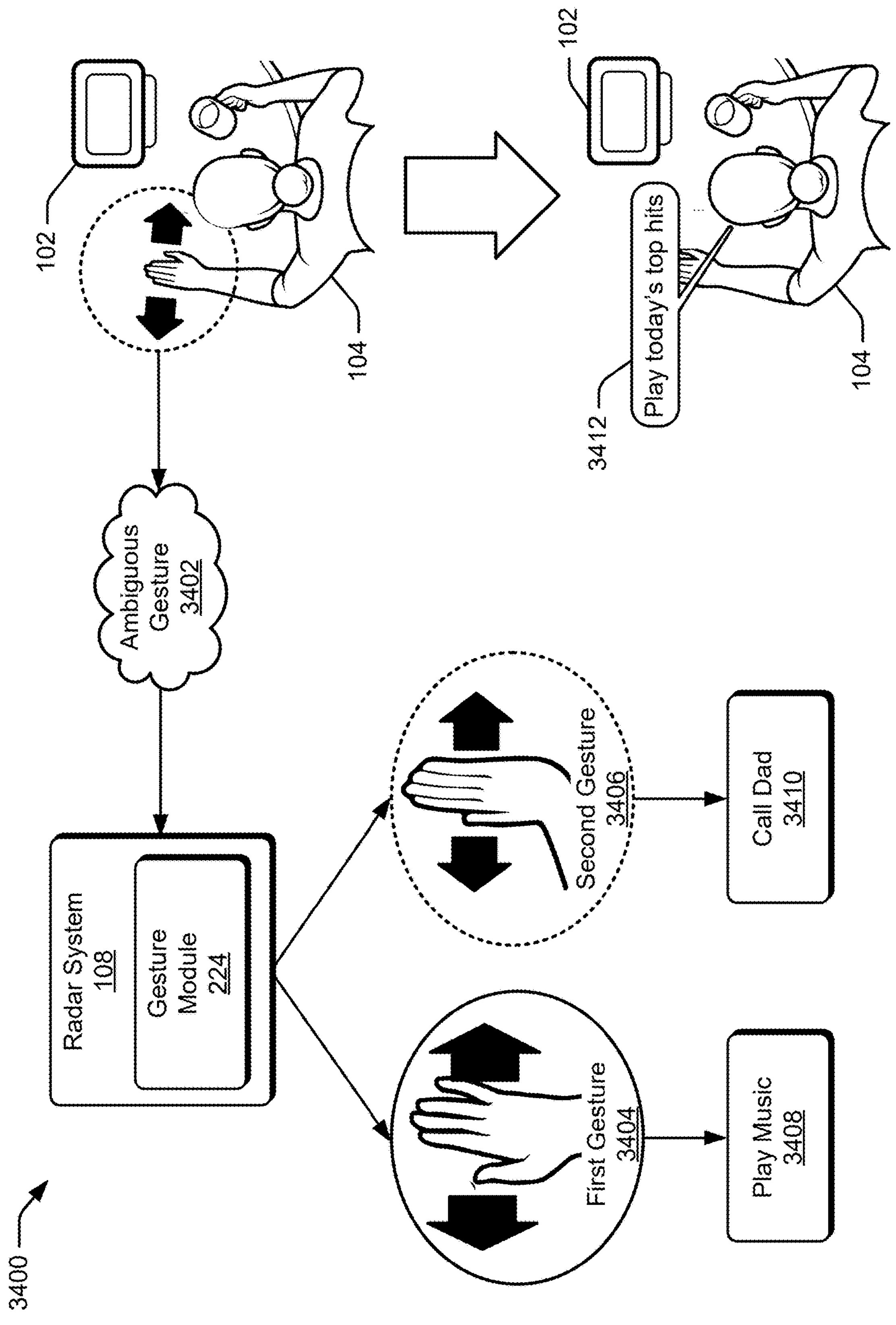
FIG. 34 illustrates an example method of in-line learning based on user inputs to improve ambiguous gesture recognition.

FIG. 34 illustrates an example of in-line learning based on user inputs to improve ambiguous gesture recognition. In an example environment 3400, a user 104 is positioned in view of a computing device 102. The computing device 102 may include a radar system 108 that provides radar data to a gesture module 224. In the illustrated example, the user 104 performs an ambiguous gesture 3402 that is identified as having one or more particular radar-signal characteristics. The gesture module 224 attempts to recognize the ambiguous gesture 3402 as a known gesture (e.g., through unsegmented detection without a wake-up trigger event indicating that the user 104 is going to perform the gesture), which may require the gesture to be associated with the known gesture within predetermined confidence threshold criteria.

In this example, the confidence threshold criteria is not met, and as a result the ambiguous gesture 3402 cannot be recognized as a particular gesture but is instead associated with one or more known gestures (e.g., a first gesture 3404 and a second gesture 3406). Specifically, the gesture module 224 may compare the one or more radar-signal characteristics of the ambiguous gesture 3402 to stored characteristics associated with the one or more known characteristics. If a correlation is determined between the one or more radar-signal characteristics of the ambiguous gesture and a stored gesture, the ambiguous gesture 3402 may be associated with the stored gesture (for how correlation can be performed see FIGS. 7-17, 25, and accompanying description). An ambiguous gesture may be associated with multiple stored gestures, due to having similarities to each of the multiple stored gestures, and the gesture module 224 may fail to recognize the ambiguous gesture as a particular known gesture. An ambiguous gesture may instead be associated with but one stored gesture but not be recognized as sufficient to meet predetermined confidence threshold criteria.

In general, if the computing device 102 is unable to recognize the ambiguous gesture 3402 as one of the known gestures, the ambiguous gesture 3402 may not cause the computing device 102 to perform a command. For example, in FIG. 34, the ambiguous gesture 3402 is associated with the first gesture 3404, which corresponds to a play-music command 3408, and the second gesture 3406, which corresponds to a call-Dad command 3410. Given that the computing device 102 was unable to recognize the ambiguous gesture 3402 as one of the two recognized gestures with the corresponding commands, the computing device 102 may not perform either command. Instead, the computing device 102 may remain idle until the command is requested using a gesture or another form of input.

In some cases, the computing device 102 may provide an indication that the ambiguous gesture 3402 was not recognized, such as through a notification to the user 104 using a display or speakers. In some instances, however, the user 104 may perform the command or request performance of the command without being prompted (e.g., requested) by the computing device 102. When the computing device 102 does not perform the desired command in response to the ambiguous gesture 3402, the user 104 may choose to perform the command themself or initiate the command through a different input type (e.g., a non-radar input, a touch input through a touch-sensitive display or keyboard, or an audio input through a voice-recognition system).

As illustrated, the user 104 uses a voice command 3412 to request the computing device 102 to "play today's top hits." As a result, the computing device 102 may receive the voice command 3412 from the user 104 and begin playing music (e.g., using an application stored on the device or through a network connection to a media service). In general, a user input may change an operating state of the computing device 102 or any other connected device. For example, the computing device 102 may begin playing music, maintaining a timer, or performing any other operation. Any of these changes in the operating state may indicate that the user 104 has performed or requested the performance of a command.

In example environment 3400, the user 104 performed the voice command 3412 after the computing device 102 failed to respond to the ambiguous gesture 3402, and thus it may be likely that the user 104 intended the ambiguous gesture 3402 to cause the computing device 102 to perform the same action as the voice command 3412. As such, the computing device 102 may determine if a command performed by or in response to the voice command 3412 is the same as or similar to a command corresponding to the gestures with which the ambiguous gesture 3402 was associated (e.g., the first gesture 3404 and the second gesture 3406). For example, the computing device 102 may determine that the voice command 3412 was the same as or similar to the play music command 3408 corresponding to the first gesture 3404 because both commands caused the computing device to play music.

After determining that the voice command 3412 is the same as a command correlated to the associated gestures, the computing device 102 may store the one or more radar-signal characteristics of the ambiguous gesture 3402 in association with the first gesture 3404 to enable the gesture module 224 to better recognize a future performance of the first gesture 3404. The gesture module 224 may thus utilize a space-time machine-learned model associated with one or more convolutional neural networks to improve the detection of the ambiguous gesture 3402. In aspects, the computing device 102 may prompt the user 104 to confirm that the ambiguous gesture 3402 is the known gesture before storing the radar-signal characteristics in association with the known gesture (e.g., by providing a notification on the display and accepting a confirmation from the user 104). In this way, the computing device 102 may eliminate false associations of radar-signal characteristics with known gestures. In some examples, the radar-signal characteristic associated with the ambiguous gesture 3402 may be associated with a specific stored radar-signal characteristic of the known gesture to enable the gesture module 224 to increase the confidence (e.g., weighting) of associations between specific radar-signal characteristics and a known gesture.

In some implementations, the computing device 102 may determine a period of time between the performance of the ambiguous gesture 3402 and the user input indicating a performance or requested performance of a command (e.g., voice command 3412). This period of time may be used to determine if the command performed as a result of the user input is the same as a command associated with one of the known gestures with which the ambiguous gesture 3402 was associated. Additionally or alternatively, this period of time may be used to determine a weighting of the radar-signal characteristic in association with the known gesture, as described in FIG. 33.

In aspects, the computing device 102 may determine if a different command is performed or requested to be performed within the period of time between the performance of the ambiguous gesture 3402 and the user input indicating the performance or requested performance of a command (e.g., as described in FIG. 33). The different command may be different than the commands (e.g., play music command 3408 and call Dad command 3410) corresponding to the known gestures (e.g., the first gesture 3404 and the second gesture 3406) with which the ambiguous gesture 3402 is associated. As such, the one or more radar-signal characteristics of the ambiguous gesture 3402 may be stored if it is determined that the different command is not performed or requested within the period of time between the performance of the ambiguous gesture 3402 and the user input indicating the performance or requested performance of the voice command 3412.

It should be noted that the voice command 3412 is but one example of a user input that can be used for in-line learning, and the techniques may instead or additionally utilize other forms of user input such as touch commands (e.g., the user 104 touches a touch-sensitive display of the computing device 102, the user 104 uses their voice to control the computing device 102 through a voice-recognition system of the computing device 102, or the user 104 types a command on a physical or digital keyboard). It is also important to note that the user input may not be restricted to being received at the computing device 102. For example, the user input may be received at any other device with which the computing device 102 may communicate (e.g., other smart home devices). As a non-limiting example, a user input on another device may include setting a timer on a smart appliance, actuating a smart light switch or smart door lock, or adjusting a smart thermostat.

In general, the gesture module 224 may continue to improve gesture recognition of a user's unique performance of gestures, thereby improving the user's confidence in gesture recognition and increasing user satisfaction. The techniques for in-line learning may enable the gesture module 224 to be trained without segmented teaching using a gesture-training event. For example, the gesture module 224 may improve gesture recognition without the computing device 102 explicitly teaching the user 104 a gesture or requesting the user 104 perform the gesture. Therefore, the techniques may not require an additional burden on the user 104 to train the computing device 102.

In-Line Learning

Figure 35:
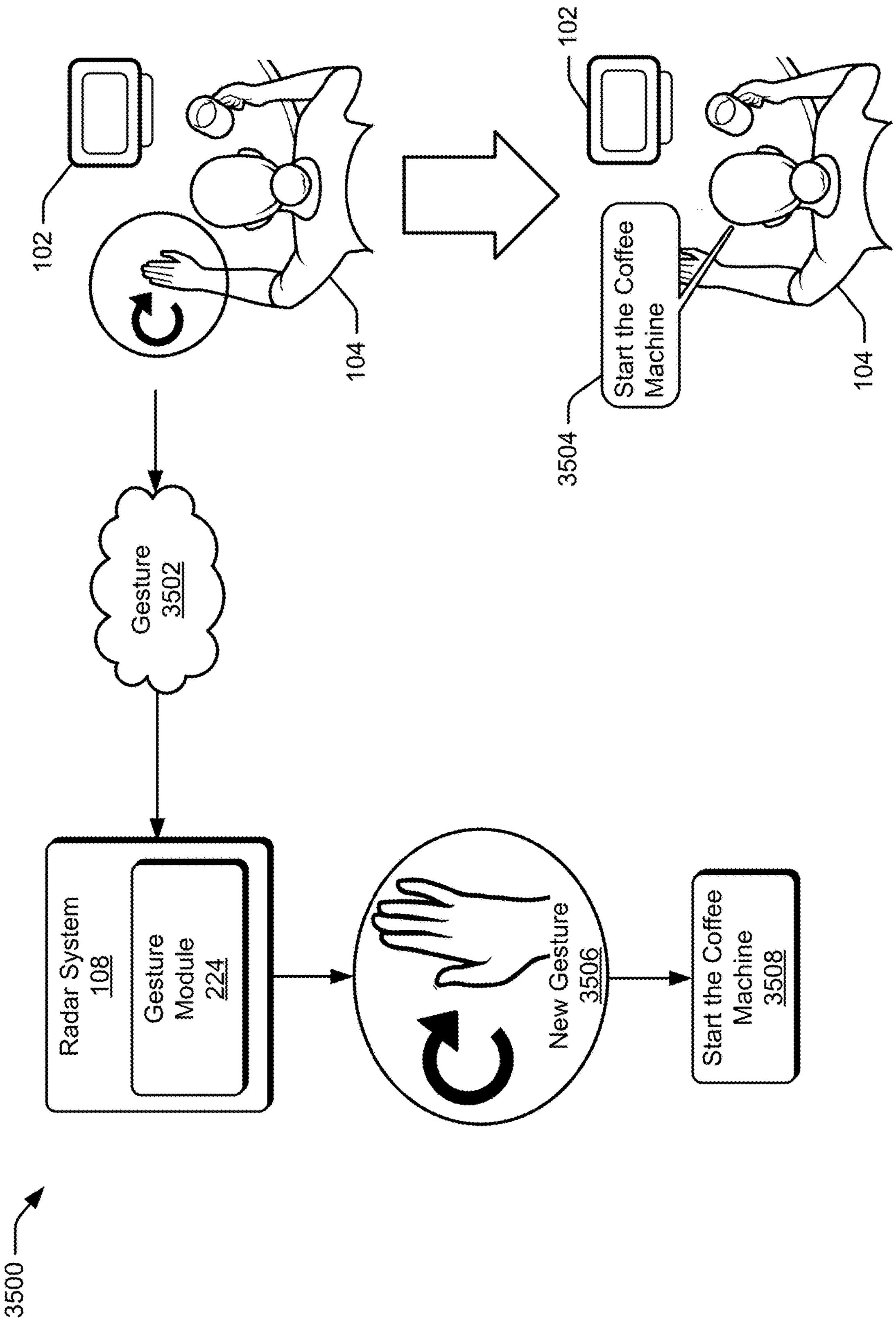
FIG. 35 illustrates example techniques for in-line learning of new gestures for radar-enabled computing devices.

FIG. 35 illustrates techniques for in-line learning of new gestures for radar-enabled computing devices. In an environment 3500, the user 104 is positioned in a field of view of the computing device 102. The user 104 performs a gesture 3502 that is detected by the radar system 108 of the computing device 102, and a radar-signal characteristic is determined from the gesture 3502 by the gesture module 224 (e.g., as described above). In this example, the user 104 rotates their hand to imitate an act of pouring coffee to indicate that the user 104 would like the computing device 102 to start a coffee machine. In detecting the gesture 3502, the computing device 102 may determine that the gesture 3502 is an intentional motion performed by the user 104 and not a background motion that is not related to a specific gesture intended for the computing device 102.

The radar-signal characteristic of the gesture 3502 is compared to one or more stored radar-signal characteristics associated with one or more known gestures. In the environment 3500, the comparison is effective to determine a lack of correlation between the gesture 3502 and the one or more known gestures. Specifically, the comparison may be ineffective to correlate the gesture 3502 or the associated radar-signal characteristic to the one or more known gestures with a desired confidence level (e.g., at a low-confidence threshold rather than a high-confidence threshold). For example, the associated radar-signal characteristic may not be sufficient to satisfy the confidence threshold criteria to be correlated to any of the stored radar-signal characteristics.

Given that the gesture 3502 lacks correlation to the one or more known gestures, the computing device 102 fails to recognize and respond to the gesture 3502. As shown, the user 104 provides the command 3504 (e.g., a voice command), which indicates that the user 104 would like the computing device 102 to start the coffee machine. In some cases, the computing device 102 may determine that the command 3504 is not the same as or similar to one or more known commands corresponding to the one or more known gestures. While the command 3504 is shown as the user 104 using their voice to ask the computing device 102 to "start the coffee machine," other commands may be included, such as those input through a touch-sensitive display or keyboard of the computing device 102 or another connected device or through the user physically performing the command (e.g., physically starting the coffee machine).

In response to determining a lack of correlation between the gesture 3502 and the one or more known gestures and receiving the command 3504, the computing device 102 may determine that the gesture 3502 is a new gesture 3506 that has not been learned by the computing device 102 or associated with a specific command. In some cases, the computing device 102 may provide some indication of this determination to the user 104, such as by displaying a message that asks the user if the gesture is a new gesture (e.g., a gesture that has not been taught to the computing device 102 or assigned to a specific command). The user may respond by indicating that the gesture is a new gesture.

The computing device 102 may determine that the gesture 3502 is the new gesture 3506 and then store the radar-signal characteristic associated with the gesture 3502 to enable the computing device 102 to recognize a performance of the gesture 3502 in the future. Also, the computing device 102 associates the new gesture 3506 with a command to start the coffee machine 3508. In this way, the computing device 102 may seamlessly learn new gestures at the convenience of the user 104. Also, by so doing, the computing device 102 may not be limited to learning new gestures during a gesture-training period.

Although a specific implementation is shown in the environment 3500, it should be noted that other implementations should be recognized as being within the scope of this disclosure. For example, the command 3504 may not be required to be performed after the gesture 3502 is performed. In general, the command 3504 may be performed in temporal proximity to the gesture 3502, such as within a predetermined time limit of two seconds, five seconds, ten seconds, or thirty seconds. Similarly, the command 3504 may be performed before, after, or at the same time as the performance of the gesture 3502. As specific examples, the user 104 may perform the command 3504 prior to performance of the gesture 3502, or the user 104 may perform the command 3504 simultaneously with performing the gesture 3502 (e.g., by speaking the command 3504 while performing the gesture 3502). In some implementations, the command 3504 will be received by the computing device 102 without the computing device 102 detecting an intervening gesture or another command initiated by the user 104.

In some examples, the computing device 102 may learn new gestures independently for different users. For example, when the computing device 102 stores the radar-signal characteristic of the gesture 3502, the computing device 102 may associate the radar-signal characteristic and the new gesture 3506 to a specific user. In this way, recognizing the gesture 3502 in the future may include distinguishing the associated user and recognizing the performance of the gesture. To enable this determination, the computing device 102 may determine another radar-signal characteristic that is associated with the presence of the user that may be used to determine the user as a registered user. When a new gesture is determined and its radar-signal characteristic is stored, the other radar-signal characteristic associated with the presence of the user may also be stored to enable the computing device to recognize the user at a future time. By independently learning new gestures associated with each user, the computing device 102 may associate different gestures with different commands based on the user. For example, the computing device 102 determines that the gesture 3502 is a new gesture for the user 104 but a known or unknown gesture for another user. In this way, the computing device 102 may enable a user-customizable gesture control technique.

Context-Sensitive Sensor Configuration

Figure 36:
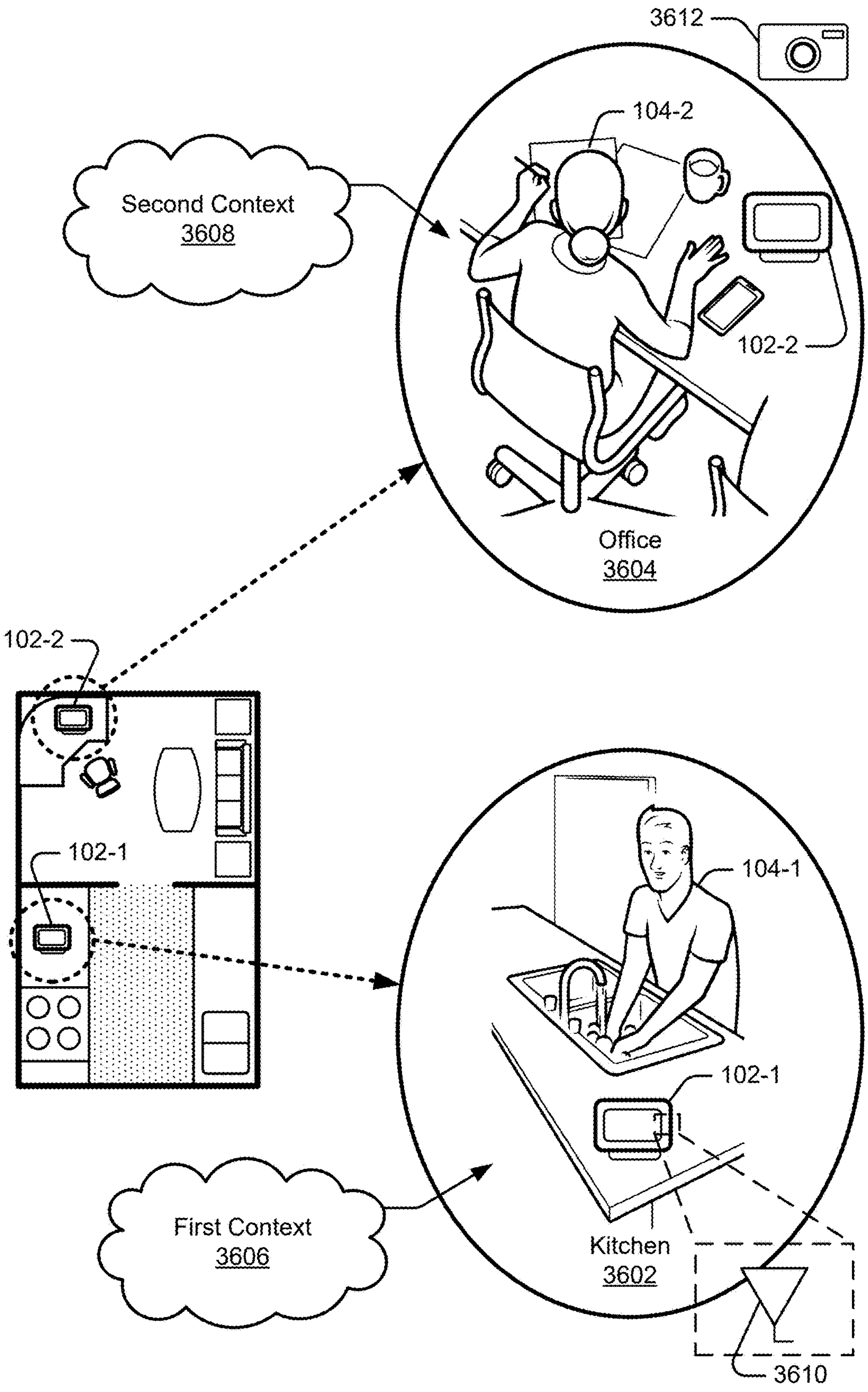
FIG. 36 illustrates example techniques for configuring a computing device with a context-sensitive primary sensor.

FIG. 36 illustrates example techniques for configuring a computing device with a primary sensor. An example environment 3600 illustrates two different computing devices: a computing device 102-1 implemented within a kitchen 3602 and a computing device 102-2 implemented within an office 3604. Within the kitchen 3602, a user 104-1 is located within a field of view of the computing device 102-1. Similarly, a user 104-2 is illustrated within a field of view of the computing device 102-2. The computing device 102-1 may determine a first context 3606 associated with the conditions in which a gesture is performed by the user 104-1, while the computing device 102-2 may determine a second context 3608 associated with the conditions in which a gesture is performed by the user 104-2.

The user 104-1 may perform a gesture in a region within the kitchen 3602. The computing device 102-1 may detect the gesture using one or more sensors that are configured to measure activity in the region. The way in which each sensor is used or an accuracy or precision of each sensor to detect and recognize the gesture may vary based on a context associated with the region in which the gesture is performed. For example, the computing device may determine a context associated with the region in which the user performs a gesture. The context may be determined from any number of details related to the region in which the gesture is performed. For example, the context may be determined in accordance with one or more aspects of the context determination described with reference to FIGS. 25-31.

In some implementations, the context may be determined based on ambient conditions within the region in which the gesture is performed. For example, the computing device may determine conditions related to light, sound, interference, an arrangement of objects, or movement within the region. Some sensors may be more capable of recognizing gestures in a particular set of conditions. For example, an optical sensor (e.g., a camera) may be more capable of recognizing a gesture in a well-lit environment. In comparison to an optical sensor, a radar sensor may experience less degradation in a poorly lit environment. Therefore, a camera may be less capable of being successfully used to recognize a gesture in an environment where lighting conditions are poor.

In another example, a radar sensor may be ineffective to recognize a gesture when a large amount of movement is present within an environment. For example, a radar sensor may fail to differentiate between different movements within an environment. In a very active environment in which there is a large amount of movement, a non-radar sensor (e.g., a camera) may be more capable of recognizing a gesture.

In another example, a radar sensor may fail to recognize a gesture when a large amount of interference is present in an environment. For example, multiple radar devices implemented in proximity to one another may cause interference due to cross-signaling between the devices. When a computing device attempts to recognize a gesture, this interference may increase a noise floor in radar-receive signals and reduce the ability of the radar sensor to recognize a gesture.

A microphone may be used to supplement gesture recognition (e.g., to determine other details related to the performance of the gesture). In high-noise environments, however, such audio sensors may be less effective in providing contextual details about a gesture. Thus, audio sensors may be less capable of supplementing gesture recognition in a high-noise environment.

The context may alternatively or additionally be based on a location in which the computing device resides. For example, the computing device may determine it is located within a kitchen. Based on this determination, the computing device may be able to determine which particular user is likely to perform a gesture, the type of gesture that is likely to be performed, or the ambient conditions that are likely to be present. These details may be utilized to determine which sensor is likely to be most capable to recognize a gesture. For example, in the kitchen, the user may be most likely to perform gestures related to cooking (e.g., controlling appliances, starting timers, or searching for recipes). The computing device may determine which sensors are most capable of detecting these specific gestures (e.g., based on past performance and recognition).

The location may provide information on the ambient conditions that are likely to be present in the region in which the gesture is performed. For example, a computing device located in a bedroom may be likely to exist in a low-light condition, a computing device located in a living room may be likely to be in a high-noise or high-movement environment, and so on. Additionally or alternatively, the location of the computing device may provide information related to which users are likely to perform a gesture or which gestures are likely to be performed. For example, a particular user or set of users may be more likely to be present in particular areas of a house, an office, or another environment.

As an alternative or in addition to using the location to determine which user is performing the gesture, user detection (e.g., as described in this document) may be used to identify the particular user performing the gesture. As illustrated, the computing device 102-1 may determine that the particular user 104-1 is performing the gesture. In doing so, the first context 3606 may include information related to the user 104-1, such as data relating to hand size, gesture performance speed, gesture performance clarity, and so on. These details may be used to determine the capability of a particular sensor to recognize a gesture performed by the user 104-1. For example, a radar sensor may be less capable of recognizing a gesture performed by a user with smaller hands. As another example, certain sensors may be more capable of accurately recognizing gestures from a particular user based on previous performances and detections of gestures performed by the user. In some implementations, the user may be most likely to perform particular gestures (e.g., based on past performance and detection of gestures by the user), which certain sensors may be more capable of recognizing.

The context may be determined based on a time of day when the gesture is performed. This information may provide data relating to any of the other context-related data. For example, in the evening, a computing device may be more likely to be in a low-light condition, gestures may be more likely to be related to evening events (e.g., cooking), or a particular set of users may be more likely to be present. Similarly, other times of day may have other characteristics that may be beneficial for context determination.

The context may be related to foreground or background operations of the computing device. The operations of the device may provide useful indications of gestures that are likely to be performed or users that are likely to perform gestures. Recent operations that adjust conditions within the environment (e.g., lighting, audio, and so on) may provide an indication of the ambient conditions in the region in which the gesture is performed. This data may be used to determine the context within the region.

It should be noted that these are but some examples of ways in which context is determined and how a determined context may be used to determine sensor capability. Thus, other examples of context determinations may be used to determine sensor capability, such as contexts described with respect to any of FIGS. 25-31. Correlations between data and contexts or contexts and sensor capability may be determined through any number of techniques, including any of the machine-learning techniques described in this document.

Turning to the illustrated example of the kitchen 3602, the computing device 102-1 may determine the first context 3606 of a particular region. The first context 3606 may relate to a location in which the gesture is performed (e.g., the kitchen 3602), a particular user performing the gesture (e.g., user 104-1), ambient conditions of the environment in which the gesture is performed, an orientation or position of the computing device 102-1 in relation to the user 104-1 and vice versa (e.g., if the user 104-1 is within a field of view of a particular sensor), a time of day, background or foreground operations of the computing device (e.g., as described with respect to FIG. 30), and so on. Based on the first context 3606, the computing device 102-1 may determine a capability of one or more sensors of the computing device 102-1 to provide data useful to recognize the gesture. The computing device may include multiple sensors, such as a radar sensor 3610 and a non-radar sensor (e.g., an optical sensor 3612) or multiple sensors of the same type. Although specific configurations of sensors are described with respect to FIG. 36, other sensors may be implemented, which are listed elsewhere herein.

The computing device 102-1 may determine a capability of a first sensor to recognize a gesture performed in a particular region. For example, the computing device 102-1 may determine that the radar sensor 3610 is capable of recognizing the gesture based on the first context. The capability of the sensor to recognize the gesture may be on a gradual scale so that different sensor capabilities may be compared to one another. The capability may be determined from previous correlations between context and gesture recognitions (e.g., from gesture recognitions in an environment with the particular context). In addition to determination of the capability of the first sensor to recognize the gesture performed in the region, a capability of a second sensor to recognize the gesture may be determined.

Once the capabilities of the one or more sensors are determined, the capabilities may be compared to determine which sensor is more capable of recognizing a performance of the gesture within the region. The more capable sensor may be determined as the primary sensor, and the computing device may be configured to use the primary sensor preferentially over other sensors. In aspects, the computing device may use the primary sensor preferentially by weighing the data collected by the primary sensor more heavily. The computing device may be configured to save power by configuring the device with the primary sensor through reducing the power supplied to other non-primary sensors and in some cases increasing the power supplied to the primary sensor.

In the particular example illustrated, the radar sensor 3610 is configured to be the primary sensor. In aspects, the radar sensor 3610 is determined to be the more capable or most-capable sensor due to a low-light condition that may entail the region having an insufficient amount of light to illuminate the region and allow an optical sensor to recognize the gesture. In some implementations, the radar sensor 3610 may be more capable to provide data to recognize the gesture based on the particular preferences of the user 104-1, the type of gesture that is most commonly performed in the region, or the orientation of the radar sensor 3610 and the other sensors relative to the region or one another. In general, it should be appreciated that the primary sensor may be determined based on any of the determined contexts or any correlation between a particular context and a particular capability of a sensor to be used to recognize a gesture in that context.

As a result of configuring the radar sensor 3610 as the primary sensor of the computing device 102-1, the data collected by the radar sensor 3610 may be used preferentially compared to the data collected by other sensors. For example, the data collected by the radar sensor 3610 may be weighted more heavily during gesture detection or recognition than data collected by other sensors. Additionally or alternatively, the computing device 102-1 may be configured with a primary sensor by altering settings of the computing device 102-1 during or after the detection of the gesture, such as with a different primary sensor than the radar sensor 3610.

As with the first context 3606 determined by the computing device 102-1, the computing device 102-2 may determine the second context 3608 related to the environment in which the user 104-2 performs a gesture. The second context 3608 may be used to determine the capability of the one or more sensors of the computing device 102-2 to detect the gesture performed by the user 104-2 within a particular region of the office 3604. The capabilities of the one or more sensors may be compared to determine a most capable sensor, and the most capable sensor may be configured as a primary sensor in the computing device 102-2.

As illustrated, the optical sensor 3612 is determined as the primary sensor. In aspects, configuring the computing device 102-2 with the primary sensor may be performed prior to, during, or after recognition of the gesture. In response to configuring the computing device, the user may be notified that the computing device has been configured with the primary sensor. For example, the computing device may provide a notification to the user, which may include a tone, light, text, interface notification, or vibration.

In aspects, the optical sensor 3612 may be determined as the primary sensor because the second context 3608 indicates that the region in which the gesture is performed is well lit, the user 104-2 prefers the optical sensor 3612 as the primary sensor, a fine resolution is required for gesture recognition based on ambient conditions or user characteristics, a large amount of radar interference is present, a certain type of gesture is most likely to be performed in the region at a current or future time, or any other context exists that may favor the optical sensor 3612. The computing device 102-2 may be configured such that the optical sensor 3612 is used preferentially over other sensors within the computing device 102-2 to improve the accuracy of gesture detection and/or recognition.

Through the techniques described, a computing device may be configured to optimally detect a gesture based on a context in which the gesture is performed. In doing so, the computing device may adapt to each environment to accurately detect and recognize gestures, even in environments that pose significant difficulties for gesture recognition.

Detecting User Engagement

Figure 37:
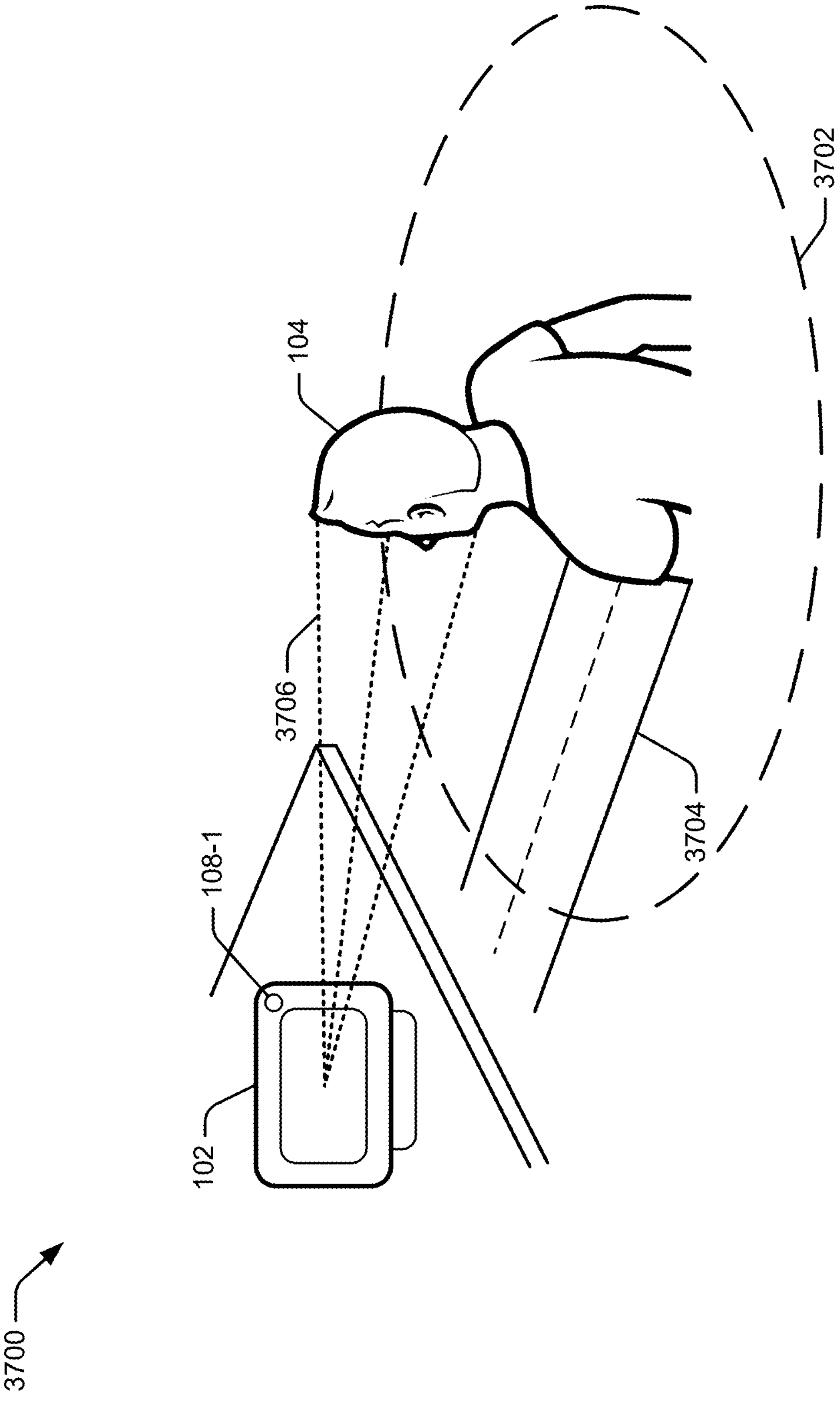
FIG. 37 illustrates an environment in which techniques for detecting user engagement with a device may be implemented.

FIG. 37 illustrates an example environment in which techniques for detecting user engagement with an interaction device can be performed. Although illustrated (and referred to) as the computing device 102, the interaction device may be another device coupled to the computing device 102 and implementing a user interface to enable interaction with the user 104. In some instances, it may be beneficial for the computing device 102 to determine if the user 104 is likely to interact with the computing device 102. For example, when interaction between the user 104 and the computing device 102 is imminent, the computing device 102 may display information that may be relevant to the user 104, such as temporal information, device status information, notifications, and the like. The computing device 102 may determine the likelihood that the user 104 is going to interact with the device by determining a current or projected (e.g., future, in temporal proximity) engagement of the user with the computing device 102.

The computing device 102 may utilize information relating to the user 104 or the environment 3700 to determine the user's engagement with the device. The computing device 102 may utilize a radar system (e.g., radar system 108) or any other sensor system of the device to determine information about the user 104 or the environment 3700 that may be useful in detecting user engagement. The computing device 102 may transmit radar signals and receive reflections of these radar signals reflected off of the user 104 or the surrounding environment. These receive signals may be processed to determine characteristics of the user 104 or the environment 3700 that may be usable to determine an engagement of the user 104 with the computing device 102. For example, the computing device 102 may determine a proximity 3702 of the user relative to the computing device 102, and the determined proximity 3702 may provide indications of the user's engagement with the device.

In some instances, the computing device 102 may determine that the user 104 is more likely to engage with the device when the user is located within a particular proximity (e.g., less than or equal to a proximity threshold criterion) of the device. For instance, the computing device 102 or a sensor system that may be used for interaction with the user 104 (e.g., radar system, touch display, voice command, and the like) may have a particular range at which it may effectively detect or recognize the user's interaction with the device. Thus, it may be unlikely that the user 104 is intending to interact with the device when the user is distant from the device. In this way, proximity may be used to determine the user's engagement with the device, such as by determining a higher user engagement when the user is closer to the device.

Proximity alone, however, may be inadequate to accurately determine the user's engagement with the device. In some scenarios, the user 104 may happen to be in proximity to the computing device 102 without ever intending to interact with the computing device 102, such as when interacting with another device or a person that is located near the computing device 102 or when walking past the computing device 102. Thus, when proximity is used as a sole factor in determining user engagement, the computing device 102 may fail to accurately detect user engagement, thereby causing the computing device to perform sub-optimally.

To increase the accuracy of detections of user engagement, any number of factors may be used to determine user engagement, including, for example, projected proximity of the user relative to the computing device 102 or body orientation of the user relative to the computing device 102. Projected proximity of the user relative to the computing device 102 may include determining the rate at which the proximity of the user 104 to the computing device 102 is changing. In some instances, determining the projected proximity may include determining a pathway 3704 indicative of a direction in which the user 104 is moving. The pathway 3704 may be represented as a vector that indicates the direction and in some cases magnitude (e.g., speed) of the user's movement relative to the computing device. By determining a pathway of the user 104, in contrast to a simple change in proximity, the computing device 102 may more accurately determine if the user 104 is intending or not intending to engage with the computing device 102.

When the user 104 is moving toward the computing device 102, it may be likely that the user 104 is intending to interact with the device and thus moving toward the device to get within a field of view of the device or to see content displayed on the device. Other instances in which the user 104 is approaching the device, however, may be unrelated to the user's intention to interact with the device, such as when the user 104 is moving to pick up an object located close to the computing device 102. Therefore, it may be beneficial to determine the pathway 3704 of the user 104, which may be used to determine where the user 104 is likely to move. If the pathway 3704 is directed toward the computing device 102 (e.g., directly or near directly toward the device as shown in FIG. 37), it may be more likely that the user 104 is engaging with and likely to interact with the device. If, however, the pathway 3704 is not directed toward the device (e.g., moving away from the device or toward the device but not directly), it may be more likely that the user's approach to the device is coincidental and is not indicative of user engagement with the device (e.g., the user is just moving past the computing device).

The pathway 3704 of the user 104 may be determined in a number of ways, such as using subsequent position measurements or doppler measurements. In some cases, the pathway 3704 may be determined by comparing a current position of the user 104 to one or more historical locations of the user 104. The pathway 3704 may be determined from one or more historical movements of the user 104, which may include a direction or velocity. The current direction or speed (e.g., velocity when combined) may be compared to historical movements to determine an accurate representation of the user's pathway 3704 toward or away from the computing device 102. These historical movements can be immediately prior to the user's current location (e.g., a prior part of the user's pathway 3704) or can be recorded from prior movements, such as when the user a day before walked past the computing device 102. This sort of history can be used, either through building a machine-learned model as noted below or through heuristics or other manners. Thus, if a user has walked a path in the past and in following that historical path has repeatedly not interacted with (or has interacted with) the computing device 102, this information can be used to determine a low (or high) probability of an intent by the user 104 to engage or interact with the computing device 102.

In addition or as an alternative to the proximity 3702 or projected proximity, the computing device 102 may determine a body orientation 3706 of the user 104 to determine the user's engagement with the computing device 102. In one example, the body orientation 3706 may be based on a facial profile of the user 104. A radar system or other sensor system may be used to determine the location in which the user's face is pointed (e.g., if the facial profile is faced toward or away from the device). The body orientation 3706 may be based on the user's line of sight (e.g., a determination that the user is looking at or away from the computing device 102).

The body orientation 3706 may be determined from the user's body positioning, such as an orientation of the trunk or head of the user 104 toward or away from the computing device 102. The radar system or other sensor system may collect information relating to the user (e.g., radar-receive signals) to determine the body orientation of the user 104 by, for instance, collecting radar data to determine if a frontal profile of the user 104 (e.g., flat surface such as the stomach, chest, torso, shoulders, and the like) is facing the computing device 102. The body orientation 3706 may be used to determine a general direction of interest of the user's body, which may be toward or away from the computing device 102.

The body orientation 3706 may also or alternatively include the recognition of gestures by the user 104. For example, the computing device 102 may determine if the user is pointing or reaching toward the computing device 102, which may indicate a user's intent to engage or interact with the device. The gestures may include any number of gestures stored or not stored by the computing device 102. In some instances, when the computing device 102 detects or recognizes a gesture performed by the user 104, it may be likely that the user 104 is engaged with the device. The computing device 102 may determine if the gesture is a known gesture (e.g., a stored gesture). If the gesture corresponds to a known gesture, it may be likely that the user is engaged with the device (e.g., it is not an extraneous user movement that is not a "gesture"). The computing device 102 may determine the direction of these gestures to determine if the gestures are likely intended for the computing device 102. If the gestures are directed toward the computing device 102, the user 104 may be determined to have higher engagement with the computing device 102.

The computing device 102 may use any combination (e.g., including one or all) of factors to estimate the user's engagement or projected (e.g., future, in temporal proximity) engagement with the device. The factors may be weighed differently to enable each factor to have a greater or lesser effect on the determination of the user's engagement. In some instances, the computing device 102 may utilize at least two factors to estimate the user's engagement with the computing device 102. The computing device 102 may utilize a machine-learned model (e.g., 700, 802) in accordance with any machine-learning techniques, including those described herein. The machine learning may be supervised such that the user 104 interacts with the computing device 102 (e.g., through touch input, gesture input, voice command, or any other input method) to confirm the user's proximity, projected proximity, or body orientation relative to the device or the association between any of these determinations and the user's engagement.

The computing device 102 may further base an estimation of the user's engagement on the direction of the computing device 102 relative to the user 104. For example, if a display or a field of view of a sensor system (e.g., radar system) of the computing device 102 is directed toward the user 104, it may be more likely that the user 104 is engaged with the device. If, however, the display is pointed away from the user 104 or the user is outside the field of view of the sensor system of the device, it may be less likely that the user 104 is engaged with the device. In some instances, the direction of the computing device 102 may be utilized in combination with the proximity 3702, projected proximity, or body orientation 3706 of the user to determine user engagement. For example, if the computing device 102 determines that the user 104 is moving towards the computing device 102 (e.g., within a close-enough proximity), the user 104 may be determined to have a high level of engagement with the device. If the computing device 102 is directed in a particular direction and the user 104 is oriented across from the device and in an opposite direction (e.g., such that the computing device 102 and the user 104 are oriented toward one another) it may be likely that the user 104 is engaged with the device. Alternatively, if the user 104 is moving away from the directional orientation of the display, the computing device 102 may determine that the user 104 has a low level of engagement with the computing device 102.

The user's engagement may be used to determine the appropriate settings with which to configure the computing device 102. For example, if the user 104 is determined to be engaged with the device (e.g., a high engagement is determined), content that is useful to the user 104 may be displayed on the device. Similarly, if the user 104 is engaged and thus may be likely to interact with the device, a power usage of one or more sensor systems may be increased to better detect, recognize, or interpret the user's interaction with the computing device 102. The computing device may determine the identity of the user 104 to determine an appropriate setting for each level of engagement. For example, when an authorized or recognized user is engaged with the device, the computing device may decrease a privacy setting of the device to make applications or content of the device more available to the user 104 (e.g., the first privacy setting 2002 of FIG. 20). If an unauthorized user is determined to be engaged with the device, however, the privacy setting may be altered to a more restrictive setting to keep sensitive content from being revealed to the unauthorized or unrecognized user (e.g., the second privacy setting 2004 of FIG. 20). In other cases, the privacy setting of the computing device 102 may be adjusted based on user engagement without distinguishing the user 104.

When the user is determined not to be engaged with the device (e.g., a low engagement is determined), the computing device may similarly be adjusted to be configured based on the user's low level of engagement. For example, sensor systems of the computing device may be turned off or operated in a low-power mode. Similarly, the display of the computing device 102 may be dimmed or turned off to conserve power on the device. When the user 104 is not engaged with the device, device resources may be redirected to other tasks, such as maintenance tasks (e.g., updating software or firmware). In some cases, a privacy setting of the device may be increased to reduce the likelihood of sensitive content being released to an unauthorized user. It should be appreciated that although specific examples are described, other settings may be adjusted based on user engagement. Similarly, the computing device 102 may determine user engagement from other factors that may be useful in determining a user's likelihood to interact with a computing device. In this way, by detecting user engagement, a computing device may be altered to perform optimally in any number of situations based on a current or projected engagement by a user with the device.

Example Methods

Figure 38:
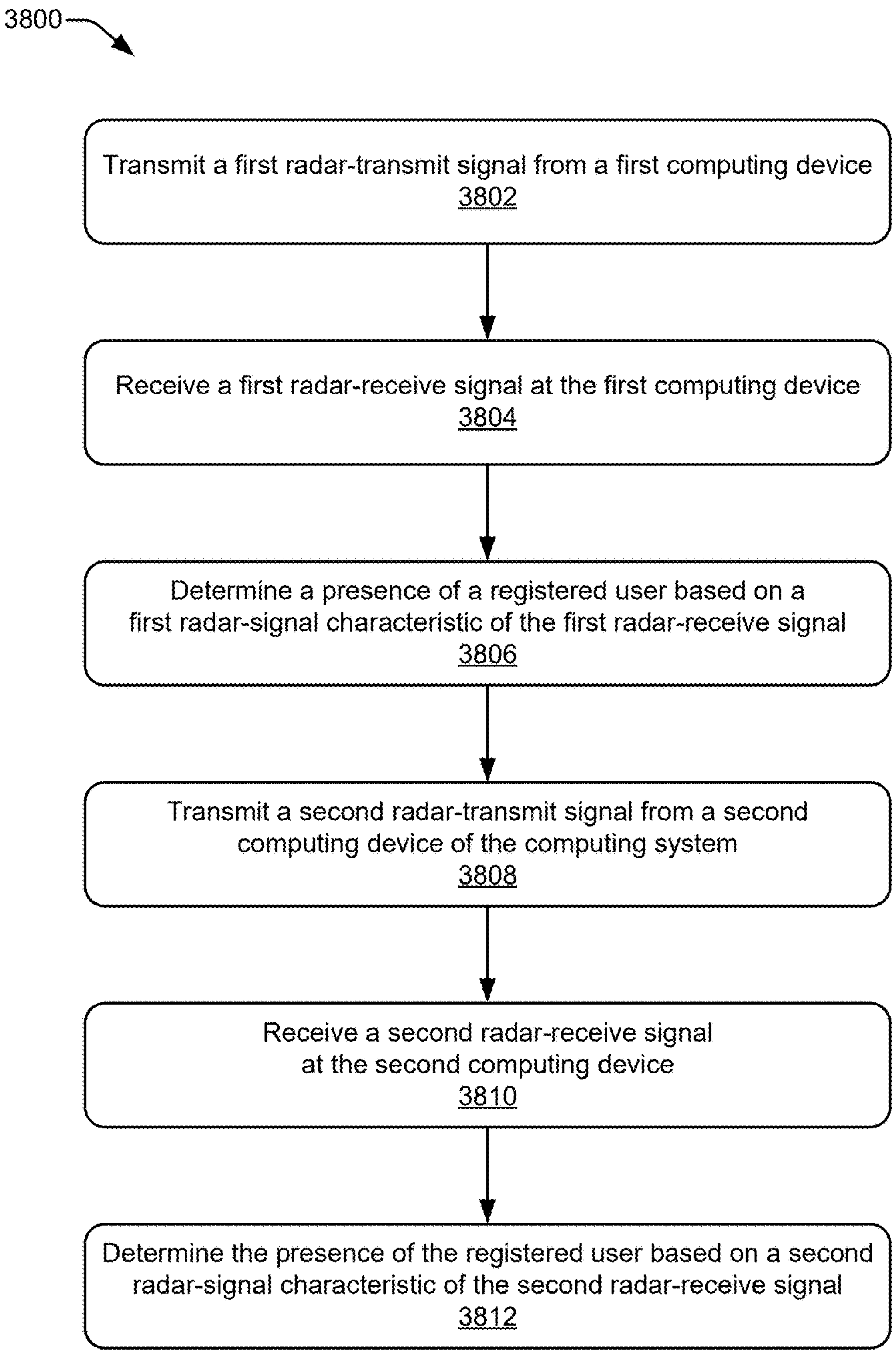
FIG. 38 illustrate an example method for determining presence of a registered user.

FIG. 38 illustrates an example method 3800 for a system of multiple radar-enabled computing devices. The method 3800 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 3802, a first radar-transmit signal is transmitted from a first computing device of a computing system. For example, a first radar-transmit signal 402-1 may be transmitted from a first radar system 108-1 of a first computing device 102-1 to detect whether a user 104 is present within a first proximate region 106-1 (e.g., FIGS. 1 and 20). The first computing device 102-1 may be a part of a computing system that comprises two or more computing devices 102-X with reference to FIGS. 3, 4, 21-23, 26-29, and 36. Each computing device 102 of the computing system may exchange information (e.g., radar-signal characteristics, stored information, operations in progress) with another device of the system by means of a communication network 302. This information may additionally be stored to one or more memories that may be local, shared, remote, or so forth. The first radar-transmit signal 402-1 may include a single signal, multiple signals that are similar or distinct, a burst of signals, continual signals, and so forth as described with reference to FIG. 4.

At 3804, a first radar-receive signal is received at the first computing device. For example, a first radar-receive signal 404-1 may be received by the first radar system 108-1 of the first computing device 102-1. The first radar-receive signal 404-1 may be associated with the first radar-transmit signal 402-1, which has been reflected off an object (e.g., the user 104) within the first proximate region 106-1. This reflected signal (the first radar-receive signal 404-1) may represent a modification of the first radar-transmit signal 402-1 in terms of time, amplitude, phase, or frequency.

At 3806, a presence of a registered user is determined based on a first radar-signal characteristic of the first radar-receive signal. For example, a presence of the registered user (with reference to FIGS. 1 and 21) may be determined based on a first radar-signal characteristic of the first radar-receive signal 404-1. This first radar-receive signal 404-1 may be reflected off an object (e.g., the registered user) and contain one or more radar-signal characteristics (e.g., associated with temporal, topological, and/or gestural information) that may be used to distinguish this object as the registered user. In particular, the first radar-signal characteristic of the first radar-receive signal 404-1 may be correlated with a first stored radar-signal characteristic of a registered user. The correlation may indicate a presence of the registered user within the first proximate region 106-1. These stored radar-signal characteristics may be stored on a local, shared, or remote memory that may be accessed by any computing device 102-X of the computing system. The first radar-signal characteristic may additionally be stored to the memory to improve the detection and distinction of the registered user at a future time. As noted herein, context and other information may also be used to aid in both detecting and distinguishing a user.

At 3808, a second radar-transmit signal is transmitted from a second computing device of the computing system. For example, a second radar-transmit signal 402-2 may be transmitted from a second radar system 108-2 of a second computing device 102-2 to detect whether a user 104 is present within a second proximate region 106-2, with reference to FIGS. 1 and 21. The second computing device 102-2 may be a part of the computing system that includes, at least, the first computing device 102-1.

At 3810, a second radar-receive signal is received at the second computing device. For example, a second radar-receive signal 404-2 may be received by the second radar system 108-2 of the second computing device 102-2. The second radar-receive signal 404-2 may be associated with the second radar-transmit signal 402-2, which has been reflected off an object (e.g., a user 104) within the second proximate region 106-2.

At 3812, the presence of the registered user is determined based on a correlation of a second radar-signal characteristic of the second radar-receive signal to one or more stored radar-signal characteristics. For example, the presence of the registered user may be determined again based on the second radar-receive signal 404-2. In particular, the second radar-signal characteristic of the second radar-receive signal 404-2 may be correlated with the first stored radar-signal characteristic or a second stored radar-signal characteristic of the registered user. The correlation indicates the presence of the registered user within the second proximate region 106-2, distinguishing the user from one or more other users or potential users. The second computing device 102-2 may alternatively compare the second radar-signal characteristic to the first radar-signal characteristic (determined by the first computing device 102-1) to determine the presence of the registered user. In this way, information detected, determined, and/or stored by the first computing device 102-1 may be used by any one or more devices (e.g., the second computing device 102-2) of the computing system to distinguish, for instance, the registered user.

Figure 39:
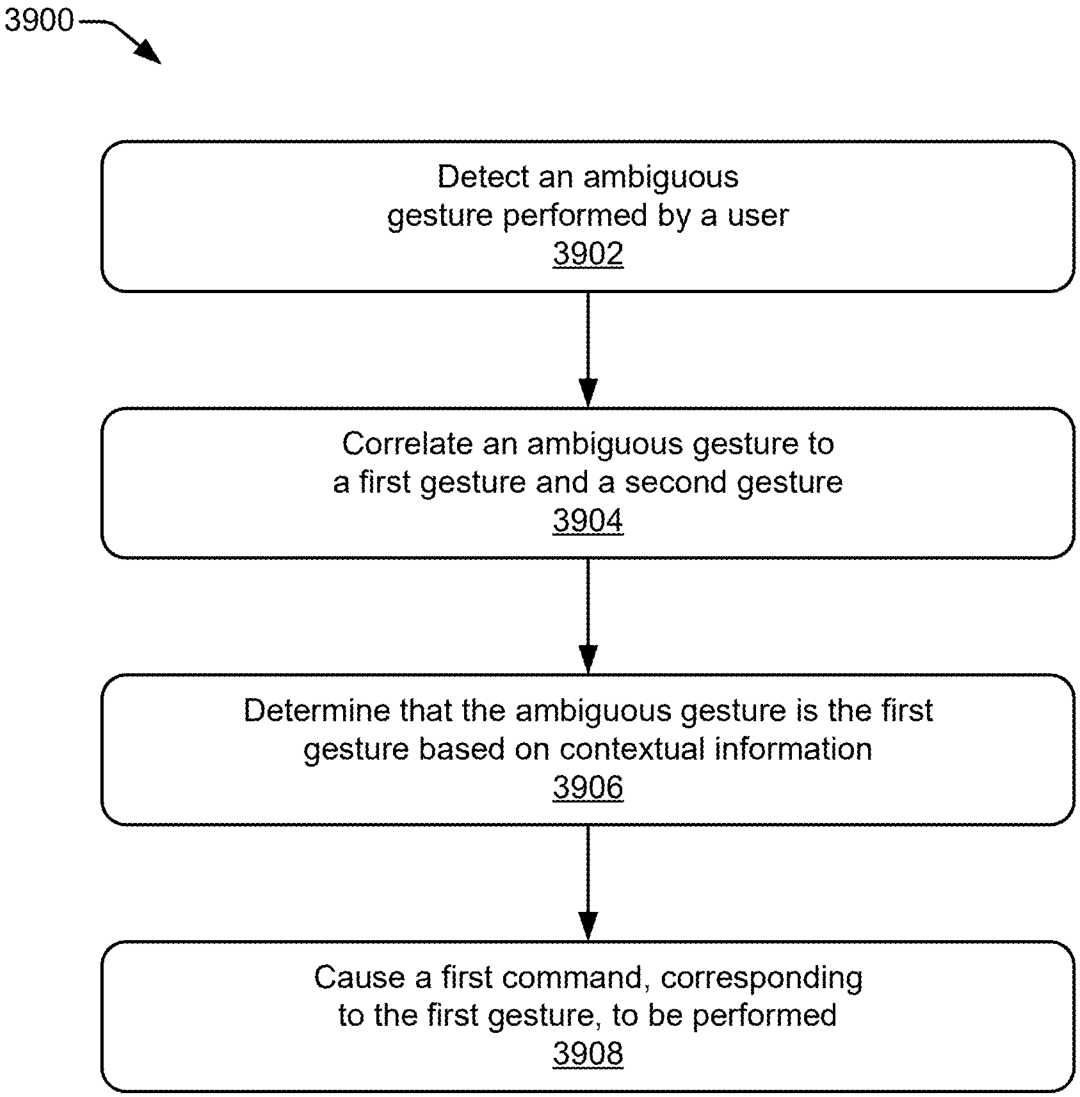
FIG. 39 illustrates an example method of radar-based ambiguous gesture determination using contextual information.

FIG. 39 illustrates an example method 3900 of radar-based ambiguous gesture determination using contextual information. The method 3900 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 3902, a computing device detects an ambiguous gesture performed by a user. For example, a computing device 102 utilizes a radar system 108 to detect one or more radar-signal characteristics of an ambiguous gesture performed by a user 104. An ambiguous gesture (e.g., the ambiguous gesture 2402) may refer to a gesture that cannot be recognized by the device to a desired level of confidence. The techniques of detecting and analyzing radar-signal characteristics associated with gestures (or users) are described above. A gesture can be detected and determined to sufficient confidence to be a gesture rather than a non-gesture body movement, animal, unmoving object, and so forth, but with an insufficient confidence to be recognized, such as below a high-confidence level and above a no-confidence level. In this case the gesture detected is an ambiguous gesture.

At 3904, the ambiguous gesture is correlated to a first gesture and a second gesture. For example, the computing device 102 compares one or more radar-signal characteristics of the ambiguous gesture to one or more stored radar-signal characteristics. A gesture module 224 correlates the ambiguous gesture to the first (known) gesture (e.g., the first gesture 2404) or the second (known) gesture (e.g., the second gesture 2406). The first gesture and the second gesture may correspond to a first command and a second command, respectively, to be performed by the computing device 102. If the gesture module 224 cannot recognize the ambiguous gesture as either the first or the second gesture to a desired level of confidence, then the computing device 102 may utilize additional information (the contextual information 2408), as described with respect to FIGS. 24-31 and 36. In particular, a gesture debouncer 810 may determine, using one or more heuristics, that the ambiguous gesture does not correlate sufficiently to the first or second gestures with reference to discussions regarding FIG. 8.

At 3906, the computing device determines that the ambiguous gesture is the first gesture based on contextual information. For example, the gesture module 224 of the computing device 102 determines that the ambiguous gesture is the first gesture based on contextual information (e.g., the contextual information 2408). Contextual information may refer to a status of operations being performed by the computing device 102 at a current time, past time, or future time. Furthermore, contextual information may include user habits, room-related context, background and foreground operations, the device's location, a current time, user presence, one or more training histories, and so forth. This determination can be made through a machine-learned model and other techniques described herein. Thus, the techniques may use context, a confidence level based on correlated radar-signal characteristics, user identity (registered, unregistered, etc.), and so forth to recognize the ambiguous gesture.

At 3908, the radar system causes the first command, corresponding to the first gesture, to be performed. For example, the radar system 108 may send one or more control signals (using the radar-based application 208) to direct the computing device 102, an application associated with the computing device 102, or another device (e.g., a second computing device 102-2) associated with the computing device 102 to perform the first command, which corresponds to the first gesture.

Figure 40:
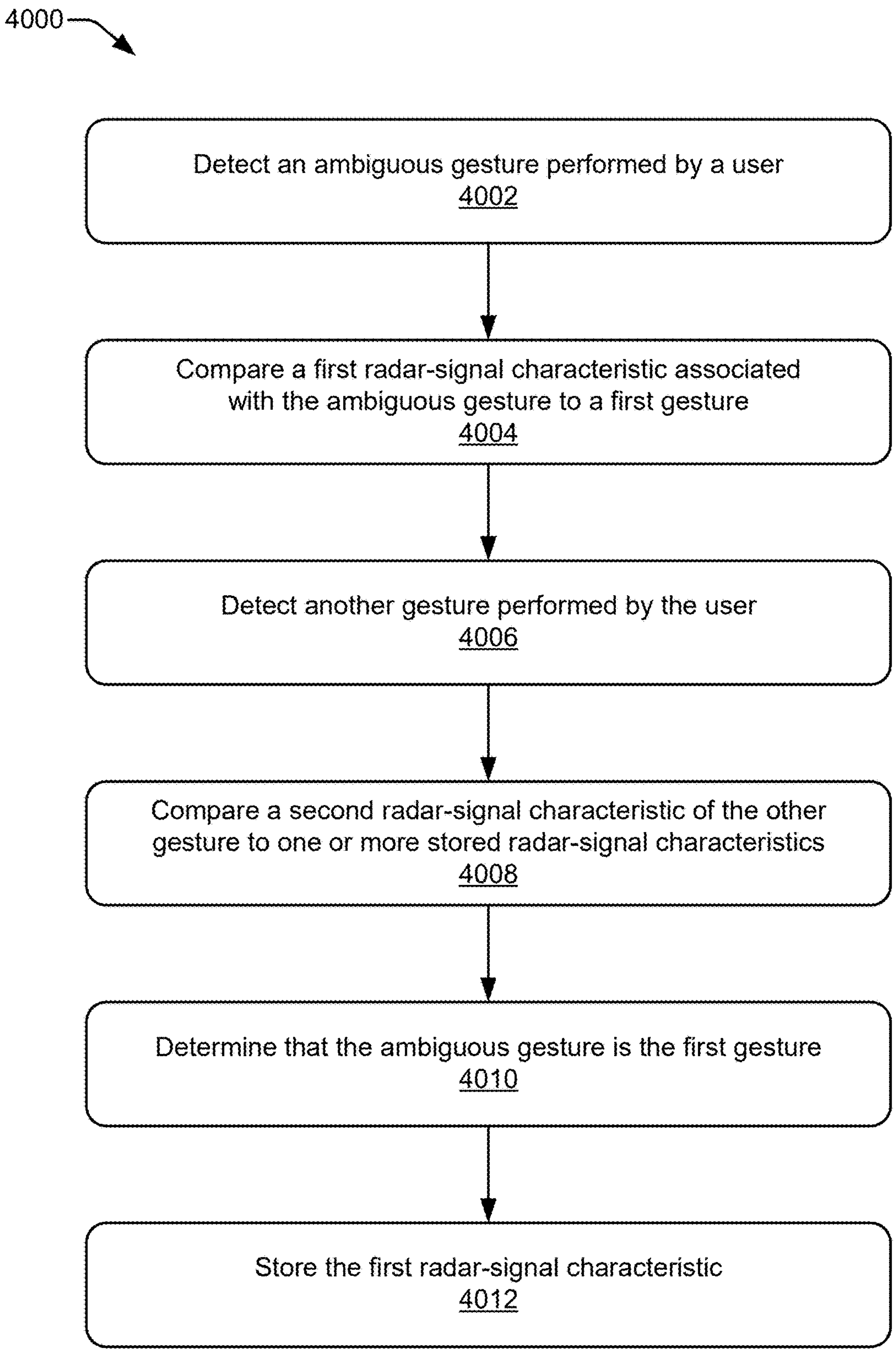
FIG. 40 illustrates an example method of continual in-line learning for radar-based gesture recognition.

FIG. 40 illustrates an example method 4000 of continual in-line learning for radar-based gesture recognition. The method 4000 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 4002, an ambiguous gesture performed by a user 104 is detected at a computing device 102. The ambiguous gesture may be detected through a radar system 108 of the computing device 102. The ambiguous gesture may be performed in an area proximate to the computing device 102. The radar system 108 may determine one or more radar-signal characteristics associated with the ambiguous gesture. For example, the ambiguous gesture may be associated with a first radar-signal characteristic.

At 4004, the first radar-signal characteristic may be compared to one or more stored radar-signal characteristics of a first gesture. The one or more stored radar-signal characteristics may be based on previous detections of radar signals received as part of gesture detection and recognition by the radar system 108. The stored radar-signal characteristics may be stored in the computing device 102, the radar system 108, a gesture module 224, a server in communication with the computing device 102, or any other device associated with the computing device 102 and with which the computing device 102 is configured to communicate. In aspects, the first radar-signal characteristic may be different from the one or more stored radar-signal characteristics of the first gesture due to a difference in performance of the ambiguous gesture, an alteration of the radar system 108, or other reasons. As such, the gesture module 224 may fail to recognize the ambiguous gesture as the first gesture or correlate the first radar-signal characteristic to the first gesture.

At 4006, another gesture is performed by the user and detected by the computing device 102, such as by the radar system 108. Alternatively, the other gesture may be detected by another computing device that is in communication with the computing device 102 using a communication network 302. The other gesture may be performed in an area proximate to the computing device 102 or the other computing device. In aspects, the other gesture may be performed by the user 104 after the computing device 102 fails to recognize and respond to the ambiguous gesture. In some implementations, the computing device 102 may prompt the user to reperform the gesture, ask for an alternative input type (e.g., audio or touch input), or simply wait for another performance of the gesture. The radar system 108 may determine one or more radar-signal characteristics associated with the other gesture, such as a second radar-signal characteristic.

At 4008, the second radar-signal characteristic is compared to the one or more stored radar-signal characteristics. The one or more stored radar-signal characteristics may be the same as or different from the one or more stored radar-signal characteristics described at 4004. The comparison of the second radar-signal characteristic to the one or more stored radar-signal characteristics may be effective to recognize the other gesture as the first gesture. In aspects, the second radar-signal characteristic may better correspond to the one or more stored characteristics as a result of the user 104 taking more care in performing an accurate gesture or simply reperforming the gesture in another manner that the computing device 102 recognizes. In this way, the gesture module 224 may recognize the other gesture as the first gesture and perform a command associated with the first gesture.

At 4010, the computing device 102 determines that the ambiguous gesture is the first gesture. The ambiguous gesture may be determined to be the first gesture based on the other gesture being performed and recognized within temporal proximity to the ambiguous gesture. In some cases, the first radar-signal characteristic and the second radar-signal characteristic may be compared to determine if the ambiguous gesture and the other gesture are similar. If so, the ambiguous gesture may be recognized as the first gesture. Additionally or alternatively, recognizing the ambiguous gesture as the first gesture may depend on a period of time that elapses between the computing device 102 detecting the ambiguous gesture and detecting the other gesture. In aspects, if the period of time is short or no additional gesture is detected within the period of time, the ambiguous gesture may be determined to be the first gesture.

At 4012, the first radar-signal characteristic is stored in correlation with the first gesture. For example, the first radar-signal characteristic may be stored by the computing device 102 to be compared to future gestures that are detected by the radar system 108. In addition to the radar-signal characteristics, contexts and other data may be stored with the first radar-signal characteristic. For example, the period of time that elapses between the detection of the ambiguous gesture and of the other gesture may be used to determine a weighting to be stored with the first radar-signal characteristic that is indicative of a confidence that the first radar-signal characteristic is correlated to the first gesture. In some implementations, contextual information from when the ambiguous gesture was performed may be stored with the first radar-signal characteristic to improve future recognition of the first gesture.

Figure 41:
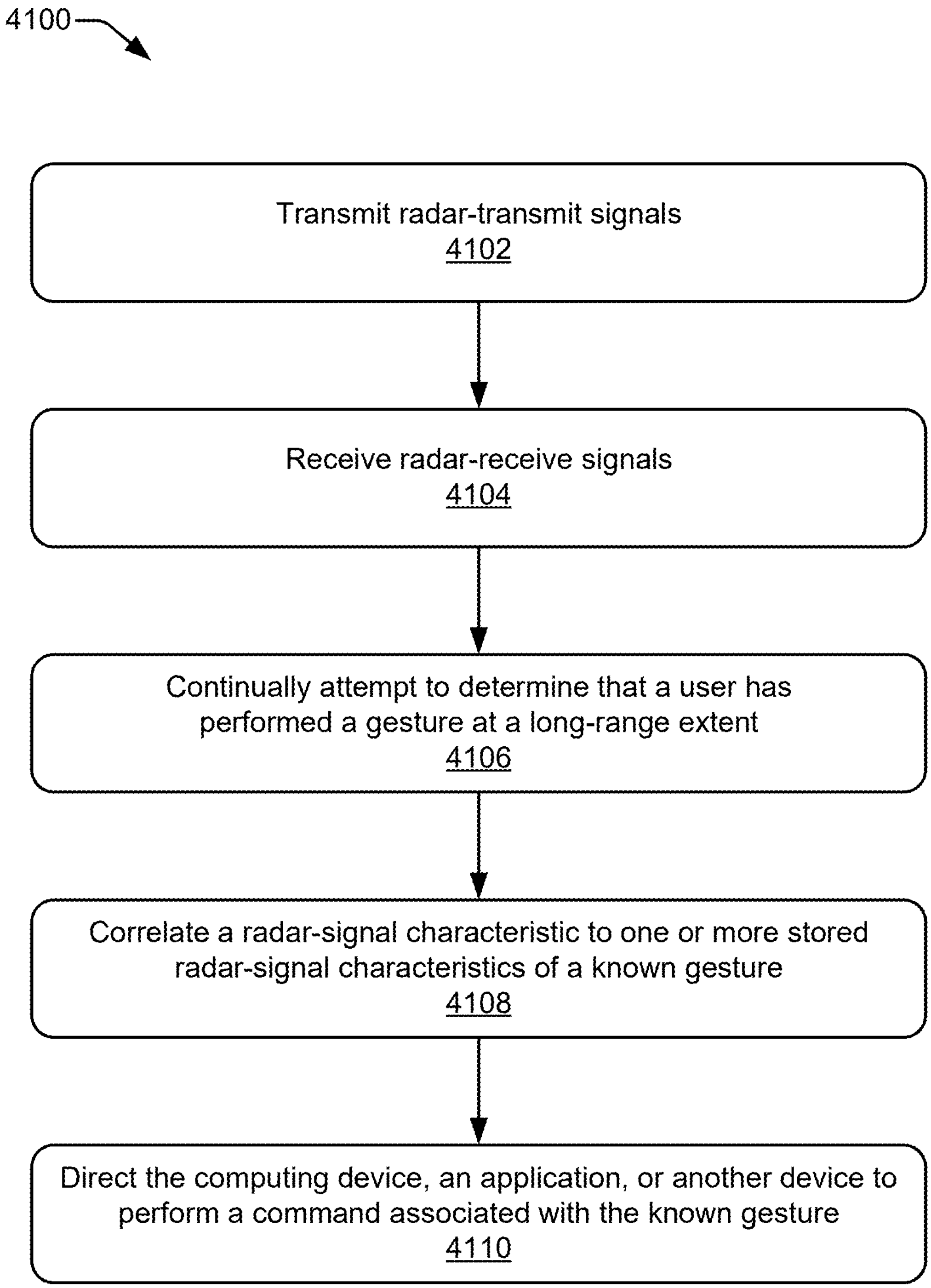
FIG. 41 illustrates an example method for radar-based gesture detection at long ranges.

FIG. 41 illustrates an example method 4100 for radar-based gesture detection at long ranges. The method 4100 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 4102, radar-transmit signals are transmitted from a radar system of a computing device. For example, a radar system 108 of a computing device 102 utilizes one or more antennas 214 to transmit radar-transmit signals 402-Y into a proximate region 106. Reference is made to discussions regarding FIGS. 4 and 5. These radar-transmit signals 402-Y may be transmitted over time in a periodic or continual manner. For example, the computing device 102 may transmit a burst of multiple signals at a rate of 10 Hz over time.

At 4104, radar-receive signals are received at the radar system or another radar system associated with the computing device. For example, radar-receive signals 404-Z are received at the radar system 108 or another radar system associated with the computing device 102. These radar-receive signals 404-Z are reflected off a scattering surface of, for instance, a user performing a gesture with their hand. An quantity of radar-receive signals 404-Z received does not necessarily correspond to a quantity of radar-transmit signals 402-Y transmitted. For instance, the radar system 108 may transmit four signals and receive only one reflected signal. The radar system 108 may also transmit four signals and receive five reflected signals due to multiple computing devices 102 of a computing system (e.g., see discussions regarding FIGS. 4-8). For a computing device 102 equipped with multiple antennas 214, a reflected radar-receive signal 404 does not necessarily have to be received by the corresponding antenna 214 that transmitted it into the proximate region 106.

At 4106, one or more of the radar-receive signals are used to continually attempt to determine that a user has performed a gesture at a long-range extent. For example, one or more of the radar-receive signals 404-Z may be used by the radar system 108 or the other radar system to continually attempt to determine that a user 104 has performed a gesture at a long-range extent. The continual attempts may be performed without segmenting or narrowing a time frame in which to analyze the one or more radar-receive signals based on an indication that the user intends to perform the gesture. Thus, continual attempts are not necessarily continuous, meaning without end or pause, but are performed multiple times, with the attempts not requiring segmentation or narrowing of a time frame for analysis due to an indication that the user is intending to perform the gesture. In some cases attempts are based on when a user has been detected, on when movement has been detected, or on some other indication that a user is present, but the method does not require an indication that the user intends or is about to perform a gesture (e.g., that the user is near to and oriented toward a computing device). Because of this lack of a requirement, computations and calculations can be more difficult than those that rely on such an indication. While the long-range extent may be four meters, in general, the computing device 102 may detect gestures at locations within the proximate region 106 that extends to a length of the long-range extent in one or more radial directions from an antenna 214, such as less than one to eight meters.

At 4108, responsive to determining the user has performed the gesture, a radar-signal characteristic of the one or more radar-receive signals is correlated to one or more stored radar-signal characteristics of a known gesture. For example, responsive to determining the user 104 has performed the gesture, a radar-signal characteristic (e.g., associated with temporal, topological, or contextual features) of the one or more radar-receive signals 404-Z is correlated to one or more stored radar-signal characteristics of a known gesture. The known gesture may refer to a class of gestures (e.g., with reference to FIG. 8), and examples include a tap, swipe, or wave gesture. The known gesture may be a gestural command the computing device 102 is programmed or taught to recognize. The radar-signal characteristic may also be associated with one or more complex-range Doppler maps 820.

At 4110, direction is given to the computing device, an application, or another device to execute a command associated with the known gesture. For example, responsive to the determination that the performed gesture is the known gesture, a gesture module 224 (or another module of the radar system 108) may direct the computing device 102, an application associated with the computing device 102, or another device associated with the computing device 102 to perform a command associated with the known gesture. For example, based on the determination that the performed gesture is the swipe gesture, the computing device 102 may be instructed (e.g., using triggers or control signals) to skip a song being played at the current time by the device. Alternatively, the radar system 108 may instruct a second computing device 102-2 of the computing system to perform the command.

Figure 42:
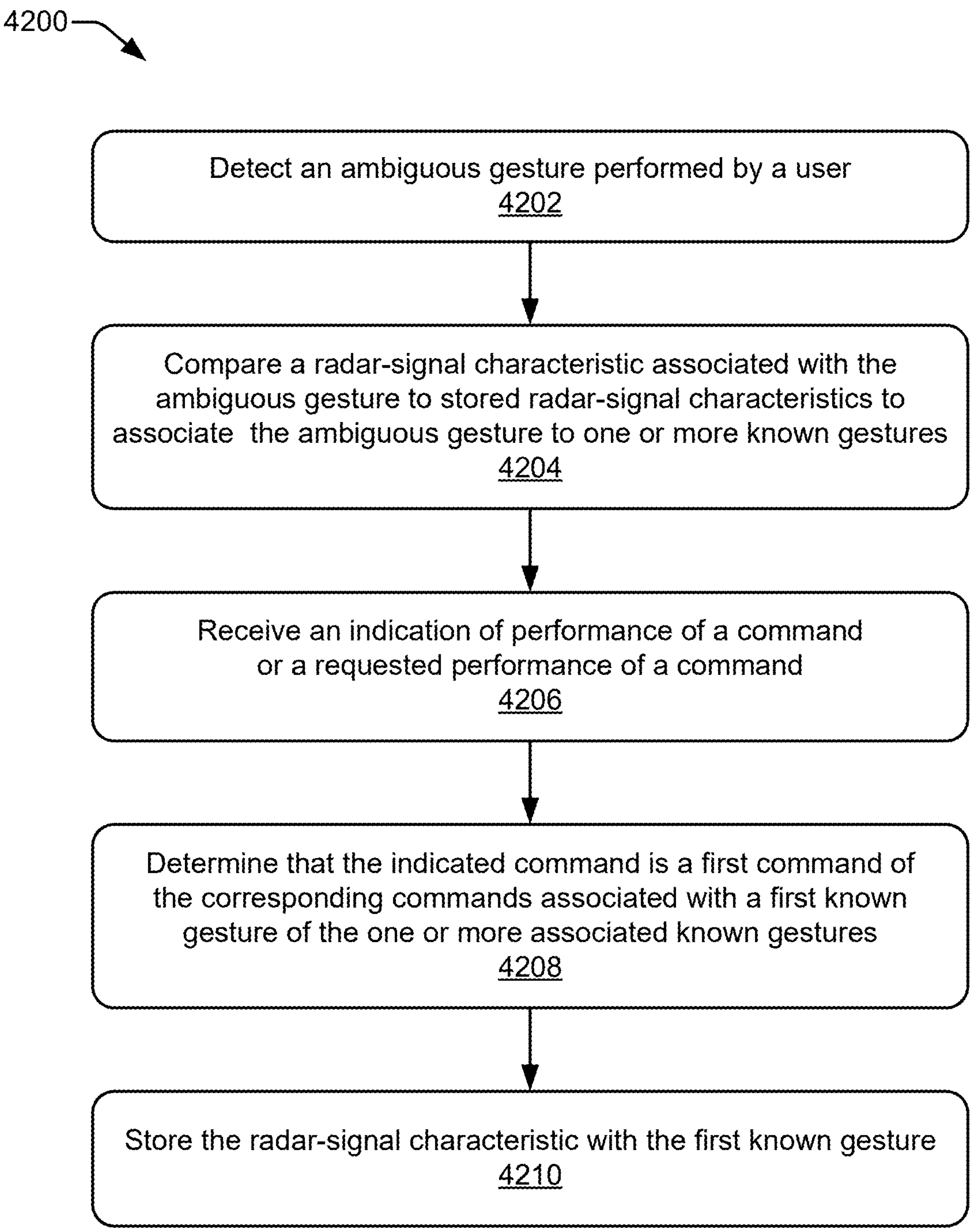
FIG. 42 illustrates an example method of in-line learning based on user inputs.

FIG. 42 illustrates an example method 4200 of in-line learning based on user inputs. The method 4200 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 4202, a computing device 102 utilizes a radar system 108 to detect an ambiguous gesture performed by a user 104. The ambiguous gesture may include one or more radar-signal characteristics based on radar data collected by the radar system 108 during performance of the ambiguous gesture.

At 4204, the radar-signal characteristics associated with the ambiguous gesture are compared to stored radar-signal characteristics to associate the ambiguous gesture to one or more known gestures, each with a corresponding command. The association may be below a confidence threshold required to recognize the ambiguous gesture as one of the one or more known gestures. The association may be based on a similarity between the radar-signal characteristics of the ambiguous gesture and the stored radar-signal characteristics of the one or more known gestures.

At 4206, the computing device 102 receives an indication of a performance or requested performance of a command. The indication may be based on a non-radar user input, such as an audio or touch input received at the computing device 102 or a connected device. The user input may cause the computing device 102 or a connected device to perform the command. Given that the command is requested or performed after the computing device 102 failed to recognize and respond to the ambiguous gesture, it may be likely that the ambiguous gesture was intended by the user to cause the computing device 102 to perform the command.

At 4208, the computing device 102 determines that the indicated command is a first command of the corresponding commands of the one or more known gestures with which the comparison was effective to associate the ambiguous gesture. For example, the computing device 102 may determine that the indicated command caused the computing device 102 or a connected device to perform a same command as a command corresponding to a first gesture of the one or more known gestures. As such, it may be likely that the ambiguous gesture was intended by the user 104 to be the first gesture.

At 4210, the one or more radar-signal characteristics associated with the ambiguous gesture are stored with the first gesture to improve the recognition of a performance of the first gesture at a future time. For example, the one or more radar-signal characteristics may be stored to enable the gesture module 224 to compare the one or more radar-signal characteristics to a future performance of the first gesture. In this way, the computing device 102 may continue to update the radar-signal characteristics associated with each gesture to enable improved gesture recognition.

Figure 43:
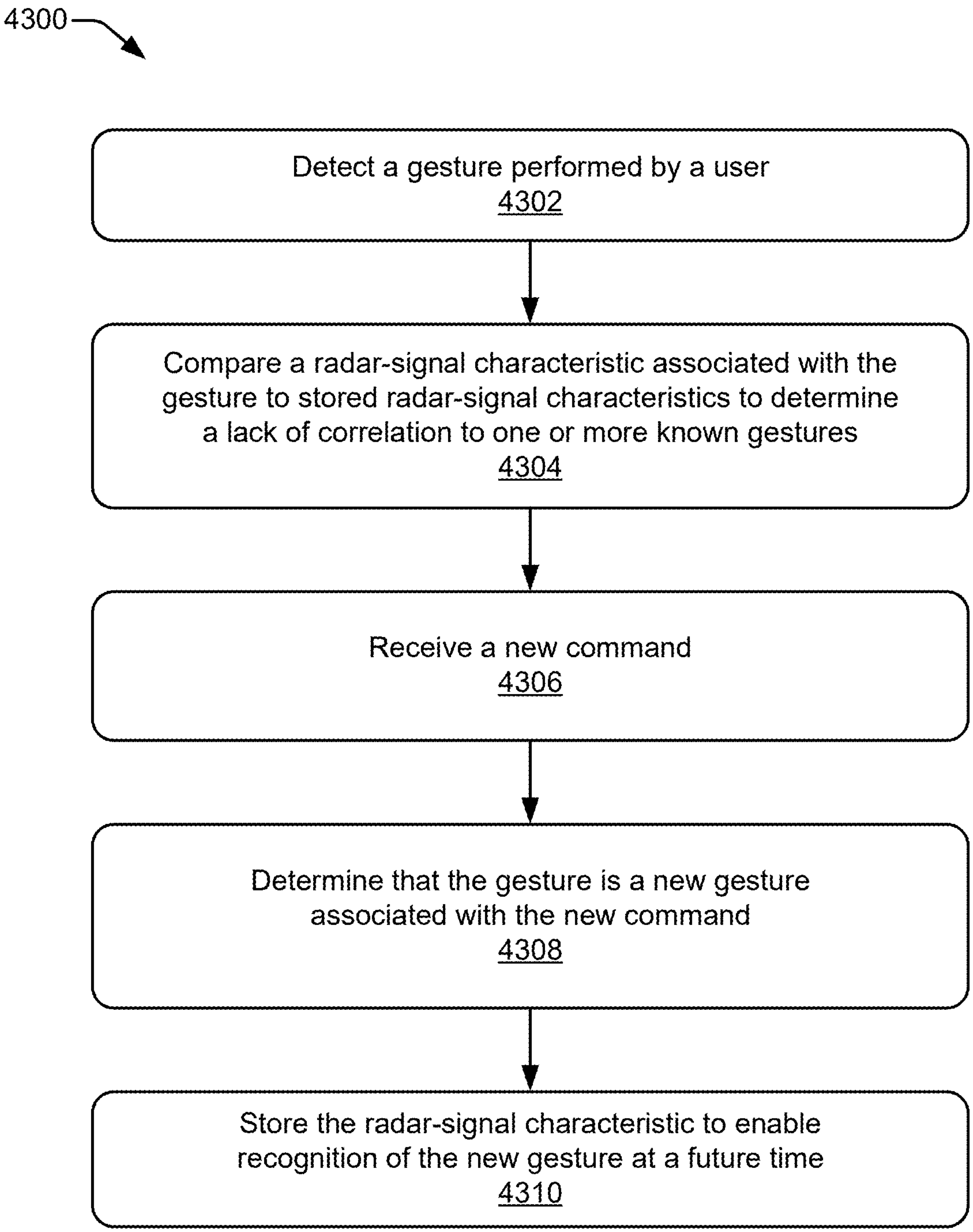
FIG. 43 illustrates an example method for in-line learning of new gestures for radar-enabled computing devices.

FIG. 43 illustrates an example method 4300 for in-line learning of new gestures for radar-enabled computing devices. The method 4300 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 4302, a computing device 102 utilizes a radar system 108 to detect a gesture performed by a user 104. Detecting the gesture may include detecting an associated radar-signal characteristic of the gesture.

At 4304, the radar-signal characteristic of the gesture is compared to one or more stored radar-signal characteristics that are associated with one or more known gestures. The comparison may be effective to determine a lack of correlation between the detected gesture and the one or more known gestures. For example, the comparison may determine that the radar-signal characteristic does not correspond to any of the stored radar-signal characteristics with a required confidence (e.g., a confidence threshold).

At 4306, a new command is received from the user 104. The command may be received at the computing device 102 or any other connected computing device. The command may be provided in a number of ways, such as through a voice command and using a voice recognition system, through a touch command at a touch-sensitive display, through typing on a physical or digital keyboard, or by the user physically performing the command at an appropriate device. The new command may be determined to be different from any known commands that correspond to the known gestures. Alternatively, the new command may be the same as one or more of the known commands.

At 4308, the computing device 102 determines that the detected gesture is a new gesture associated with the new command. In aspects, the determination may be based on a period of time between the performance of the gesture and the reception of the new command. In some implementations, the determination may include determining that the user did not perform an intervening command or gesture during the time period between the performance of the gesture and the reception of the new command.

At 4310, the computing device 102 stores the radar-signal characteristic of the detected gesture to enable the computing device 102 to recognize a performance of the gesture in the future and respond by performing the new command. In aspects, the new gesture may be associated with a specific user and recognized when that specific user performs the gesture. In this way, an additional radar-signal characteristic may be stored that is associated with the presence of the particular user to enable the computing device 102 to recognize when that specific user performs the new gesture. By performing in-line learning of new gestures, a radar-enabled computing device may implement a continually developing, user-customizable gesture control system.

While illustrated and described in the context of a new command, other situations are also contemplated by the techniques. For example, a received command may be a command that is not new relative to the commands associated with the known gestures but instead new to the particular user (e.g., a registered user that does not have a history indicating use of that command with the known gesture). In such a case, the method 4300 may operate to create a new known gesture for the received command, even though a current known gesture associated with the same command is already known. Thus, the method 4300 may further include associating the new known gesture created with the received command solely for that particular user. Alternatively or in addition, the method 4300 may overwrite the gesture by removing or not using the older known gesture (the current known gesture noted above) for that command and replace it with the new known gesture.

In another aspect, the received command may not be new based on the commands associated with the known gestures and also not be new to the particular user. The techniques may still create the new gesture, storing it as a known gesture with the received radar-signal characteristic from operation 4304. In such a case the older gesture can be removed and replaced or can be retained, thereby permitting two different known gestures to be usable to cause the command to be performed.

Motivation for the presently described inventions, such as those described in reference to the methods 4000, 4200, and 4300, lies in the fact that the subject radar-detected gestures originate from real human beings, with all of the individual eccentricities, strengths, and foibles that make them human, and in the fact that the designed responses of the surrounding machines are ultimately intended to make better the lives of these human beings. Provision of user experiences according to the present teachings can advantageously bring about a rich and familiar-feeling user experience with a gesture-detecting smart home system, an experience that can be perceived by the user as providing a sense of forgiveness, or forgiving adaptiveness, recognizing that not all physical input gestures by a real human are going to be perfect by-the-book executions at all times and that such gestures may have variations depending on the tendencies or disabilities (temporary or permanent) of any particular user. Thus, for example, consider a simple "circle" gesture comprising a circular trajectory of a hand, parallel to a frontal plane of a user, made in the air space somewhere in front of the torso area. In a real-world example, in attempting to make a circle gesture, a user might first make an "awkward" version of that gesture—because perhaps they are slightly disabled in their arm, or maybe just tired—their gesture might not get recognized, and they might receive a feedback sounding like "rejection" (like a "bounce" sound or "sad trumpet" sound) from the receiving device.

Like most humans, the user will naturally try a second time. But this second time, the user will probably put more energy—more oomph—into the circle gesture effort, and this time the circle swipe gesture will more likely get recognized, and the gesture detection system will proceed accordingly. Also similarly to natural human behavior, the user may attempt to perform the command themselves or attempt to input the command using another input type. Meanwhile, according to the one or more embodiments, the gesture detection system is effectively designed to "remember" the measurement readings for the failed attempt and "learn" that this user will have a tendency to give circle gestures that are not quite "by the book," and over time the system will start to recognize "awkward" versions of the circle gesture from that user as the actual circle gesture, thus adapting to that user individually. Advantageously, the entire process feels very natural to the user, being similar in many ways to a typical party-conversation scenario in which a person will say a phrase more loudly, more slowly, and more deliberately if their listener leans in and indicates that they did not quite hear or understand that phrase the first time. Subsequently, the listener is usually more able to recognize that phrase the third and following times it is said by the person in the conversation, even if not articulated quite as loudly, slowly, and deliberately as when the person said it the second time.

Also within the scope of the present teachings would be a two-times failed gesture attempt (such as the above circle gesture) followed by a third time in which the gesture succeeds. In other words, the user tries the circle gesture once and it fails; then the user tries the circle gesture a second time with a bit more energy and oomph, and that fails too. Like many or most humans, the user will try the circle gesture a third time, this time with real determination, clarity, energy, and oomph, and this time the circle gesture is recognized. Here, the gesture detection system will remember the measurement readings for both failed attempts, use them to learn the user's "awkward" versions of the circle gesture, and recognize them and respond as if the actual circle gesture were made.

In a similar fashion to the way the "awkward" versions of gestures may be learned, the gesture detection system may learn new gestures when a performed gesture is not recognized by storing measurement readings for failed recognition attempts. As in the situation described above, these techniques may enable the gesture-recognition system to "learn" gestures in accordance with the specific idiosyncrasies of each user. Through these techniques, the gesture-recognition system mimics natural human learning by recognizing when a gesture is new and "learning" the gesture to improve interactions with the user. Moreover, this interaction may be individualized to enable the gesture-recognition system to tailor operation to each particular user.

Figure 44:
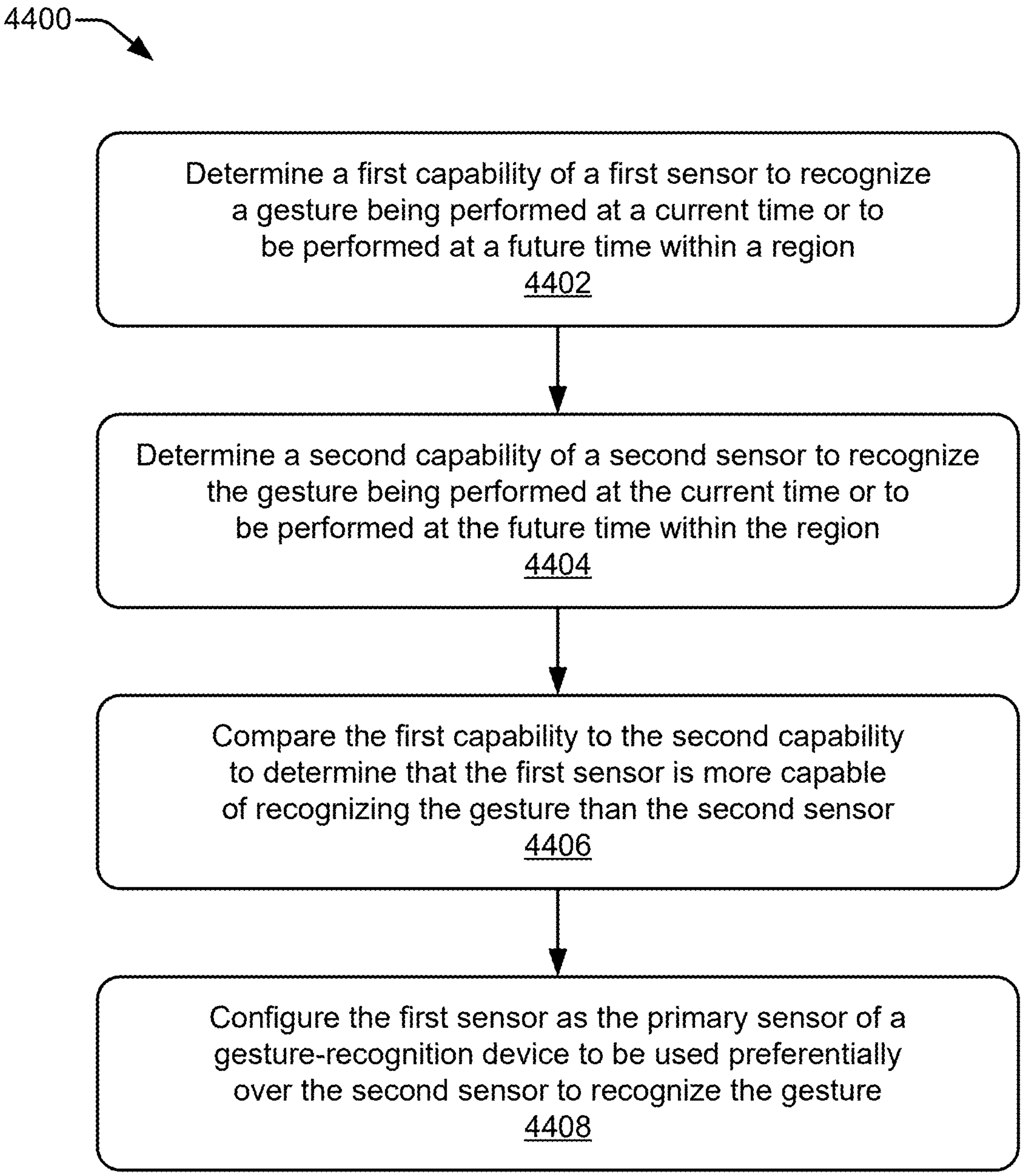
FIG. 44 illustrates an example method for sensor capability determination.

FIG. 44 illustrates an example method of configuring a computing device with a primary sensor. A method 4400 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 4402, a first capability of a first sensor to recognize a gesture performed at a current time or to be performed at a future time is determined. The gesture may be performed within a particular region. The first capability of the first sensor may be determined based on contextual information associated with the region in which the gesture is performed. The contextual information may relate to conditions within the region, a user 104 performing the gesture within the region, characteristics of gestures performed within the region, and so on.

At 4404, a second capability of a second sensor to recognize the gesture performed at the current time or to be performed at the future time is determined. The second sensor may be a different type of sensor than the first sensor or a same type of sensor as the first sensor. In aspects, the first sensor may be a radar sensor and the second sensor may be a non-radar sensor (examples listed elsewhere herein). The capabilities of the first sensor and the second sensor to recognize the gesture may be different based on the context of the gesture performed in the region.

At 4406, the first capability and the second capability are compared to determine that the first sensor is more capable of recognizing the gesture than the second sensor. The comparison may include determining which of the first and second capabilities is more likely to recognize a gesture performed within the region based on the context.

At 4408, the first sensor may be configured as a primary sensor of the computing device. The primary sensor may be used preferentially over the second sensor to recognize the gesture. The first sensor may be configured as the primary sensor in response to determining that the first sensor is more capable of recognizing the gesture in comparison to the second sensor. The first sensor may be configured as the primary sensor by weighting data collected by the primary sensor more heavily than data collected by the second sensor. For example, the primary sensor may be assigned a first weighted value applied to the data collected at the primary sensor, and another sensor may be assigned a second weighted value applied to the data collected at the other sensor. To recognize the detected gesture, the first weighted value may be applied to the data collected at the primary sensor to preferentially rely on this data over the data collected at the other sensor. In doing so, an operation associated with the recognized gesture may be performed at the computing device, an application on the computing device, or an associated computing device.

Alternatively or additionally, the primary sensor may be solely relied on for gesture detection or recognition (e.g., by setting one or more Boolean values associated with the primary sensor and the other sensors). In some implementations, the primary sensor may be used to determine a subset of possible gestures to which the detected gesture may correspond, and the secondary sensors may be used to differentiate the possible gestures, or vice versa.

The configuration may additionally or alternatively include adjusting the power consumption of the first sensor or the second sensor (e.g., increasing the power consumption of the first sensor or decreasing the power consumption of the second sensor). The first sensor may be configured as the primary sensor such that when the gesture is recognized in the future it is recognized with the first sensor but not the second sensor. Alternatively, the gesture may be recognized by the first sensor and the second sensor when the gesture is performed in the future. While mentioned in the context of recognizing a gesture, the method 4400 may also or instead be used to determine sensors to use or weigh for detecting a user engagement, detecting or distinguishing a user, or detecting a gesture.

Figure 45:
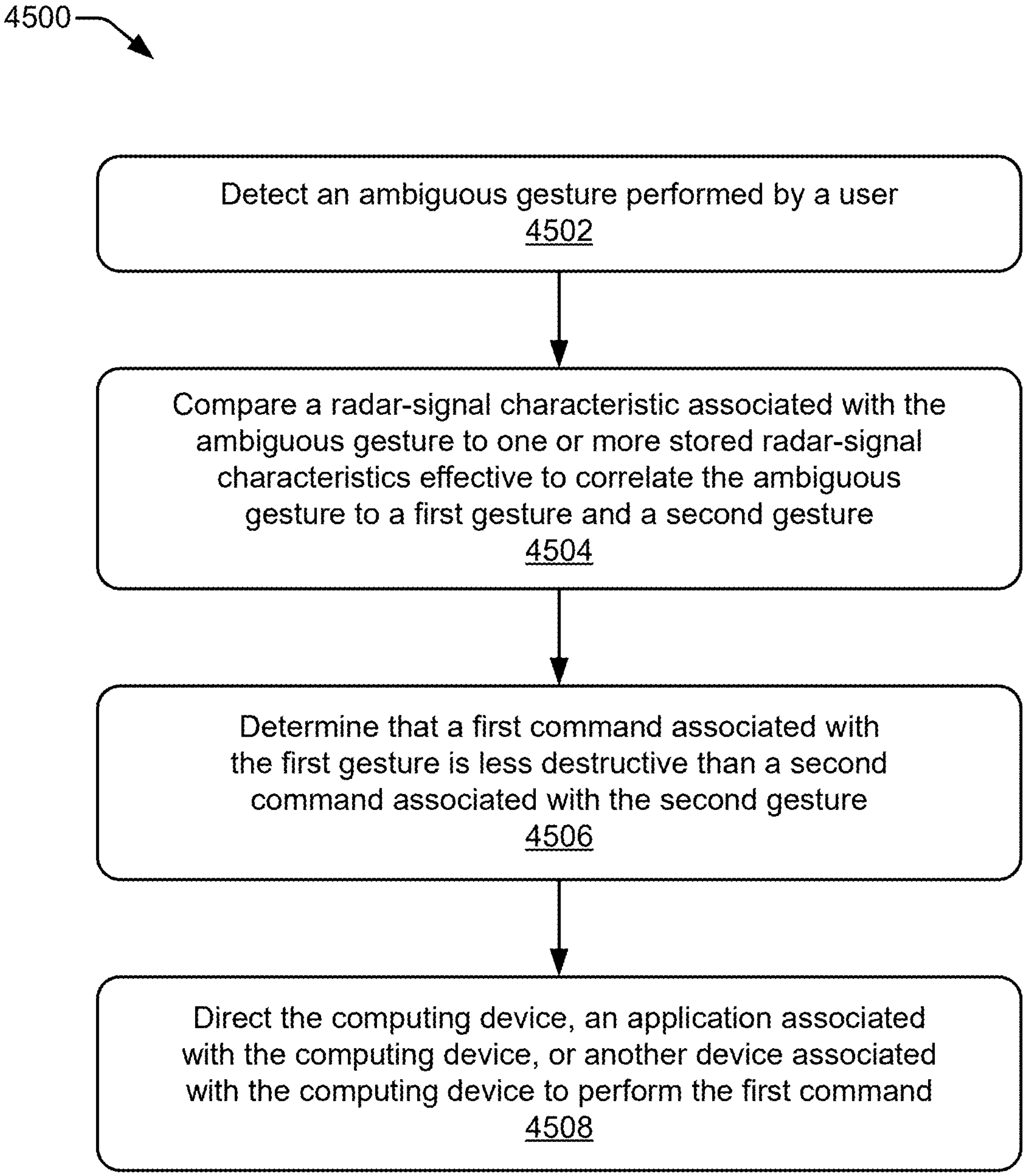
FIG. 45 illustrates an example method of recognizing an ambiguous gesture based on a less-destructive operation.

FIG. 45 illustrates an example method 4500 of recognizing an ambiguous gesture based on a less-destructive operation. The method 4500 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 4502, an ambiguous gesture performed by a user is detected by a computing device using a radar system, such as the user 104, the computing device 102, and the radar system 108. The ambiguous gesture may be associated with a particular radar-signal characteristic, which may be determined by a gesture module 224.

At 4504, the radar-signal characteristic associated with the ambiguous gesture may be compared to one or more stored radar-signal characteristics effective to correlate the ambiguous gesture to a first gesture and a second gesture. The first gesture and the second gesture may be associated with a first command and a second command, respectively. The ambiguous gesture may be correlated to the first gesture and the second gesture based on one or more stored radar-signal characteristics associated with the first gesture and the second gesture being similar to the radar-signal characteristic associated with the ambiguous gesture.

At 4506, the computing device 102 determines that the first command associated with the first gesture is less destructive than the second command associated with the second gesture. The first command or the second command may be determined as less destructive based on an operation associated with the first command and an operation associated with the second command. The first command may be determined as the less-destructive command based on the first command being an interim command, the first command being reversible, prior action taken by the user 104 in response to prior performance of the first or second command, or a user input after the performance of the first or second command.

At 4508, the computing device 102, an application associated with the computing device 102, or another device associated with the computing device 102 is directed to perform the first command in response to determining the first command is the less-destructive command. In doing so, the techniques recognize gestures that are otherwise ambiguous but in a less damaging way. This recognition reduces user frustration from cases where the computing device fails to accurately recognize a gesture or fails to recognize a gesture at all.

Figure 46:
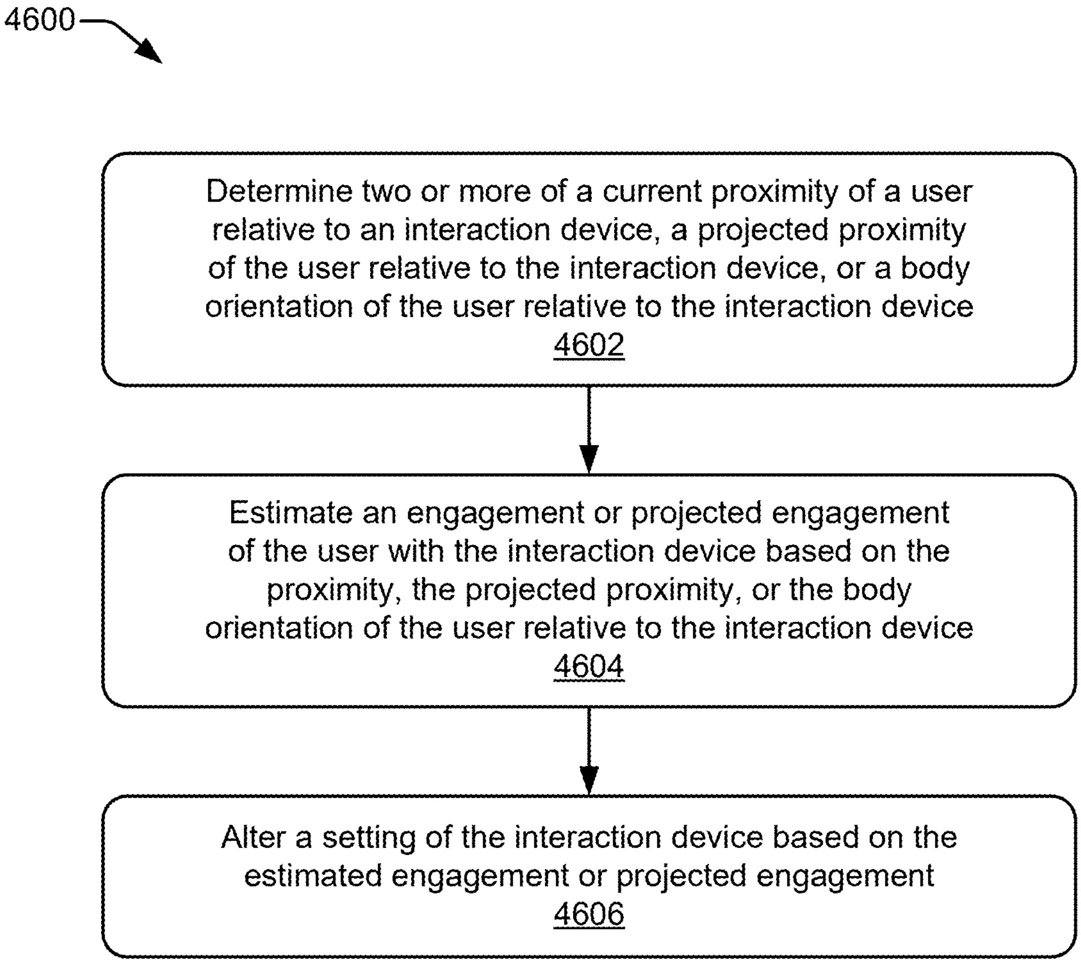
FIG. 46 illustrates an example method of detecting user engagement.

FIG. 46 illustrates an example method 4600 of detecting user engagement. The method 4600 is shown as sets of operations (or acts) performed, is not necessarily limited to the order or combinations in which the operations are shown herein, and may be performed, in whole or in part, with other methods described herein. Furthermore, any of one or more of the operations of these methods may be repeated, combined, reorganized, or linked to provide a wide array of additional and/or alternative methods. In portions of the following discussion, reference may be made to example environments, experimental data, or experimental results of FIGS. 1-37, reference to which is made for example only. The techniques are not limited to performance by one entity or multiple entities operating on or associated with one computing device 102.

At 4602, two or more of a current proximity of a user relative to an interaction device associated with a computing device, a projected proximity of the user relative to the interaction device, or a body orientation of the user relative to the interaction device are determined based on radar-receive signals. As illustrated in FIG. 37, a proximity 3702 of a user 104 relative to the interaction device (e.g., a display) may be determined as a linear distance between the interaction device and the user 104. A projected proximity may include the determination of a pathway 3704 (path of travel) based on the current movement of the user 104 and historical movements of the user 104. A body orientation 3706 may be based on the angle of the user's body relative to the interaction device, a direction of focus of the user 104 relative to the interaction device, a head orientation of the user 104 relative to the interaction device, or a gesture direction relative to the interaction device.

At 4604, an engagement or projected engagement of the user with the interaction device is estimated based on the proximity, the projected proximity, or the body orientation of the user relative to the interaction device. The engagement or projected engagement may be determined using a machine-learned model, including one or more of those described in this document. The machine-learned model may be created using supervised training based on the user's input as to the association of various factors and the user's engagement. For example, the interaction device may provide a user interface (e.g., graphical, audio, and so on) that asks the user 104 if they are engaged with the device (e.g., if they are looking at the device, if they are about to interact with the device, and so on). The user 104 may respond to the user interface, and the machine-learned model may be developed based on the user's confirmation or correction of the association. The model may also be developed using the user's prior selection to engage with the device after recording information about the user's proximity, projected proximity, or body orientation (even if not explicitly a confirmation).

At 4606, a setting of the interaction device is altered based on the estimated engagement or potential engagement. The interaction device may be altered such that power usage of the device is lowered, such as by lowering the power usage of a sensor system or display of the device. The altering may include adjusting a privacy setting (e.g., as described in FIG. 20) based on the user's engagement. The user's engagement may be classified as a high engagement or a low engagement (e.g., based on an engagement threshold), and settings may be adjusted based on the user's engagement being classified as high or low. In doing so, the interaction device may adjust to the current or projected engagement of the user to improve performance in various scenarios. Also, as mentioned elsewhere herein, determination of user engagement can be used to aid in recognizing gestures, such as by using it as a context for aiding in recognition techniques (e.g., FIGS. 36 and 39).

CONCLUSION

Although techniques and apparatuses for a system of multiple radar-enabled computing devices have been described in language specific to features and/or methods, it is to be understood that the subject of the appended claims is not necessarily limited to the specific features or methods described. Rather, the specific features and methods are disclosed as example implementations of system of multiple radar-enabled computing devices.

Some Examples are described below.

Example 1: A method comprising: transmitting a first radar-transmit signal from a first radar-enabled computing device of a computing system, the first radar-enabled computing device within a first proximate region of a physical region, the physical region larger than the first proximate region; receiving, at the first radar-enabled computing device, a first radar-receive signal; comparing a first radar-signal characteristic of the first radar-receive signal to one or more stored radar-signal characteristics, the comparing effective to correlate the first radar-signal characteristic to a first stored radar-signal characteristic of a registered user, the correlation indicating a presence of the registered user within the first proximate region; transmitting a second radar-transmit signal from a second radar-enabled computing device of the computing system, the second radar-enabled device within a second proximate region of the physical region, the second radar-enabled computing device having access to the one or more stored radar-signal characteristics; receiving, at the second radar-enabled computing device, a second radar-receive signal; and comparing a second radar-signal characteristic of the second radar-receive signal to the one or more stored radar-signal characteristics, the comparing effective to determine that the second radar-signal characteristic correlates to the first stored radar-signal characteristic or a second stored radar-signal characteristic of the registered user, the correlation indicating the presence of the registered user within the second proximate region.

Example 2: The method as recited by example 1, wherein the physical region is a domicile, the first proximate region is a first room of the domicile, and the second proximate region is a second room of the domicile.

Example 3: The method as recited in example 1 or 2, further comprising: receiving, at a first time and at the first radar-enabled computing device, a first portion of a command from the registered user; receiving, at a second, later time and at the second radar-enabled computing device, a second portion of the command from the registered user; and determining, based on the presence of the registered user within the first proximate region at the first time and on the presence of the registered user within the second proximate region at the second, later time, that the first portion and the second portion of the command are associated.

Example 4: The method as recited in example 3, further comprising: responsive to determining that the first portion and the second portion of the command are associated, causing performance of the command.

Example 5: The method of example 3 or 4, wherein: the command is a two-part command; the first portion of the command is received through a first gesture recognized by a first radar system associated with the first radar-enabled computing device or is received through a first audio input recognized by a first audio system associated with the first radar-enabled computing device; the second portion of the command is received through a second gesture recognized by a second radar system associated with the second radar-enabled computing device or is received though a second audio input recognized by a second audio system associated with the second radar-enabled computing device; and the association of the first portion of the command and the second portion of the command is based on the command being the two-part command.

Example 6: The method of examples 3 or 4, wherein: the command is a single command; the first portion of the command is received through a first part of a gesture recognized by a first radar system associated with the first radar-enabled computing device or is received through a first part of an audio input recognized by a first audio system associated with the first radar-enabled computing device; and the second portion of the command is received through a second part of the gesture recognized by a second radar system associated with the second radar-enabled computing device or is received through a second part of the audio input recognized by a second audio system associated with the second radar-enabled computing device.

Example 7: The method of any one of examples 3-6, further comprising: responsive to the determination of the presence of the registered user within the second proximate region, configuring the second radar-enabled computing device to determine an association of the first and second portions of the command.

Example 8: The method of example 7, wherein the configuring includes passing, to an entity associated with the computing system that is accessible by the second radar-enabled computing device, information about the first portion of the command.

Example 9: The method as recited in example 1 or 2, wherein one or more operations or applications are being performed within the first proximate region incident with performing one or more elements of the method, and further comprising, responsive to the correlation indicating the presence of the registered user within the second proximate region, causing performance or continuing performance of the one or more operations or applications within the second proximate region.

Example 10: The method as recited in example 9, wherein the one or more operations or applications is a media presentation within the first proximate region and causing performance or continuing performance causes performance or continuing performance of the media presentation within the second proximate region.

Example 11: The method as recited by any preceding example, wherein: the first radar-enabled computing device is configured to anticipate the registered user based on the first radar-enabled computing device being located in the first proximate region; determining, at the first computing device, that an ambiguous user is present, the ambiguous user being the registered user, another registered user, or an unregistered person; and determining that the ambiguous user is the registered user based on the second radar-enabled computing device being configured to anticipate the registered user.

Example 12: The method as recited by example 11, the method further comprising detecting that the second radar-enabled computing device has been moved to the first proximate region; and configuring the second radar-enabled computing device to anticipate detecting the registered user.

Example 13: The method as recited by any preceding example, wherein the first radar-enabled computing device is configured to anticipate a known gesture based on the first radar-enabled computing device being located in the first proximate region, the method further comprising: detecting, at the first radar-enabled computing device, an ambiguous gesture; and determining, based on the first radar-enabled computing device being configured to anticipate the known gesture, that the ambiguous gesture is the known gesture.

Example 14: The method as recited by any preceding example, the method further comprising, responsive to determining the presence of the registered user: providing, at the first radar-enabled computing device, training to teach the registered user to perform one or more particular known gestures; maintaining, for the registered user, a first training history comprising the one or more particular known gestures as performed by the registered user during training, the second radar-enabled computing device further configured to access the first training history; and responsive to determining, at the second computing device, the presence of the registered user, resuming training at the second radar-enabled computing device based on the first training history.

Example 15: A computing system comprising a first computing device and a second computing device connected to a communication network to enable: the first computing device or the second computing device to perform any one of the methods recited in examples 1 to 14; and an exchange of information between the first computing device and the second computing device, the information including at least one of the following: one or more determined radar-signal characteristics; one or more stored radar-signal characteristics; contextual information; or one or more audio inputs.

Example 16: A method comprising: detecting, at a computing device, an ambiguous gesture performed by a user, the ambiguous gesture associated with a radar-signal characteristic; comparing the detected radar-signal characteristic to one or more stored radar-signal characteristics, the comparing effective to correlate the ambiguous gesture to a first gesture and a second gesture, the first gesture and the second gesture corresponding to a first command and a second command, respectively; determining, based on contextual information, that the ambiguous gesture is the first gesture; and responsive to the determining, directing the computing device, an application associated with the computing device, or another device associated with the computing device to perform the first command.

Example 17: The method as recited by example 16, wherein the contextual information comprises an activity currently associated with the user, the activity detected by or inferred by the computing device.

Example 18: The method as recited by any of examples 16 and 17, wherein the contextual information comprises a status of operations being performed by the computing device at a current time, the operations related to, or capable of being affected by, the first command.

Example 19: The method as recited by example 18, wherein: the second command is also related to or capable of affecting the operations being performed at the current time; the contextual information further comprises a history of operations performed by the computing device during a past period, the first command having been previously performed and recorded within the history of operations, and the second command having been previously performed and recorded within the history of operations, the first command being recorded with a greater frequency or more recently than the second command; and the determining that the ambiguous gesture is the first gesture is further based on the history of operations.

Example 20: The method as recited by any of examples 16-19, wherein: the contextual information comprises future operations that are scheduled or anticipated to be performed; the first command is associated with the future operations; the second command is not associated with the future operations; and the determining that the ambiguous gesture is the first gesture is further based on the future operations.

Example 21: The method as recited by examples 16 or 17, wherein the contextual information comprises a status of operations being performed in a foreground and a background of the computing device, the foreground associated with operations the user is actively involved with at a current time, the background associated with operations the user is passively involved with at the current time, and wherein determining that the ambiguous gesture is the first gesture is further based on the first command being capable of affecting the operations being performed in the foreground.

Example 22: The method as recited by any of examples 16-21, wherein the ambiguous gesture is further detected by the other device associated with the computing device, the other device receiving the detected radar-signal characteristic or another radar-signal characteristic of the ambiguous gesture, the other device configurable to access the contextual information of the computing device.

Example 23: The method as recited by any of examples 16-22, the method further comprising: responsive to the determining that the ambiguous gesture is the first gesture, associating the detected radar-signal characteristic with the first gesture; and storing the associated radar-signal characteristic to enable detection of the first gesture at a future time.

Example 24: The method as recited by any of examples 16-23, the method further comprising: detecting, at the computing device, a second ambiguous gesture comprising a second radar-signal characteristic; comparing the second detected radar-signal characteristic to the one or more stored radar-signal characteristics, the comparing effective to correlate the second ambiguous gesture to the first gesture and the second gesture; determining the second ambiguous gesture is the second gesture based on the contextual information or the associated radar-signal characteristic; and responsive to the determining, directing the computing device, the application associated with the computing device, or the other device to perform the second command.

Example 25: The method as recited by any of examples 16-24, wherein the determining that the ambiguous gesture is the first gesture is performed using a machine-learned model that utilizes one or more radar-signal characteristics.

Example 26: The method as recited by any of examples 16-25, wherein the contextual information comprises a history of users, user habits, common activities, or gestures detected by the computing device.

Example 27: The method as recited by any of examples 16-26, wherein the contextual information comprises additional non-radar sensor data, the additional non-radar sensor data including ambient lighting conditions associated with a region in which the user resides, an audio signal received contemporaneously with reception of the radar-signal characteristic, or a notification from the application, the computing device, or the other device associated with the computing device, the notification one in which the first command but not the second command is determined to be an adequate command to address the notification.

Example 28: The method as recited by any of examples 16-27, wherein the determining is performed responsive to the comparing resulting in the correlation between the ambiguous gesture and both the first gesture and the second gesture being above a no-confidence level and below a high-confidence level.

Example 29: A computing device comprising: at least one antenna; a radar system configured to transmit a radar-transmit signal and receive a radar-receive signal using the at least one antenna, the radar-receive signal having the radar-signal characteristic; at least one processor; and a computer-readable storage media comprising instructions, responsive to execution by the processor, for directing the computing device to perform any one of the methods recited in examples 16-28.

Example 30: A computing system comprising a first computing device and a second computing device connected to a communication network to enable: the first computing device or the second computing device to perform any one of the methods recited in examples 16-28; and an exchange of information between the first computing device and the second computing device, the information including at least one of the following: one or more detected radar-signal characteristics; one or more stored radar-signal characteristics; or contextual information.

Example 31: A method comprising: detecting, at a computing device and using a radar system, an ambiguous gesture performed by a user, the ambiguous gesture associated with a first radar-signal characteristic; comparing the first radar-signal characteristic to one or more stored radar-signal characteristics, the comparing not effective to recognize the ambiguous gesture as a first gesture; detecting another gesture performed by the user, the other gesture associated with a second radar-signal characteristic; comparing the second radar-signal characteristic of the other gesture to the one or more stored radar-signal characteristics, the comparing effective to correlate the other gesture to the first gesture; and responsive to the comparing: determining that the ambiguous gesture is the first gesture; and storing the first radar-signal characteristic, the stored first radar-signal characteristic usable to determine, at a future time, a performance of the first gesture.

Example 32: The method as recited by example 31, wherein determining that the ambiguous gesture is the first gesture is further based on an amount of time between detecting the ambiguous gesture and detecting the other gesture.

Example 33: The method as recited by example 32, wherein the amount of time is: two seconds or less; or a period of elapsed time in which an additional gesture is not detected between the ambiguous gesture and the other gesture.

Example 34: The method as recited by examples 32 or 33, the method further comprising: determining an amount of elapsed time within the amount of time; and responsive to the determining that the ambiguous gesture is the first gesture, applying a weighted value to the first and second radar-signal characteristics, the weighted value: determined based on the amount of elapsed time; usable to increase a confidence of the first and second radar-signal characteristics for lower amounts of elapsed time; usable to decrease the confidence of the first and second radar-signal characteristics for greater amounts of elapsed time; and stored to improve detection of the first gesture at the future time.

Example 35: The method as recited by any of examples 31-34, the method further comprising determining the other gesture is similar to the ambiguous gesture by comparing the first radar-signal characteristic and the second radar-signal characteristic, the comparing effective to determine that the first radar-signal characteristic has a correlation to the second radar-signal characteristic that is above a high-confidence threshold.

Example 36: The method as recited by any of examples 31-35, wherein the comparing of the first radar-signal characteristic to the one or more stored radar-signal characteristics correlates the ambiguous gesture to multiple gestures, the correlation of the ambiguous gesture to multiple gestures not effective to correlate the ambiguous gesture to the first gesture to a confidence higher than at least one other of the multiple gestures.

Example 37: The method as recited by any of examples 31-36, wherein the determining that the ambiguous gesture is the first gesture is further based on receiving a prompted gesture performed by the user, the receiving responsive to providing a prompt to the user to repeat the ambiguous gesture.

Example 38: The method as recited by any of examples 31-37, wherein the determining that the ambiguous gesture is the first gesture is further based on receiving a nongestural command.

Example 39: The method as recited by example 38, wherein receiving the nongestural command is responsive to inquiring, from the user, whether the ambiguous gesture is the first gesture.

Example 40: The method as recited by any of examples 31-39, wherein: the other gesture is detected by a second computing device of a computing system, the computing system including the computing device and a communication network, the communication network enabling the computing device and the second computing device to exchange information; the ambiguous gesture is detected within a first proximate region of the computing device; and the other gesture is detected within a second proximate region of the second computing device.

Example 41: The method as recited by any of examples 31-40, the method further comprising, responsive to determining the ambiguous gesture is the first gesture, determining contextual information regarding the performance of the ambiguous gesture and storing the contextual information, the stored contextual information usable to aid in determination of, at the future time, the performance of the first gesture.

Example 42: The method as recited by example 41, wherein the contextual information includes a position or orientation of the user, relative to the computing device, during the performance of the ambiguous gesture.

Example 43: The method as recited by examples 41 or 42, wherein the contextual information includes at least one non-radar-signal characteristic of the ambiguous gesture detected at another sensor.

Example 44: The method as recited by example 43, wherein the other sensor includes one or more of: an ultrasound detector, camera, ambient light sensor, pressure sensor, barometer, microphone, or biometric sensor.

Example 45: The method as recited by any of examples 31-44, wherein: the radar system utilizes unsegmented detection to detect the ambiguous gesture; and the unsegmented detection is conducted without either prior knowledge or a wake-up trigger event indicating that the user is going to perform the ambiguous gesture.

Example 46: A computing device comprising: at least one antenna; a radar system configured to transmit a radar-transmit signal and receive a radar-receive signal using the at least one antenna; at least one processor; and a computer-readable storage media comprising instructions, responsive to execution by the processor, for directing the computing device to perform any one of the methods recited in examples 31-45.

Example 47: A method comprising: transmitting radar-transmit signals from a radar system associated with a computing device; receiving, at the radar system or another radar system associated with the computing device, radar-receive signals; continually attempting to determine, based on one or more of the radar-receive signals, that a user has performed a gesture at a long-range extent, the continually attempting performed without segmenting or narrowing a time-frame in which to analyze the one or more radar-receive signals based on an indication that the user intends to perform the gesture; responsive to determining the user has performed the gesture, correlating a radar-signal characteristic of the one or more radar-receive signals to one or more stored radar-signal characteristics of a known gesture; and responsive to determining that the performed gesture is the known gesture, directing the computing device, an application associated with the computing device, or another device associated with the computing device to execute a command associated with the known gesture.

Example 48: The method as recited by example 47, wherein the one or more radar-receive signals are reflected off the user performing the gesture at a linear displacement of two to four meters relative to the radar system associated with the computing device.

Example 49: The method as recited by any of examples 47 and 48, wherein the indication includes a sensed action that the user intends to perform a gesture, the sensed action performed by the user and recognized by one or more sensors associated with the computing device.

Example 50: The method as recited by any of examples 47-49, wherein the computing device is configured to recognize the gesture performed by the user at one or more locations within a proximate region of the radar system, the recognition conducted without requiring the user to perform the gesture at a specified location or orientation within the proximate region.

Example 51: The method as recited by any of examples 47-50, the method further comprising: responsive to the correlating of the radar-signal characteristic to the one or more stored radar-signal characteristics, verifying a preliminary result of the correlation using a gesture debouncer, the preliminary result comprising a classification of the performed gesture as the known gesture associated with the command, the preliminary result satisfying at least one of the following requirements of the gesture debouncer: a minimum threshold requirement of elapsed time between gesture performances; a maximum threshold requirement regarding a level of confidence; or one or more heuristics.

Example 52: The method as recited by any of examples 47-51, the method further comprising: receiving, at the radar system or the other radar system, a second radar-receive signal reflected off another gesture of the user; determining, from the second radar-receive signal, a second radar-signal characteristic; comparing the second radar-signal characteristic to the one or more stored radar-signal characteristics, the comparing effective to determine the other gesture of the user is not the known gesture or another known gesture; and responsive to the determination that the other gesture of the user is not the known gesture or the other known gesture: classifying the second radar-signal characteristic as negative data, the negative data corresponding to a class of background motions; and storing the second radar-signal characteristic, the stored second radar-signal characteristic usable to correlate, at a future time, a future-received radar-receive signal to the other gesture of the user, the future-received radar-receive signal reflected off an additional gesture of the user and having a similar or identical radar-signal characteristic to the second radar-signal characteristic, the correlation indicating the additional gesture of the user corresponds to the class of background motions and not the known gesture or the other known gesture.

Example 53: The method as recited by any of examples 47-52, the method further comprising: responsive to the determining that the performed gesture is the known gesture, augmenting the radar-signal characteristic of the performed gesture prior to storing the radar-signal characteristic, the augmenting including an interpolation or extrapolation of the radar-signal characteristic without requiring one or more additional radar-receive signals.

Example 54: The method as recited by example 53, wherein the radar-signal characteristic is associated with at least one complex-range Doppler map, the at least one complex-range Doppler map comprising: a range dimension corresponding to a displacement of the performed gesture relative to the radar system, the displacement taken at a scattering center of the performed gesture; and a Doppler dimension corresponding to a velocity of the performed gesture relative to the radar system.

Example 55: The method as recited by example 54, wherein: the augmentation of the radar-signal characteristic includes a rotation of the at least one complex-range Doppler map; the rotation is achieved by substituting a random or predetermined phase value into the at least one complex-range Doppler map to generate an augmented radar-signal characteristic of the performed gesture, the random or predetermined phase value being distinct from a phase value associated with the radar-signal characteristic; and the augmented radar-signal characteristic represents an additional angular displacement of the performed gesture relative to the radar system, the augmented radar-signal characteristic determined without requiring the user to perform the gesture at the additional angular displacement.

Example 56: The method as recited by example 54, wherein: the augmentation of the radar-signal characteristic includes one or more scalings of a magnitude of the at least one complex-range Doppler map; the one or more scalings are achieved using one or more random or predetermined scaling values of a normal distribution to generate an augmented radar-signal characteristic of the performed gesture; and the augmented radar-signal characteristic represents an additional linear displacement of the performed gesture relative to the radar system, the augmented radar-signal characteristic determined without requiring the user to perform the gesture at the additional linear displacement.

Example 57: The method as recited by any of examples 47-52, the method further comprising: augmenting the radar-signal characteristic associated with the gesture being performed at the long-range extent and for a short-range extent, the short-range extent corresponding to a smaller linear displacement from the radar system than the long-range extent; and storing the augmented radar-signal characteristic to enable recognition, at a future time, of the gesture being performed at the short-range extent.

Example 58: The method as recited by any of examples 47-57, wherein the correlation of the radar-signal characteristic to the one or more stored radar-signal characteristics is performed using a machine-learned model, the machine-learned model associated with one or more convolutional neural networks, the machine-learned model comprising a frame model, the frame model configured to modify one or more frames of the radar-signal characteristic using one or more convolution layers, the one or more frames collected by the radar system at one or more times, and the frame model comprising one or more of: a separable convolution layer; or a residual neural network.

Example 59: The method as recited by example 58, wherein: the machine-learned model comprises a temporal model configured to correlate one or more modified frames along a time domain, the temporal model including one or more residual neural networks; and the correlation of the one or more modified frames is effective to determine a probability of the performed gesture being associated with a set of possible classes, the set of possible classes comprising at least one of: a gesture class corresponding to the known gesture or another known gesture; or a background class corresponding to one or more background motions that are not the known gesture or the other known gesture.

Example 60: A computing device comprising: at least one antenna; a radar system configured to transmit a radar-transmit signal and receive a radar-receive signal using the at least one antenna; at least one processor; and a computer-readable store media comprising instructions, responsive to execution by the processor, for directing the computing device to perform any one of the methods recited in examples 47-59.

Example 61: A computing system comprising a first computing device and a second computing device connected to a communication network to enable: the first computing device or the second computing device to perform any one of the methods recited in examples 47-60; and an exchange of information between the first computing device and the second computing device, the information including at least one of the following: one or more determined radar-signal characteristics; or one or more stored radar-signal characteristics.

Example 62: A method comprising: determining a first capability of a first sensor to sense a gesture being performed at a current time or to be performed at a future time within a region, the determining the first capability based on contextual information associated with the region; determining a second capability of a second sensor to sense the gesture being performed at the current time or to be performed at the future time within the region, the determining the second capability based on the contextual information associated with the region; comparing the first capability to the second capability, the comparing effective to determine that the first sensor is more capable of sensing the gesture than the second sensor; and responsive to the comparing, configuring the first sensor as the primary sensor of a gesture-recognition device, the primary sensor to be used preferentially over the second sensor to sense the gesture at the current or future time.

Example 63: The method as recited by example 62, wherein: the first sensor is an antenna associated with a radar system and the second sensor is a camera; the contextual information includes to a quantity of light available to illuminate the gesture being performed within the region, the quantity of light being an amount of light insufficient to optically illuminate the gesture sufficient for capture by an optical sensor of the camera; and the first sensor is determined to be more capable of sensing the gesture than the camera based on the low quantity of light.

Example 64: The method as recited by example 62, wherein the contextual information includes one or more conditions of the region, the one or more conditions associated with a light, sound, motion, or arrangement of objects.

Example 65: The method as recited by any of examples 62-64, wherein the configuring of the first sensor as the primary sensor is effective to conserve power by reducing a power setting or a power use by the second sensor.

Example 66: The method as recited by any of examples 62-65, wherein the contextual information includes a style or type of gesture previously performed by a user within the region.

Example 67: The method as recited by example 66, wherein the style or type of gesture is a particular gesture most-commonly performed in the region at the current or future time, and wherein determining the first or second capability is based on a capability of the first or second sensor, respectively, to sense the particular gesture.

Example 68: The method as recited by any of examples 62-67, wherein the contextual information includes a position or an orientation of a user or the user within the region.

Example 69: The method as recited by any of examples 62-68, wherein the contextual information includes a presence of a particular known user, the particular known user affecting the first capability or the second capability.

Example 70: The method as recited by any of examples 62-69, wherein the contextual information includes a time of day, information stored on a device associated with the first or second sensor, foreground or background operations of the device, or a location of the device.

Example 71: The method as recited by any of examples 62-70, wherein the first or second sensor is associated with a radar system and another of the first or second sensor is not associated with the radar system, the other of the first or second sensor being a microphone, camera, ultrasonic sensor, biometric sensor, temperature sensor, health sensor, or an optical sensor.

Example 72: The method as recited by any of examples 62-71, wherein determining the first and second capability utilizes a machine-learned model that includes at least one convolutional neural network.

Example 73: The method as recited by any of examples 62-72, the method further comprising recognizing, at the current or future time, the gesture using: data sensed by the primary sensor and the second sensor; or data sensed by the primary sensor and not the second sensor.

Example 74: The method as recited by example 73, wherein recognizing the gesture uses the data sensed by the primary sensor and the second sensor, and the recognizing the gesture uses a first weighted value for the primary sensor and a second weighted value for the second sensor, the first weighted value greater than the second weighted value.

Example 75: A computing device comprising: at least one antenna; a radar system configured to transmit a radar-transmit signal and receive a radar-receive signal using the at least one antenna; at least one processor; and a computer-readable store media comprising instructions, responsive to execution by the processor, for directing the computing device to perform any one of the methods recited in examples 62-74.

Example 76: A computing system comprising a first computing device and a second computing device connected to a communication network to enable: the first computing device or the second computing device to perform any one of the methods recited in examples 62-74; and an exchange of information between the first computing device and the second computing device.

Example 77: A method comprising: detecting, at a computing device and using a radar system, an ambiguous gesture performed by a user, the ambiguous gesture associated with a radar-signal characteristic; comparing the radar-signal characteristic to one or more stored radar-signal characteristics, the comparing effective to associate the ambiguous gesture to one or more known gestures, the one or more known gestures each having a corresponding command, the association to the one or more known gestures below recognition threshold criteria sufficient to recognize the ambiguous gesture as one of the one or more known gestures; receiving, after detecting the ambiguous gesture, an indication of performance or requested performance of a command; determining that the indicated command is a first command of the corresponding commands associated with a first known gesture of the one or more known gestures with which the comparing was effective to associate the ambiguous gesture; and storing the radar-signal characteristic with the first known gesture to enable recognition of the first gesture at a future time.

Example 78: The method as recited by example 77, wherein receiving the indication is not responsive to performance or requested performance of the command based on recognition of a gesture by the radar system.

Example 79: The method as recited by any of examples 77 and 78, wherein receiving the indication is responsive to selection, by the user, of the command through non-radar input.

Example 80: The method as recited by any of examples 77-79, wherein the non-radar input is audio input through a voice-recognition system, a touch input through a touch-sensitive display, or typing input through a physical keyboard.

Example 81: The method as recited by any of examples 77-80, further comprising: receiving an input from the user that confirms that the ambiguous gesture was intended to be the first known gesture, wherein storing the radar-signal characteristic is responsive to receiving the input from the user.

Example 82: The method as recited by any of examples 77-81, wherein detecting the ambiguous gesture is performed in absence of a gesture-training event, the gesture-training event comprising segmented teaching, for the user, of one or more gestures.

Example 83: The method as recited by any of examples 77-82, wherein receiving the indication of performance or requested performance of the command comprises determining the performance or requested performance based on one or more changes to an operational state of the computing device.

Example 84: The method as recited by any of examples 77-83, wherein detecting the ambiguous gesture utilizes a machine-learned model to improve the detection of the ambiguous gesture, the machine-learned model associated with one or more convolutional neural networks.

Example 85: The method as recited by any of examples 77-84, wherein storing the radar-signal characteristic is further responsive to or based on a period of time between detecting the ambiguous gesture and receiving the indication of the performance or requested performance of the command.

Example 86: The method as recited by any of examples 77-85, further comprising weighting the radar-signal characteristic relative to the one or more stored characteristics based on the period of time.

Example 87: The method as recited by any of examples 77-86, wherein storing the radar-signal characteristic is further responsive to or based on whether or not an indication of performance or requested performance of another command is indicated prior to receiving the indication.

Example 88: The method as recited by any of examples 77-87, wherein storing the radar-signal characteristic is responsive to determining that no indication of performance or requested performance of the other command is indicated prior to receiving the indication of performance or requested performance of the command.

Example 89: The method as recited by any examples 77-88, wherein responsive to the determining, associating the radar-signal characteristic of the ambiguous gesture to a first stored radar-signal characteristic of the one or more stored radar-signal characteristics, the first stored radar-signal characteristics associated with the first known gesture.

Example 90: A computing device comprising: at least one antenna; a radar system configured to transmit a radar-transmit signal and receive a radar-receive signal using the at least one antenna; at least one processor; and a computer-readable storage media comprising instructions, responsive to execution by the processor, for directing the computing device to perform any one of the methods recited in examples 77-89.

Example 91: A computing system comprising a first computing device and a second computing device connected to a communication network to enable: the first computing device or the second computing device to perform any one of the methods recited in examples 77-89; and an exchange of information between the first computing device and the second computing device, the information including at least one of the following: one or more detected radar-signal characteristics; or one or more stored radar-signal characteristics.

Example 92: A method comprising: detecting, at a computing device and using a radar system, an ambiguous gesture performed by a user, the ambiguous gesture associated with a radar-signal characteristic; comparing the radar-signal characteristic to one or more stored radar-signal characteristics, the comparing effective to correlate the ambiguous gesture to a first gesture and a second gesture, the first gesture and the second gesture associated with a first command and a second command, respectively; determining that the first command will be less destructive than the second command; and responsive to the determining, directing the computing device, an application associated with the computing device, or another device associated with the computing device to perform the first command.

Example 93: The method as recited by example 92 wherein determining that the first command will be less destructive determines that the first command is an interim command and the second command is a final command.

Example 94: The method as recited by any of examples 92 and 93, wherein determining that the first command will be less destructive determines that the first command can be reversed and that the second command cannot be reversed.

Example 95: The method as recited by any of examples 92-94, wherein determining that the first command is less destructive than the second command is further based on a prior action taken by the user within a period of time after a prior performance of the first or the second command.

Example 96: The method as recited by any of examples 92-95, the method further comprising: responsive to performance of the first command, detecting, at the computing device or the other device associated with the computing device, a user input directing the computing device to perform a third command to undo the first command, the user input not including another gesture performance; responsive to detecting the user input command, determining the ambiguous gesture is the not the first gesture; and storing the determination of the ambiguous gesture to improve detection of the first gesture at the future time.

Example 97: The method as recited by any of examples 92-96, the method further comprising: responsive to performance of the first command, detecting, at the computing device or the other device associated with the computing device, another gesture being performed by the user; and responsive to determining that the other gesture is similar or identical to the ambiguous gesture: determining the user did not intend for the first command to be performed, the unintended performance indicating the other gesture and the ambiguous gesture are not the first gesture; and determining the other gesture and the ambiguous gesture are the second gesture, the determining effective to correlate the other gesture to the second command.

Example 98: The method as recited by any of examples 92-97, the method further comprising, responsive to correlating the other gesture to the second command: directing the computing device, the application associated with the computing device, or the other device associated with the computing device to: stop performing the first command; or perform the second command; and storing another radar-signal characteristic associated with the other gesture to enable detection of the second gesture at the future time.

Example 99: The method as recited by any of examples 92-98, wherein the determining that the first command is less destructive is based on a present condition, a logic, a history of user behavior, or a user input.

Example 100: The method as recited by any of examples 92-99, wherein the first command and second command are both capable of affecting an operation of a single application, the operation executable by the computing device or the other device associated with the computing device.

Example 101: The method as recited by any of examples 92-100, wherein: the single application is a phone application; the first command is to mute a phone call; and the second command is to end the phone call.

Example 102: The method as recited by any of examples 92-101, wherein: the single application is a notification application; the first command is to mute, pause, or delay a notification; and the second command is to disable the notification.

Example 103: The method as recited by any of examples 92-102, wherein the first command and second command are capable of affecting an operation of different, respective applications or devices associated with the computing device.

Example 104: The method as recited by any of examples 92-103, wherein the computing device utilizes a machine-learned model that performs unsupervised learning of gesture performances, the unsupervised learning usable to correlate the gesture performances to one or more commands without utilizing predetermined conditions or algorithms regarding the correlation.

Example 105: A computing device comprising: at least one antenna; a radar system configured to transmit a radar-transmit signal and receive a radar-receive signal using the at least one antenna; at least one processor; and a computer-readable store media comprising instructions, responsive to execution by the processor, for directing the computing device to perform any one of the methods recited in examples 92 to 104.

Example 106: A computing system comprising a first computing device and a second computing device connected to a communication network to enable: the first computing device or the second computing device to perform any one of the methods recited in examples 92 to 104; and an exchange of information between the first computing device and the second computing device.

Example 107: A method comprising: determining, based on one or more radar-receive signals, two or more of: a current proximity of a user relative to an interaction device associated with a computing device; a projected proximity of the user relative to the interaction device associated with the computing device; or a body orientation of the user relative to the interaction device associated with the computing device; estimating, based on the two or more of the current proximity, the projected proximity, or the body orientation, an engagement or projected engagement of the user with the interaction device associated with the computing device; and based on the estimated engagement or the estimated projected engagement of the user with the interaction device associated with the computing device, altering a setting of the computing device or an interaction device associated with the computing device.

Example 108: The method of example 107, wherein altering the setting alters the interaction device from a first setting to a second setting, the first setting being a first privacy setting and the second setting being a second privacy setting.

Example 109: The method of any one of examples 107 and 108, wherein the determining is based on at least the current proximity, and wherein the current proximity is determined to be within an effective distance for the interaction device to detect input from the user.

Example 110: The method of any one of examples 107-109, wherein the determining is based on at least the projected proximity, and wherein the projected proximity is determined based on a projected pathway, the projected pathway determined based on a current location of the user and a history of prior movement of the user or a current velocity of the user.

Example 111: The method of any one of examples 107-110, wherein the determining is based on at least the body orientation, and wherein the body orientation is determined based on a facial profile of the user.

Example 112: The method of any one of examples 107-111, wherein the determining is based on at least the body orientation, and wherein the body orientation is determined based on an angle of the user's body, the angle indicating a direction of interest toward or away from the interaction device associated with the computing device.

Example 113: The method of any one of examples 107-112, wherein the estimating the engagement or the projected engagement of the user with the interaction device associated with the computing device uses a machine-learned model.

Example 114: The method of example 113, wherein the machine-learned model is built using supervised training, the supervised training including user selection to interact with the interaction device, the user selection having associated prior current proximity, prior projected proximity, or prior body orientation.

Example 115: The method of any one of examples 107-114, wherein the estimating the engagement or the projected engagement of the user with the interaction device associated with the computing device weights the two or more of the current proximity, the projected proximity, or the body orientation.

Example 116: The method of any one of examples 107-115, wherein the estimating the engagement or the projected engagement of the user with the interaction device associated with the computing device is further based on a directional orientation of the interaction device.

Example 117: The method of example 116, wherein the estimating the engagement or the projected engagement of the user with the interaction device based on the directional orientation of the interaction device determines the estimated engagement or the estimated projected engagement using the projected proximity and the directional orientation.

Example 118: The method of example 117, wherein the estimating the engagement or the projected engagement of the user with the interaction device based on the directional orientation of the interaction device determines the estimated engagement or the estimated projected engagement based on an opposing direction of the body orientation with the directional orientation.

Example 119: The method of any one of examples 107-118, wherein the estimating the engagement or the projected engagement of the user with the interaction device associated with the computing device estimates a low engagement or a low projected engagement based on determining that the user is walking or is projected to walk past the interaction device.

Example 120: The method of any one of examples 107-118, wherein the estimating the engagement or the projected engagement of the user with the interaction device associated with the computing device estimates a high engagement or a high projected engagement based on determining that the user is walking directly toward the interaction device.

Example 121: A computing device comprising: at least one processor; and computer-readable storage media comprising instructions, responsive to execution by the processor, for directing the computing device to perform any one of the methods recited in examples 107-120.

Example 122: A method comprising: detecting, using a radar system associated with a computing device, a gesture performed by a user, the gesture associated with a radar-signal characteristic; comparing the radar-signal characteristic associated with the gesture performed by the user to one or more stored radar-signal characteristics, the comparing effective to determine a lack of correlation to one or more known gestures with which the one or more stored radar-signal characteristics are associated, the one or more known gestures associated with one or more known commands; receiving, proximate with detecting the gesture, a new command; responsive to the comparing effective to determine the lack of correlation and the receiving the new command, determining that the gesture is a new gesture associated with the new command; and storing the associated radar-signal characteristic to enable recognition of the new gesture at a future time effective to cause performance of the new command.

Example 123: The method as recited by example 122, wherein the detecting the gesture is performed at the computing device associated with the radar system and wherein the receiving the new command is performed by the computing device.

Example 124: The method as recited by any of examples 122 and 123, wherein the comparing effective to determine the lack of correlation to the one or more known gestures with which the one or more stored radar-signal characteristics are associated determines the lack of correlation based on failing to meet confidence threshold criteria.

Example 125: The method as recited by any of examples 122-124, wherein the confidence threshold criteria is associated with a low confidence, and wherein the comparing is at or below the confidence threshold criteria for each of the one or more stored radar-signal characteristics.

Example 126: The method as recited by any of examples 122-125, wherein detecting the gesture associated with the radar-signal characteristic further comprises determining the radar-signal characteristic.

Example 127: The method as recited by any of examples 122-126, wherein receiving the new command is performed prior to detecting the gesture performed by the user.

Example 128: The method as recited by any of examples 122-127, wherein receiving, proximate with detecting the gesture, the new command receives the new command and detects the gesture within five seconds of each other.

Example 129: The method as recited by any of examples 122-128, wherein receiving, proximate with detecting the gesture, the new command receives the new command and detects the gesture without an intervening gesture attempt or other command initiated by the user.

Example 130: The method as recited by any of examples 122-129, wherein detecting the gesture comprises determining that the radar-signal characteristic of the gesture is associated with an intentional motion performed by the user, the intentional motion not corresponding to a background motion.

Example 131: The method as recited by any of examples 122-130, the method further comprising: detecting, using the radar system and at the computing device, a second radar-signal characteristic associated with a presence of the user, the second radar-signal characteristic usable to determine that the user is a registered user; and responsive to determining the user is the registered user, correlating the new gesture to the registered user.

Example 132: The method as recited by any of examples 122-131, wherein the new gesture is correlated with the registered user and not a different user, the method further comprising recognizing, at the future time, performance of the new gesture based at least in part on detecting the presence of the registered user using the second radar-signal characteristic.

Example 133: The method as recited by any of examples 123-132, wherein the new command is associated with two or more gestures, the two or more gestures including: the new gesture when performed by the registered user; and a different gesture when performed by the different user.

Example 134: The method as recited by any of examples 124-133, wherein the computing device associated with the radar system utilizes a machine-learned model to improve the recognition of the new gesture, the machine-learned model associated with one or more convolutional neural networks.

Example 135: The method as recited by any of examples 125-134, wherein the new command is not associated with the one or more known commands.

Example 136: A computing device comprising: at least one antenna; a radar system configured to transmit a radar-transmit signal and receive a radar-receive signal using the at least one antenna; at least one processor; and a computer-readable store media comprising instructions, responsive to execution by the processor, for directing the computing device to perform any one of the methods recited in examples 125-135.

The invention claimed is:

1. A method comprising:

transmitting a first radar-transmit signal from a first radar-enabled computing device of a computing system, the first radar-enabled computing device within a first proximate region of a physical region, the physical region larger than the first proximate region;

receiving, at the first radar-enabled computing device, a first radar-receive signal;

comparing a first radar-signal characteristic of the first radar-receive signal to one or more stored radar-signal characteristics, the comparing effective to correlate the first radar-signal characteristic to a first stored radar-signal characteristic of a registered user, the correlation indicating a presence of the registered user within the first proximate region;

transmitting a second radar-transmit signal from a second radar-enabled computing device of the computing system, the second radar-enabled computing device being separate from the first radar-enabled computing device and within a second proximate region of the physical region, the second radar-enabled computing device having access to the one or more stored radar-signal characteristics via a communication network;

receiving, at the second radar-enabled computing device, a second radar-receive signal; and comparing a second radar-signal characteristic of the second radar-receive signal to the one or more stored radar-signal characteristics, the comparing effective to determine that the second radar-signal characteristic correlates to the first stored radar-signal characteristic or a second stored radar-signal characteristic of the registered user, the correlation indicating the presence of the registered user within the second proximate region.

2. The method of claim 1, wherein the physical region is a domicile, the first proximate region is a first room of the domicile, and the second proximate region is a second room of the domicile.

3. The method of claim 1, further comprising:

receiving, at a first time and at the first radar-enabled computing device, a first portion of a command from the registered user;

receiving, at a second, later time and at the second radar-enabled computing device, a second portion of the command from the registered user; and determining, based on the presence of the registered user within the first proximate region at the first time and on the presence of the registered user within the second proximate region at the second, later time, that the first portion and the second portion of the command are associated.

4. The method of claim 3, further comprising:

responsive to determining that the first portion and the second portion of the command are associated, causing performance of the command.

5. The method of claim 3, wherein:

the command is a two-part command;

the first portion of the command is received through a first gesture recognized by a first radar system associated with the first radar-enabled computing device or is received through a first audio input recognized by a first audio system associated with the first radar-enabled computing device;

the second portion of the command is received through a second gesture recognized by a second radar system associated with the second radar-enabled computing device or is received though a second audio input recognized by a second audio system associated with the second radar-enabled computing device; and the association of the first portion of the command and the second portion of the command is based on the command being the two-part command.

6. The method of claim 3, wherein:
the command is a single command;
the first portion of the command is received through a first part of a gesture recognized by a first radar system associated with the first radar-enabled computing device or is received through a first part of an audio input recognized by a first audio system associated with the first radar-enabled computing device; and
the second portion of the command is received through a second part of the gesture recognized by a second radar system associated with the second radar-enabled computing device or is received through a second part of the audio input recognized by a second audio system associated with the second radar-enabled computing device.

7. The method of claim 3, further comprising:
responsive to the determination of the presence of the registered user within the second proximate region, configuring the second radar-enabled computing device to determine an association of the first and second portions of the command.

8. The method of claim 7, wherein the configuring includes passing, to an entity associated with the computing system that is accessible by the second radar-enabled computing device, information about the first portion of the command.

9. The method of claim 1, wherein one or more operations or applications are being performed within the first proximate region incident with performing one or more elements of the method, and further comprising, responsive to the correlation indicating the presence of the registered user within the second proximate region, causing performance or continuing performance of the one or more operations or applications within the second proximate region.

10. The method of claim 9, wherein the one or more operations or applications is a media presentation within the first proximate region and wherein the method further comprises causing performance or continuing performance of the media presentation within the second proximate region.

11. The method of claim 1, wherein:
the first radar-enabled computing device is configured to anticipate the registered user based on the first radar-enabled computing device being located in the first proximate region;
determining, at the first radar-enabled computing device, that an ambiguous user is present, the ambiguous user being the registered user, another registered user, or an unregistered person; and
determining that the ambiguous user is the registered user based on the second radar-enabled computing device being configured to anticipate the registered user.

12. The method of claim 11, the method further comprising detecting that the second radar-enabled computing device has been moved to the first proximate region; and configuring the second radar-enabled computing device to anticipate detecting the registered user.

13. The method of claim 1, wherein the first radar-enabled computing device is configured to anticipate a known gesture based on the first radar-enabled computing device being located in the first proximate region, the method further comprising:
detecting, at the first radar-enabled computing device, an ambiguous gesture; and
determining, based on the first radar-enabled computing device being configured to anticipate the known gesture, that the ambiguous gesture is the known gesture.

14. The method of claim 1, the method further comprising, responsive to determining the presence of the registered user:
providing, at the first radar-enabled computing device, training to teach the registered user to perform one or more particular known gestures;
maintaining, for the registered user, a first training history comprising the one or more particular known gestures as performed by the registered user during training, the second radar-enabled computing device further configured to access the first training history; and
responsive to determining, at the second radar-enabled computing device, the presence of the registered user, resuming training at the second radar-enabled computing device based on the first training history.

15. A computing system comprising a first radar-enabled computing device and a second radar-enabled computing device connected to a communication network to enable operations comprising:
transmitting a first radar-transmit signal from the first radar-enabled computing device of the computing system, the first radar-enabled computing device within a first proximate region of a physical region, the physical region larger than the first proximate region;
receiving, at the first radar-enabled computing device, a first radar-receive signal;
comparing a first radar-signal characteristic of the first radar-receive signal to one or more stored radar-signal characteristics, the comparing effective to correlate the first radar-signal characteristic to a first stored radar-signal characteristic of a registered user, the correlation indicating a presence of the registered user within the first proximate region;
transmitting a second radar-transmit signal from the second radar-enabled computing device of the computing system, the second radar-enabled computing device being separate from the first radar-enabled computing device and within a second proximate region of the physical region, the second radar-enabled computing device having access to the one or more stored radar-signal characteristics via a communication network;
receiving, at the second radar-enabled computing device, a second radar-receive signal; and
comparing a second radar-signal characteristic of the second radar-receive signal to the one or more stored radar-signal characteristics, the comparing effective to determine that the second radar-signal characteristic correlates to the first stored radar-signal characteristic or a second stored radar-signal characteristic of the registered user, the correlation indicating the presence of the registered user within the second proximate region.

16. The computing system of claim 15, wherein the operations further comprise:
receiving, at a first time and at the first radar-enabled computing device, a first portion of a command from the registered user;
receiving, at a second, later time and at the second radar-enabled computing device, a second portion of the command from the registered user;
determining, based on the presence of the registered user within the first proximate region at the first time and on the presence of the registered user within the second proximate region at the second, later time, that the first portion and the second portion of the command are associated; and responsive to determining that the first portion and the second portion of the command are associated, causing performance of the command.

17. The computing system of claim 16, wherein the operations further comprise:

responsive to the determination of the presence of the registered user within the second proximate region, configuring the second radar-enabled computing device to determine an association of the first and second portions of the command.

18. The computing system of claim 15, wherein the first radar-enabled computing device is configured to anticipate the registered user based on the first radar-enabled computing device being located in the first proximate region, the operations further comprising:

determining, at the first radar-enabled computing device, that an ambiguous user is present, the ambiguous user being the registered user, another registered user, or an unregistered person; and determining that the ambiguous user is the registered user based on the second radar-enabled computing device being configured to anticipate the registered user.

19. The computing system of claim 15, wherein the first radar-enabled computing device is configured to anticipate a known gesture based on the first radar-enabled computing device being located in the first proximate region, the operations further comprising:

detecting, at the first radar-enabled computing device, an ambiguous gesture; and determining, based on the first radar-enabled computing device being configured to anticipate the known gesture, that the ambiguous gesture is the known gesture.

20. The computing system of claim 15, wherein the operations further comprise, responsive to determining the presence of the registered user:

providing, at the first radar-enabled computing device, training to teach the registered user to perform one or more particular known gestures;

maintaining, for the registered user, a first training history comprising the one or more particular known gestures as performed by the registered user during training, the second radar-enabled computing device further configured to access the first training history; and responsive to determining, at the second radar-enabled computing device, the presence of the registered user, resuming training at the second radar-enabled computing device based on the first training history.

* * * * *